US012056445B2

(12) United States Patent
Dvorak

(10) Patent No.: US 12,056,445 B2
(45) Date of Patent: Aug. 6, 2024

(54) METHOD AND SYSTEM FOR IMPROVED SPREADSHEET CHARTS

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 17/384,404

(22) Filed: Jul. 23, 2021

(65) Prior Publication Data

US 2022/0027555 A1 Jan. 27, 2022

Related U.S. Application Data

(60) Provisional application No. 63/055,581, filed on Jul. 23, 2020.

(51) Int. Cl.

*G06F 3/0482* (2013.01)
*G06F 3/0486* (2013.01)
*G06F 40/18* (2020.01)

(52) U.S. Cl.

CPC ............ *G06F 40/18* (2020.01); *G06F 3/0482* (2013.01); *G06F 3/0486* (2013.01)

(58) Field of Classification Search

CPC ....... G06F 40/18; G06F 3/0482; G06F 3/0486
See application file for complete search history.

(56) References Cited

U.S. PATENT DOCUMENTS 6,529,217 B1 3/2003 Maguire, III et al.
8,321,781 B2 11/2012 Tolle
8,527,909 B1 * 9/2013 Mullany ............. G06F 3/04883 345/173
8,972,421 B2 3/2015 Vishnubhatta et al.
10,606,855 B2 3/2020 Pattabhiraman et al.
11,748,634 B1 9/2023 Kulkarni et al.
2008/0195930 A1 8/2008 Tolle
2009/0112922 A1 * 4/2009 Barinaga ............. G06F 16/9577
2011/0088011 A1 4/2011 Ouali
2013/0103701 A1 4/2013 Vishnubhatta et al.
2013/0197953 A1 8/2013 Sholes et al.
2014/0053091 A1 * 2/2014 Hou .................... G06F 3/04886 715/810
2015/0254369 A1 * 9/2015 Hou ...................... G06F 16/248 707/798

(Continued)

*Primary Examiner* — Jennifer N Welch
*Assistant Examiner* — Amy P Hoang
(74) *Attorney, Agent, or Firm* — Haynes Beffel & Wolfeld LLP; Ernest J. Beffel, Jr.

(57) ABSTRACT

The technology disclosed improves the creation, modification and presentation of spreadsheet charts. The technology makes creating charts from non-contiguous data, i.e., data requiring more than one non-contiguous ranges, easy and intuitive for users. Instead of placing the inputs in pop-ups, drop-downs and/or sidebars employing ribbons and other steps, the inputs are placed on the desired chart proximate to where the populated data will display. The inputs accept typed text, spreadsheet cells and provide a selector for cell selection. Embodiments will pre-populate title locations accepting similar inputs, add color for easier information identification and provide user sidebar or other input options. Error and warning messages are provided to help users generate the chart they desire.

22 Claims, 93 Drawing Sheets
(92 of 93 Drawing Sheet(s) Filed in Color)

(56) References Cited

U.S. PATENT DOCUMENTS

| | | | |
|---|---|---|---|
| 2015/0346972 | A1 | 12/2015 | Böekling et al. |
| 2016/0012111 | A1 | 1/2016 | Pattabhiraman et al. |
| 2016/0055232 | A1 | 2/2016 | Yang et al. |
| 2019/0102425 | A1 * | 4/2019 | Obeidat ................ G06F 16/248 |
| 2019/0147031 | A1 | 5/2019 | Dvorak |
| 2022/0270183 | A1 | 8/2022 | Menon et al. |
| 2023/0033480 | A1 | 2/2023 | Nakakimura et al. |
| 2023/0177751 | A1 | 6/2023 | Dvorak |

* cited by examiner

975

1411

1427

1438

1485

4668

4684

6252 6255 6274

6287 6278

8444

8473

8600

Fig. 86 Computer System

METHOD AND SYSTEM FOR IMPROVED SPREADSHEET CHARTS

RELATED APPLICATIONS

This application claims priority to and the benefit of U.S. Provisional Application No. 63/055,581, filed Jul. 23, 2020. This provisional application is incorporated by reference.

This application is related to and incorporates by reference the following applications:

U.S. application Ser. No. 16/31,339, entitled "Methods and Systems for Providing Selective Multi-Way Replication and Atomization of Cell Blocks and Other Elements in Spreadsheets and Presentations", filed 10 Jul. 2018, which claims the benefit of U.S. Provisional Application No. 62/530,835, filed Jul. 10, 2017, U.S. application Ser. No. 16/31,379, entitled "Methods and Systems for Connecting a Spreadsheet to External Data Sources with Formulaic Specification of Data Retrieval", filed 10 Jul. 2018, which claims the benefit of U.S. Provisional Application No. 62/530,786, filed Jul. 10, 2017, U.S. application Ser. No. 16/31,759, entitled, "Methods and Systems for Connecting A Spreadsheet to External Data Sources with Temporal Replication of Cell Blocks", filed 10 Jul. 2018, which claims the benefit of U.S. Provisional Patent Application No. 62/530,794, filed on Jul. 10, 2017, and U.S. application Ser. No. 16/191,402, entitled, "Methods and Systems for Connecting A Spreadsheet to External Data Sources with Ordered Formulaic Specification of Data Retrieved" filed Nov. 14, 2018, which claims the benefit of U.S. Provisional Patent Application No. 62/586,719," filed on Nov. 15, 2017.

U.S. application Ser. No. 17/359,430, entitled, "Methods and Systems for Constructing a Complex Formula in a Spreadsheet Cell", filed Jun. 25, 2021, which claims the benefit of U.S. Application No. 63/44,990, filed on Jun. 26, 2020.

U.S. application Ser. No. 17/359,418, entitled, "Methods and Systems for Presenting Drop-Down, Pop-Up or Other Presentation of a Multi-Value Data Set in a Spreadsheet Cell", filed Jun. 25, 2021, which claims the benefit of U.S. Application No. 63/44,989, filed on Jun. 26, 2020.

FIELD OF THE TECHNOLOGY DISCLOSED

Suggested Art Unit 2144 For Spreadsheets

The technology disclosed provides data processing means or steps wherein human perceptible elements of electronic spreadsheet information are gathered, associated, created, formatted, edited, prepared, or otherwise processed in forming a unified collection of such information storable as a distinct entity and a user's interaction with a computer system is used to control the presentation of display data; such interaction is interpreted and used by a data processor or computer architecture wherein system level elements of computation or data processing techniques are used prior to use with or in a specific display system.

Cell elements within a spreadsheet are gathered, associated, created, formatted, edited, prepared, or otherwise processed to be presented or wherein the relationship between the elements in a document or portion thereof is defined. The cell elements include data values organized in cells where the relationship between the cells is defined by formulas. Spreadsheet data in the cells is represented in equivalent pictorial form. Substantial improvements over previous charting from spreadsheet data are disclosed.

BACKGROUND

Today's spreadsheets are very good at creating, modifying and using charts in a very narrow range of settings. More specifically, if the data is contiguously located so that it can be completely entered in one range they are very good at creating charts. If the chart is adjacent to the data that populates it, it is easy to modify and use. However, if the user wants to use data from non-contiguous parts of a (bigger) spreadsheet and/or put the chart in a more presentation-oriented tab (e.g., chart tab in Microsoft Excel or Google Sheets) for easy viewing—then creating and modifying the chart is much more difficult and in some situations impossible. And if the user would like to use the chart in a presentation page with the formatting and images and other graphical content they are used to in Presentation applications like Microsoft PowerPoint and Google Slides, the user finds they must instead work across two applications with many separate activities and cross application complexity. Creating, modifying and using a spreadsheet chart in all the ways users would like is much more difficult than it needs to be.

Creating a chart from data that is not contiguously located in existing spreadsheet varies from very difficult to impossible to do, depending on the spreadsheet used and the configuration of the data. Current spreadsheets are designed to handle straightforward data input into charts that can be entered using one data range, complete with the data labels and any legend values. However, users frequently want to chart data sets that are dispersed within spreadsheet generated reports or analyses, where repositioning the data into the ideal configuration would be a lot of unnecessary work. Creating charts in these settings requires, at a minimum, a large number of steps negotiating ribbons, sidebars, dropdowns and/or other selections; and in some data and spreadsheet combinations is not possible. Users need a much simpler and intuitive way to handle these settings.

Modifying current spreadsheet charts also is more difficult than it needs to be. For example, modifying the order of the data in a chart without having to change the order of the data in the spreadsheet cells, is either an obscure process, or one involving many unnecessarily complex steps, or not doable in the current spreadsheets. Modifying charts when they are visibly adjacent to the data from which they are generated can be an acceptable process requiring many steps with ribbons, sidebars, dropdowns and/or other selections—however, when the chart is placed on a separate chart tab for better viewing it becomes an even more difficult process to make changes which could be dramatically improved.

Finally, viewing of charts in today's spreadsheets is too limited, driving unnecessary work by users to bridge separate spreadsheet and presentation applications. This work would be reduced if a spreadsheet had the capabilities to create complete presentation slides containing charts, turn those slides into multi-slide presentation documents and present them in presentation mode where the users see only the slides and can easily move from slide to slide.

Accordingly, there is a large opportunity to improve creating, modifying and using charts in a spreadsheet application.

SUMMARY

The technology disclosed improves the creation, modification and presentation of spreadsheet charts. The technology makes creating charts from non-contiguous data, i.e., data requiring more than one non-contiguous ranges, easy and intuitive for users. Instead of placing the inputs in pop-ups, drop-downs and/or sidebars employing ribbons and other steps, the inputs are placed on the desired chart proximate to where the populated data will display. The inputs accept typed text, spreadsheet cells and provide a selector for cell selection. Embodiments will pre-populate title locations accepting similar inputs, add color for easier information identification and provide user sidebar or other input options. Error and warning messages are provided to help users generate the chart they desire.

Other aspects of the invention relate to improving the modification of charts. One embodiment facilitates simple drag and drop altering of the order of chart elements without having to touch the spreadsheet cells from which the data was sourced. That drag and drop reordering can also be accomplished in sidebar or pop-up data proxies, where the ease of use of those proxies can be even further improved by color coordination with the related chart elements. Modification of charts not proximate to the spreadsheet data is dramatically simplified by our technology automating the location of the data and preparing the input for changes that once executed automatically take the user back to the chart location.

In another embodiment, charts can be incorporated in a presentation slide within the spreadsheet. That slide having text box, shape, image and other graphical capabilities within and outside the chart on the slide. The presentation slide also is able to hold more than one chart and able to be put into presentation mode displaying only the slide content (with no ribbon or other visible elements) and with navigation to other slides by simple keystroke or mouse click. In another embodiment, those presentation slides or pages are held within a multi-panel visual including an ordering visual with multiple slide or page representations, a current slide or page view and the presentation mode capability.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 58, 59A, 59B, 49C, 59D and 60 examples the two-step highly automated process (with detail blowups) for changing chart cell inputs with a sidebar involved.

DETAILED DESCRIPTION

Figure 1B:
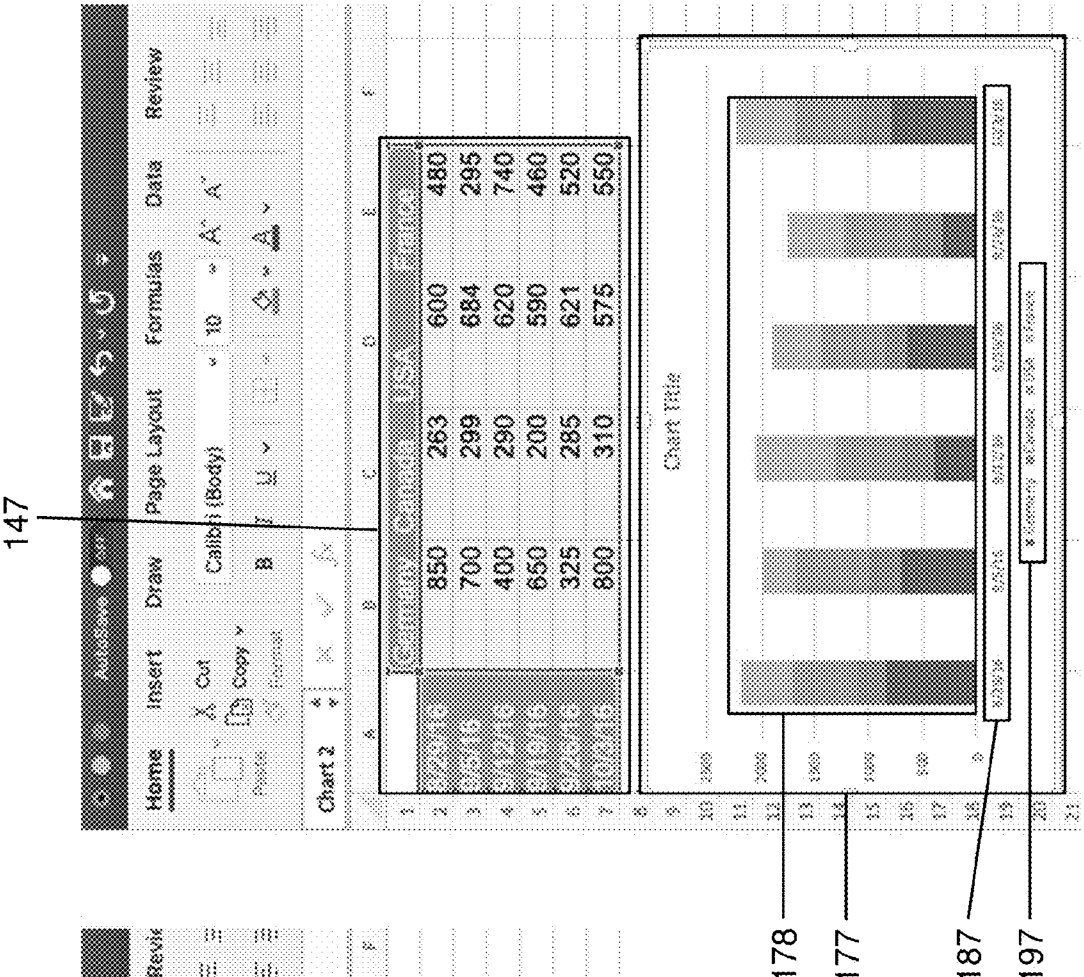
FIG. 1A and FIG. 1B example in Microsoft Excel the perfect data configuration (i.e., contiguous data) and its chart outcome.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. All this complexity has led to over a hundred books and thousands of online videos that have been published to help users understand the capabilities of Excel alone. However, unlike programming languages and programming where users tend to spend long hours of focused use day after day, most spreadsheet users are much more occasional users episodically working in spreadsheets as part of being a student, doing their job or doing some other activity. Therefore, they tend to know how to use a small fraction of the spreadsheet capabilities and not to remember non-intuitive instructions. For these users it is incredibly beneficial to make the usage simple and intuitive requiring no memory of what to do and how to do it.

Spreadsheet providers like Microsoft Excel and Google Sheets, as well as the other spreadsheet providers, have not achieved the simple and intuitive level when it comes to creating and modifying charts. In Microsoft Excel's case, users frequently have multiple ways of accomplishing the same objective but need to remember instructions for those activities and in many situations what they are required to do is not intuitive. Google Sheets generally has fewer ways of doing many of the activities that we will discuss but also their activities are not as intuitive as would be ideal for users. In both cases, as well as the other available spreadsheets, there are changes to charts that users would like to make that unnecessarily require going back to the data and changing its setup, content or order when much simpler ways should be available.

Users frequently want to embed their spreadsheet charts in presentation documents or even present the charts from their spreadsheets; such as embedding a Microsoft Excel spreadsheet chart within a Microsoft PowerPoint slide or a Google Sheets spreadsheet chart within a Google Slides slide. In both cases users can link the spreadsheet to the presentation slide so that changes in the spreadsheet propagate to presentation slide. However, making changes requires going back and forth and knowing how to do that. It would be dramatically easier for users if they could make many of the changes they want to make to the chart in a presentation slide without having to go to the spreadsheet worksheet; and if they did need to go there it would be best done with a simple click that takes them directly to the data they want to see or change.

The disclosed technology simplifies creating a chart by allowing users to bypass entering information into sidebars and pop-ups and do it directly into the chart. It also makes it much simpler and more intuitive for users to change the order of data in charts, e.g., creating different groupings within pie, waterfall, bar, column and area charts, and makes it much simpler and more intuitive for users to change charts which have been embedded into presentation slides. This not only allows spreadsheet chart users to much more quickly and easily create, alter and use charts, but it lowers the barriers for occasional spreadsheet users who do not use the current charting capabilities to try turning their data into a chart.

To put into context the current spreadsheet and combined spreadsheet and presentation application charting capabilities, we will example some of those capabilities for the two leading spreadsheets.

Current Technology Limitations

Both leading spreadsheets, Microsoft Excel and Google Sheets, have extensive UIs for creating charts. Like the other spreadsheet applications, if the user's spreadsheet cell input data is in the perfect configuration for creating a chart, they do a great job. However, if the data is not in the perfect all contiguous layout then the data setup of the chart becomes complicated and in some situations is not possible—thus needing a better way.

Figure 1A:
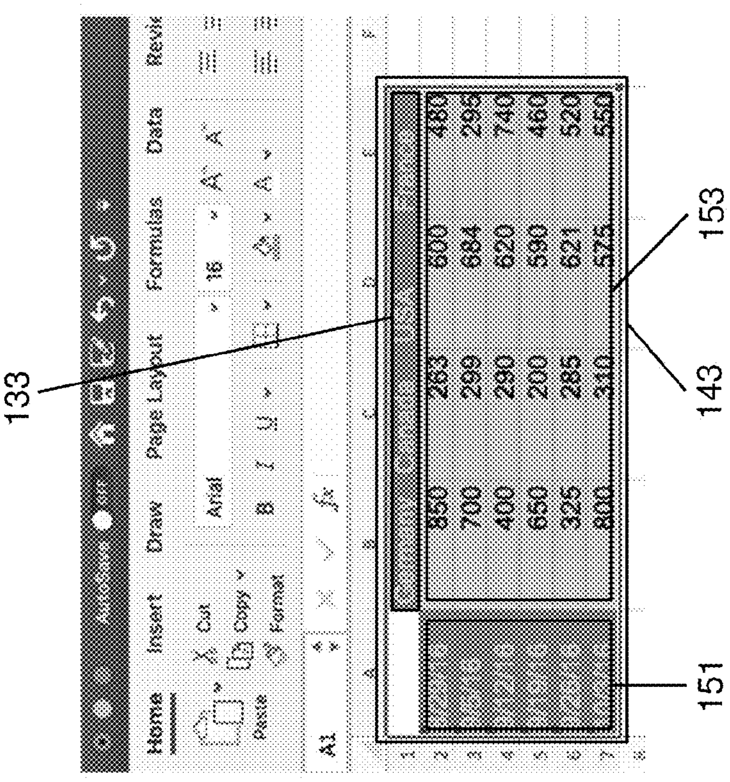

FIG. 1A and FIG. 1B example in Microsoft Excel the perfect data configuration (i.e., contiguous set of legend labels, y and x values) and its chart outcome. The user highlights the contiguous area 143 containing the Legend labels 133, y data points 153 and the x labels 151. When the user then opens the Insert ribbon, selects the family of charts, selects the specific type of chart and hits return they are presented with the Chart 177 shown in FIG. 1B. That chart has a Legend (without the term legend) with the values from cells 'B1:E1' 133 labelled 197 and the x labels from cells 'A2:A7 151 are displayed 187 below the columns 178. It has the y values 153 populating the four different colored stacked elements in each column 178. As the chart 177 is created the data is color coded 147 to represent the three different data inputs, 1) the legend labels are shaded and outlined in red, 2) the x labels are shaded and outlined in purple and 3) they values shaded and outlined in blue. Other than the missing x and y axes titles, a descriptor for the legend values and filling in the Chart Title, the chart is pretty complete.

Figure 2B:
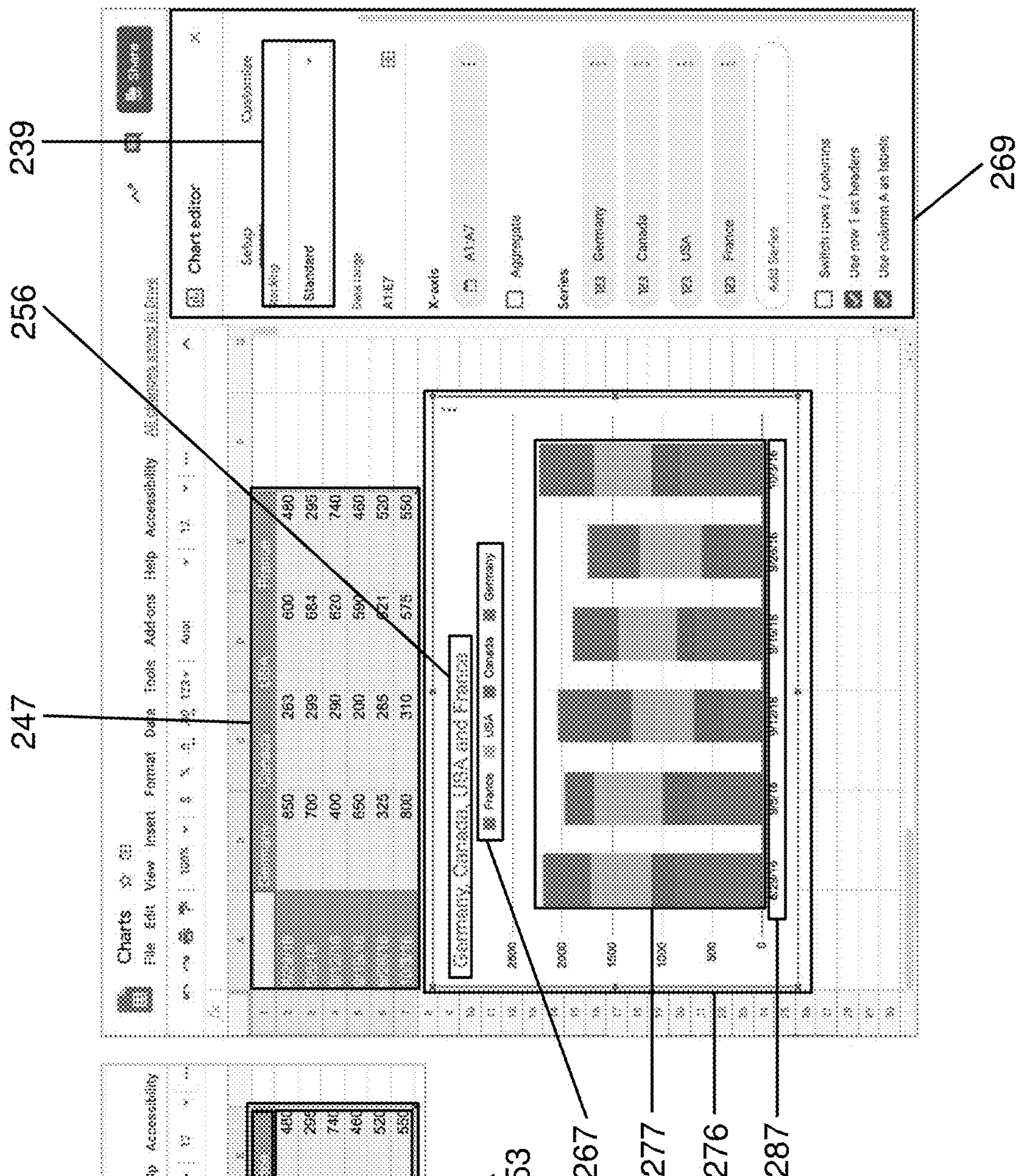
FIG. 2A and FIG. 2B example in Google Sheets the same perfect data configuration (i.e., contiguous data) and its chart outcome.
Figure 2A:
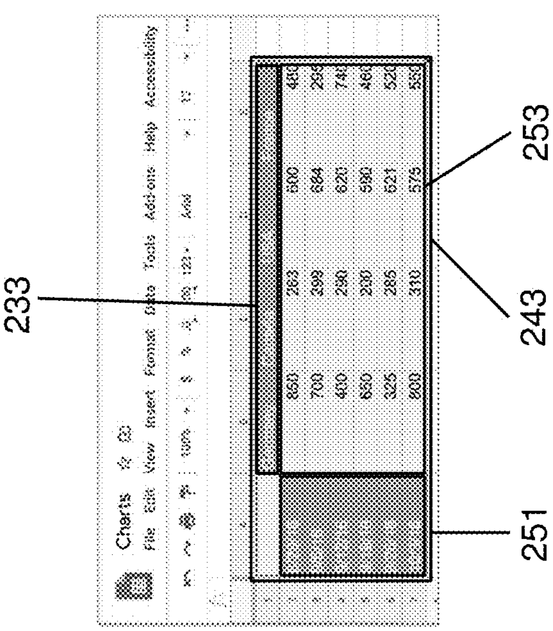

FIG. 2A and FIG. 2B examples the same perfect data configuration (i.e., contiguous set of legend labels, y and x values as in FIG. 1A and FIG. 1B) chart creation process in Google Sheets. The user highlights the contiguous area 243 containing the Legend labels 233, y data points 253 and the x labels 251. When the user then clicks on the Insert menu and selects Chart they get a chart and the sidebar 269, they then select the chart type the desire 239 in the sidebar to get the chart shown in the highlighted box 276. That chart has a Legend (without the term legend) with the values from cells 'B1:E1' 233 labelled 267 and the x labels from cells 'A2:A7 251 are displayed 287 below the columns 277. It has the y values 253 populating the four different colored stacked elements in each column 277. As the chart 276 is created the data is highlighted 247 but not color coded like Excel. Other than the missing x and y axes titles, a descriptor for the legend values and replacing the title 'Germany, Canada, USA and France' 256 Sheets created with something that makes sense, the chart is pretty complete.

Figure 3A:
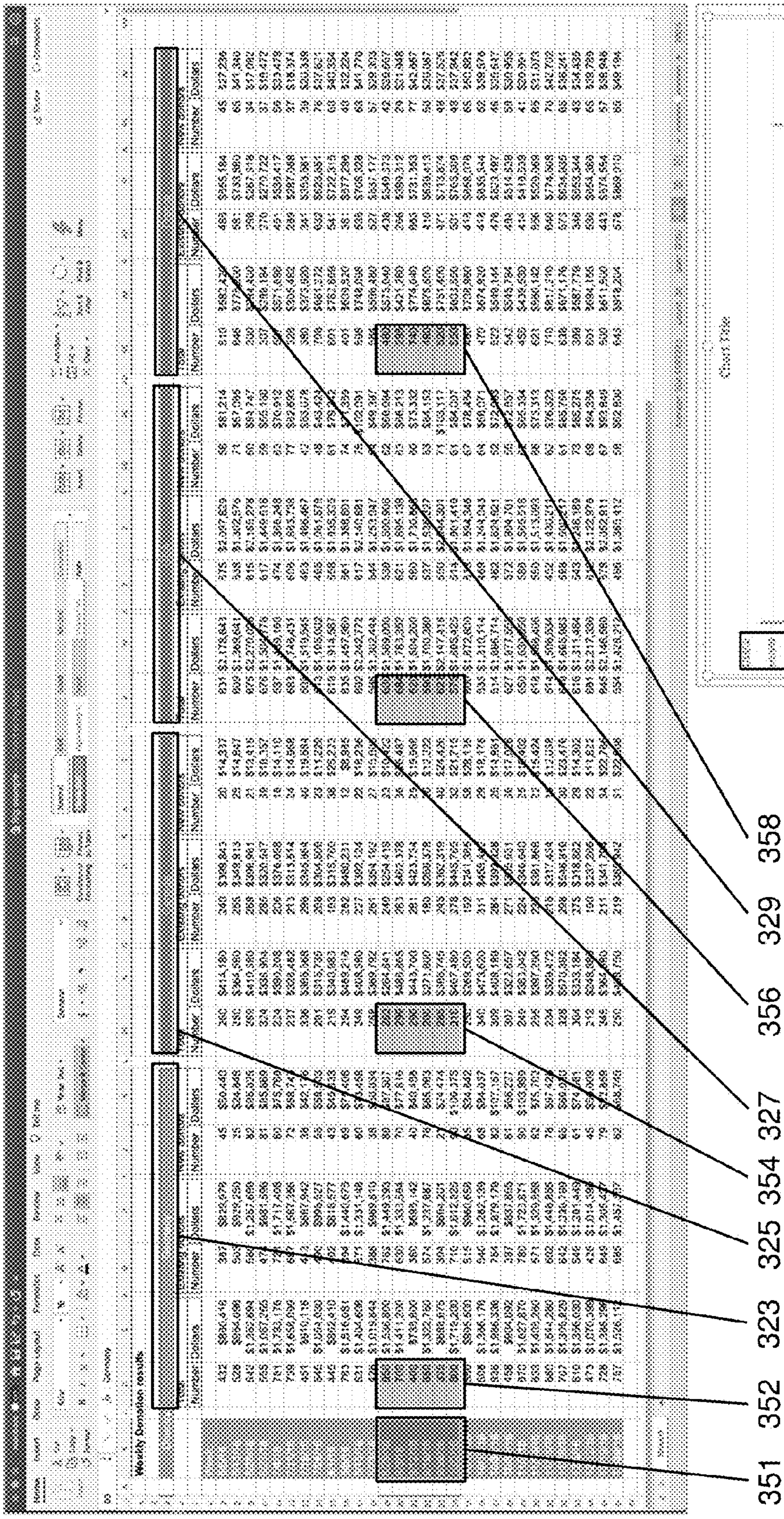
FIG. 3A and FIG. 3B example a Microsoft Excel chart failed outcome for non-contiguous data taken from a report.
Figure 3B:
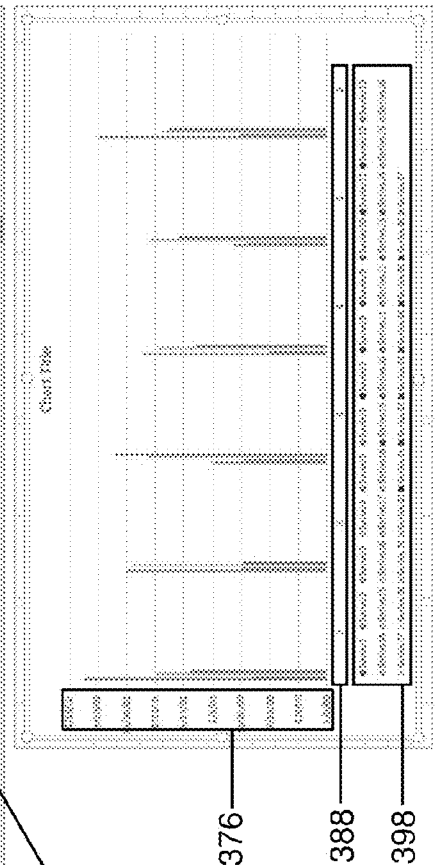

However, in both applications it is a very different if the data is not in the perfect data configuration. Users often want to create charts out of a few select sets of data out of their much more complicated spreadsheets but as we will example next, users frequently don't do that because of its complexity or the fact it simply will not work. FIG. 3A examples a pretty typical charity donation report, that a manager compiles, which includes the data from the previous two examples (FIG. 1A and FIG. 2A) in a much more complete analysis/report showing the donation numbers and amounts broken out for each country by total, existing donors and new donors. However, the user wants to chart only the totals for a specific six-week period 351 as was done in FIG. 1B and FIG. 2B. They therefore highlight the legend values (323, 325, 327 and 329), the x values (351) and they values (352, 354, 356 and 358), and as they are doing this in Microsoft Excel repeat the process use in FIG. 1 to generate FIG. 2. Specifically, they open the Insert ribbon, select the family of charts, select the specific type of chart and hit enter (or on a Mac return) and are then presented with the Chart shown in FIG. 3B. Note that the top left cell is not selected. The user was expecting a column chart with four columns for each of the six weeks exactly as shown in FIG. 1B 177. Instead of a legend with four values of 'Germany' through 'France' they got thirty-seven series numbers. They expected to get y values between '200' and '850' instead got y values 376 ranging from '1/0/00' to '6/18/02'. For x axis labels they expected dates '8/29/16' to '10/3/16' 187 and instead got the numbers '1' to '6' 388. A feature of Excel that the inventor has never seen documented and only discovered during preparation of this application is that adding selection of the top left cell causes Excel to do something, though not quite what is desired. An entirely baffling result and clearly not the one desired, so the user pulled the data to much simpler non-contiguous data set with some simple headings (Country: and Week:) in FIG. 4A to try again.

Figure 4B:
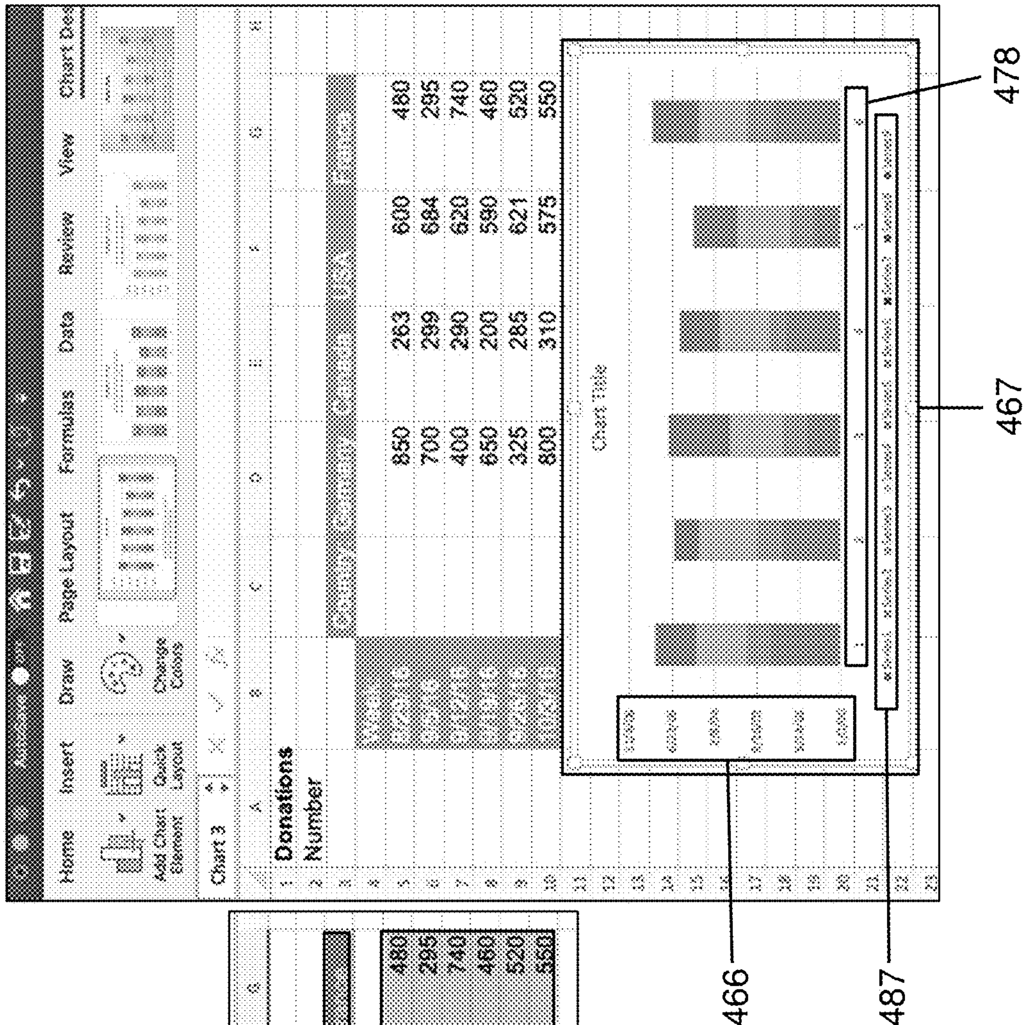
FIG. 4A and FIG. 4B example a Microsoft Excel chart failed outcome from a simpler non-contiguous data setup using three highlighted ranges.
Figure 4A:
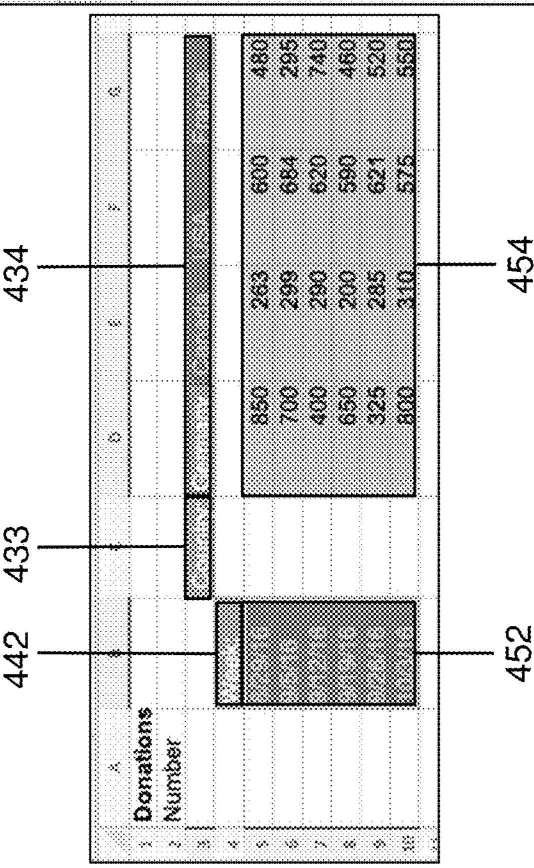

FIG. 4A is a simplified version of the problem in FIG. 3A and like FIG. 3A has the same data as in FIG. 1A through FIG. 2A. It has 'Week:' 442 and 'Country:' 433 labels for the row and column headings and the pretty typical resulting one row and one column offset to they data 454—in this case the number of donations. The user then highlights and enters the desired areas 452, 434 and 454 and then executes the same sequence of steps used in FIG. 1A (opens the Insert ribbon, selects the family of charts, selects the specific type of chart and hits return) to get presented the chart 467 in FIG. 4B. The user opts for the same stacked column chart used to generate FIG. 1B but again gets a very different outcome. Instead of the four countries in the legend this time they get 9 unlabeled series 487 as the legend, the x axis values being 1 to 6 478 rather than the expected dates '8/29/16' to '10/3/16' 187 and they axis values 466 being unrecognizable dates rather than the range in FIG. 1B of '0' to '2500'. It clearly is not the desired outcome, so the user decides to try entering the data as one block as done in FIG. 1A.

Figure 5B:
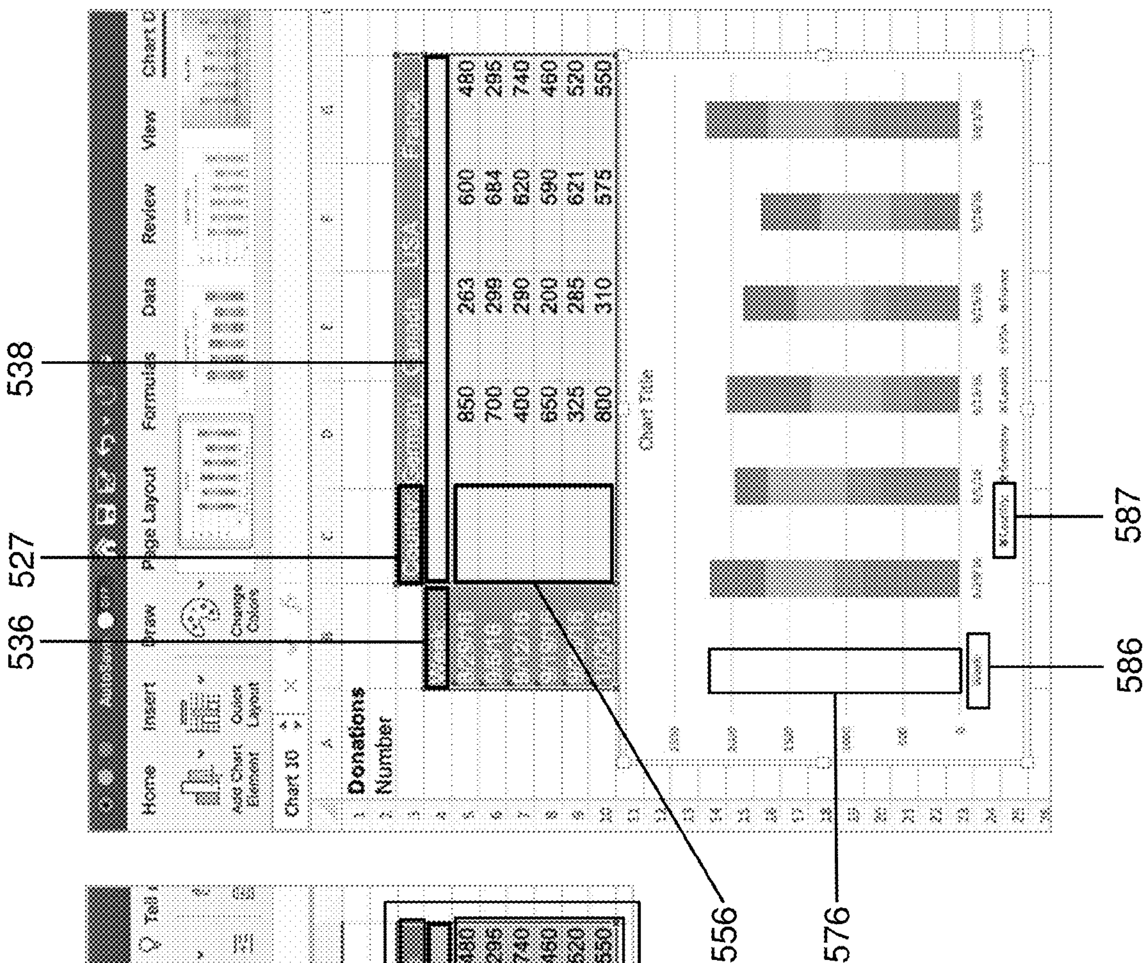
FIG. 5A and FIG. 5B example a Microsoft Excel chart failed outcome from a simpler non-contiguous data setup using one highlighted range.
Figure 5A:
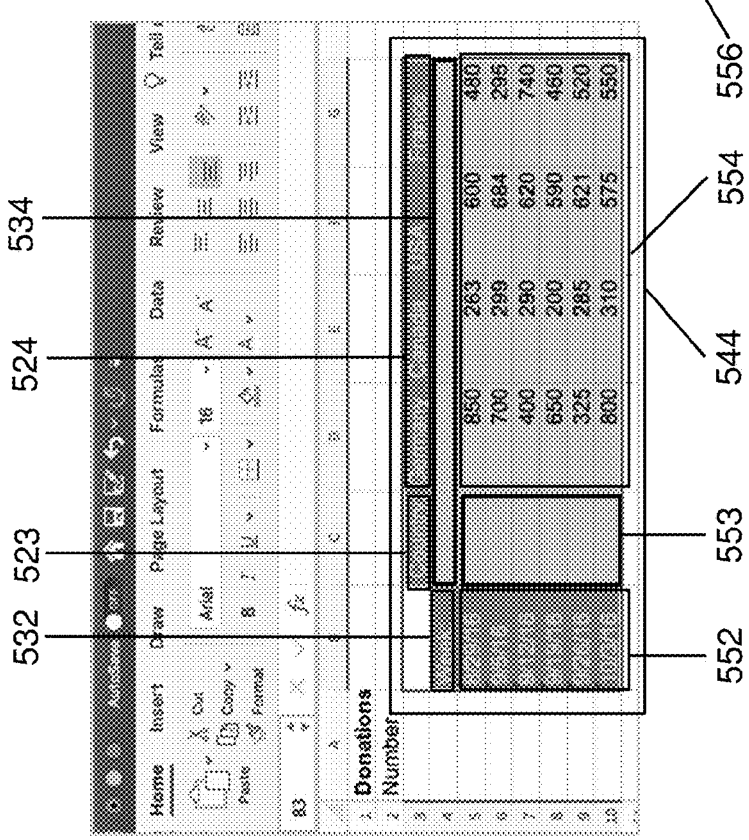

Therefore, in FIG. 5A the user highlights all the data 544 and follows the same sequence of steps used in FIG. 1A (opens the Insert ribbon, selects the family of charts, selects the specific type of chart and hits return) they are presented with the result in FIG. 5B. Unfortunately, this chart is also not what they wanted because it has included "Country" 527 in the legend 587 and included a blank stacked column 576 and as its x axis label "Week" 586. The user tried but could not find a way to remove the blank spaces 538 and 556 and the labels 'Country:' 527 and 'Week:' 536 from the chart data. Therefore, the user decided to try entering the data one element at a time.

Figure 6A:
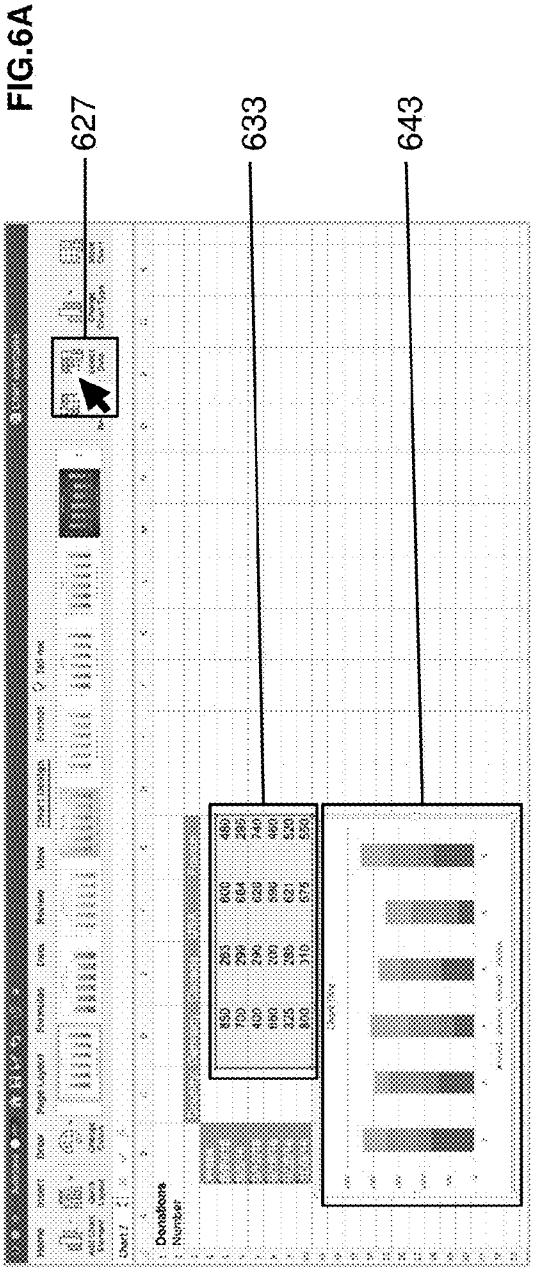
FIGS. 6A, 6B, 7A, 7B, 7C, 7D, 7E, 8A, 8B, 8C and, 9 example in Microsoft Excel the many steps to enter a chart data from non-contiguous data.
Figure 6B:
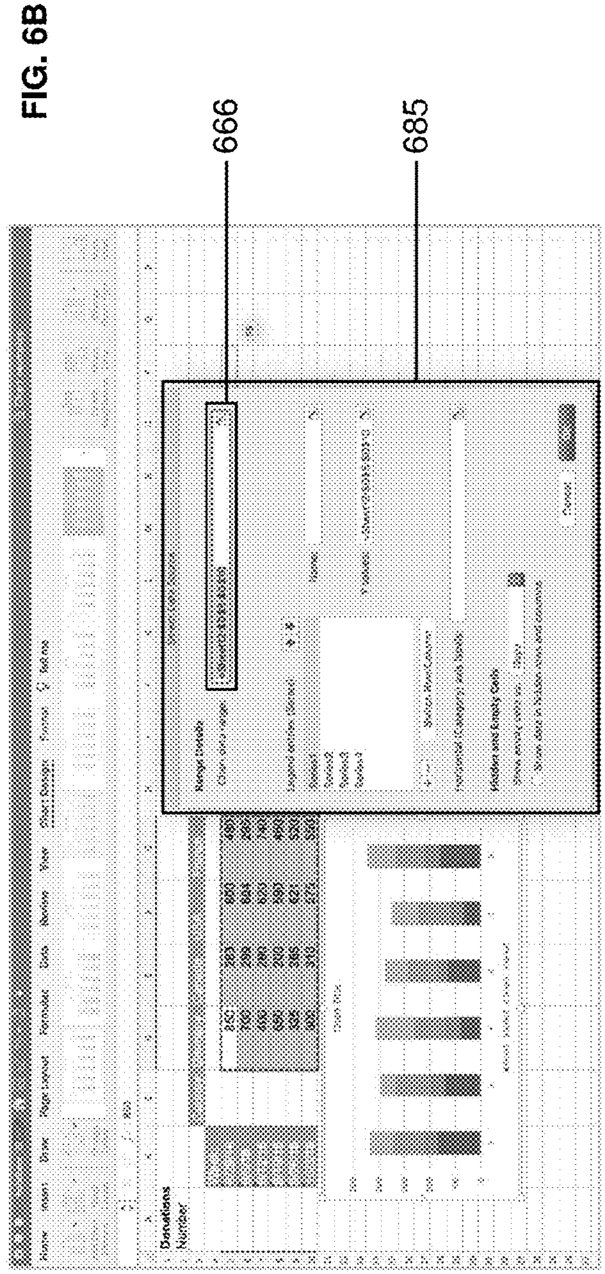
Figure 7B:
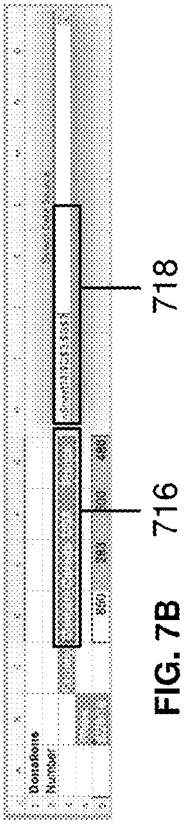
Figure 7C:
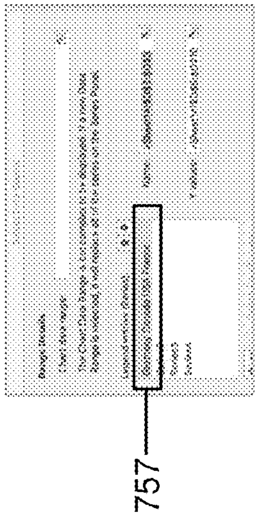
Figure 7A:
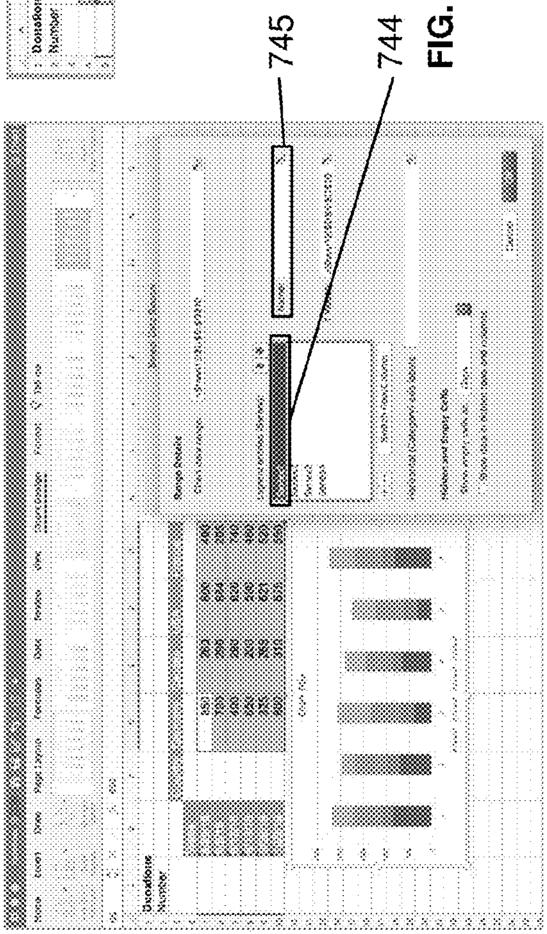
Figure 7D:
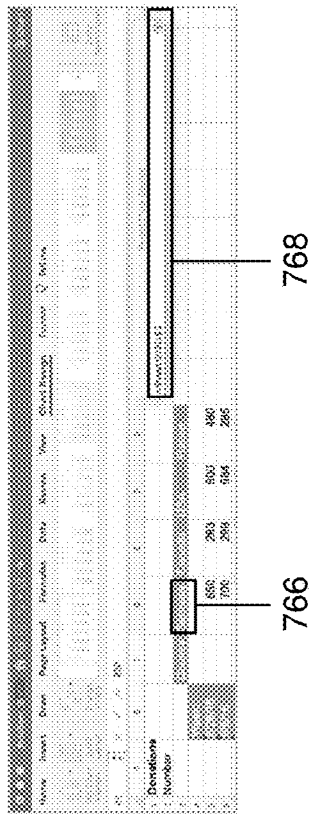
Figure 7E:
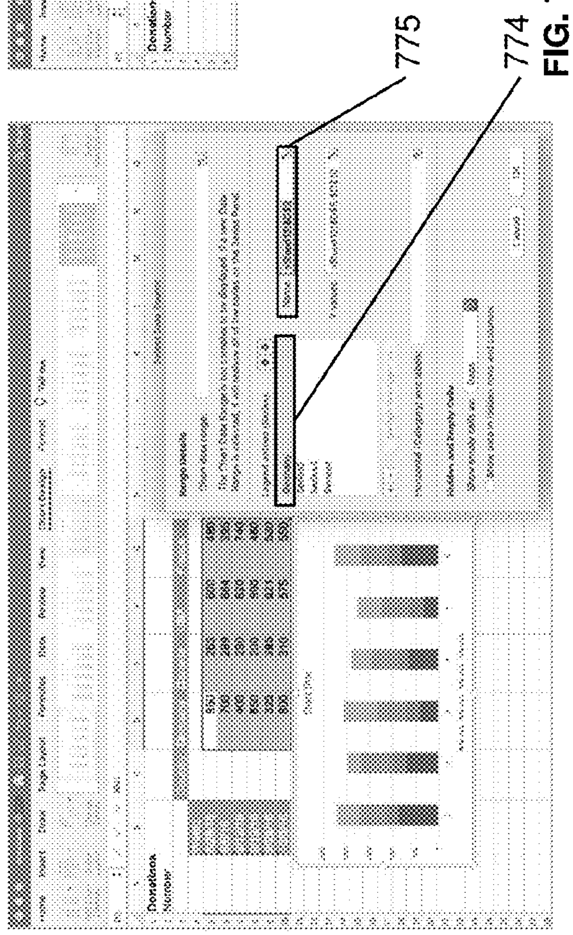
Figure 8B:
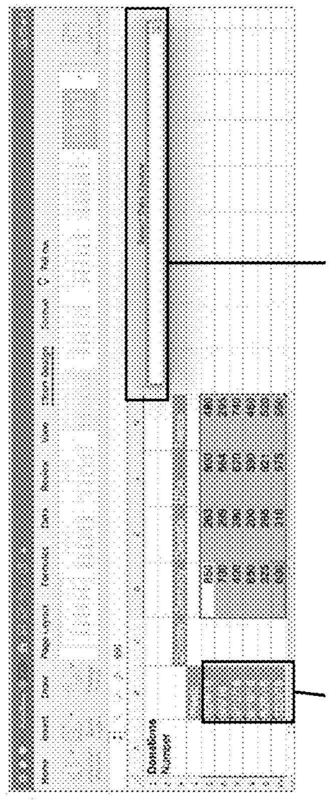
Figure 8A:
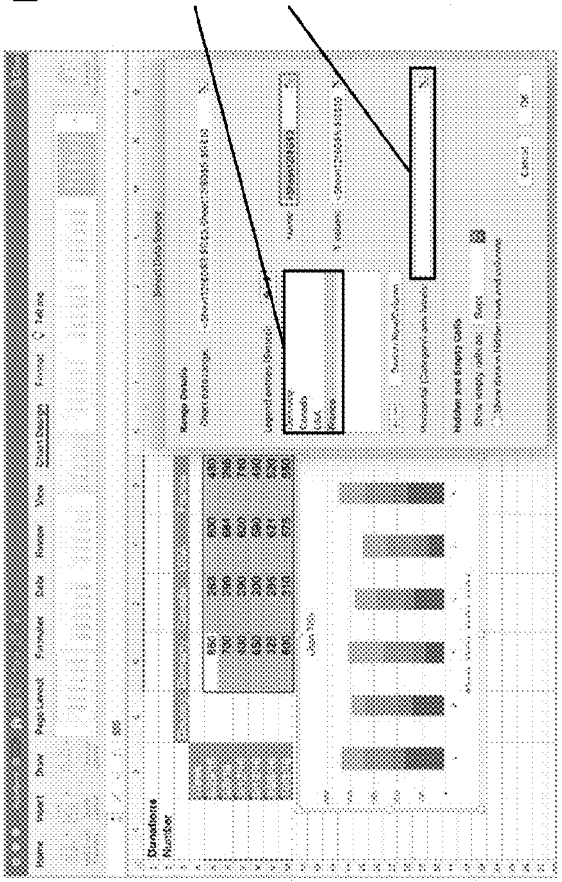
Figure 8C:
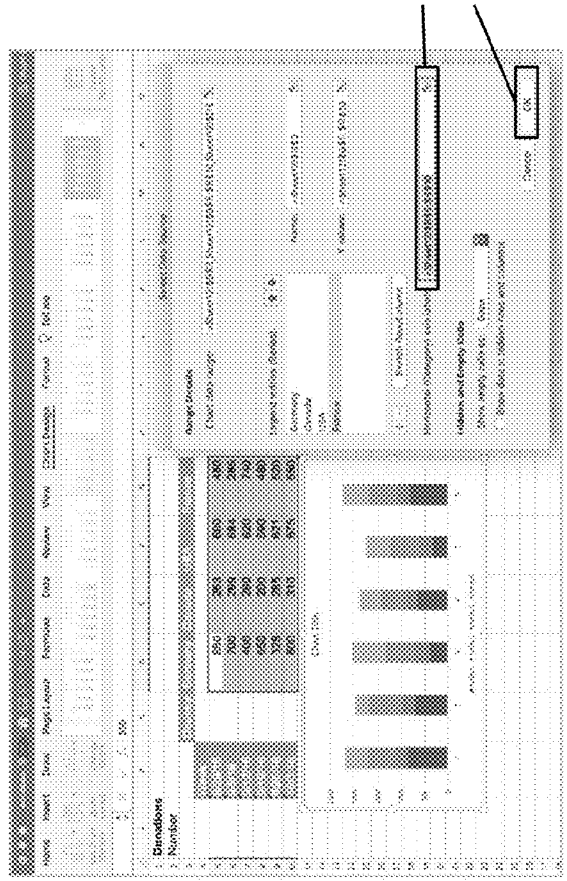
Figure 9:
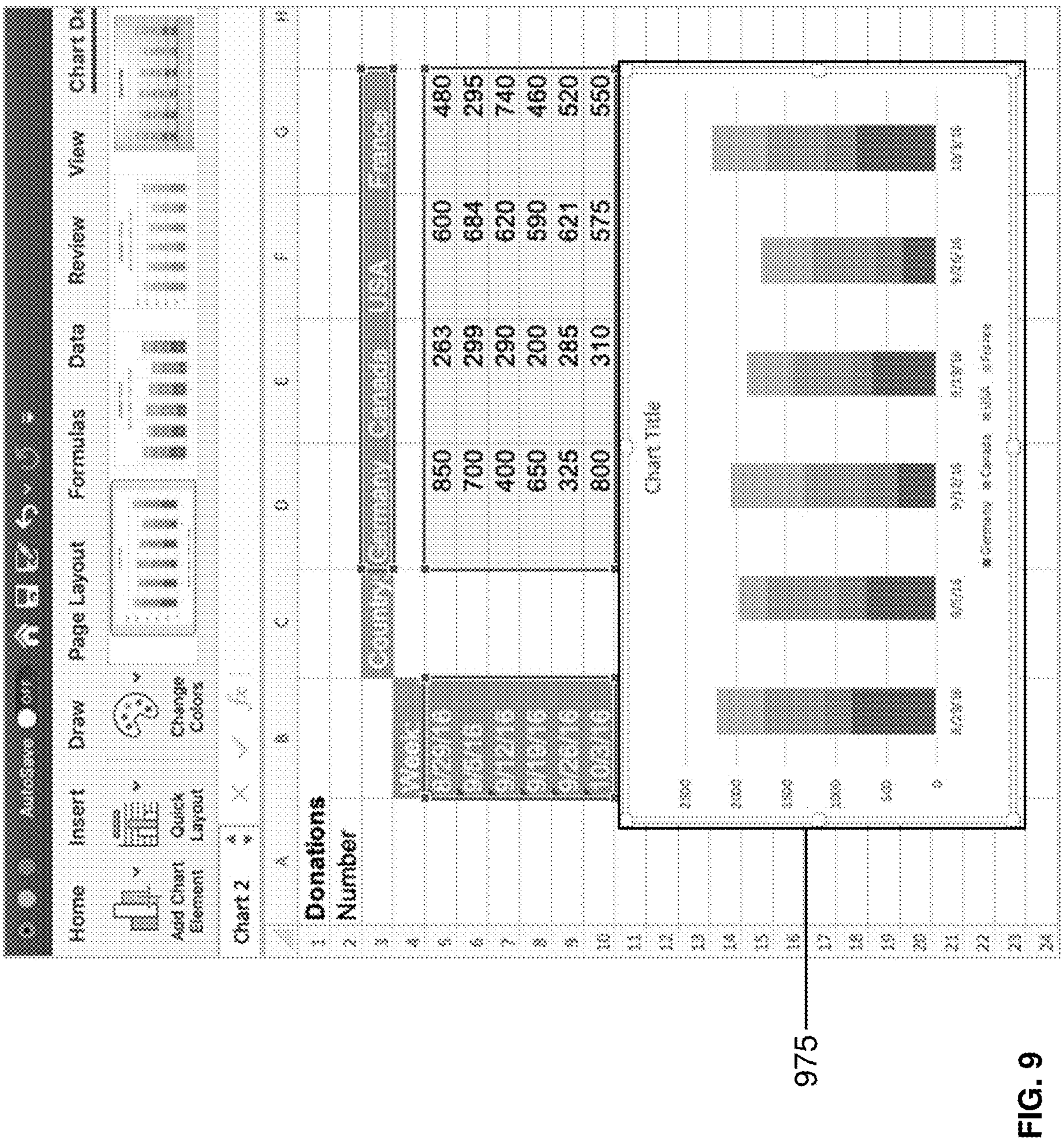

FIG. 6A through FIG. 9 example the numerous steps to enter the data step by step. In FIG. 6A the user executes the same sequence of steps used in FIG. 1A (opens the Insert ribbon, selects the family of charts, selects the specific type of chart and hits return) for the data set 633 without the legend and x value labels and are presented with the chart result 643. They then need to know that to add the additional data they click the "Select Data" button 627 in the Chart Design ribbon (not entirely intuitive) at which point they are presented with the pop-up 685 shown in FIG. 6B. Using that pop-up in FIG. 7A the user starts to add the Legend labels. First highlighting the first of the Series 744 they want to add, but then discovering when you click on the Series1 you can't do anything to it. So, they click on the Name box 745 and its selector button to be given the input 718 empty in FIG. 7B. The user then inputs the entire range 'D3:G3' 716 they want to populate in the Legend which Excel inputs as '=Sheet4!$D$3:$F$3' in the input 718 and when they hit ENTER or RETURN it populates the value 'GermanyCanadaUSAFrance' 757 in the Legend series shown in FIG. 7C. Unfortunately, at this point they realize they can't populate the entire range but must do them one at a time. So, they now redo the four-step process one at a time four times selecting the series 774 then clicking into the Name box 775 button to be given the empty input 768 in FIG. 7D. The user then inputs the cell 766 they want to populate in the Legend and hit ENTER or RETURN to populate the value 774 in the Legend series shown in FIG. 7E and when done with all four iterations they get the result shown in FIG. 8A 844. The user then clicks into the Horizontal (Category) axis labels cell 855 selector button to get the input 868 in FIG. 8B into which the user then selects 'B5:B10' 876 and after hitting ENTER or RETURN populates the values 885 in the Horizontal (Category) axis labels button box. Once the user clicks OK 895, after well over twenty steps to get here, they are presented their goal of the chart 975 in FIG. 9 which matches the chart 177 in FIG. 1B. As you can see, a process with many non-intuitive steps, many repetitive steps and many total steps.

Figure 10A:
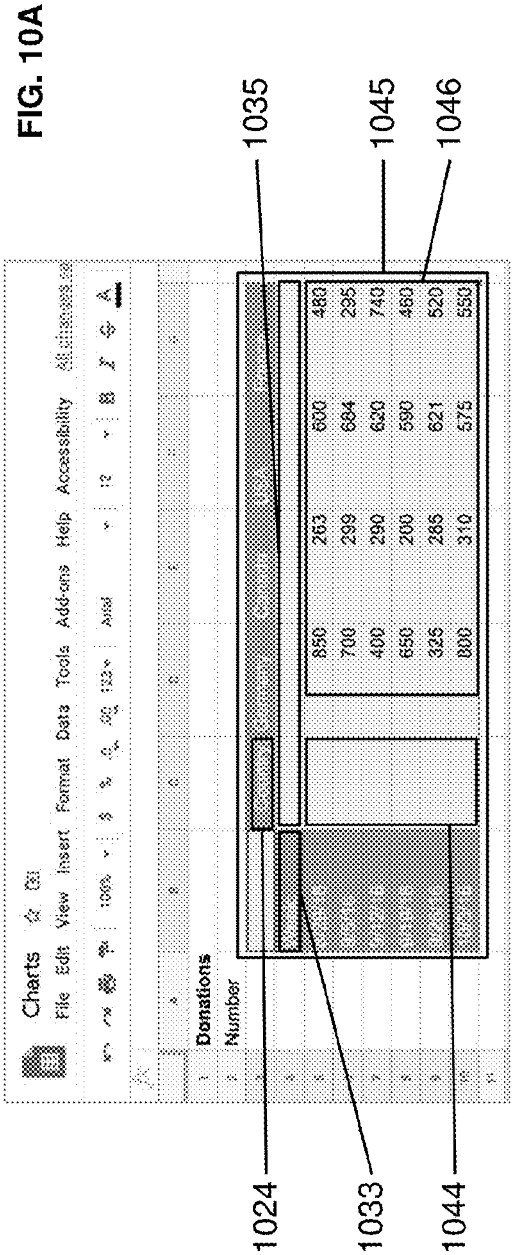
FIG. 10A and FIG. 10B example a Google Sheets chart (failed) outcome from a single selection of non-contiguous data.
Figure 10B:
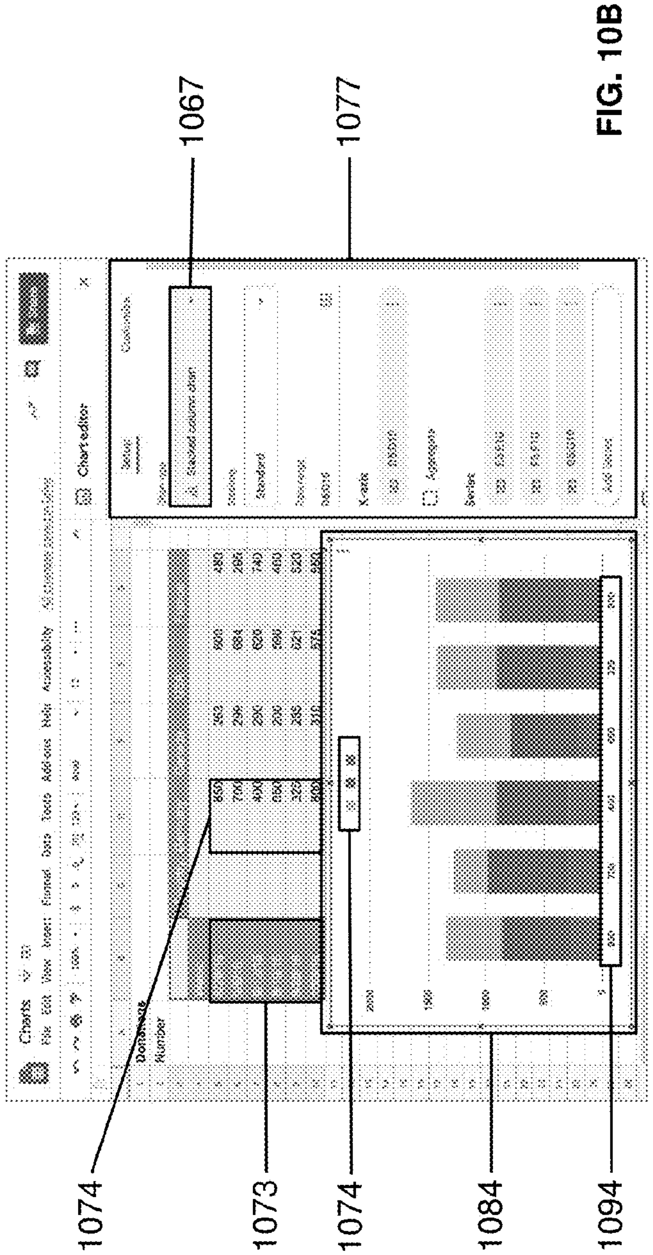

Switching to Google Sheets, in FIG. 10A the user parallels the Microsoft Excel example in FIG. 5A using the data from the formatted table which has 'Week:' 1033 and ' Country:' 1024 labels for the row and column headings and the pretty typical resulting spacing 1035 and 1044 offsetting they data 1046—in this case the number of donations. When the user highlights all the data 1045 and follows the same sequence of steps used in FIG. 2A (clicks on insert menu and selects Chart—they get a chart 1084 and the sidebar 1077, they then select the chart type they desire 1067 in the sidebar and hit ENTER or RETURN) to be presented with the result in FIG. 10B. Unfortunately, this chart 1084 is not what they wanted because it skipped using the week data 1073 for the x axis labels 1094 and instead used Germany data 1074 for the x axis labels 1094 and therefore only had three rather than the full four sets of data in the columns and no labels for the legend 1074 in the chart 1084 and has three not the correct four colors. Clearly not the chart desired. Here after many attempts the user found no way to change the data inputs to the chart desired (FIG. 2B 276).

Figure 11A:
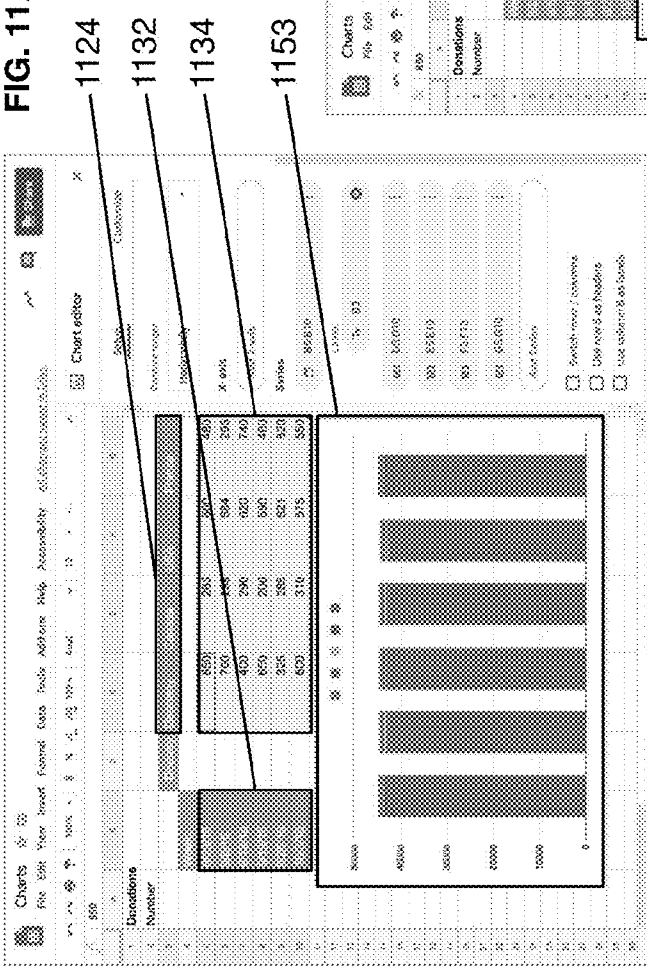
FIGS. 11A, 11B and 11C examples two Google Sheets chart (failed) outcomes from attempting to setup inputs of non-contiguous data.
Figure 11B:
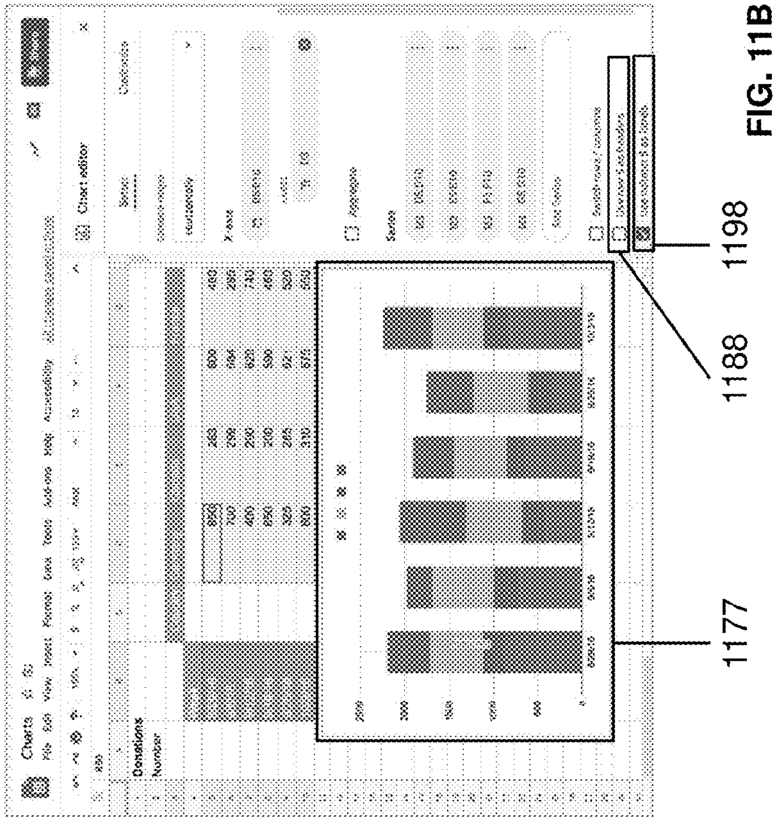
Figure 11C:
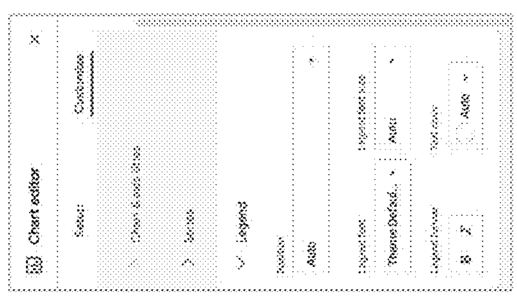

So, in FIG. 11A the user tries the approach of highlighting only the values to be inputted and none of the blank spaces 1124, 1132 and 1134 (paralleling what was done in FIG. 4A and FIG. 4B in Microsoft Excel). When the user executes the same sequence of steps used in FIG. 10A and FIG. 2A (clicks on insert menu and selects Chart—they get a chart selected by the app and the sidebar, they then select the chart type they desire in the sidebar and hit ENTER or RETURN) they are presented with the chart result 1153. They realize that Sheets is using Week data 1132 not as the X-axis labels but as y values 1134, so they check the box 1198 'Use column B as Labels' to get the chart 1177 in FIG. 11B. Now they need the legend values which in Sheets sidebar check box 1188 are called headers. However, the option offered for the headers is 'Use row 5 as headers' 1188 and what the user needs is row 3. After searching the Sheets help and the web, the user can see no way to change the header from row 5 to row 3. They therefore check the Customize view on the sidebar in FIG. 11C for the Legend but find no input only positioning and formatting and find no way to achieve what they want from this data configuration. They therefore conclude data entry of this mode is not possible in Google Sheets.

Figure 12B:
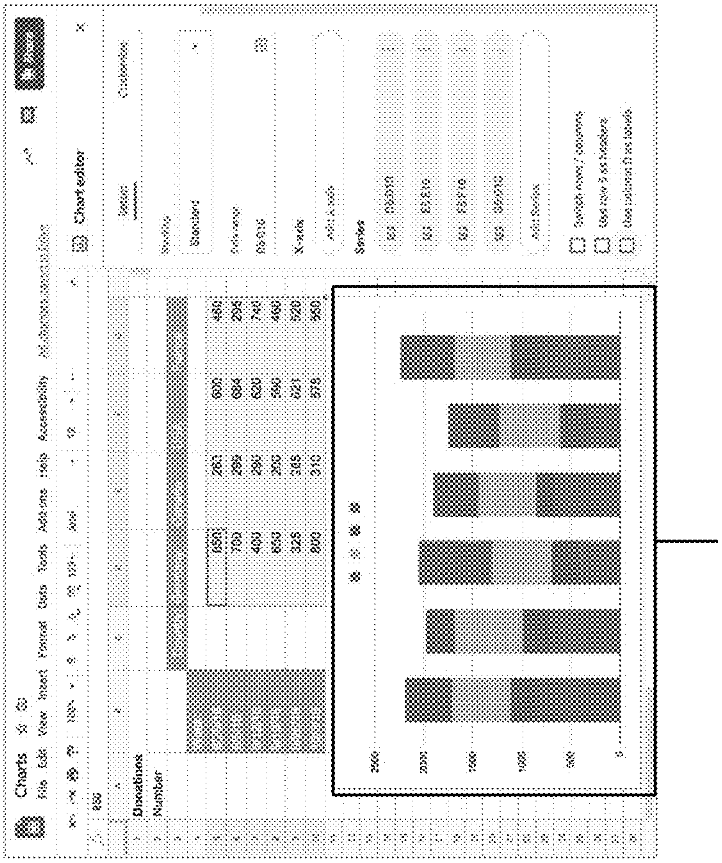
FIG. 12A and FIG. 12B example a user failing in Google Sheets to create the correct chart from the non-contiguous data.
Figure 12A:
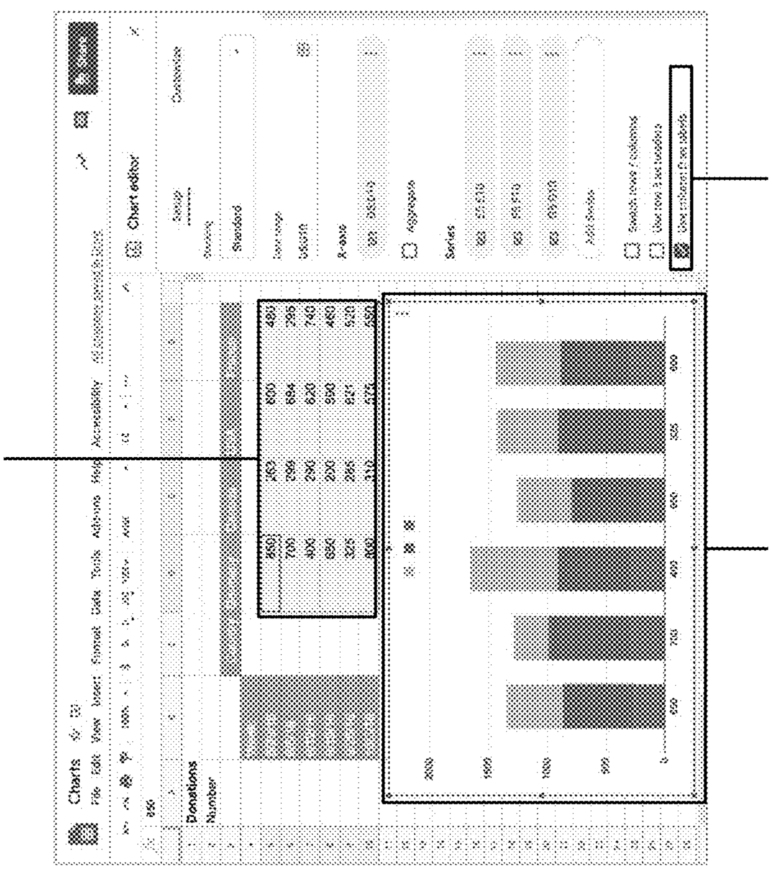

In FIG. 12A the user then attempts to enter only they values 1234 (what Sheets calls Series) without the legend and X-axis labels. After executing the same sequence of steps used in FIG. 10A and FIG. 2A (clicks on insert menu and selects Chart—they get a chart selected by the app and the sidebar, they then select the chart type they desire in the sidebar and hit ENTER or RETURN) they are presented with the chart result 1263. They realize they do not want to "Use column D as labels" 1275 so they unclick the box to get the resulting chart 1267 in FIG. 12B. At this point they have the exact same problem as they had in FIG. 11B, which is no way to input the legend labels (Sheet headers). So, they conclude there is no way in Sheets to enter the data configuration they want—making it very non-intuitive, clearly not simple and apparently not possible without repositioning the data.

Figure 13B:
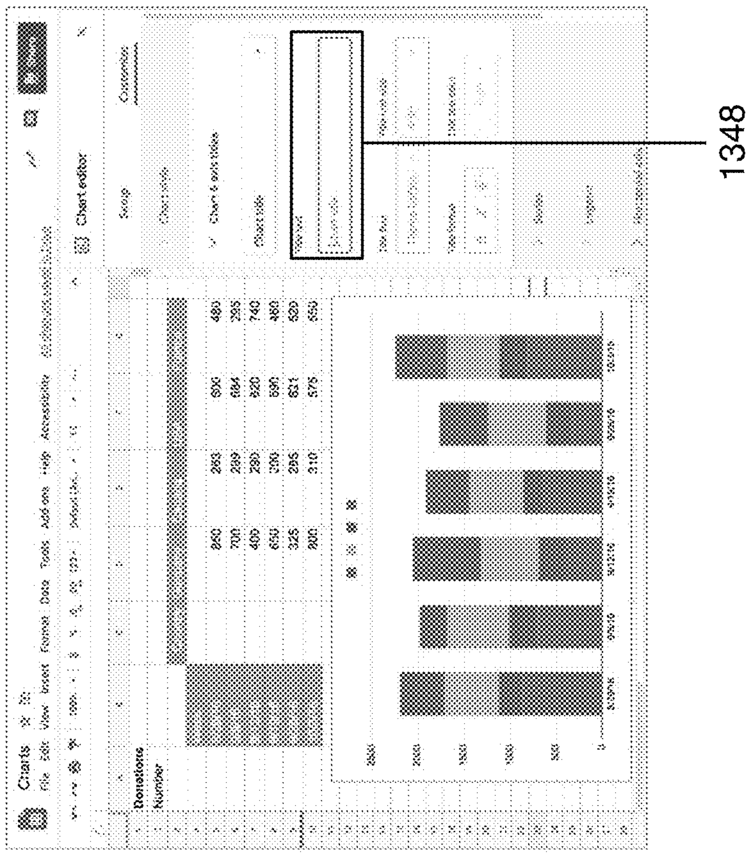
FIG. 13A and FIG. 13B example how to setup different titles in Google Sheets.
Figure 13A:
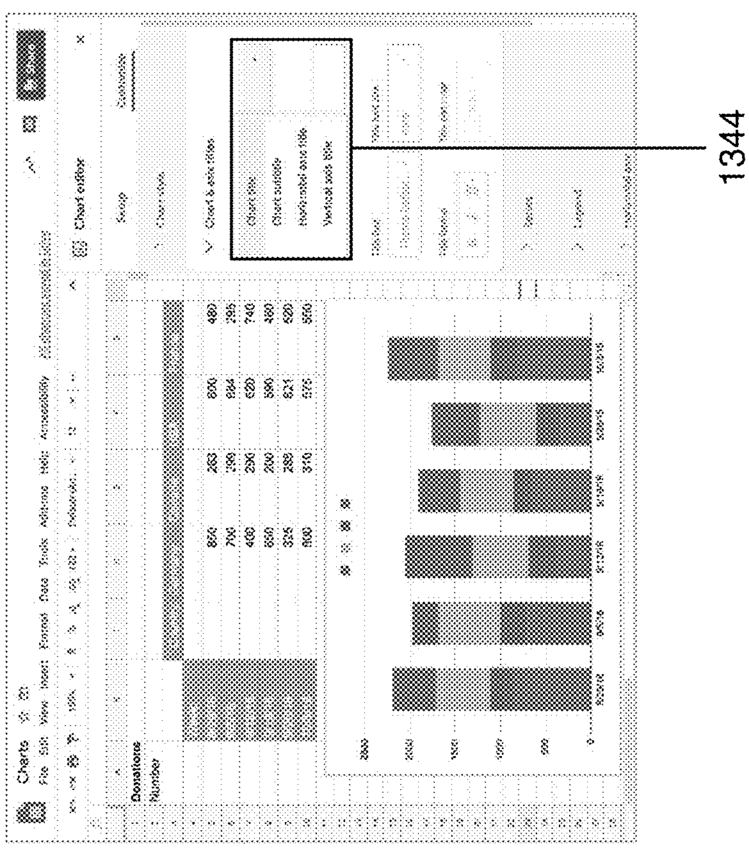
Figure 14A:
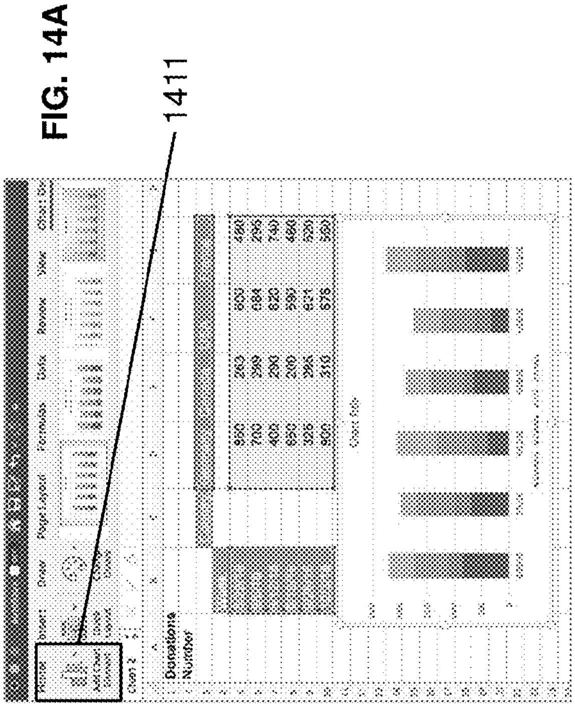
FIGS. 14A, 14B and 14C example how to setup Axis Titles in Microsoft Excel.
Figure 14B:
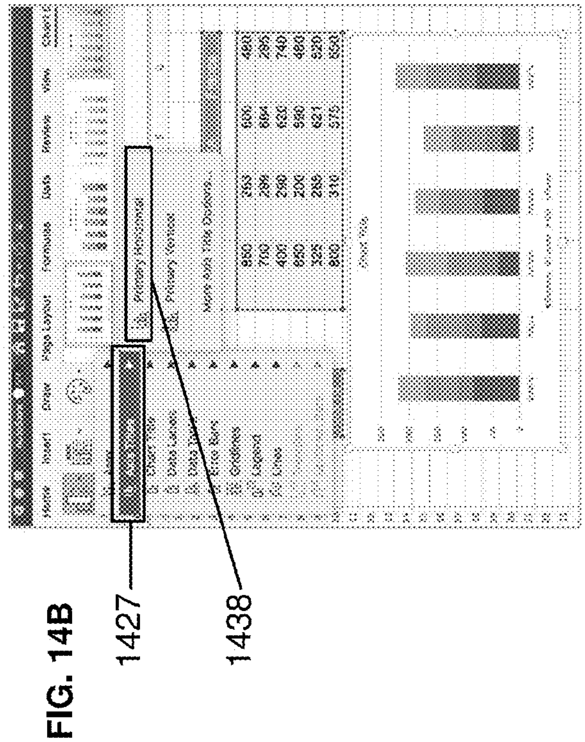
Figure 14C:
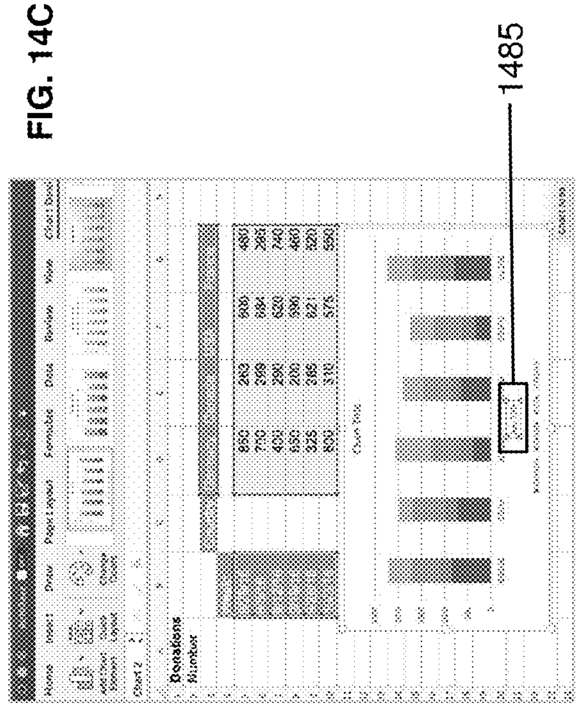

The other thing to note in these Sheets charts is the lack of auto generated titles, subtitles and X (Horizontal axis title) and Y (Vertical axis title) axes labels. As shown in FIG. 13A these require dropdown selections 1344 and then inputs in the text box 1348 as shown in FIG. 13B within the sidebar to populate the titles on the chart. Microsoft Excel adds these additional titles, as shown in FIG. 14A through FIG. 14C, by users realizing they should click the "Add Chart Element" button 1411 in the Chart Design ribbon and then selecting which element they want to add 'Axis Titles' 1427, highlighting that element 1438, and then clicking it to populate it 1485 on the chart as shown in FIG. 13C. Although at this point, they have to type in the value they want and cannot add a cell value from the spreadsheet. They also need to repeat the process from the beginning 1411 with each other title they want to add. As we will discuss, these multi-step processes once you find the right location in the sidebar or ribbon are not the most convenient or intuitive way for users to add this information.

Our Approach Working Directly on the Chart

Our spreadsheet chart technology makes it very simple and intuitive for users to input data from any spreadsheet data layout. In one embodiment, the user does all of the data entry to format the chart in controls positioned directly on the chart itself using tailored inputs for the type of chart selected. The controls are positioned to overlay the body of the chart. These controls can be positioned at or adjoining the chart feature for which input is provided, for instance, in the position of the chart title. Other embodiments of our technology then support mixing and matching direct, on-chart data input with sidebar, pop-ups or other visual input modes.

Figure 15:
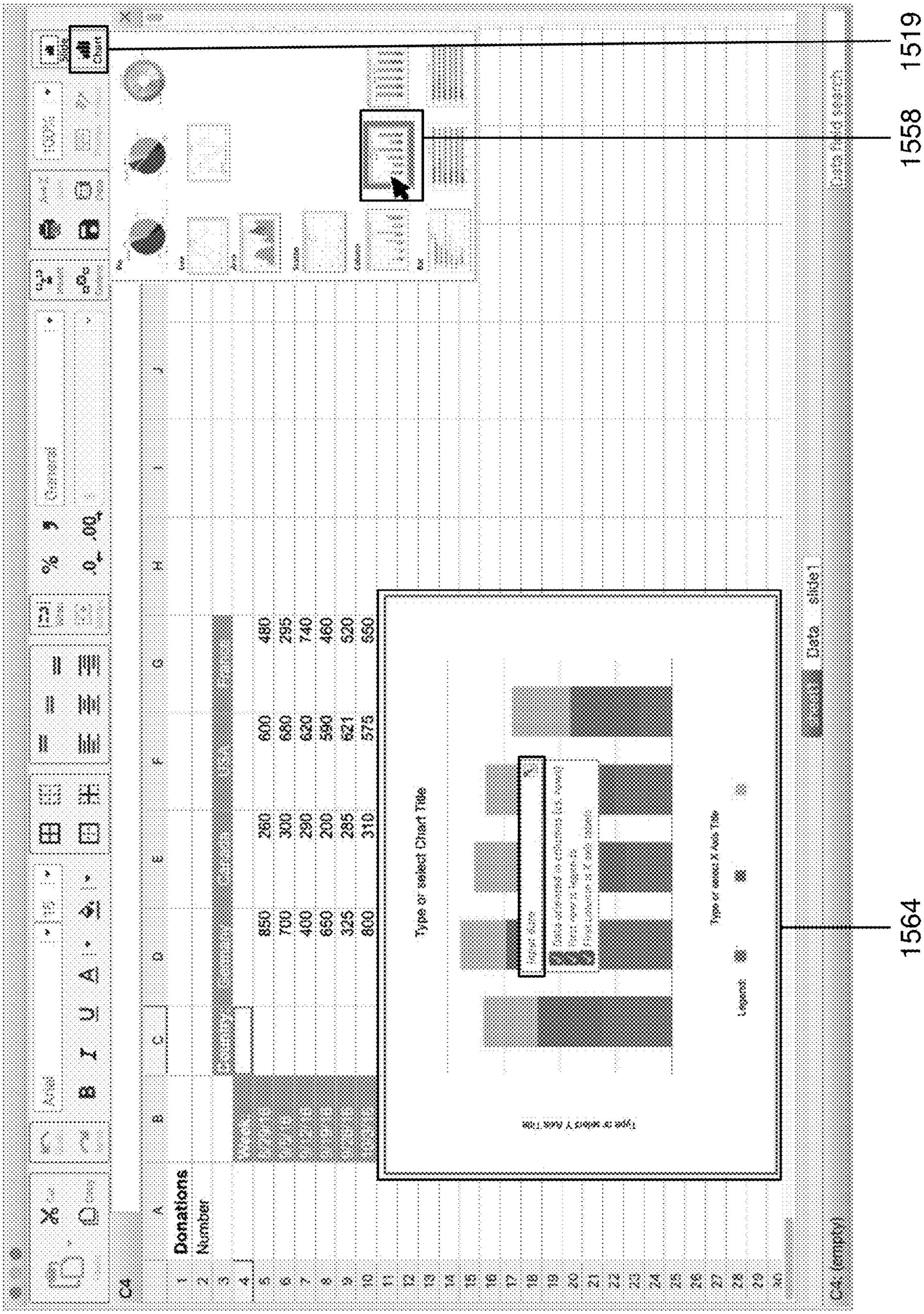
FIG. 15 examples in our technology a stacked column starter chart.
Figure 16:
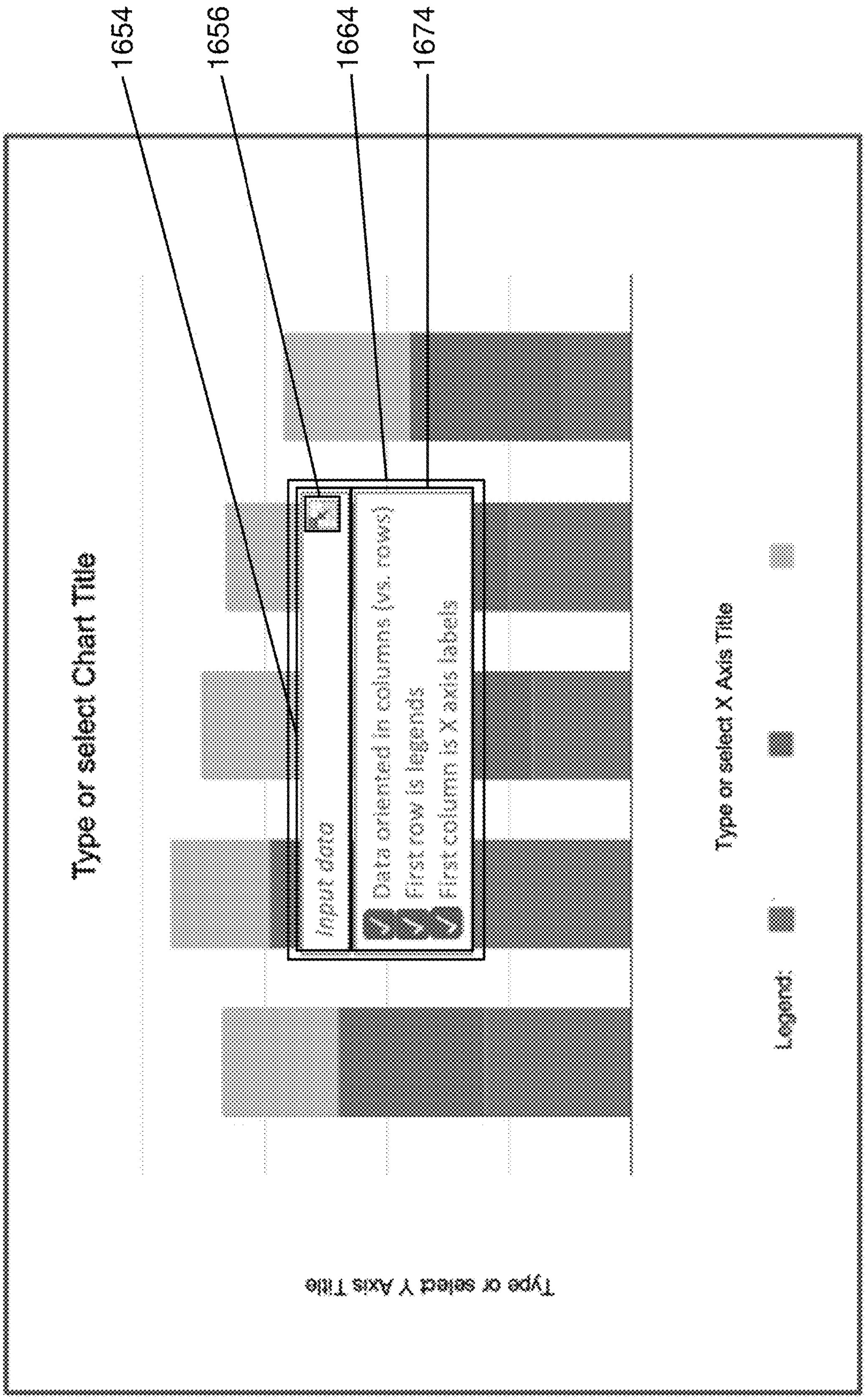
FIG. 16 blows up the illustrative starter chart in FIG. 15.

FIG. 15 examples one embodiment of our technology where once a user has clicked the chart button 1519 on the ribbon and selected the chart type 1558, they get an illustrative example of the chart type 1564 with all the data entry points populated on the chart. The chart 1564 can be presented as a preview or thumbnail while viewing of the data entry points and/or in a separate tab. A preview or thumbnail can be closed one editing is complete. FIG. 16 gives a closer look at the illustrative chart 1564 where the central area of the chart 1664 offers the user different ways to input the main data. In this embodiment the chart opens asking the user three questions 1674 about the data they are entering. Those questions are tailored to the specific chart the user has selected and the data orientation to avoid confusion. In this example the answer to the first question 'Data oriented in columns (vs. rows)' changes the two questions below as the 'First row is legends' question applies to data in columns and switches to 'First row is X axis labels' if the data is in rows. Likewise, if the data is in rows the third question 'First column is X axis labels' changes to 'First column is legends'. After a user answers those three questions then they can input the data by clicking on the selector button 1656 in the data input bar 1654 and highlight the data; or if they had started the process with a data range or ranges highlighted those values would already be in the data entry bar 1654 and once they hit enter (PC) or return (Mac) an actual chart using the data will appear. The chart 1564 can be presented as a preview or thumbnail while viewing of the data entry points and/or in a separate tab. A preview or thumbnail can be closed one editing is complete.

Figures 17A, 17B, 17C:
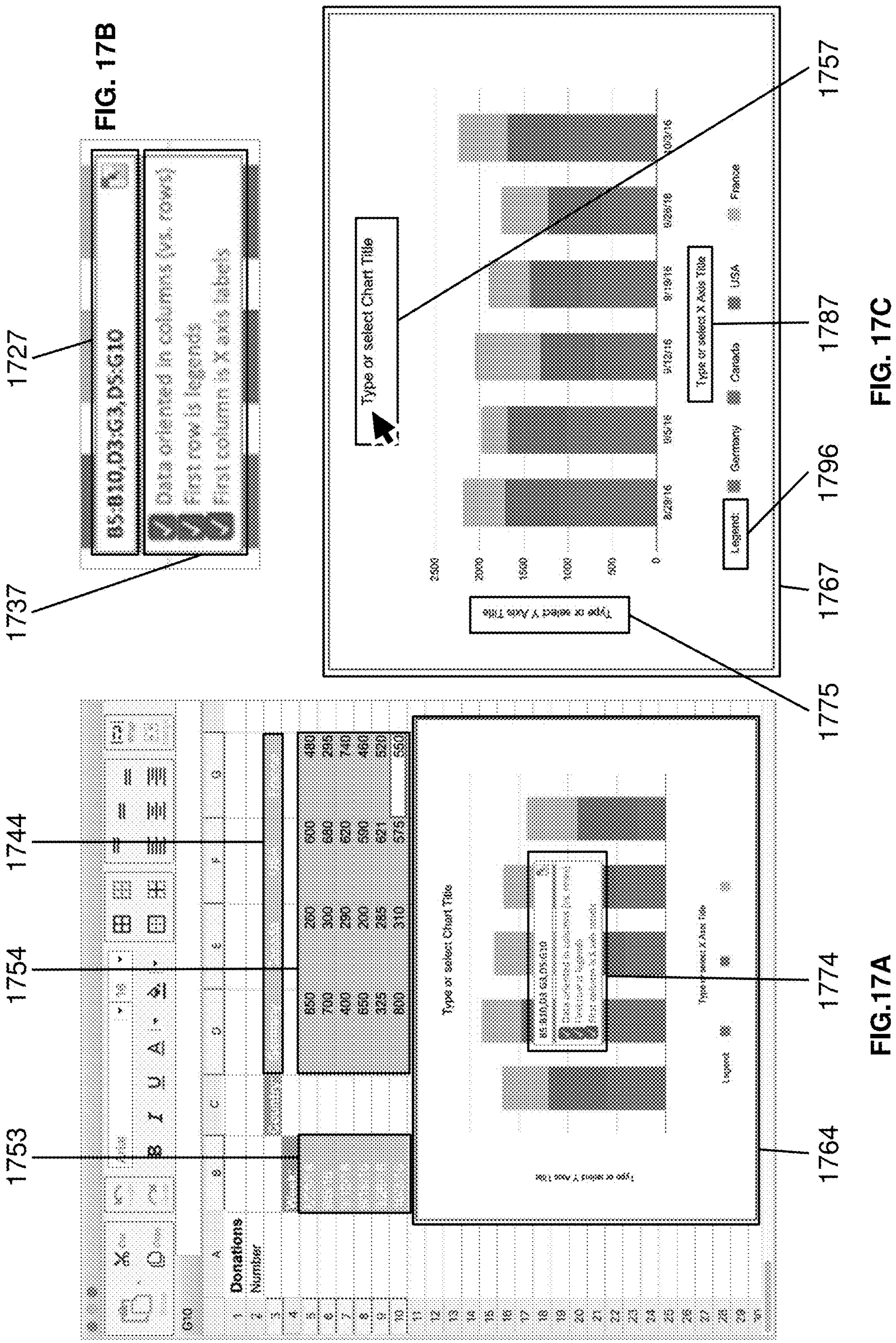
FIGS. 17A, 17B and 17C examples in our technology setting up a Stacked Column Chart from non-contiguous data.

FIG. 17A through FIG. 17C examples our technology inputting non-contiguous (discontinguous) data into a chart. Not only does our technology successfully work for a single (potentially simultaneous) entry of all the data, where Microsoft Excel and Google Sheets did not (See FIG. 3A through FIG. 4B and FIG. 9A and FIG. 10C), it can also allow users to do all the data entry right on the chart. In FIG. 17A the user highlights on the spreadsheet 1753, 1744 and 1754 which is populated 'B5:B10,D3:G3,D5:G10' into the data entry bar 1727 (which is a blow up in FIG. 17B of FIG. 17A 1774). Because the default answers to the three questions 1737 are correct, the user then simply hits enter (PC) or return (Mac) to get the chart 1767 shown in FIG. 17C. The data can be even more non-contiguous (discontinguous) as the chart in FIG. 17C would be generated by the selected data (351, 352, 323, 325, 354, 327, 356, 329 and 358) in FIG. 3A if those selections were done in our technology. The user can then complete the chart tailoring the content of the Title, X and Y axis titles and the legend title which were also automatically populated by our technology 1757, 1775, 1787 and 1796. Rather than having to hunt for where to populate these they are right on the chart ready for used (or removal in the rare case they are not desired). They can also be populated from spreadsheet cell references (e.g., click or type a cell reference), something not done by the existing spreadsheets.

Figure 18A:
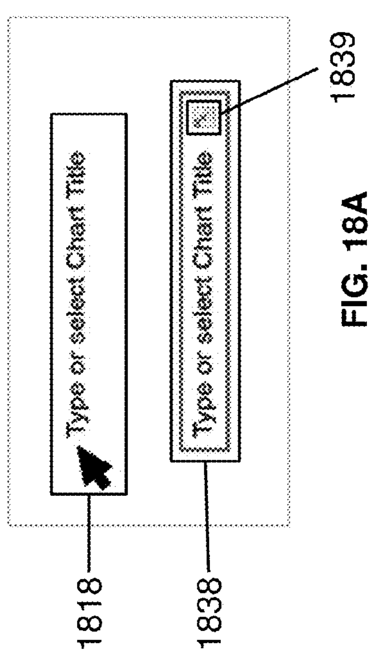
FIGS. 18A, 18B and 18C examples filling in an auto populated title from a cell selection in our technology.
Figure 18C:
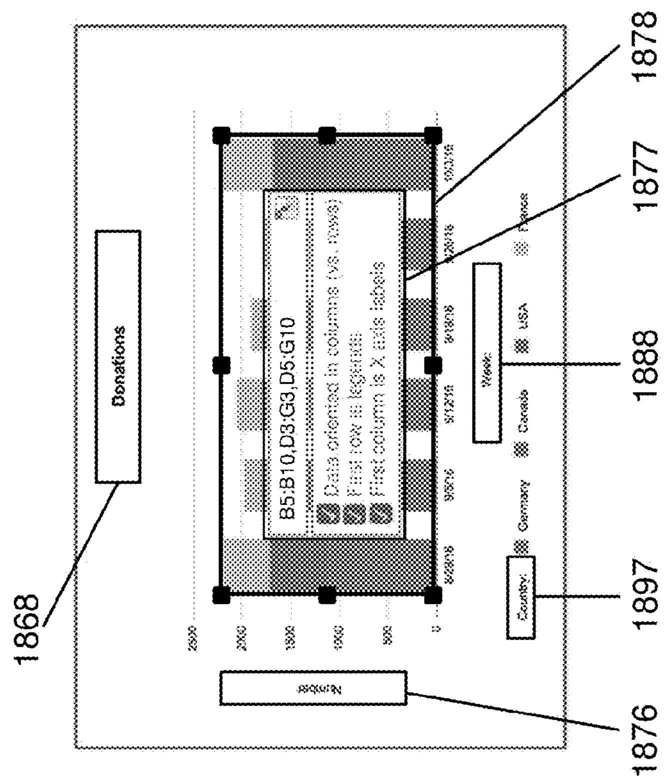
Figure 18B:
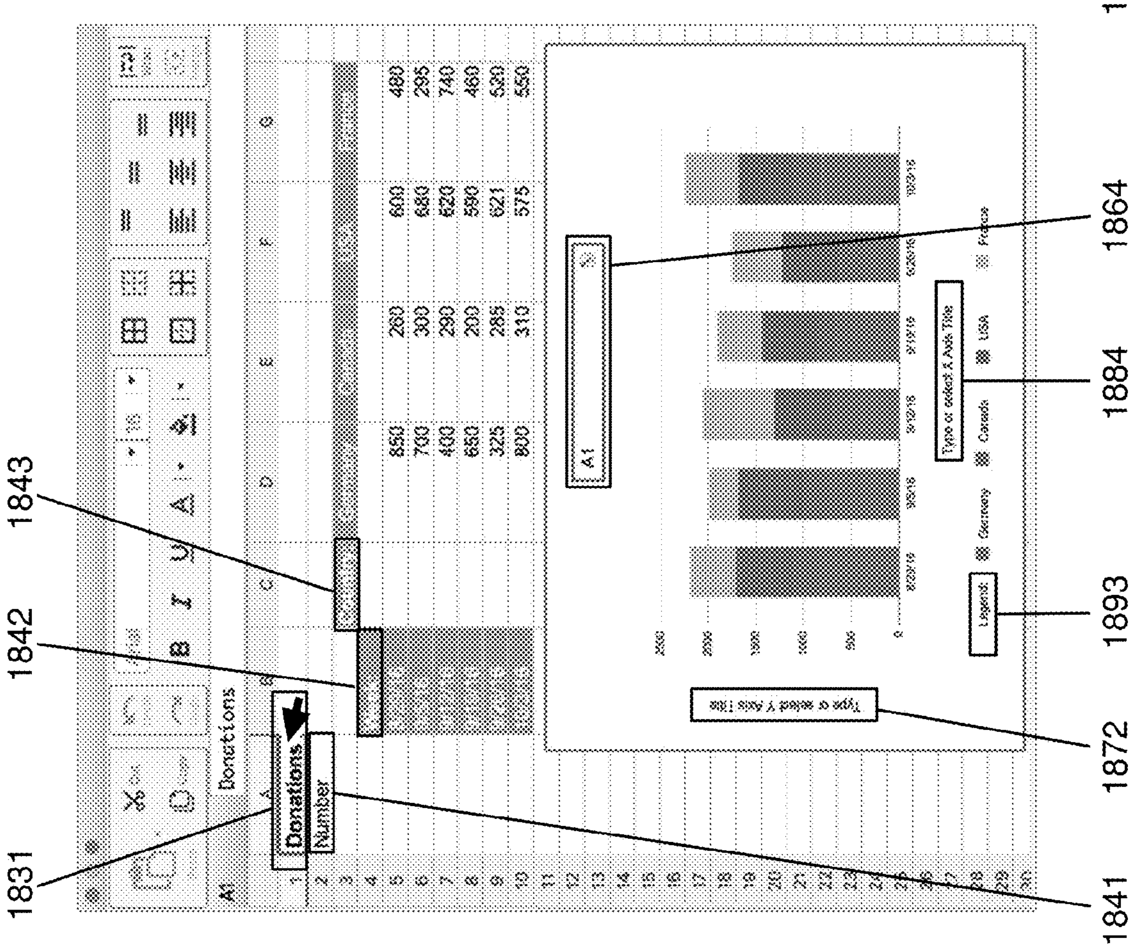

The user starts by clicking into the 'Type or select Chart Title' 1757 control as also shown in FIG. 18A 1818. They are then presented with a box 1838 where they can type whatever content they would like or select to use the content from a cell by typing the cell reference or using the selector button 1839 to navigate to the cell for selection. FIG. 18B examples the user selecting the cell 'A1' 1831 which is then displayed in the box 1864 and once the user hits ENTER or RETURN the value 'Donations' 1868 from cell 'A1' 1831 is displayed in the chart as shown in FIG. 18C 1868. In this example the user does a similar process to replace the 'Type or select X Axis Label' 1884 with cell 'B4' 1842 and the 'Type or select Y Axis Label' 1872 with cell 'A2' 1841. The results of which are also shown in FIG. 18C 'Week:' 1888 and 'Number' 1876. They also replace the label 'Legend:' 1893 using a similar approach with the value from cell 'C3' 1843 to get 'Country:' 1897. While the user could just have easily replaced one or more of those labels with the text of their choice, the process was made very easy and intuitive with the instructions built right into the text deposited on the chart. And unlike the existing spreadsheets, the user was given the option to populate values from spreadsheet cells so that any changes to the spreadsheet automatically populate to the chart for the different titles. It is also a lot easier for users to get the right value or text into the right place when they are putting it directly on the chart, when the control is positioned over the body of the chart, rather than typing it into some drop-down or sidebar where the content is not visually related to where it is going and the labels vary from spreadsheet to spreadsheet and sometimes vary within different locations in the same spreadsheet (e.g., series, header or legend being used for the same information).

FIG. 18B and FIG. 18C also example the reopening of the data entry. The populated chart in FIG. 18B is, in this embodiment, reopened for data for changing input values by double clicking on the stacked column elements 1878 in FIG. 18C. That reopens the data input control 1877, which in this example not only inputted the Y values but also inputted the Legends and the X axis labels as indicated by the check boxes in 1877. All of these inputs are then ready to be changed by typing in different values or by selecting different data cells. In other embodiments right clicks or other methods could be used to reopen the input on the chart and what will reopen can vary depending on whether the data was entered all together as in this example or piecewise as exampled next in FIG. 19A and FIG. 19B.

Figure 19A:
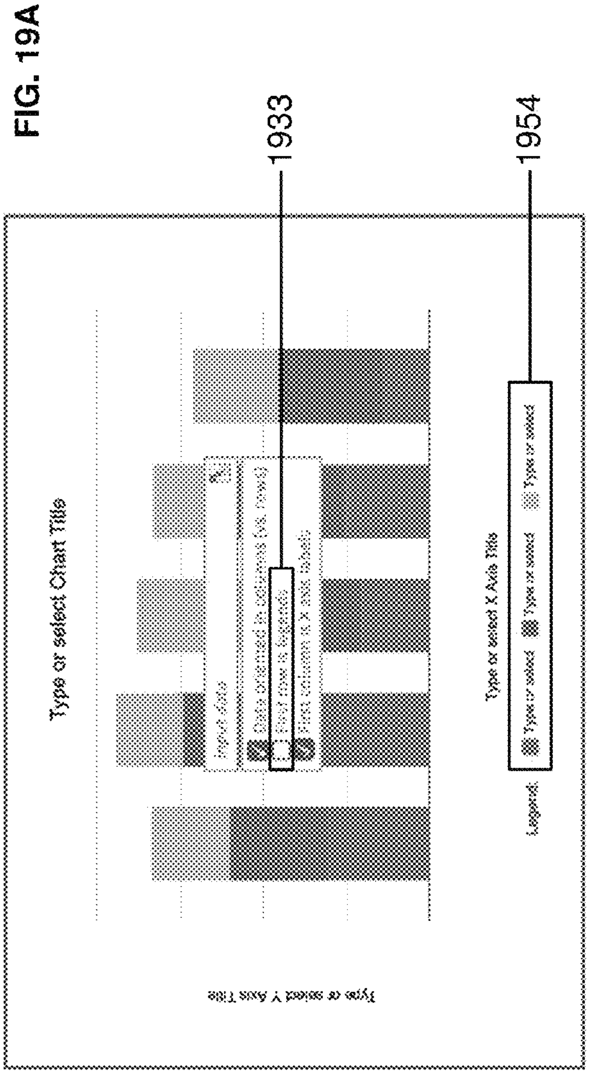
FIG. 19A and FIG. 19B example other options for on-chart Legend and X value label inputs.
Figure 19B:
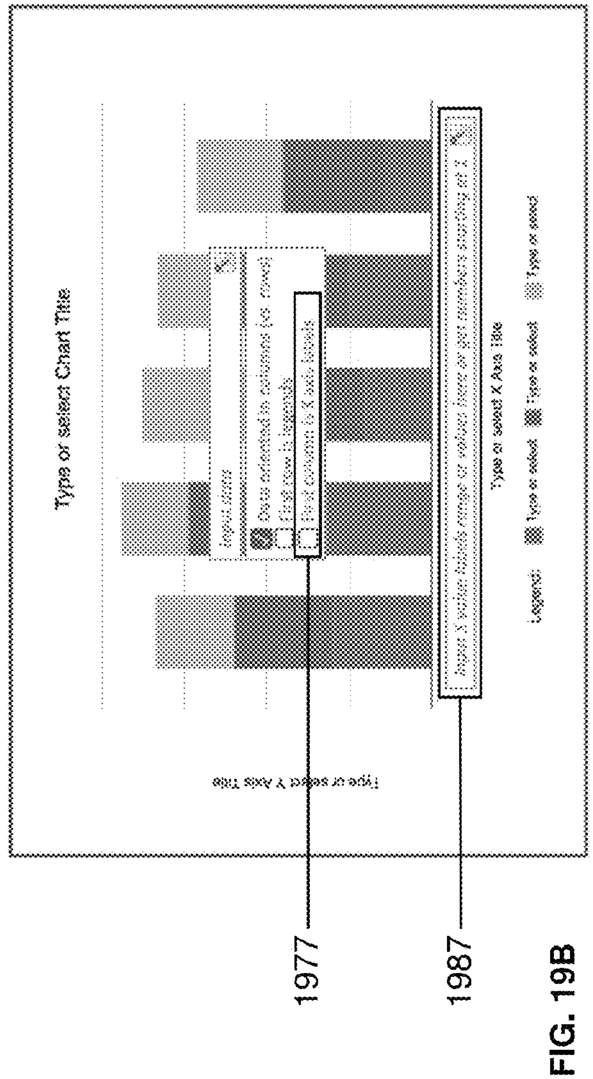

FIG. 19A and FIG. 19B further example the visual simplicity advantage of directly entering data on the chart. In this embodiment when the user answers the 'First row is legends' 1933 as 'no', by unclicking the check box, our application automatically presents them with input controls for the legend values 1954. These chart labeling proxies are positioned where legends are frequently found and labelled so that it is very clear for users what they are—there is no hunting for them or confusion on what they are. Likewise, if the user answers the 'First column is X axis labels' 1977 as no, by unclicking the check box in this embodiment, our application presents them with an input control for the X axis labels input bar 1987 positioned where those X axis labels go, so there is no confusion as to what they are inputting. In this embodiment the input control 1987 also contains an instruction 'Input X value labels range here or get numbers starting at 1' making it very clear what happens with the X axis labels. And these inputs are directly on the chart with the ability to take typed or button triggered selection cell references as well as typed text. Should the user not want to use them at all in this embodiment, they can simply erase the content and they will become invisible, ready for use if later desired.

Figure 20:
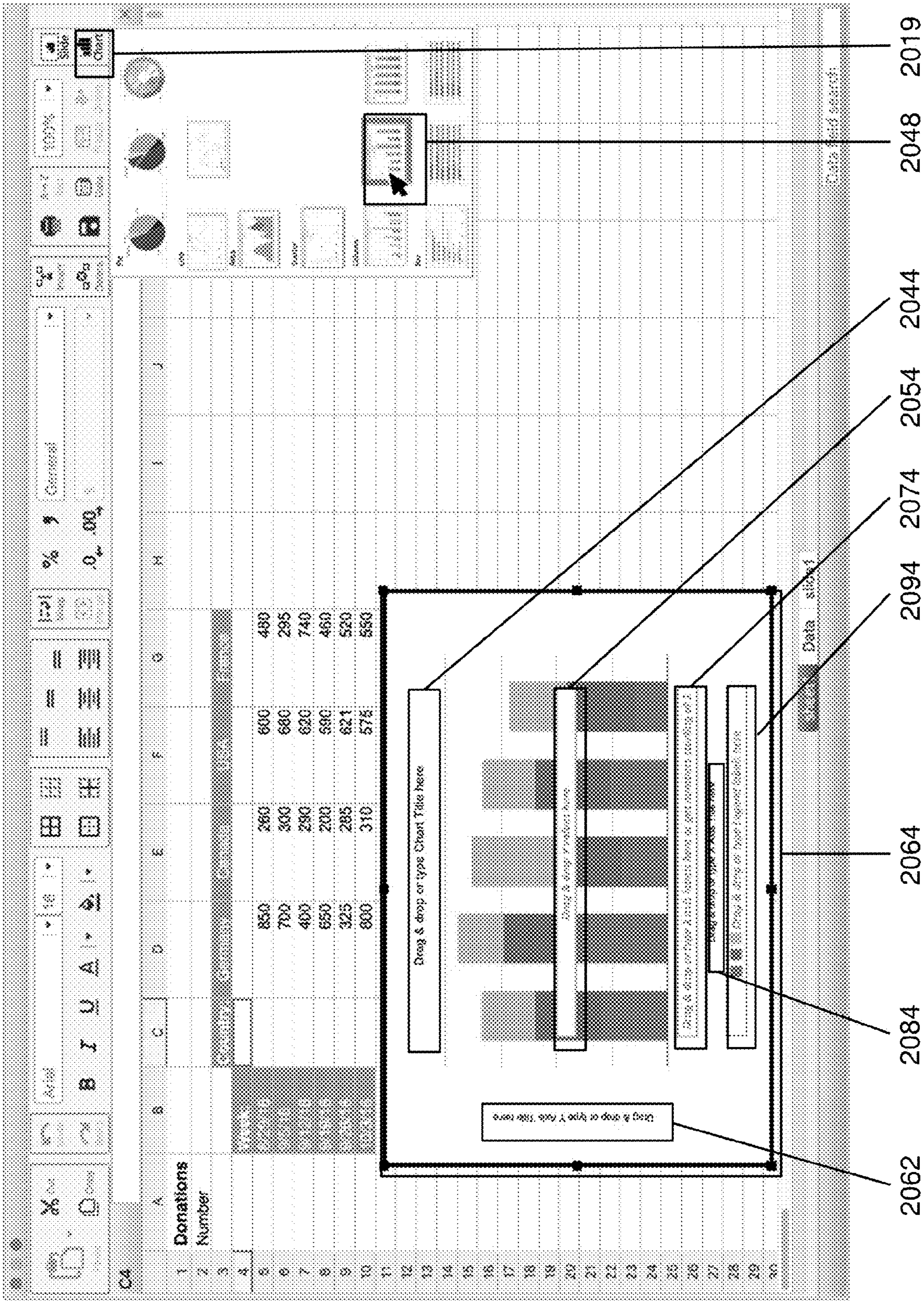
FIGS. 20, 21A, 21B, 22A, 22B, 23A and 23B examples the drag and drop on-chart data controls.

FIG. 20 examples another embodiment of our approach of directly working on a chart. In this embodiment the user does not need to answer questions about the orientation of the data (column versus row) or the labeling proxies (in this example the legend and the X axis labels). As once the user clicks the chart button 2019 and selects a chart type 2048, the user sees an illustrative chart matching the type they selected 2064 ready for them to populate with data. Those data population controls (2044, 2054, 2062, 2074, 2084 and 2094) can be populated many different ways. In this embodiment they can be populated by drag and drop of the data, typing cell references or typing desired values. Once the user populates one or more of the labeling proxies of the legend 2094 or the X axis labels 2074 the application knows data orientation, whether the data is in columns or rows thereby not requiring the user to answer that question.

Figure 21B:
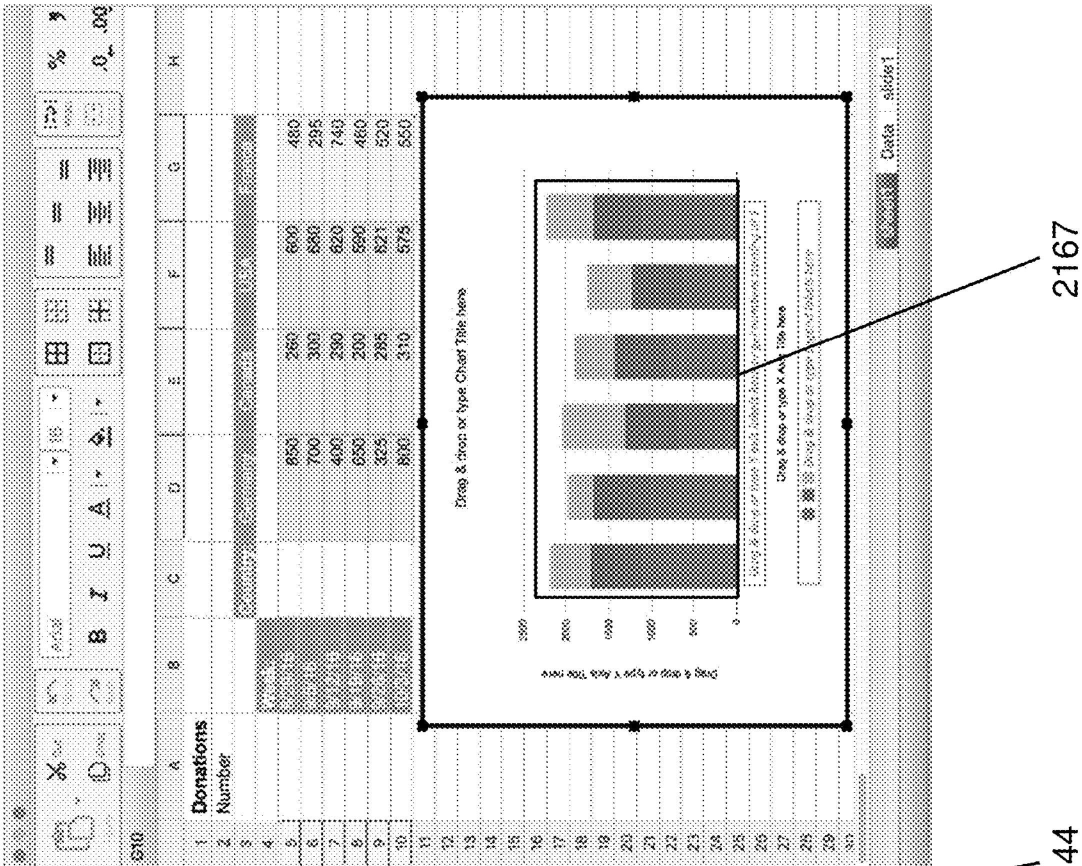
Figure 21A:
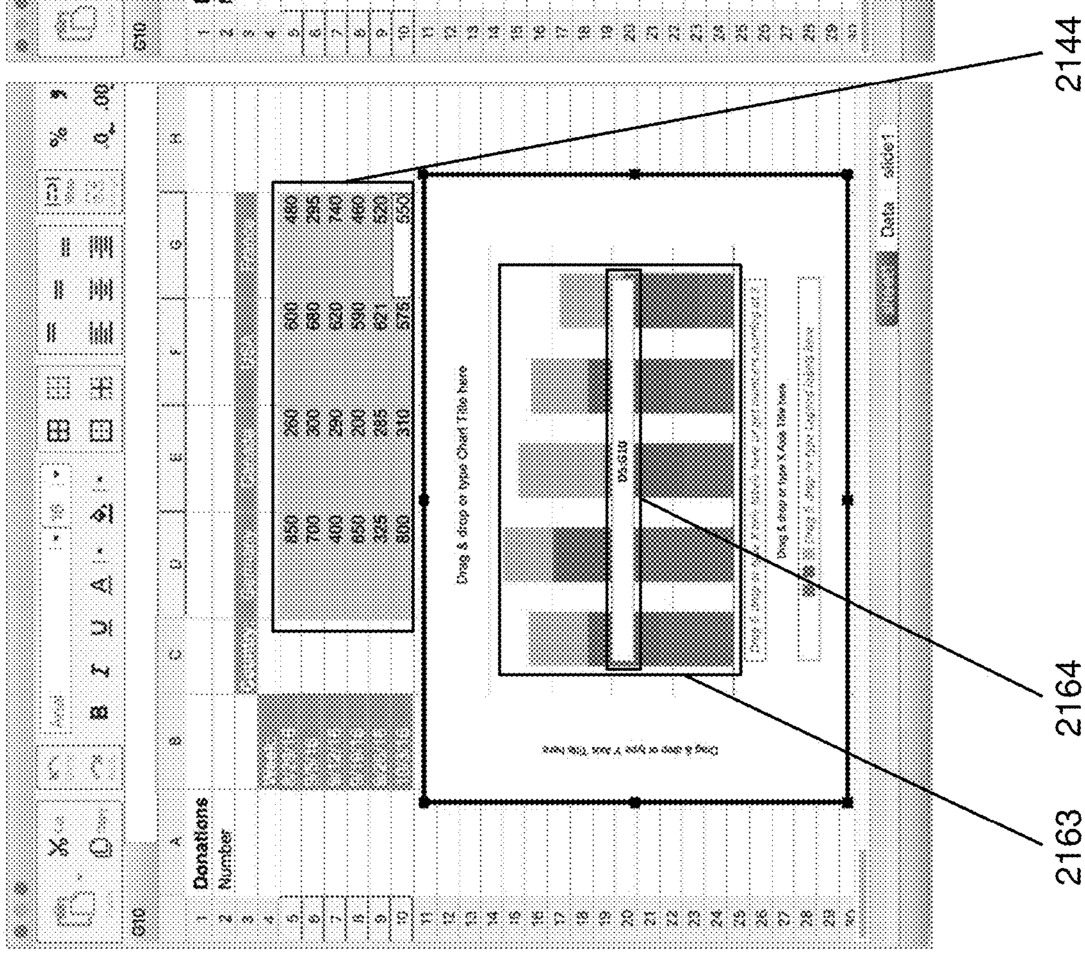

FIG. 21A through FIG. 23B example the drag and drop population of the data in the on-chart controls. FIG. 21A examples the user dragging the Y data cells 'D5:G10' 2144 to the on-chart control 2164 (which is on the chart body also referenced as the chart group of series when populated) which then registers the cell reference values 'D5:G10'. When the user hits enter (or return on a Mac) on that drag and drop it results in the replacement of the illustrative data 2163 with the actual data shown in FIG. 21B 2167 (showing the chart group of series with its colored elements that correspond to points in the series). At this point the application does not know the orientation of the data but in this embodiment assumes that it is columns since that is the more frequent data orientation. That will be automatically corrected if it is proven wrong by the population of one of the labeling proxies, the legend or the X axis labels.

Figure 22A:
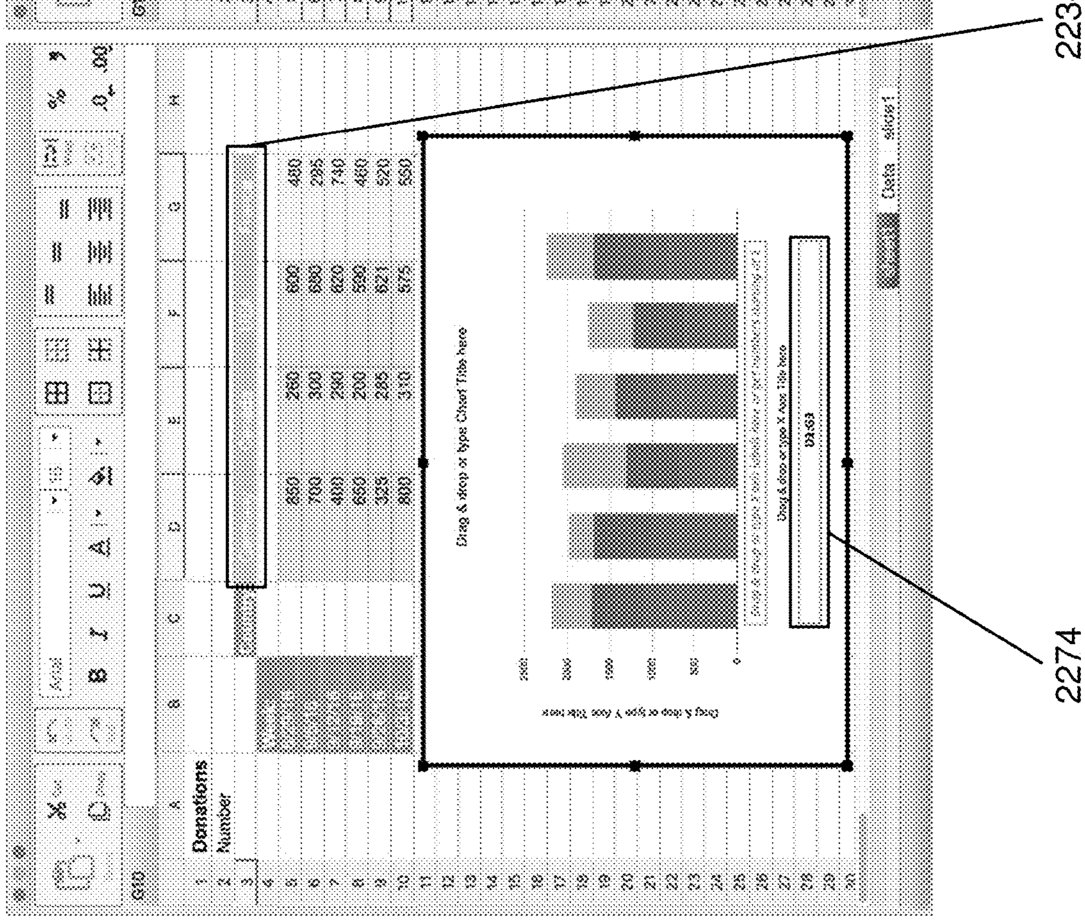
Figure 22B:
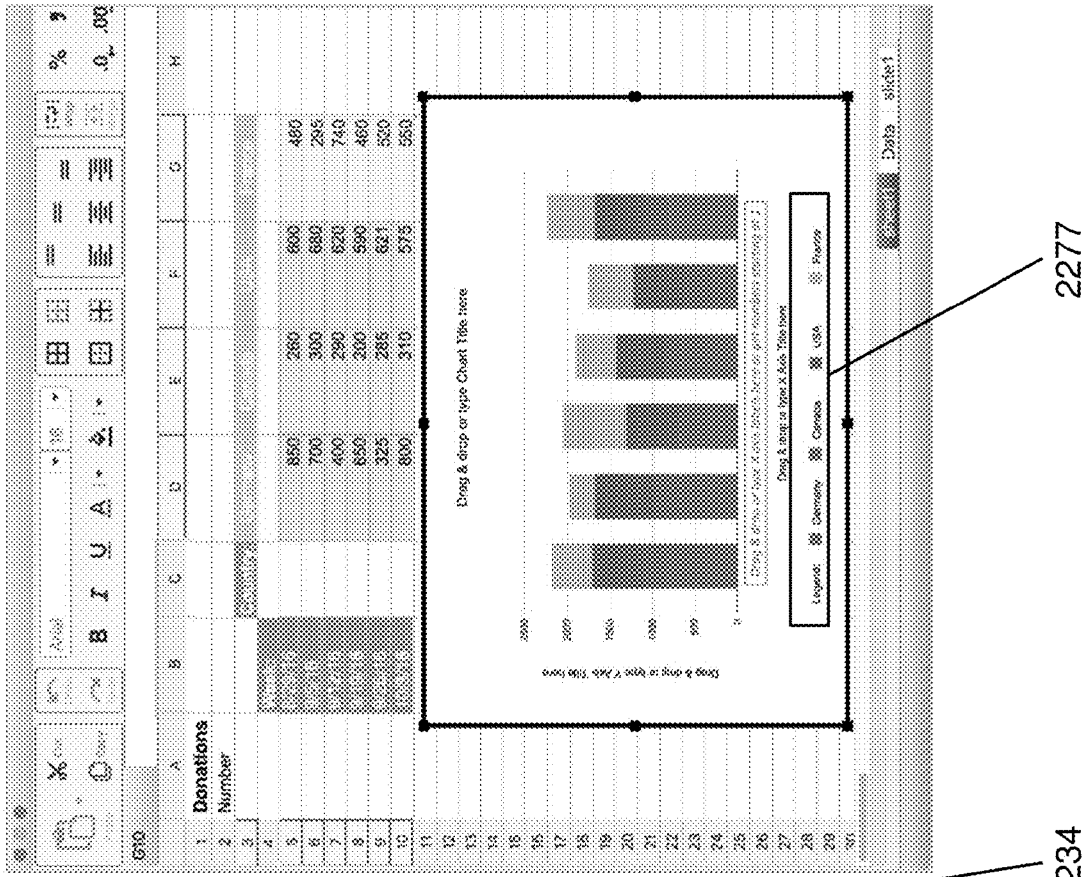

FIG. 22A examples the drag and drop population of the chart labeling proxy for the legend. The user is dragging the cells 'D3:G3' 2234 to the on-chart control 2274 which then shows the cell references 'D3:G3'. Once the user confirms the selection it results in the displayed values shown in in FIG. 22B 2277 showing the color-coded values from the cells matching the sections of the columns with the title 'Legend'. Because this confirmed the column orientation of the data no change was made to the already displayed data.

Figure 23B:
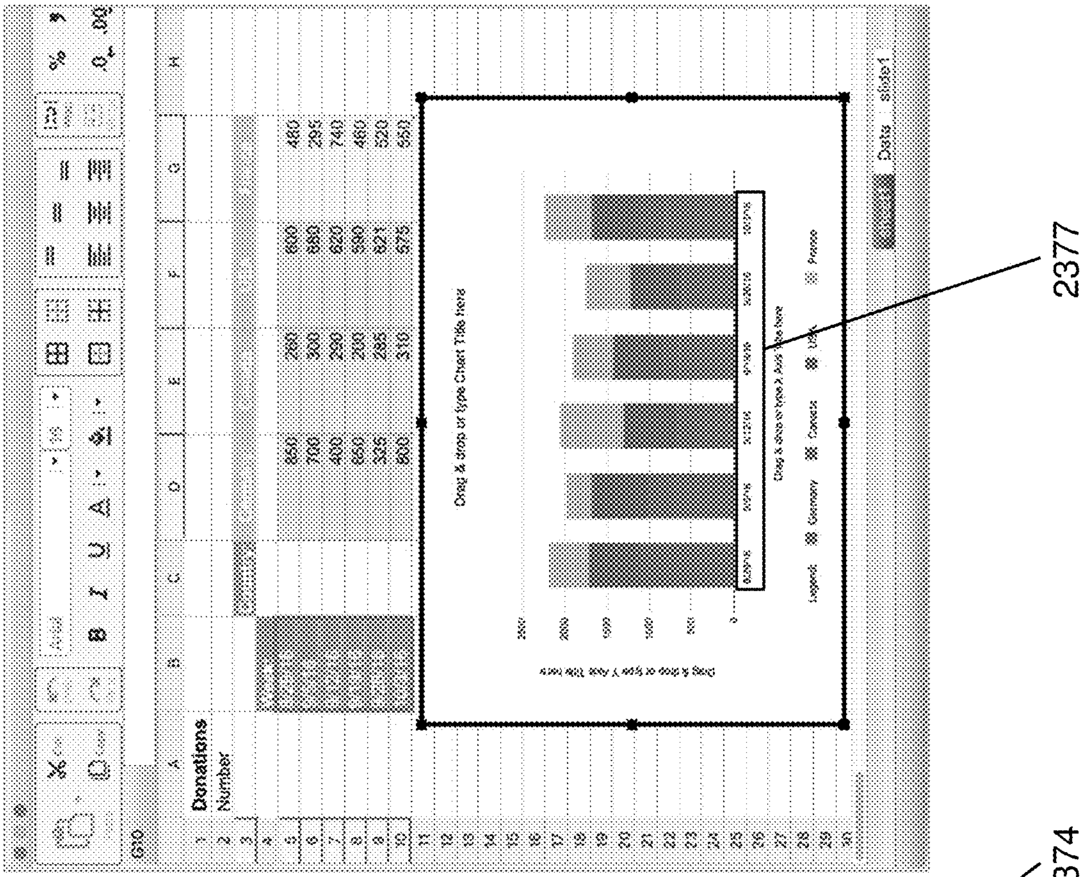
Figure 23A:
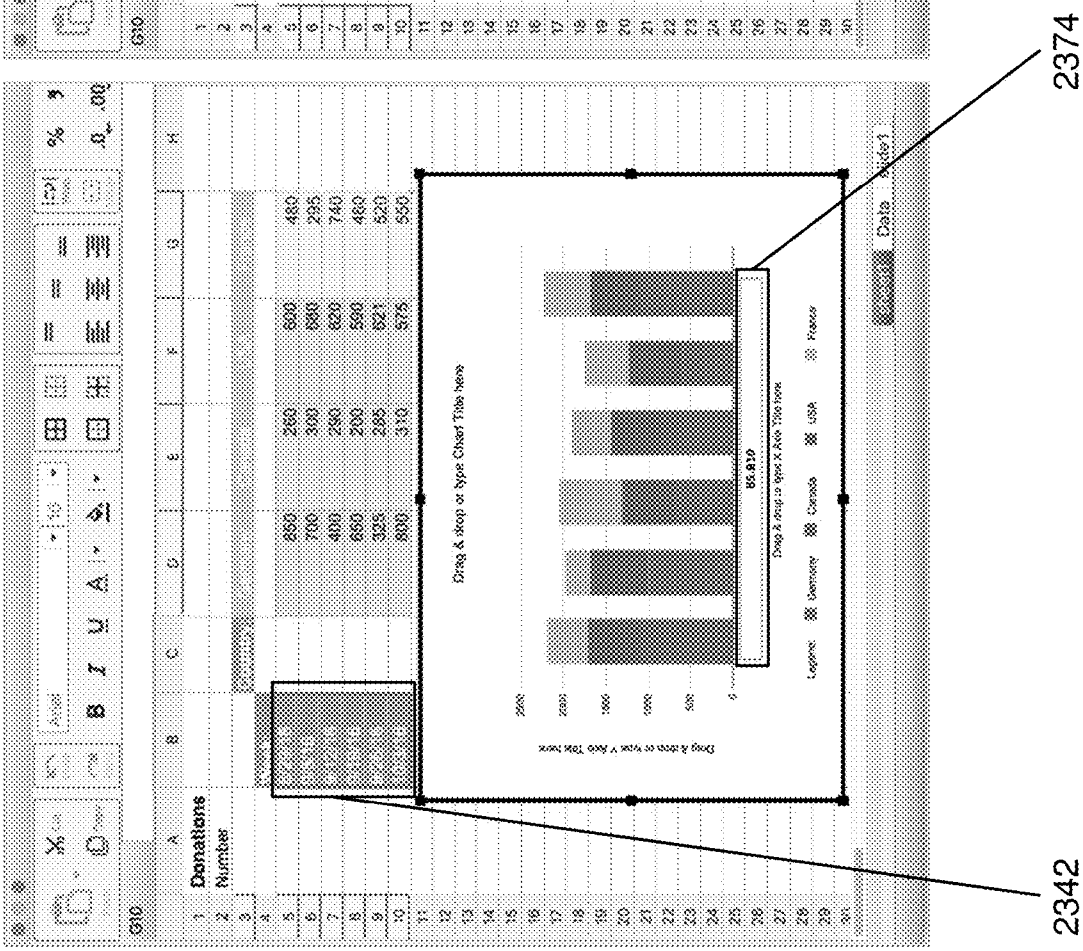

FIG. 23A examples the drag and drop population of the chart labeling proxy for the X axis labels. The user is dragging the cells 'B5:B10' 2342 to the on-chart control 2374 which then shows the cell references 'B5:B10'. Once the user confirms the selection it results in the displayed values shown in in FIG. 23B 2377. The user could then continue to use the drag and drop method to populate the titles (2044, 2062, and 2084 in FIG. 20) or they could type in cell references or the text that they want.

Figure 24:
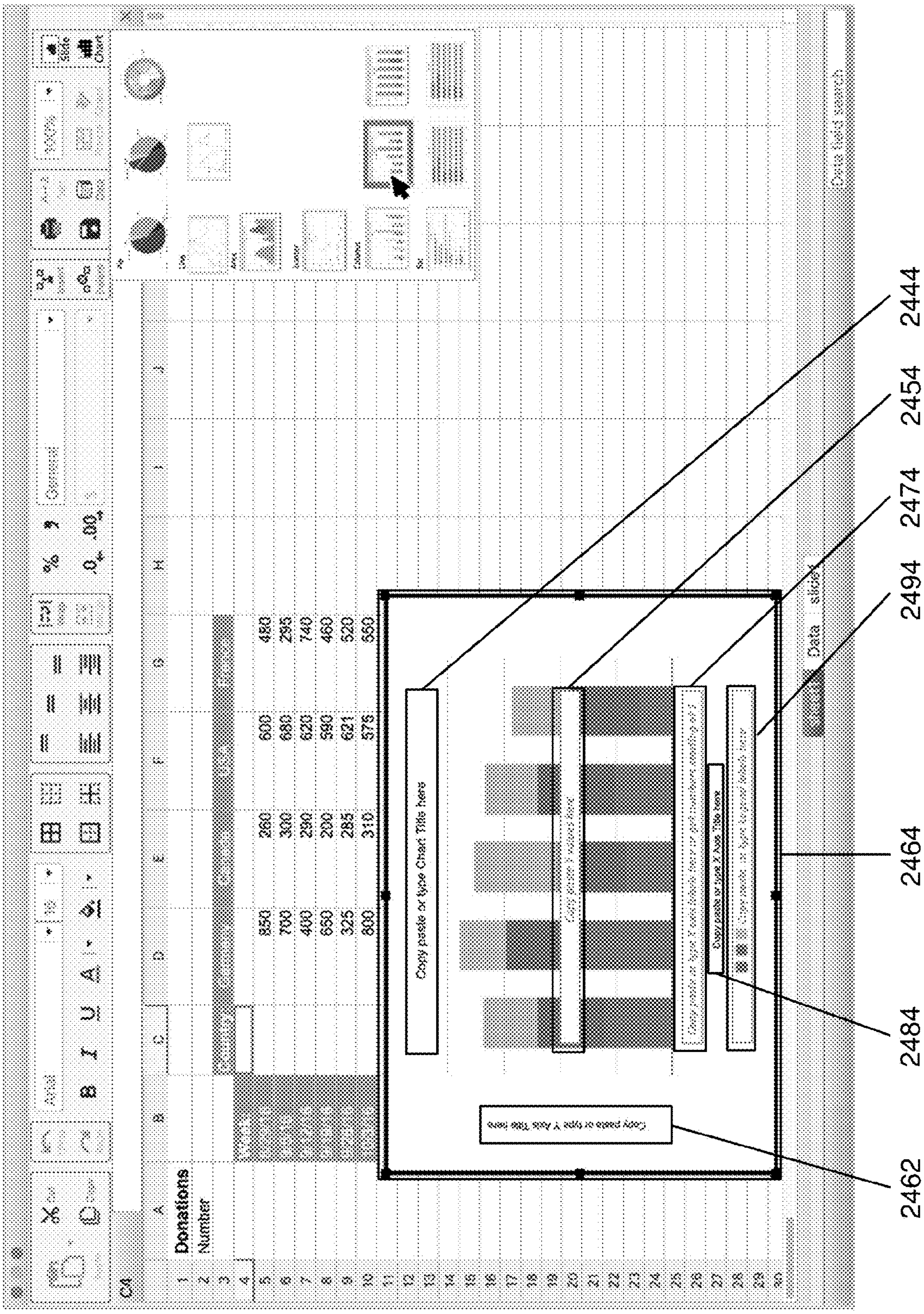
FIG. 24 examples the use of a special copy paste to populate the on-chart data controls.

FIG. 24 examples another embodiment of our approach of directly working on a chart using a special copy paste to insert the desired cell references. Rather than dragging and dropping or using a control with a selector button (as shown in FIG. 16 1664) in this embodiment the user uses a special copy paste to select cell references. Any one of the on-chart data entry controls (2444, 2454, 2462, 2474, 2484 and 2494) can be populated in this manner or our technology can be enabled to use any or all of the data selection approaches as preferred by the user.

Figure 25:
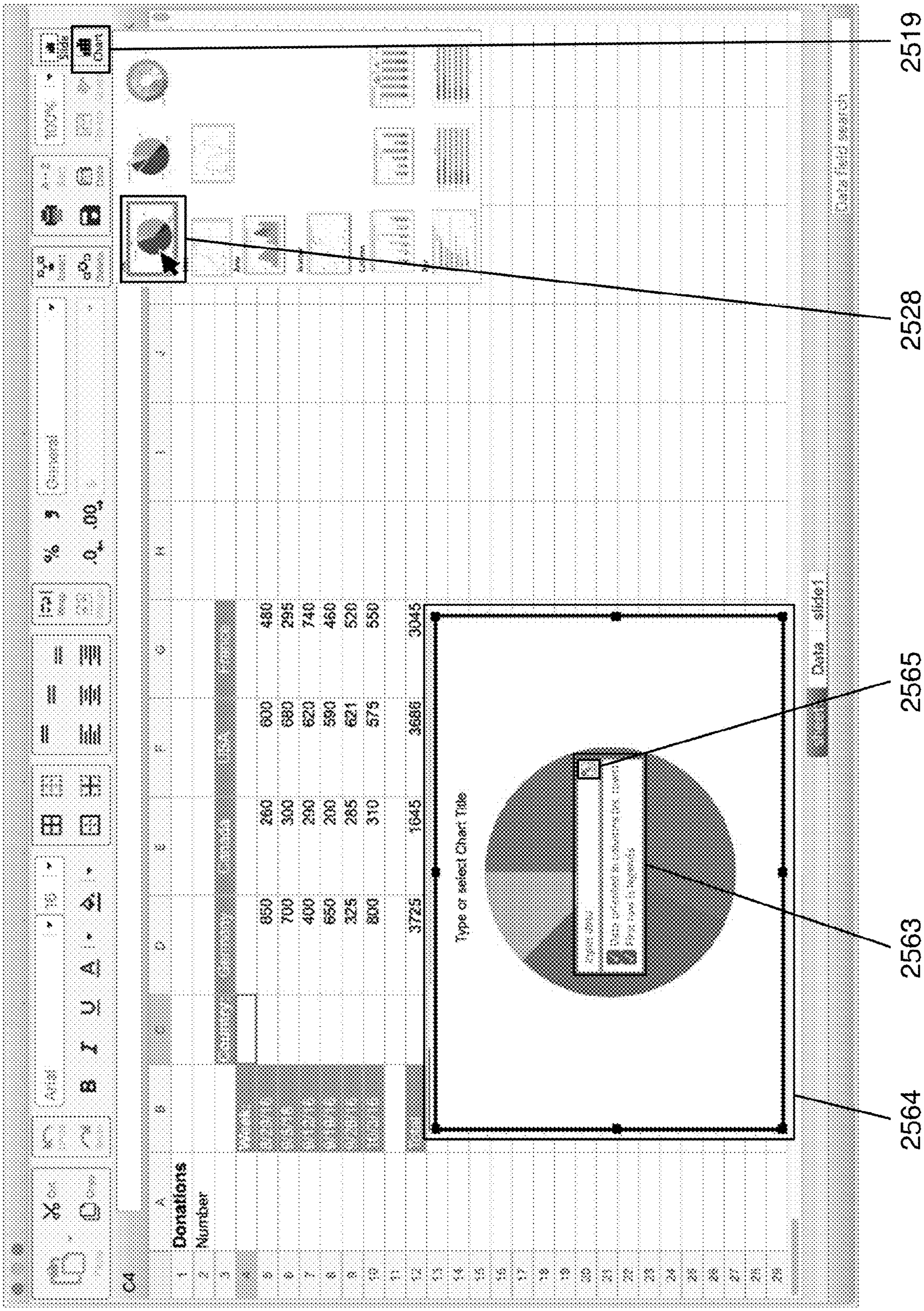
FIGS. 25, 26 and 27 examples our on-chart technology populating a single dimensional (e.g., pie) chart from non-contiguous data.

Most charts are two dimensional in some manner and share similarities with the previously exampled column chart. However, there are one dimensional charts, such as the pie chart, which then have a single labeling proxy rather than two. FIG. 25 examples our on-chart technology for one such single dimensional chart. Like the previous embodiments, once the user opens the charting capability 2519 and selects a pie chart 2528 they are presented with an illustrative chart 2564 if they have no highlighted data. Had they highlighted data ahead of time, our application would give the user a rendition of the chart assuming a data orientation allowing the user to change it if the orientation was incorrect. In this example the user is presented with an on-chart data input control 2563 with the data orientation question 'Data oriented in columns (vs. rows)' and the labeling proxy question of 'First row is legends', as well as a data input with a selector button 2565.

Figure 26:
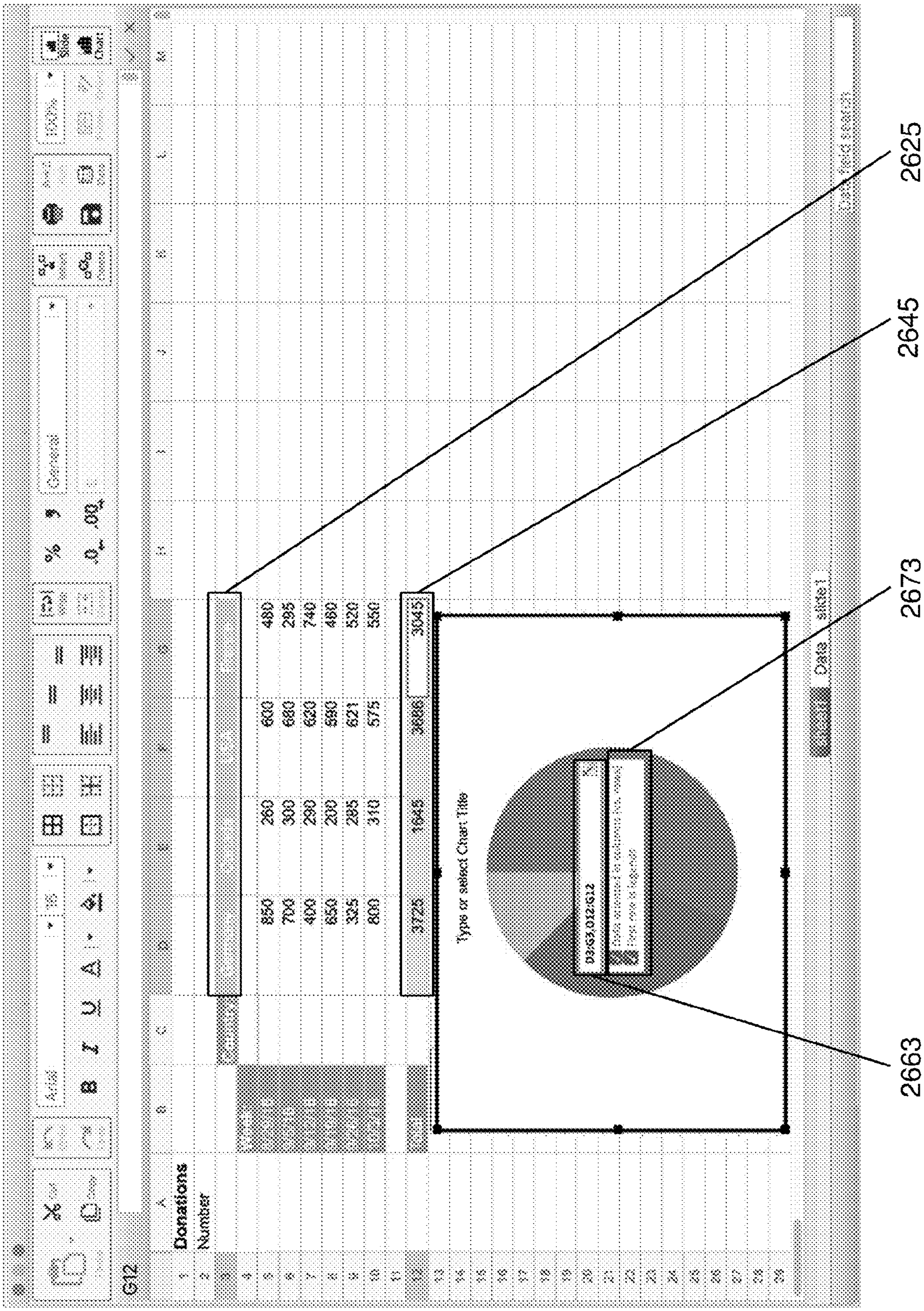

FIG. 26 examples populating non-contiguous data into that pie chart where the user wants to see the totals for a period of time without having to reconfigure the source data analysis. They have used the data input control 2663 and selected the cells 'D3:G3' 2625 and 'D12:G12' 2645 as then shown in "D3:G3,D12:G12' 2663. Because the data is in columns and the legend values are first (the default settings for those two questions in the input control 2673) they then hit return to get the chart values 2764 (from the data in the cells 2645) and the legend values 2784 (from the cells in cells 2625) shown in FIG. 27.

Figure 28:
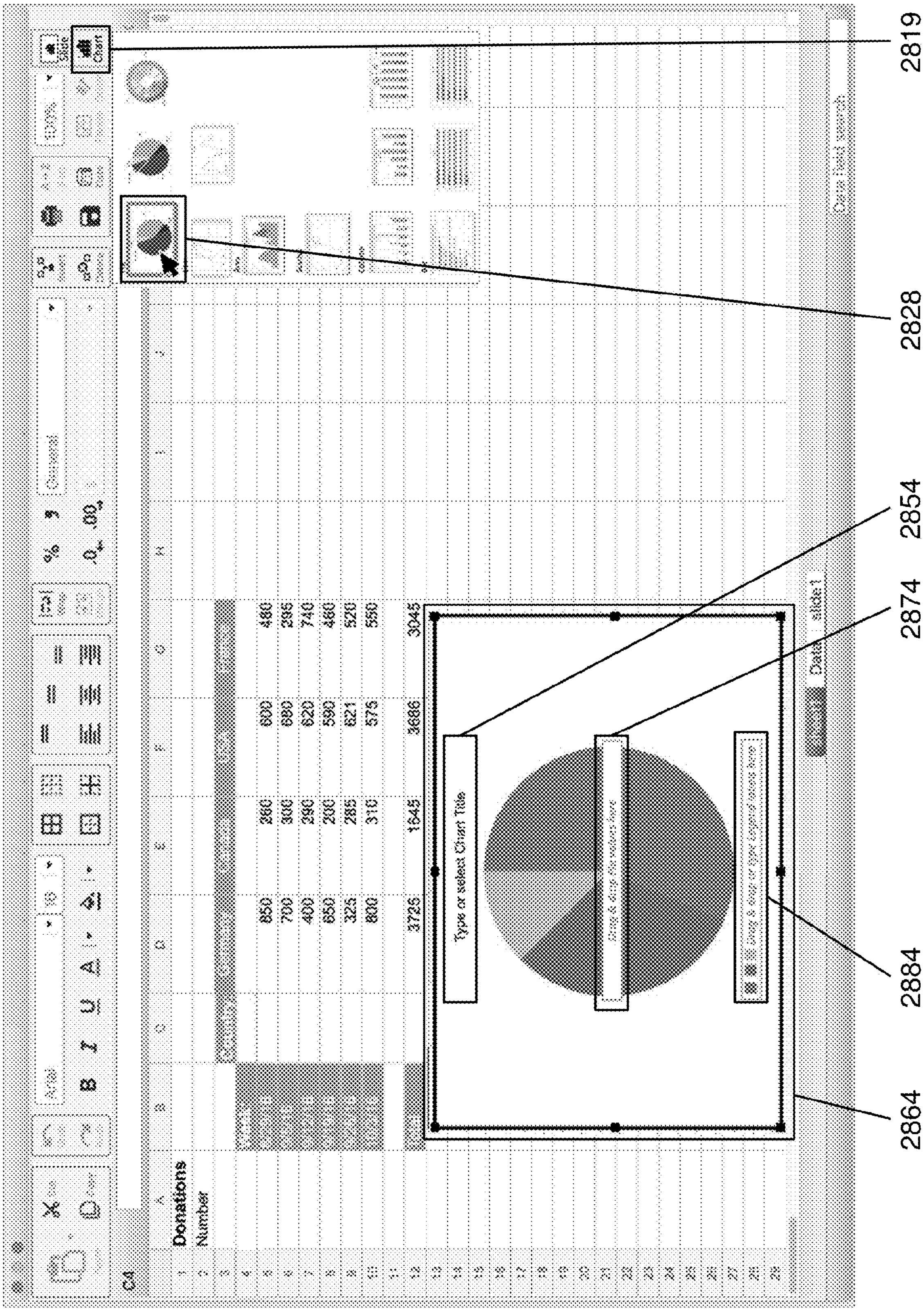
FIGS. 28, 29A, 29B, 30A and 30B examples mixing use of drag and drop with the button selector population of the data in the pie on-chart controls.

FIG. 28 through FIG. 30B example mixing the drag and drop with the button selector population of the data in the pie on-chart controls. FIG. 28 examples what the user sees in this embodiment after opening the chart capability 2819 and selecting a Pie Chart 2828 having pre-selected no data. The illustrative pie chart that pops up 2864 has two drag and drop data entry controls (2874 and 2884) and then one Title control 2854 with a hidden selector button that works as shown in FIG. 18A through FIG. 18C.

Figure 29B:
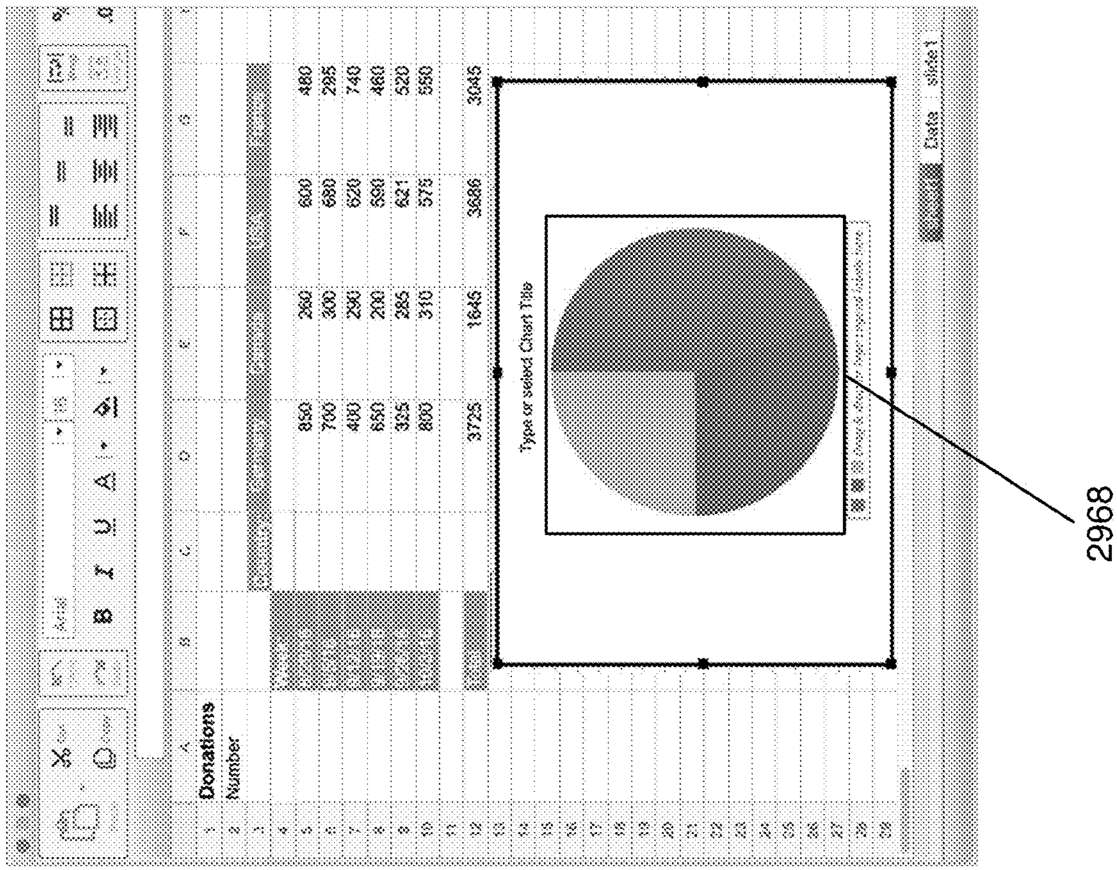
Figure 29A:
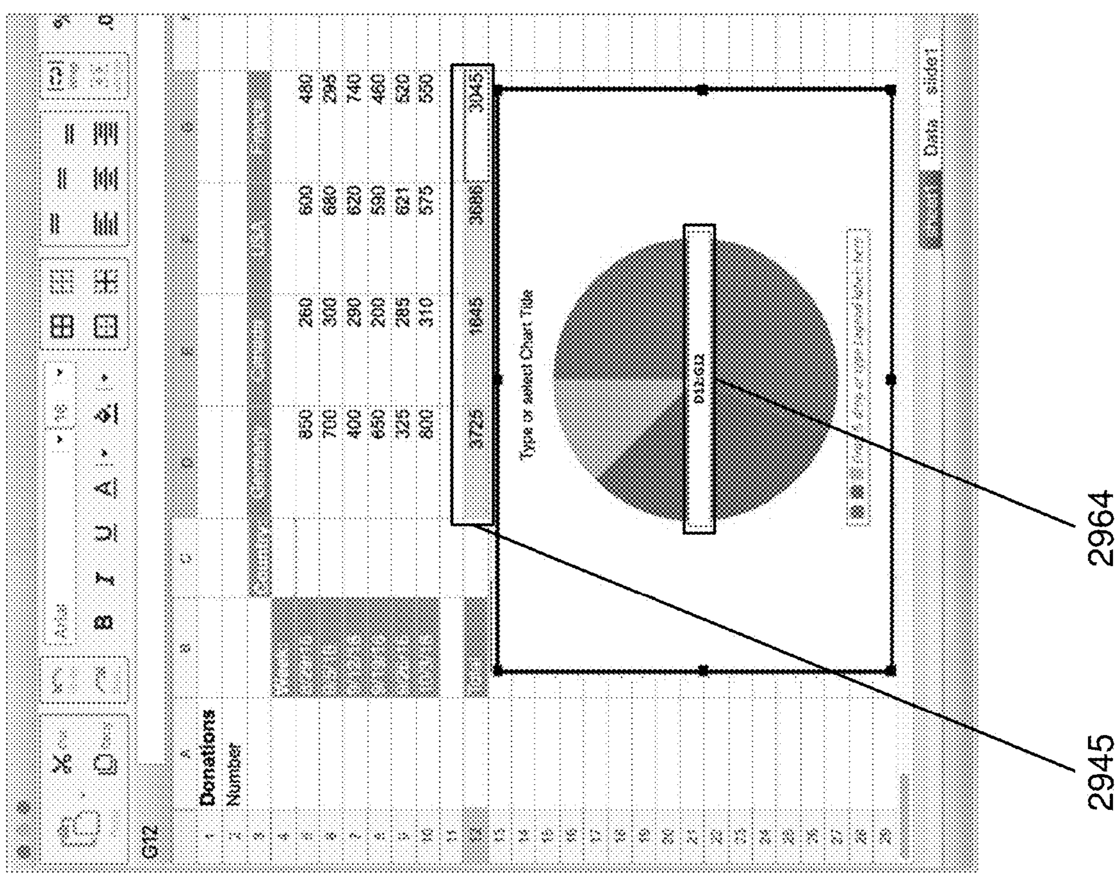
Figure 30A:
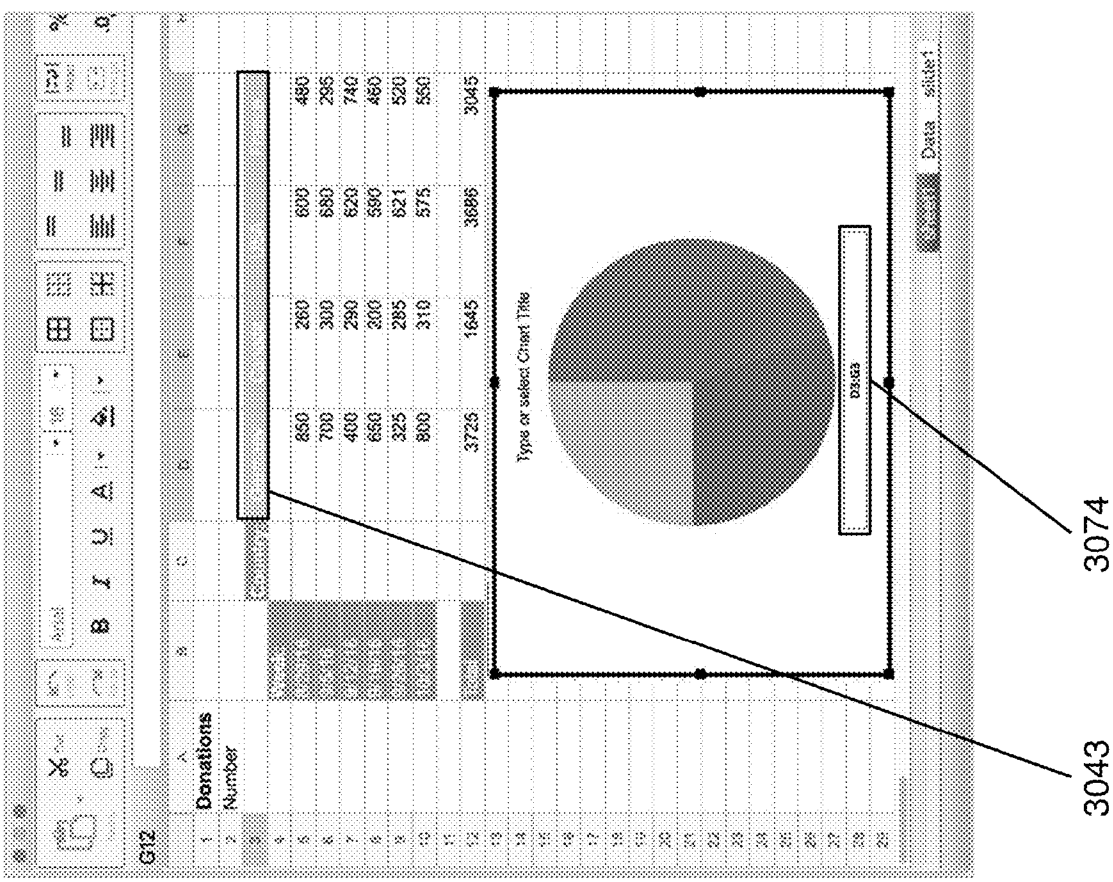
Figure 30B:
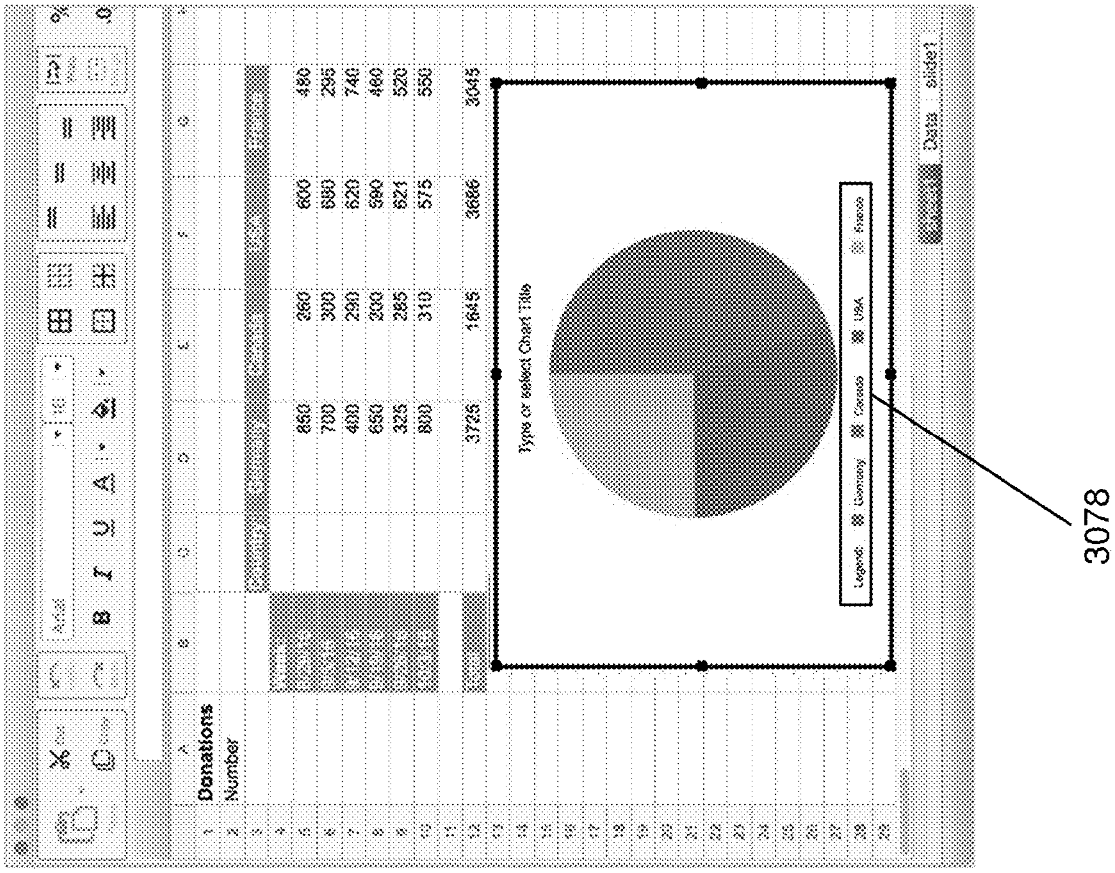

FIG. 29A through FIG. 30B then example the drag and drop population of the pie slices and the legend. In FIG. 29A the user drags the cells 'D12:G12' 2945 to the on-chart control 2964 and when they hit enter (return on a Mac) get the pie 2968 shown in FIG. 29B (showing the data values). In FIG. 30A the user drags the cells 'D3:G3' 3043 to the on-chart control 3074 and when they hit enter (return on a Mac) get the legend 3078 shown in FIG. 30B (showing the data values as the color matched legend complete with a 'Legend: title). There are many mix and match combinations as well as controls taught by the technology disclosed that can handle all of the potential data entry approaches. This and all the other chart capabilities can be communicated to the user in the intuitive manner discussed next.

Figure 31:
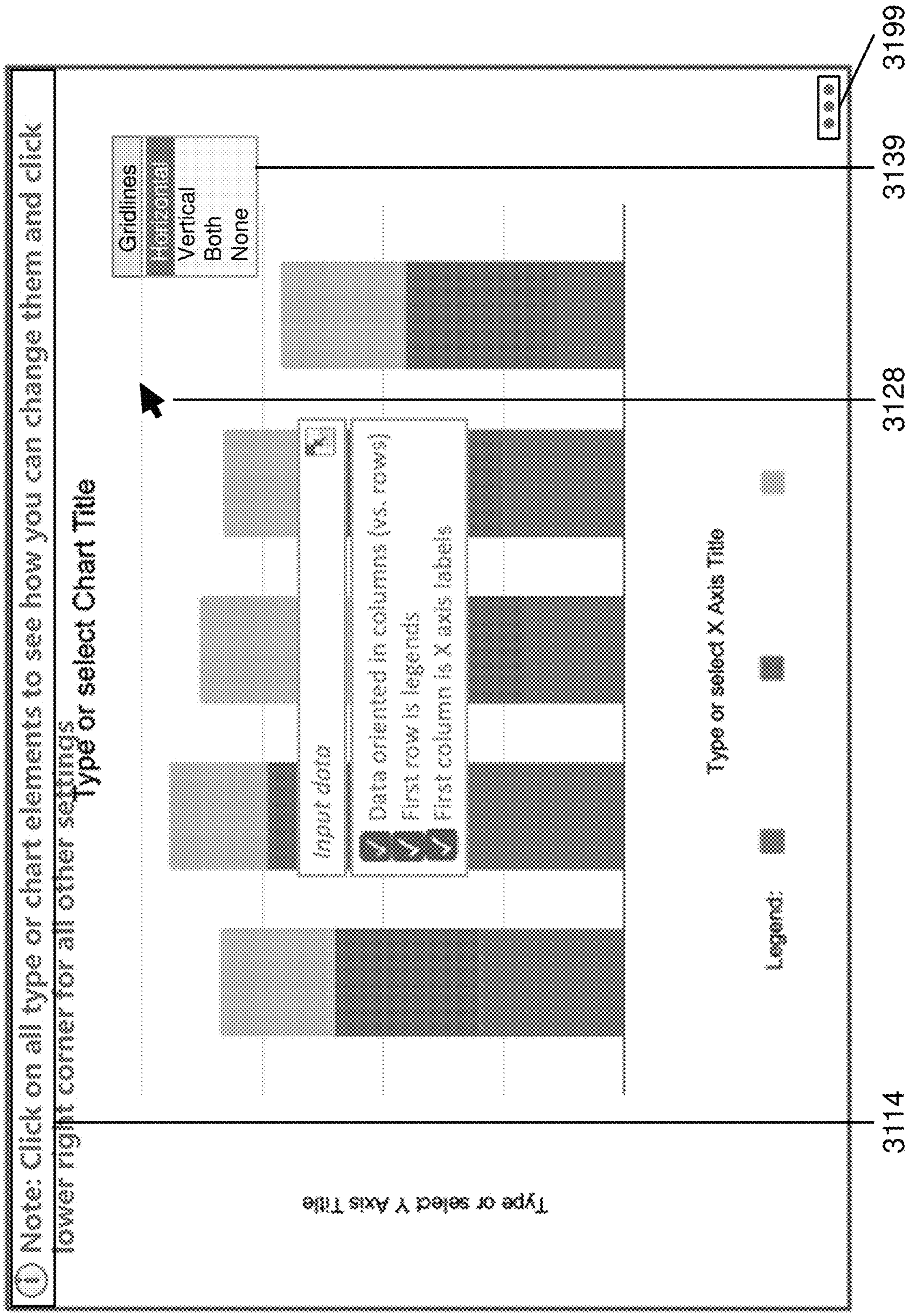
FIG. 31 examples starting instructions and on our starter chart.

In FIG. 31 one embodiment opens anew chart with simple starting instruction 3114 that informs users 'Click on all type or chart elements to see how you can change them and click lower right corner for all other settings'. In this embodiment the instruction then goes away after the user completes an activity or after a period of time. An example is shown of the settings where a user has clicked on a gridline 3128 opening a dropdown 3139 giving the relevant options—in this case: 'Horizontal', 'Vertical', 'Both' and 'None'. In this embodiment other settings such as the Min and Max scales, setting custom scale increments, setting scale locations, changing scales to logarithmic, adding data labels, totals, error bars, trending and so on are accessed by clicking the lower right corner three dots 3114 to expose drop-down, sidebar or other visuals for making selections. This opening chart could be an illustrative chart with no preselected data as shown in FIG. 31 or if the user had preselected data before triggering the chart creation that data could then be used for the initial chart.

Figure 32:
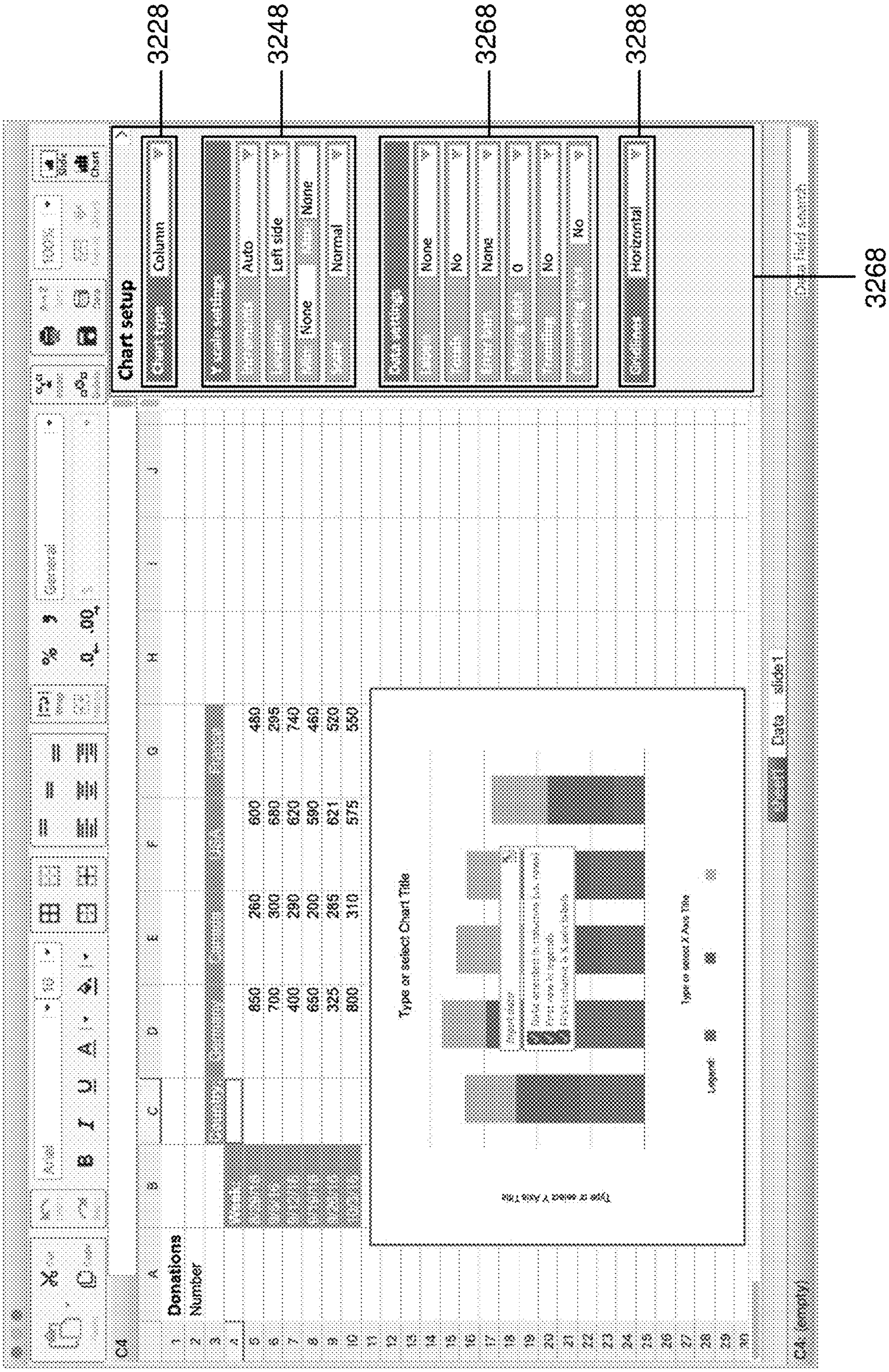
FIG. 32 examples the use of a sidebar for setting selections.

FIG. 32 examples using a sidebar 3268 for those other selections. In this embodiment the user has the capability to select or change the chart type 3228, with the other options being chart type dependent. For the stacked column example this includes 'Y scale settings' 3248, 'Data settings' 3268 and 'Gridlines' setting 3288. In different embodiments these sidebar selections could be used in addition to the same on-chart capabilities or as a substitute for some or all of those settings.

Figure 33:
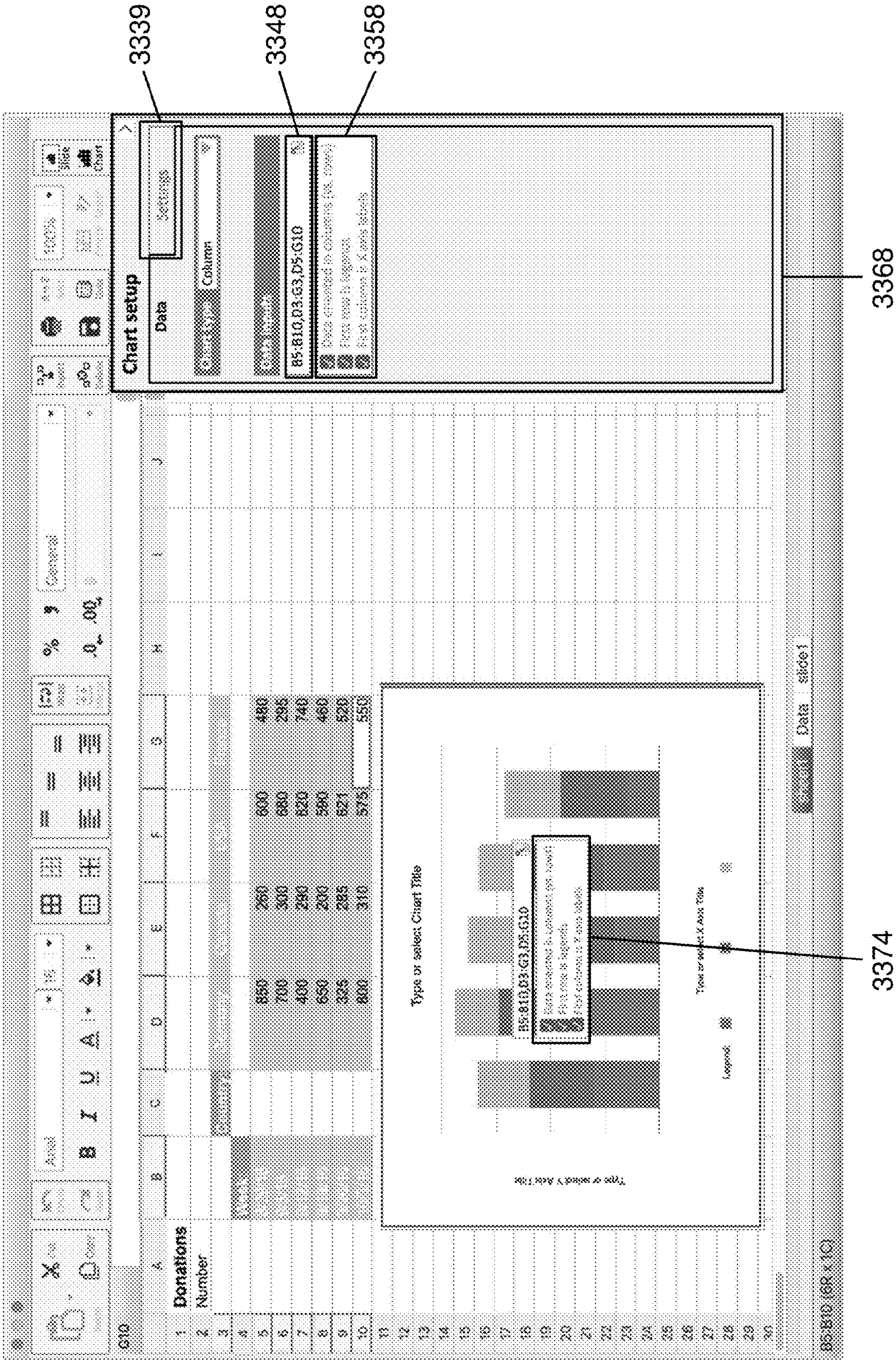
FIG. 33 examples duplicating in a sidebar on-chart data inputs.

In another embodiment the main data entry would be duplicated in the sidebar, pop-up or other visual for those users who prefer doing some of the data entry that way. FIG. 33 examples a sidebar setup 3368, in this example the user is entering the data ranges in sidebar data input bar 3348. The three different question check boxes 3374 are also duplicated 3358 in the sidebar Data tab 3368. There is also a settings tab 3339 housing the 'Y scale settings' 3248, the 'Data settings' 3268 and the 'Gridlines' 3288 patterned after those shown in FIG. 32.

Figure 34:
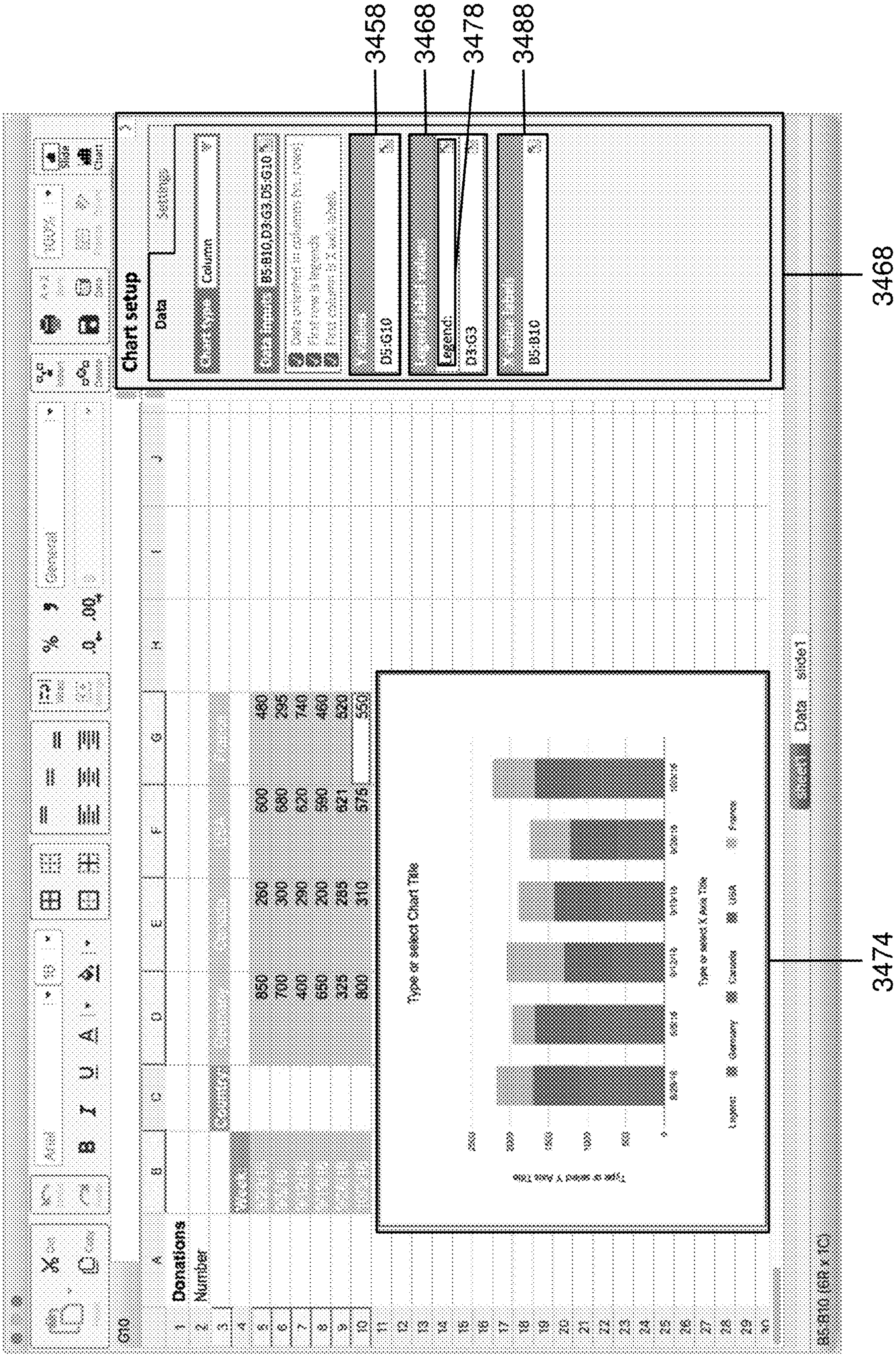
FIG. 34 examples the on-chart and sidebar results of hitting ENTER (RETURN on a Mac) for the data inputs in FIG. 33.

FIG. 34 examples the result of hitting ENTER or RETURN on the Data Inputs 3348 in FIG. 33. This replicates what was as done in FIG. 17A using the in-chart comparable input 1727. The user gets the same result as chart FIG. 17C 1767 in FIG. 34 3474. This embodiment then populates the specified cells in their respective sidebar 3468 components, 'Y values' in 3458, 'Legend label values' in 3468 and 'X value labels' in 3488. Because the 'Legend:' on the chart is editable and specifiable from a cell value, that value shows up in a sidebar box 3478.

Figure 35:
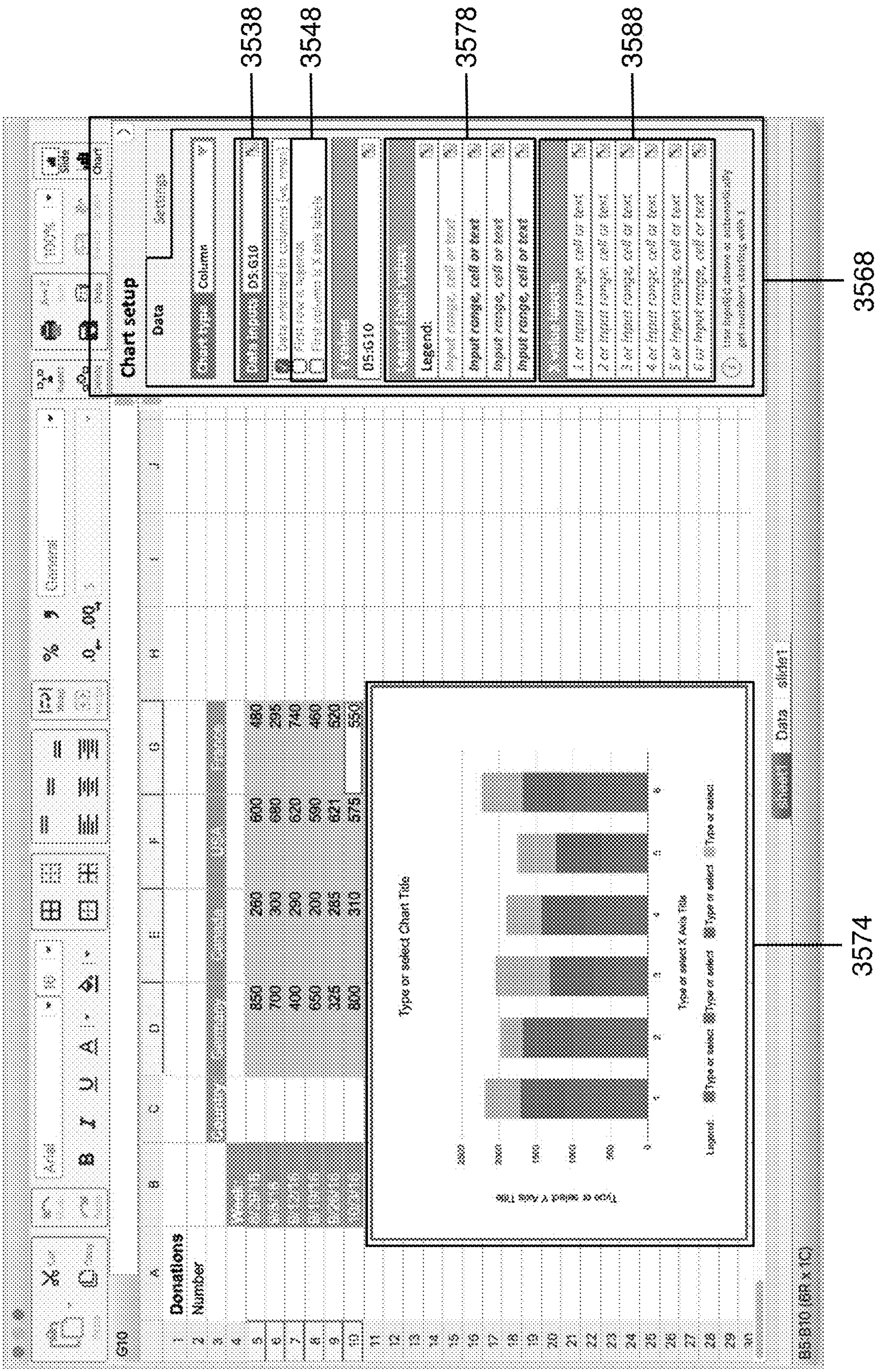
FIG. 35 examples the on-chart and sidebar results of inputting only Y values into a Stacked Bar chart.

FIG. 35 examples where the user has unchecked the last two 3548 of the three data questions and therefore only entered the Y values "D5:G10" 3538 in the 'Data inputs'. This could have been done on the chart or in the sidebar 3548. In this embodiment once the user hits ENTER or RETURN they get the sidebar 3568 and the chart 3574 recording of the results as well as the ability to make changes in both places. The 'Legend label values' 3578 and 'X value labels' 3588 input boxes are replicated to match their respective number of values and input locations on the chart (which users in this embodiment can click into like shown in FIG. 19A and FIG. 19B). This gives the editable and cell specifiable 'Legend:' label and then one input box for each of the four legend colors 3578 in the sidebar (matching the four columns of data input). For the 'X value labels' 3588 it means six inputs (matching the six rows of data input), one for each of the X labels on the chart. although you can enter a range to set them all in the sidebar or in the on-chart locations. Therefore, paralleling as much as possible the sidebar or other visual data entry approach to the in-chart approach while offering users options for the simple and intuitive ways to create the charts they desire.

Figure 36:
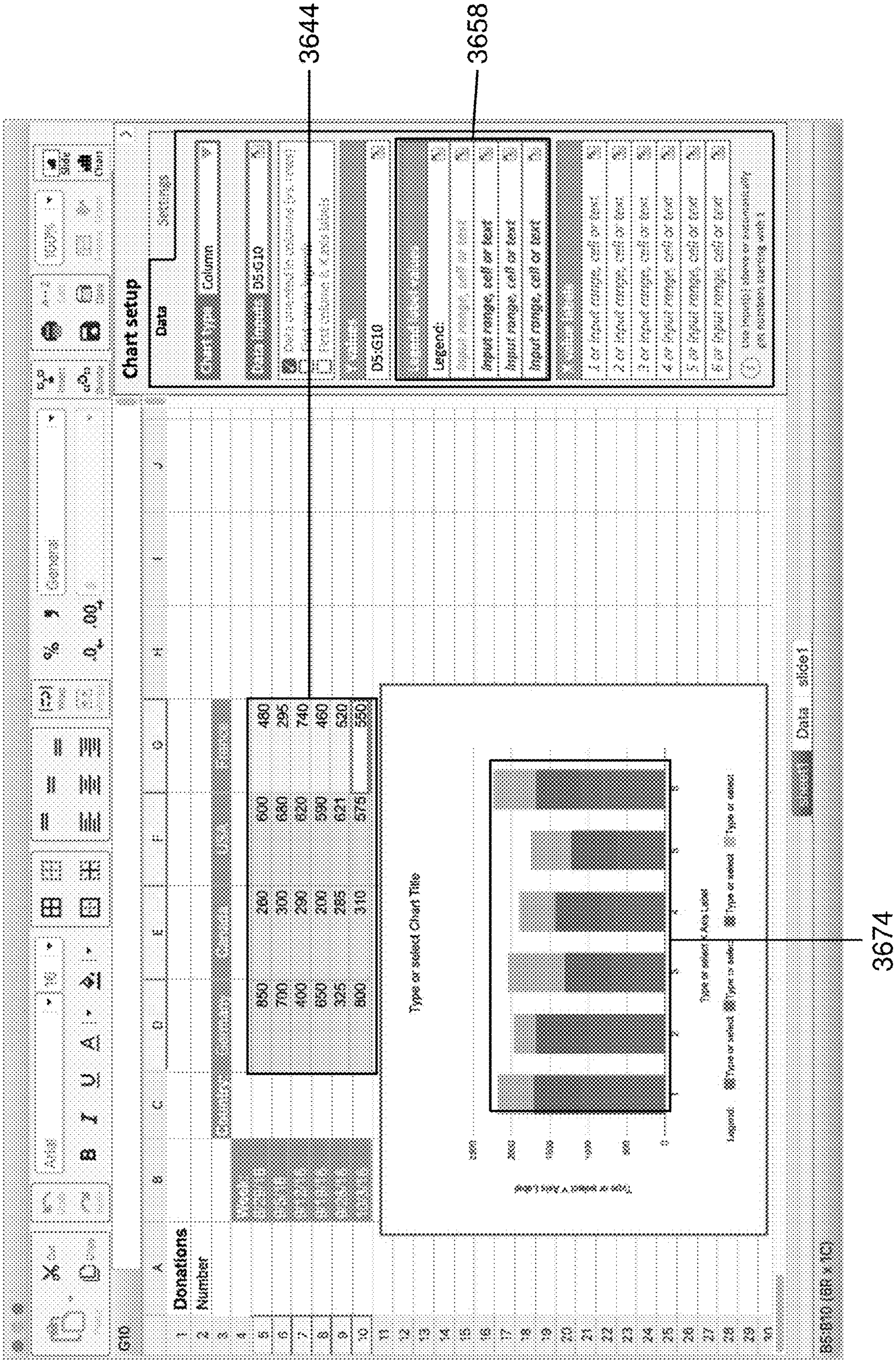
FIG. 36 examples color matching Y value inputs in the spreadsheet cells.

FIG. 36 examples an additional dimension our technology uses to eliminate mistakes when adding legend values. That is to color match the Y value inputs as they are shown in the chart 3674 as transposed over the data 3644 and the sidebar 3658 should the user use it. This makes it very easy for users to ensure they are putting the correct cell reference or text into the correct legend position whether they are entering the data on-chart or via the sidebar.

On-Chart Modification

Once a chart has been created modifying the content can be a time-consuming process requiring users to remember which ribbons, buttons, dropdowns or sidebar elements to use, and/or having to actually move around the spreadsheet data. It is frequently not as simple as point and click to make the change desired. For example, changing the order of data in a spreadsheets chart should be as simple as dragging and dropping it in the order desired, but that is not how it is done with existing spreadsheets.

Figures 37A, 37B, 37C:
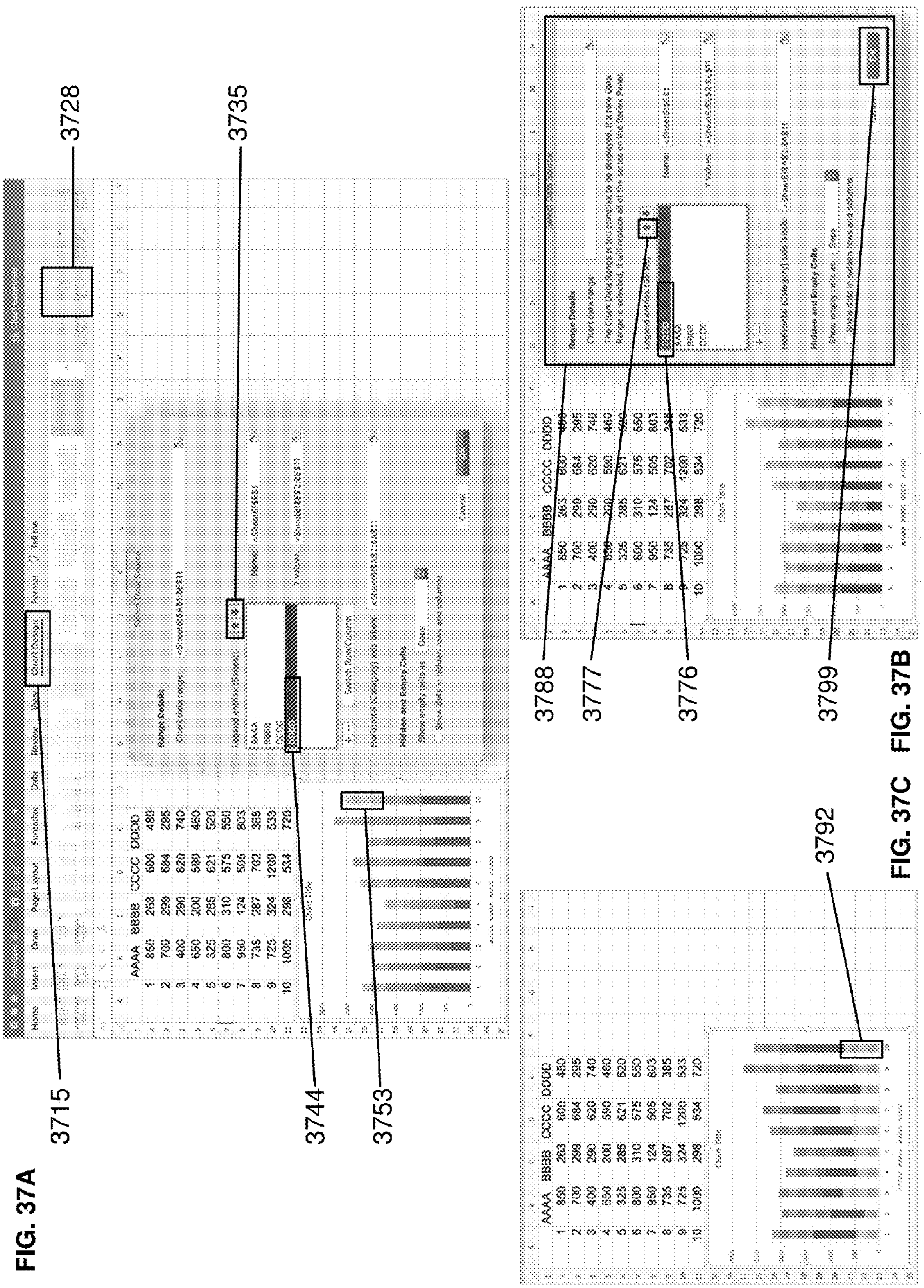
FIGS. 37A, 37B, 37C, 38A and 38B example two different ways to reorder the data presented in a Microsoft Excel spreadsheet chart without having to physically move the data in the spreadsheet.

FIG. 37A through FIG. 38B example two different ways to reorder the data presented in a Microsoft Excel spreadsheet chart without having to physically move the data in the spreadsheet. In FIG. 37A the user needs to know to go the Chart Design ribbon 3715 and click on the Select Data button 3728 and then know to highlight the Legend value 'DDDD' 3744 they want to move and know that the arrows 3735 above the Legend entries (Series) box moves them. In this example then click the button 3777 three times to move 'DDDD' to the top spot 3776 which is then a bit confusing because the top spot in the 'Legend entries (Series)' box 3776 is the bottom position on the chart 3792 which you only see after you click 'OK' 3799 at which point the Select Data Series pop-up 3788 goes away and you are left with the changed chart as shown in FIG. 37C. Now the user can see the result of the process moving the top column elements 3753 to the bottom 3792 while what they have done in the Legend entries (Series) box is the opposite of moving the bottom label 3744 to the top 3776. If the result was not the one desired then the user needs to start the process again, make more changes without seeing the result of those changes until they click 'OK'. Rather than all these steps and the confusion of top in the input being bottom on the chart, why not just drag and drop what you want right on the chart immediately getting the result desired?

Figure 38B:
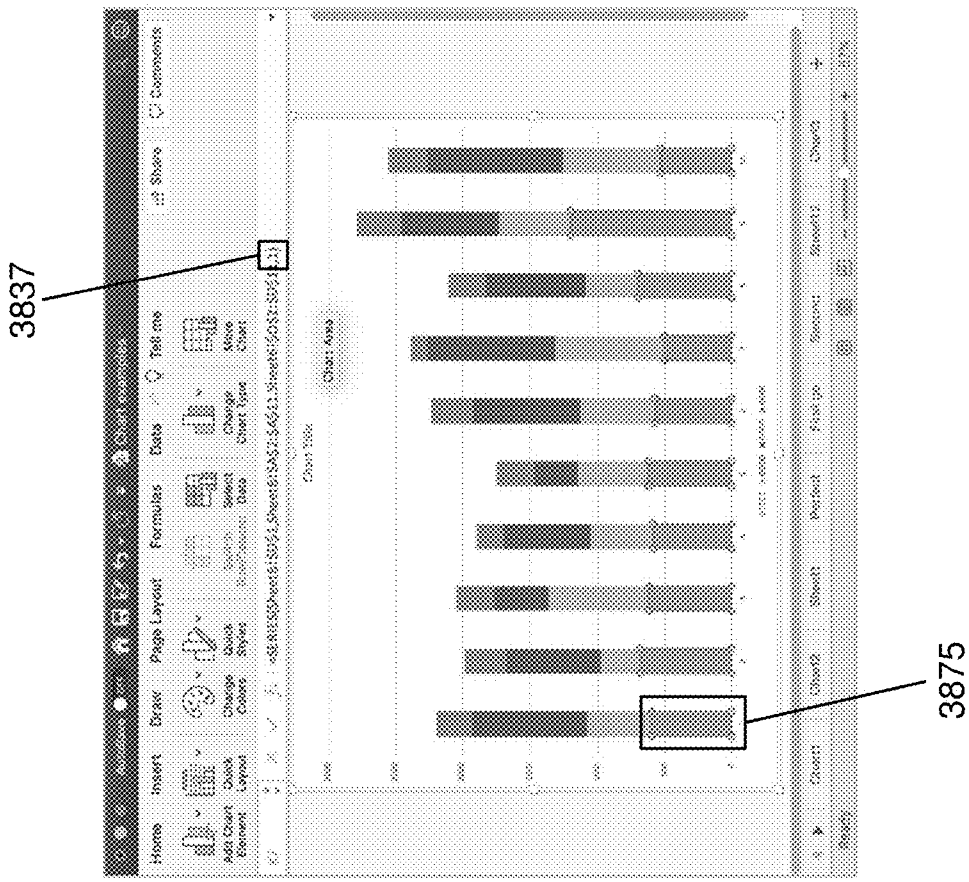
Figure 38A:
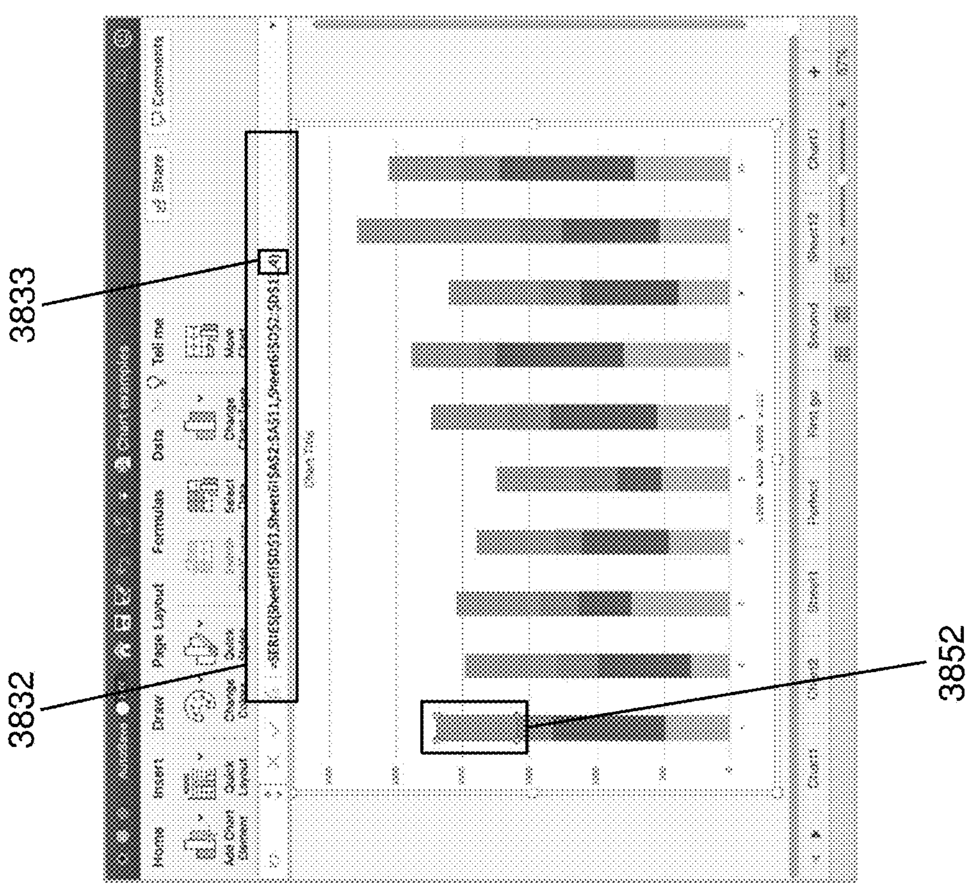
Figure 39A:
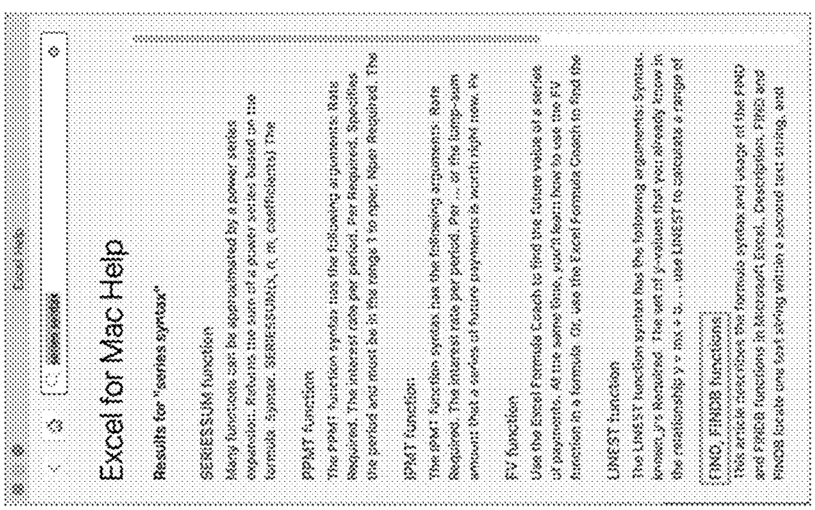
FIGS. 39A, 39B, 39C, 39D, 39E and 40 example the difficulty understanding how to use the Microsoft Excel Series function.
Figure 39B:
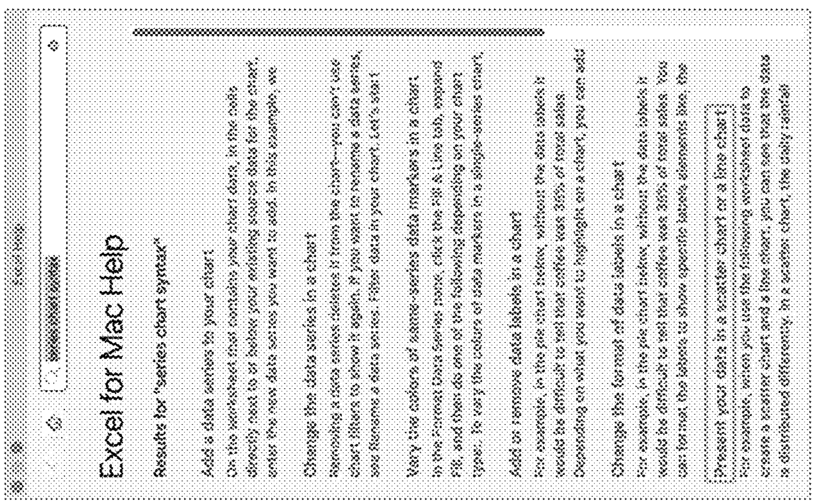
Figure 39C:
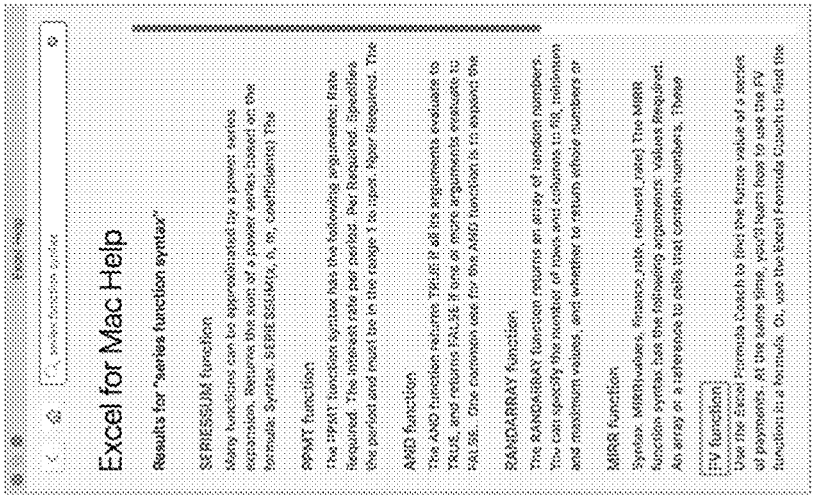
Figure 39D:
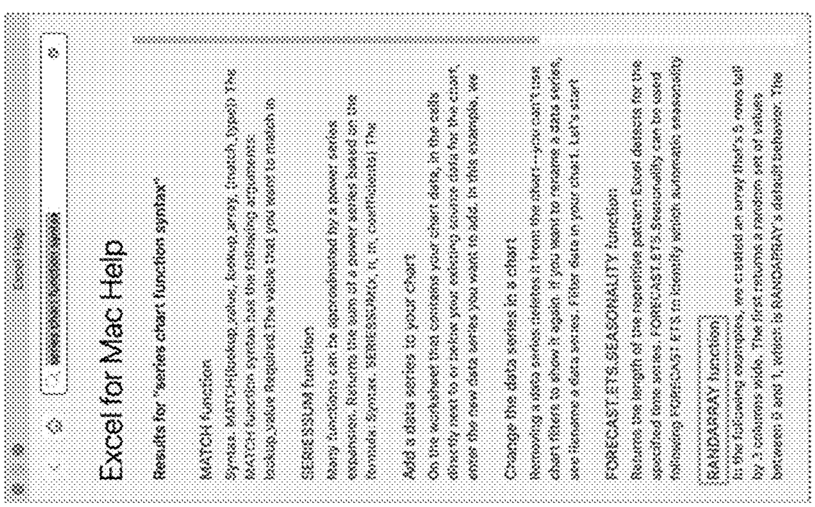
Figure 39E:
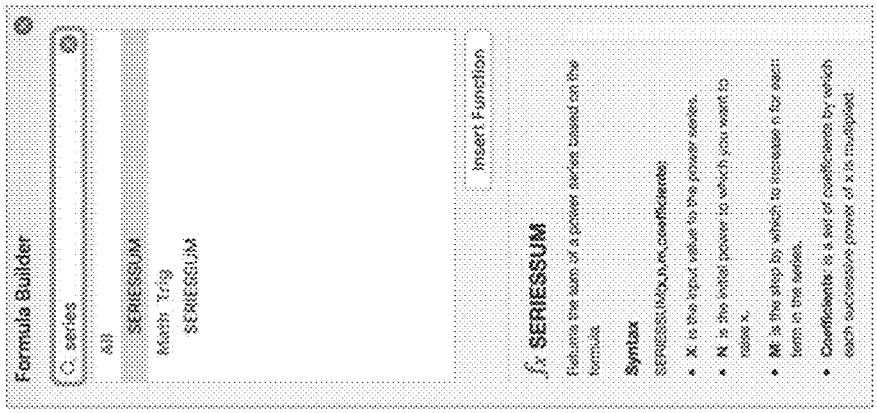
Figure 40:
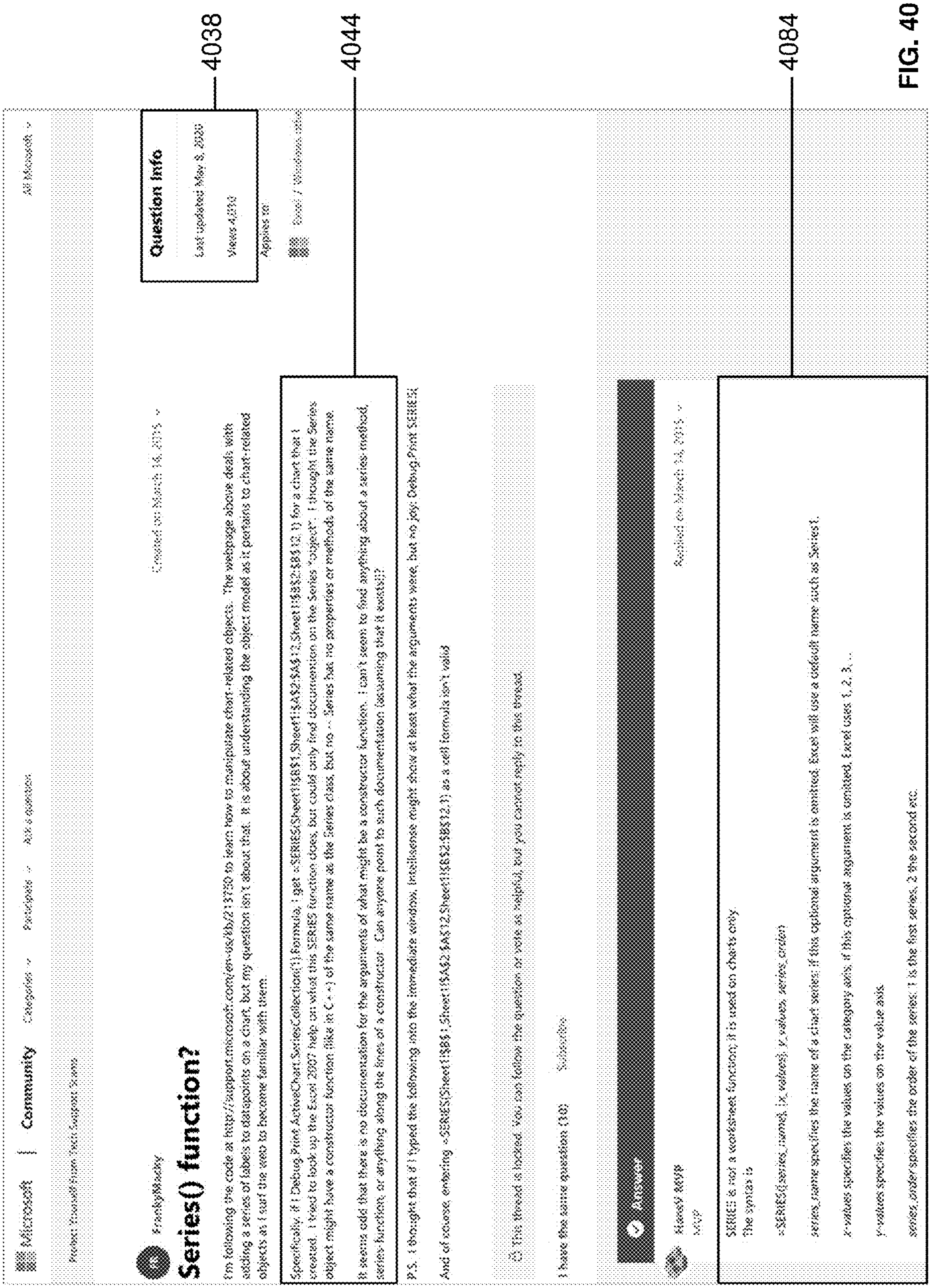

FIG. 38A begins exampling a second way users can change the order in a Microsoft Excel chart which involves many less steps but is even less intuitive to users. If users click on an element in a chart 3852 it brings up a SERIES function formula in the formula bar 3832. The user then needs to look up the syntax of that function, which is not readily available in the Microsoft Excel application help, as shown in FIG. 39A through FIG. 39D. When the user can't find it there they go to the formula builder which contains all the worksheet functions and enters 'Series' to find the syntax. Again, it is not listed as shown in FIG. 39E. So, the user resorts to a web search and does not find the syntax on the Microsoft Excel pages but in a Microsoft Community question and answer showing others have struggled 4044 as well to find the answer 4084 and Microsoft has therefore posted for over five years the answer with 410 views 4038. With the answer now known, the user changes the '4' 3833 in the SERIES formula in FIG. 38A to '1' 3837 as shown in FIG. 38B and you can see the gray bars represented by 3852 move from the top to the bottom 3875. Given the barriers to finding the knowledge, this is not a process that is simple or intuitive for an average user.

Switching now to Google Sheets, after extensive searching, no way could be found to change the order of the data in a chart other than actually changing the order of the data in the spreadsheet that feeds the chart. In settings where that data is part of other analyses or part of a report that people look at (like FIG. 3)—that is impractical and requires users to set up a separate data set simply for feeding the chart. Thus, creating a great deal of additional work each time they want to make a change. None of the other current spreadsheets were found to give users better capabilities.

Figure 41A:
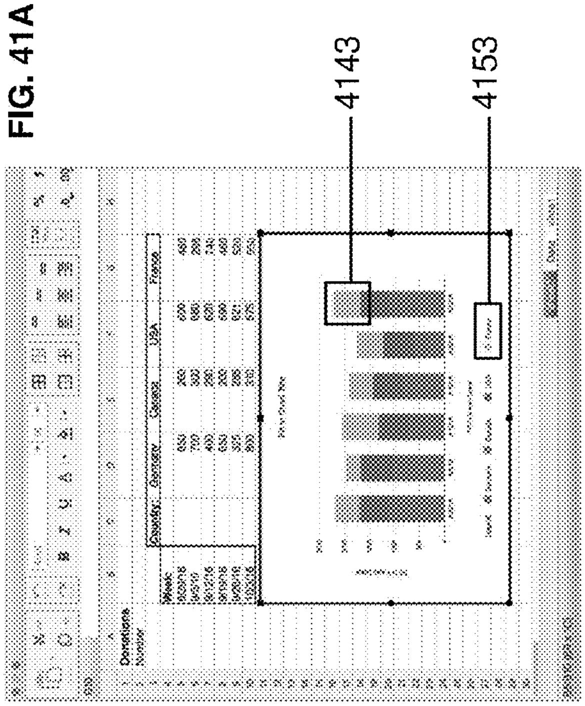
FIGS. 41A, 41B, 41C and 41D example two on-chart ways to change the order of the data in a stacked column chart in our technology.
Figure 41B:
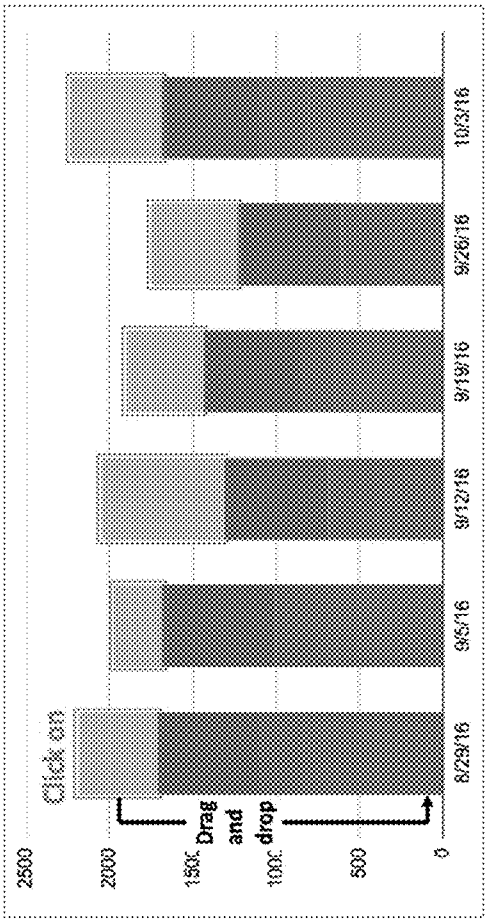
Figure 41C:
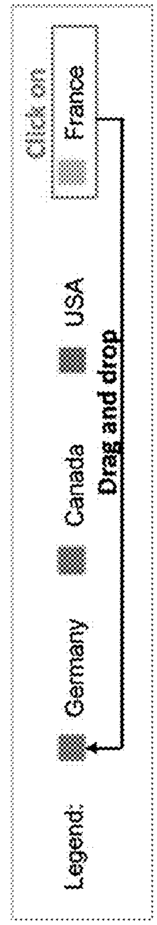
Figure 41D:
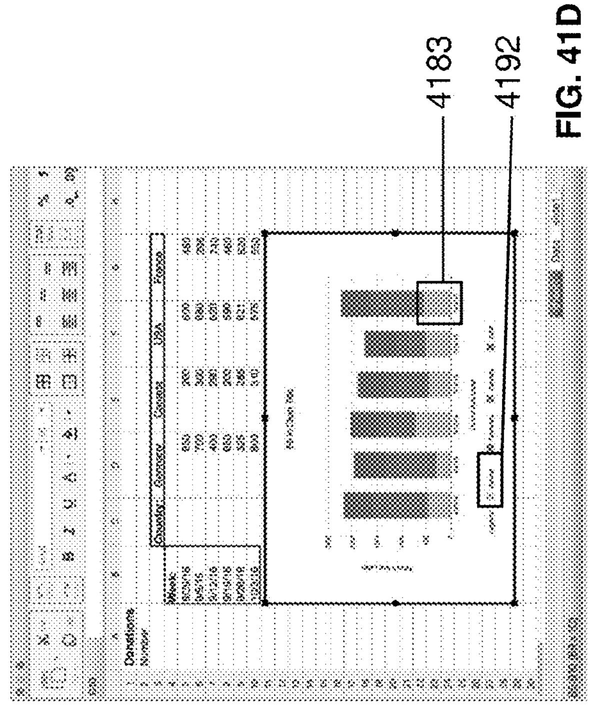

Our technology seeks to make it extremely easy for users to change their charts without having to touch the underlying data. FIG. 41A through FIG. 41D example two ways for users of our technology to change the order of data in a chart with stacked columns. The user wants to move the yellow elements represented by 4143 from being on top to being on the bottom 4183 and correspondingly move the yellow positions 4153 to 4192 in the legend. The first exampled mode is dragging and dropping one of the stacked elements from the top to the bottom position as shown in FIG. 41B. The second mode of doing it is to drag the legend element to be moved to the position the user would like as shown in FIG. 41C. Either of those actions would change the other and make the set of changes shown in FIG. 41D relative to those in FIG. 41A.

Figure 42A:
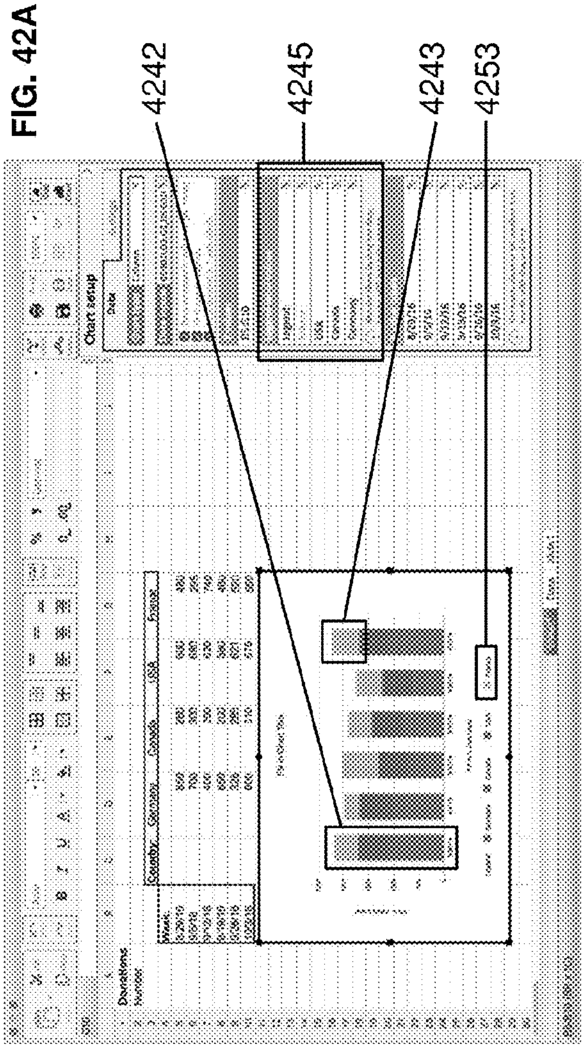
FIGS. 42A, 42B, 42C and 42D examples one sidebar way to change the order of the data in a stacked column chart in our technology.
Figure 42B:
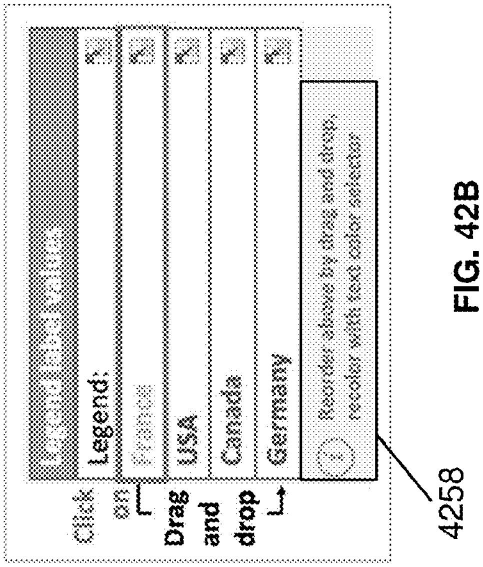

FIG. 42A through FIG. 42D examples how those same chart changes could be achieved using a sidebar equivalent drag and drop. In this embodiment one of the advantages of our sidebar technology is that when order and color matters, it is ordered and colored like the chart. That is reflected in the order and color of the 'France', 'USA', 'Canada', and 'Germany' Legend label values in the sidebar 4245 (better seen in the blow up in FIG. 42B) and the stacked elements in the column 4242. Putting the Legend label values in the same order and coloring them the same as in the chart makes it visually much easier for users to drag and drop the sidebar labels, as shown in FIG. 42B giving the sidebar result shown in FIG. 42C with the total result shown in FIG. 42D. The yellow stacked elements have moved from top 4243 to the bottom 4283 in the chart and also in the sidebars 4245 (blown up in FIG. 42B) and sidebars 4275 (blown up in FIG. 42C) and moved positions 4253 to 4292 in the Legend. All done with one simple drag and drop, and the user made aware of this capability through instructions like the 'Reorder above by drag and drop' 4258 and/or a temporary popping up instruction similar to 3114 in FIG. 31 which would let the user know of the drag and drop reordering capability.

Figure 43A:
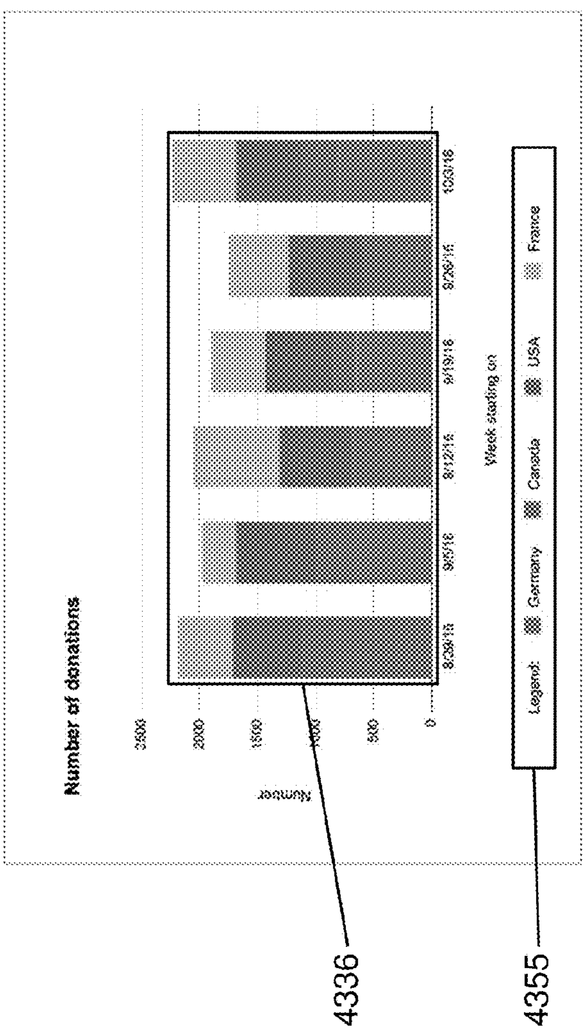
FIG. 43A and FIG. 43B example in our technology how users can move around the content to the locations of their choice.
Figure 43B:
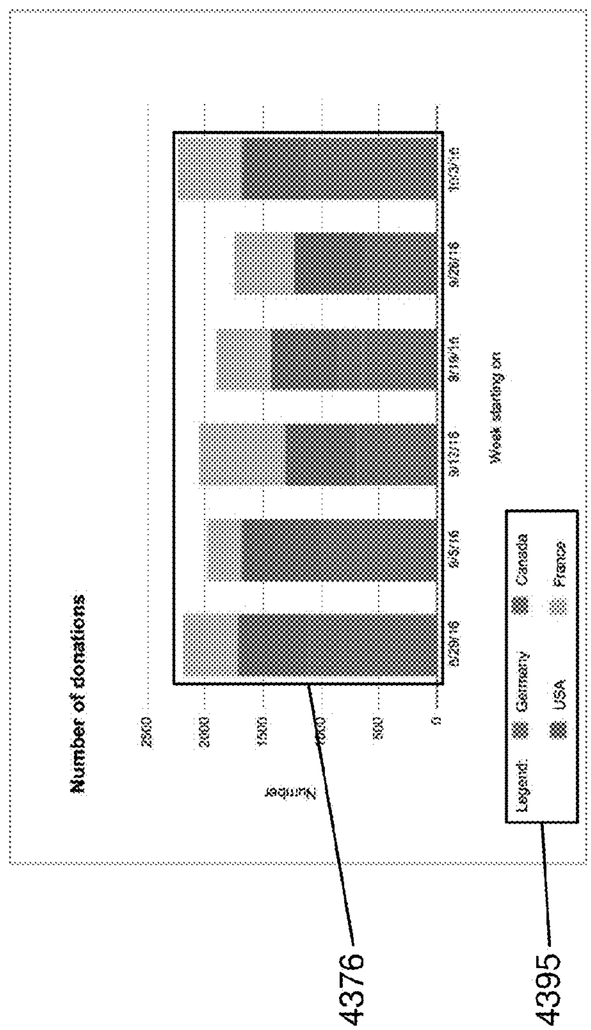
Figure 44A:
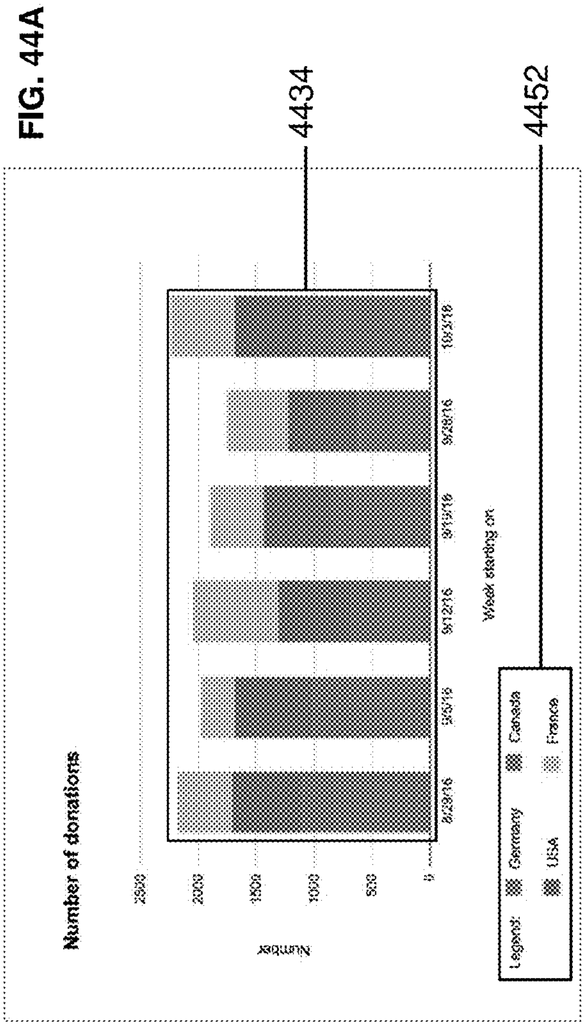
FIGS. 44A, 44B, 44C and 44D example how the moved content retains their ordering and reordering relationships FIGS. 45A, 45B, 45C and 45D example drag and drop data reordering for the X axis data.
Figure 44B:
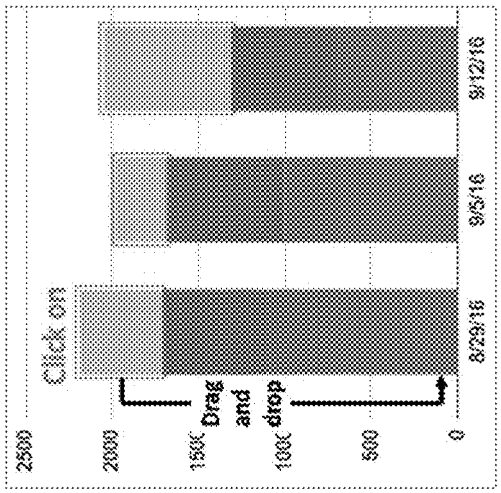
Figure 44C:
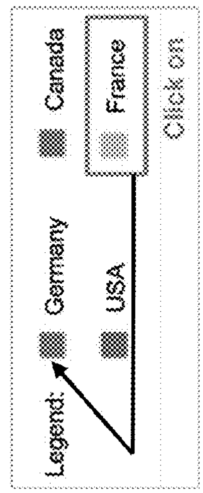
Figure 44D:
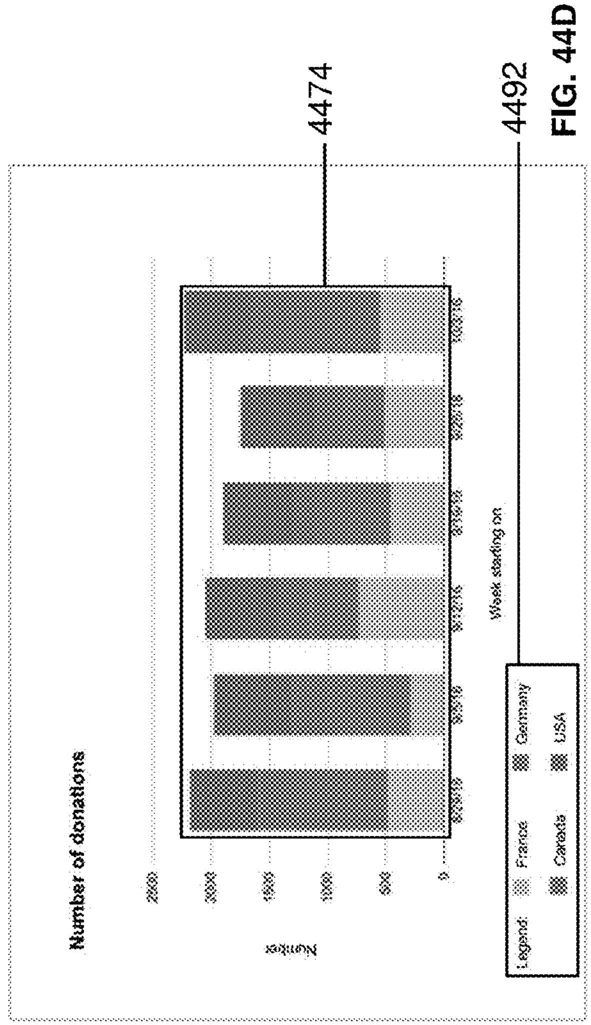

FIG. 43A and FIG. 43B example in our technology how users can move around the content to the locations of their choice. Here the user has decided to reconfigure the 'Legend' moving its five elements 4355 to a different location with a more-square setup 4395. Because the user has not swapped any of the legend locations this has had no impact on the chart which looks the same in both situations (4336 and 4376). However, our technology retains the relationships of the legend as FIG. 44A through FIG. 44D example, if the user then drags and drops the yellow element on the chart from the top to the bottom as shown in FIG. 44B they get the outcome shown in FIG. 44D where the chart elements have shifted positions (4474 versus 4434) and the order in the Legend has shifted (4492 versus 4452) with 'France' taking the position of 'Germany', 'Germany' taking the position of 'Canada', 'Canada taking the position of 'USA' and 'USA' taking the position vacated by 'France'. Alternatively had the user used the legend value 'France' to do the drag and drop, as shown in FIG. 44C, they would have ended up with the same result shown in FIG. 44D. Our technology remembers the relative relationships regardless of where you move the elements and then appropriately shifts values with drag and drop moves. Had an embodiment with a sidebar been used the changes would propagate to the sidebar as well as changes made in the sidebar would propagate appropriately to the Legend.

Figure 45A:
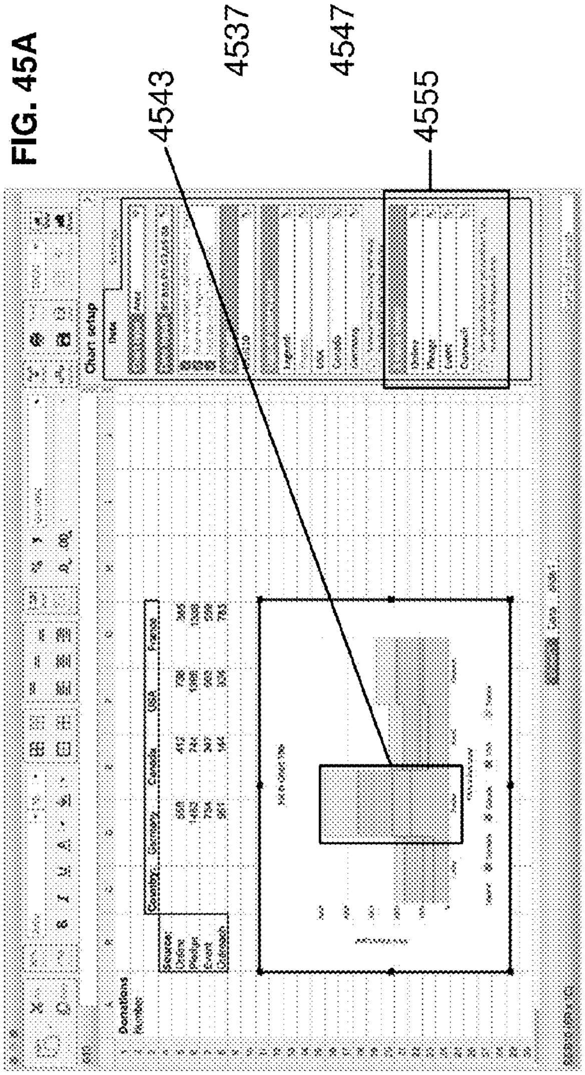
Figure 45B:
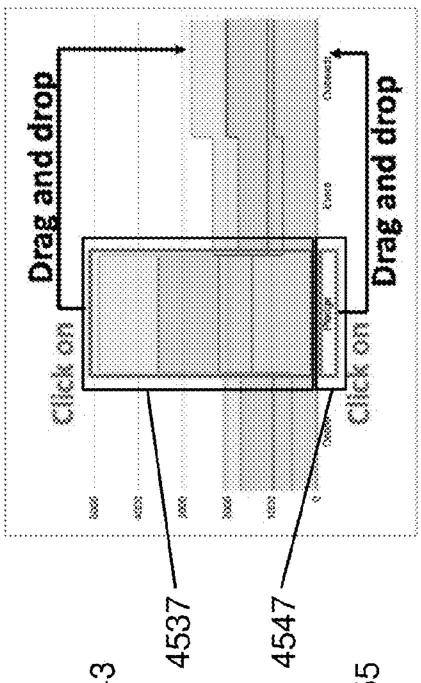
Figure 45C:
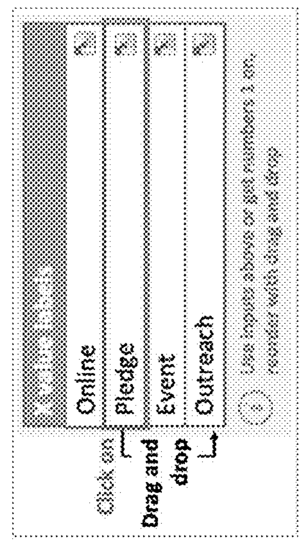
Figure 45D:
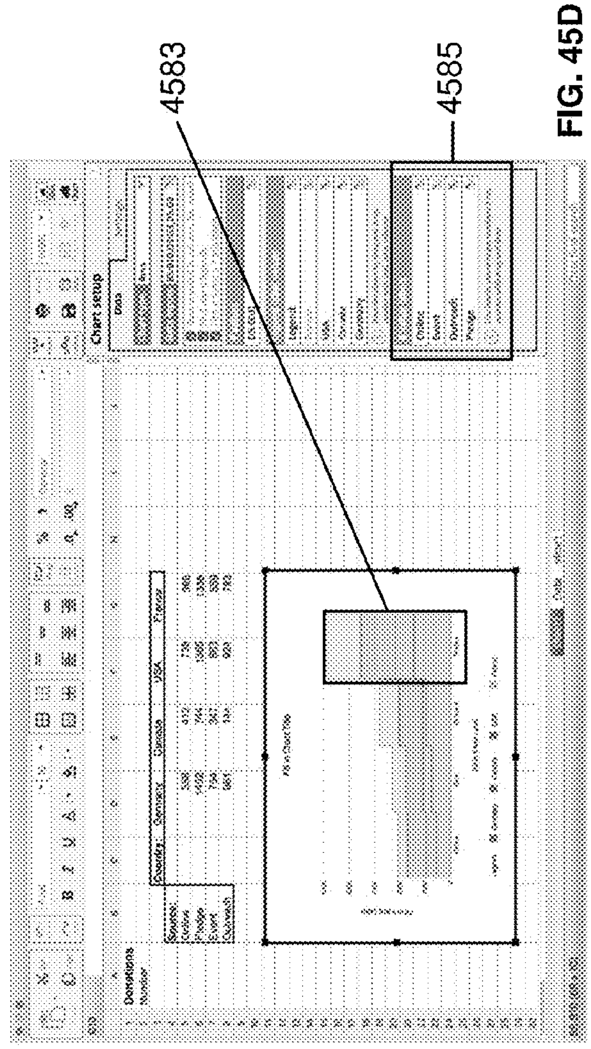

In our technology, the reordering drag and drop capability also works for any other axis. FIG. 45A through FIG. 45D example drag and drop data reordering for the X axis data. The user drags the second stacked element and/or X axis label 'Pledge' 4543 as shown in the blow-up FIG. 45B from second to the last position with the result shown in FIG. 45D 4583. In this embodiment they could do that by clicking on the section of the chart element 4537 and dragging and dropping it at the last position in the chart as indicated by the arrow and shown in 4538. They could also click the X axis label 'Pledge' 4547 and drag and drop it at the last position in the chart as indicated by its arrow to arrive at the position 4583. Clicking and dragging and dropping either the section of chart element or it associated X axis label will reposition the other as well and it will reposition the proxy in sidebar 4585 (Pledge moved from the second position from the top in 4555 to the bottom position in 4585). The user could also click both the section of chart element 4537 and its associate X axis label 'Pledge' 4547 and drag and drop both of them to the desired location. FIG. 45C examples an additional way of achieving the same outcome on this embodiment by dragging and dropping the X value label 'Pledge' in the sidebar 4555 which then moves the on-chart X axis label and the section of stacked elements as shown in 4583. This allows users to regroup the data very easily on any dimension or dimensions they would like without having to resort to ribbons, drop-downs, pop-ups or obscure function syntax and it allows user to regroup on multiple dimensions which cannot be done in any of the current spreadsheet charts with resorting to data changing.

Figure 46:
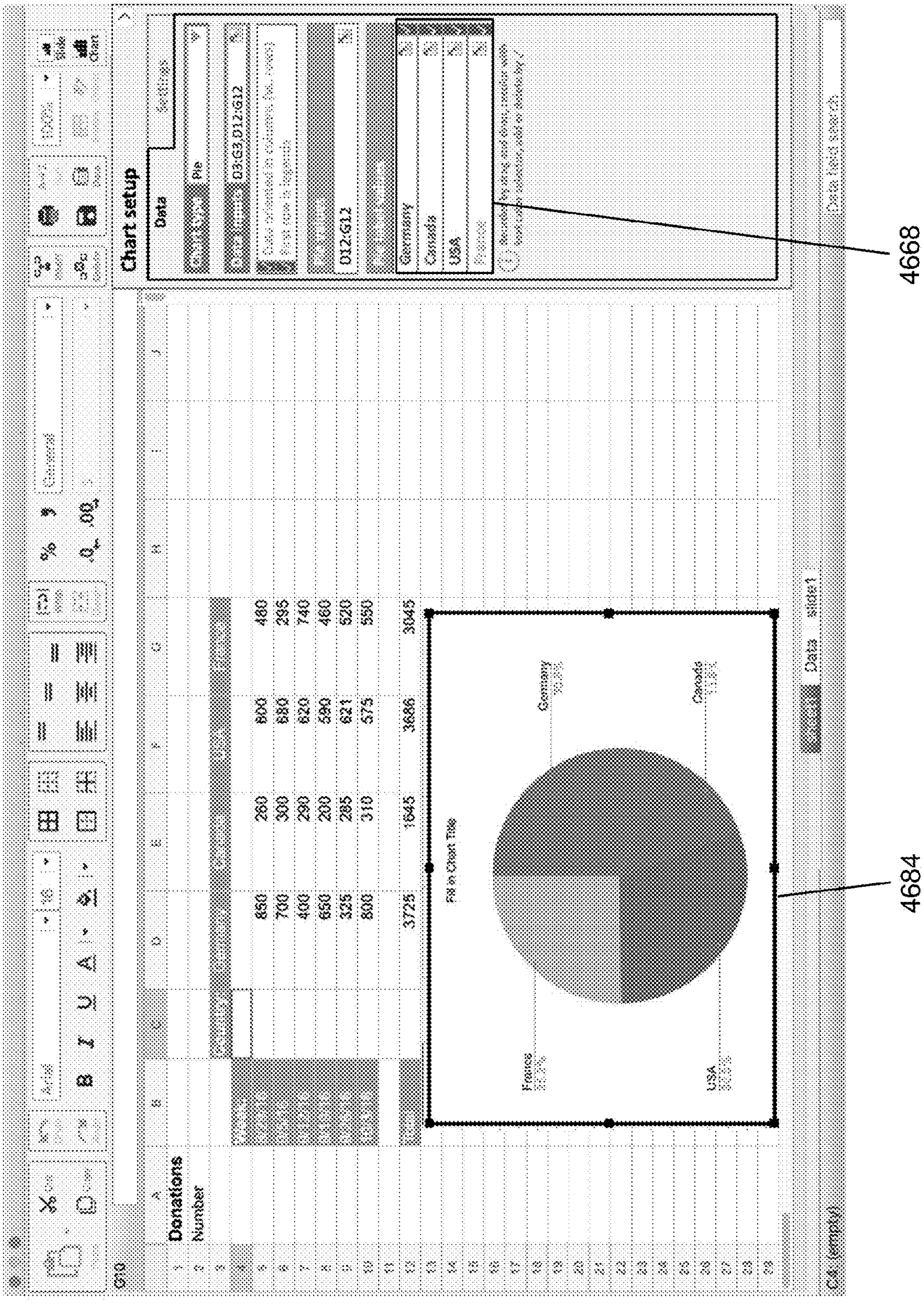
FIG. 46 examples the meaning of order and reordering in a Pie chart.

The previously described technologies work across different chart types although in some instances with slightly different orientations. FIG. 46 examples how in an embodiment order can mean different things for different types of charts. For a Pie chart the order starts at 12:00 and goes clockwise, so blue is the first slice, green is the second and that is how it is reflected in the chart 4684 and the sidebar 4668. The drag and drop changes done in either of the chart or the sidebar will be reflected in the other.

Figure 47:
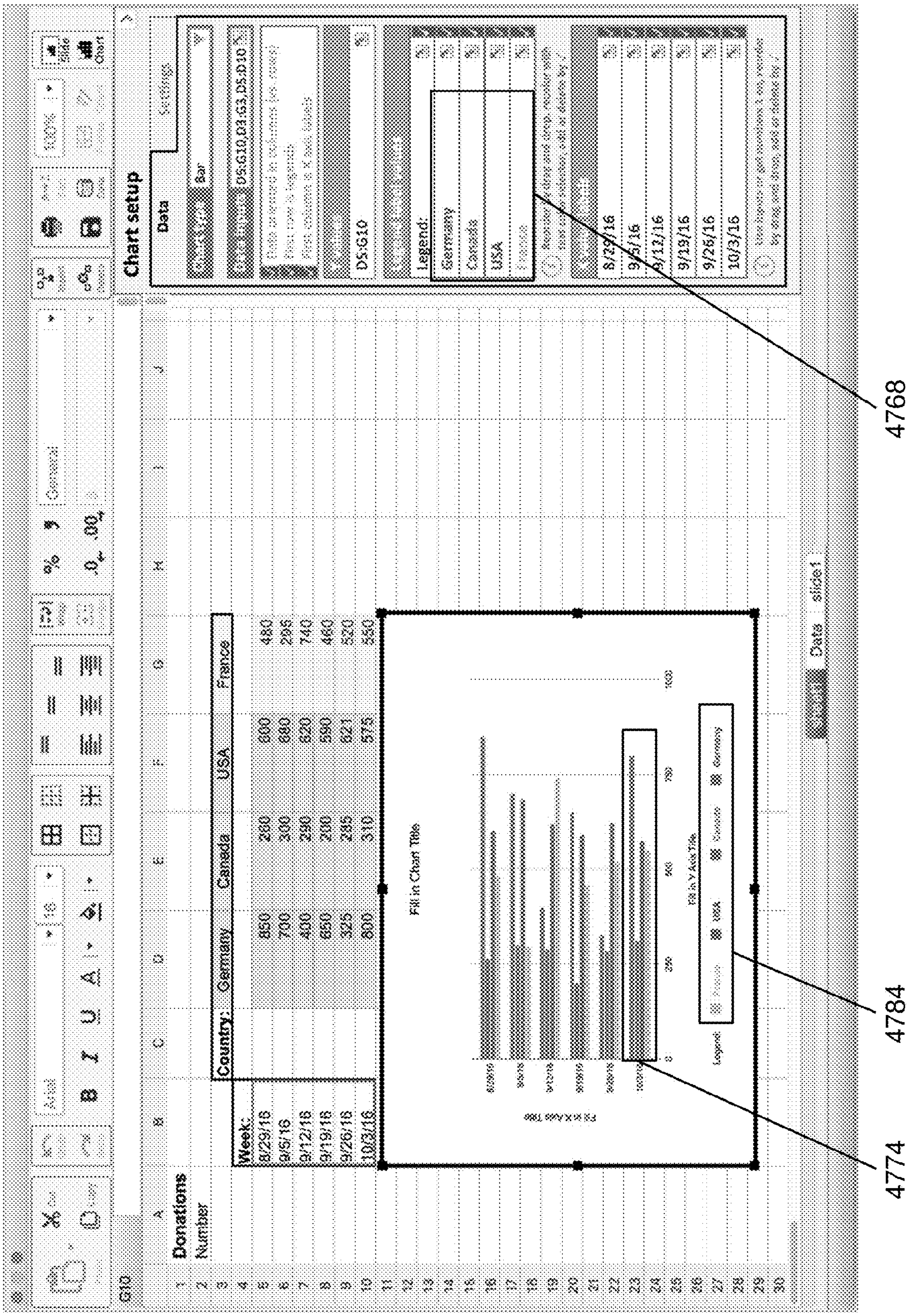
FIG. 47 examples the color ordering in the chart values and the legend labeling proxies for a Bar chart.

FIG. 47 examples the color ordering in the chart values and the legend labeling proxies for a Bar chart. The chart values go from bottom to top 4774 'Yellow, Red, Green then Blue' in the figure, but could go from top to bottom. This same order from bottom to top is replicated in the sidebar labeling proxy 4768. In the on-chart lower legend the order goes left to right in the labeling proxy 4784 'Yellow, Red, Green then Blue' to best mirror the order on the chart starting on the left with the color on the chart nearest to the legend and ending on the right with the color farthest from the legend.

Figure 48A:
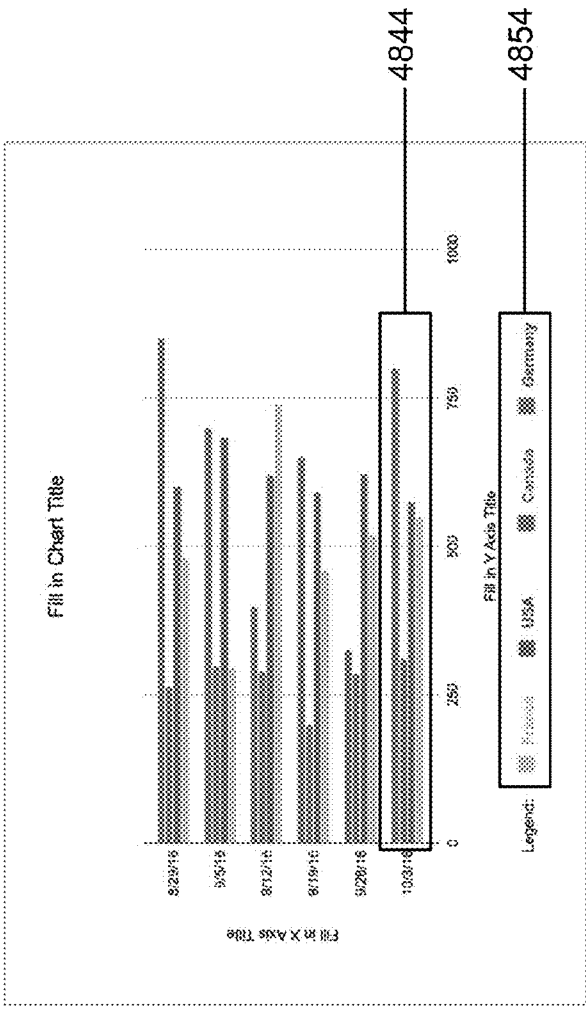
FIG. 48A and FIG. 48B example how our technology automatically alters the legend value order if a different legend location is selected.
Figure 48B:
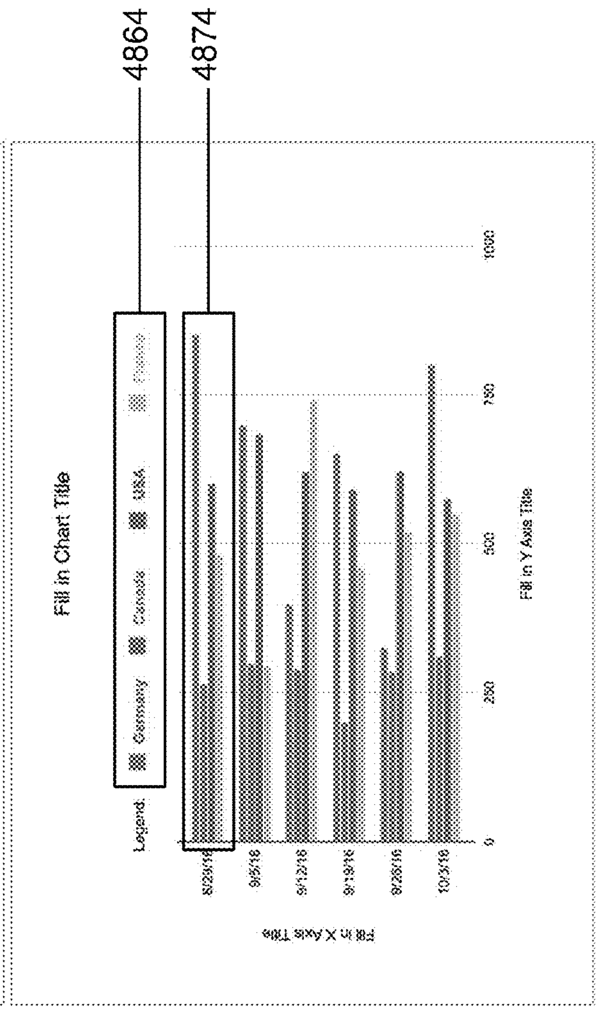

FIG. 48A and FIG. 48B example how our technology automatically alters the legend value order if a different legend location is selected. FIG. 48A has the lower legend positioning with the legend color and value ordering 4854 going 'Yellow, Red, Green then Blue' to best mirror the on-chart bottom to top same order 4844. However, when the legend location is set to the top of the chart the legend order reverses to 'Blue, Green, Red then Yellow' 4864 to now match the closest to the farthest order on the chart from top to bottom 4874.

Figure 49A:
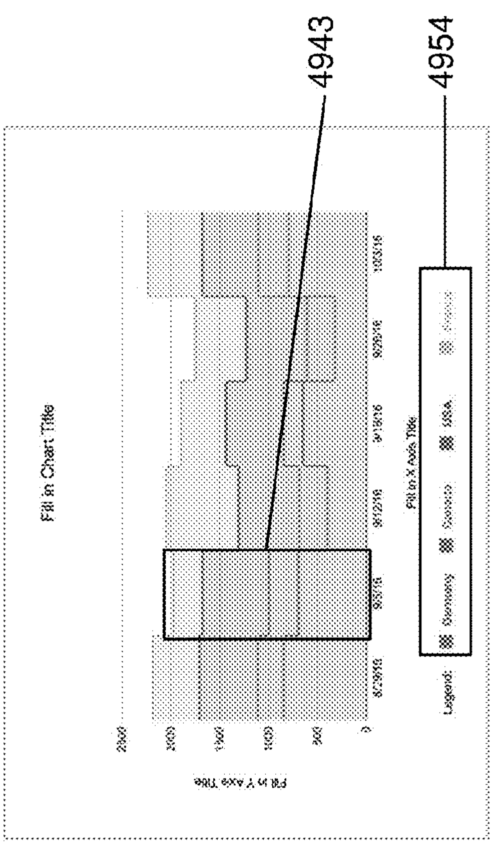
FIGS. 49A, 49B, 49C and 49D example different on-chart legend labelling proxies for a stacked area chart.
Figure 49B:
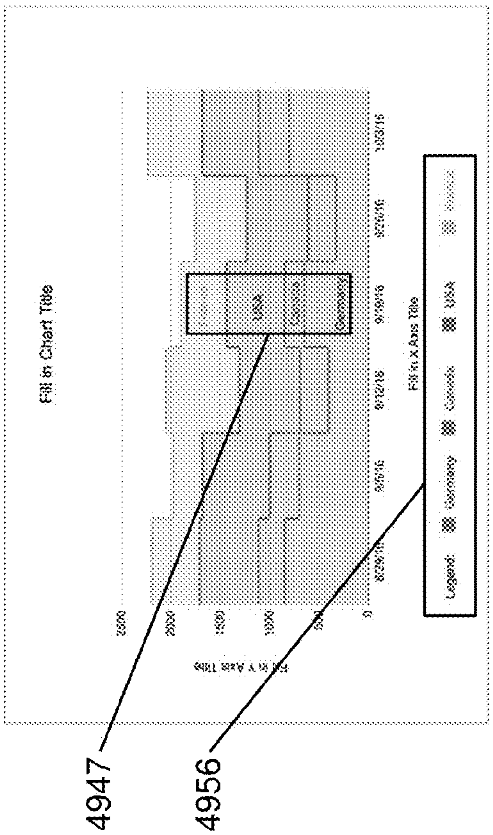
Figure 49C:
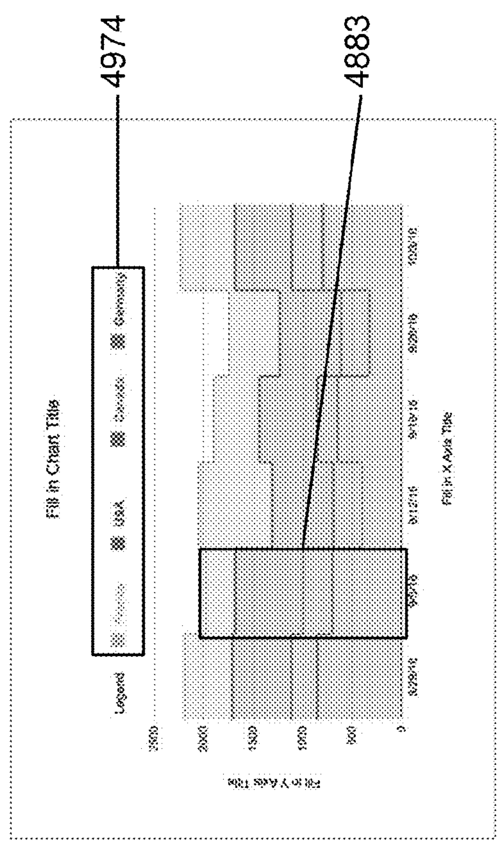
Figure 49D:
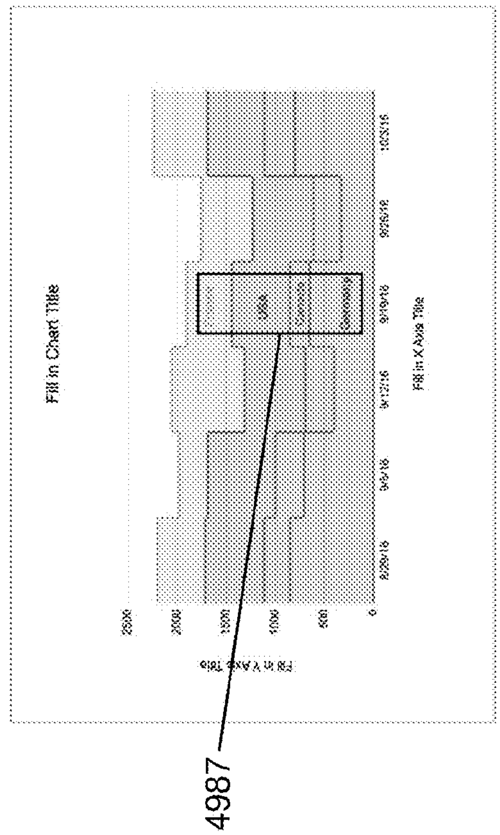

FIG. 49A through FIG. 49D example different on-chart legend labelling proxies for a stacked area chart. The label ordering and/or color controls in these proxies can be presented in a sidebar, pop-up, dropdown or other visual element. FIG. 49A and FIG. 49C example the automatic altering of the legend value orders as exampled in FIG. 48A and FIG. 48B. FIG. 49B examples an additional variant of the legend labeling proxy which is the within chart elements labeling 4947 which in this example is combined with the legend layout 4956. FIG. 49C examples where the within chart elements labeling 4987 replaces the legend layout as options can be mixed and matched.

Figure 50:
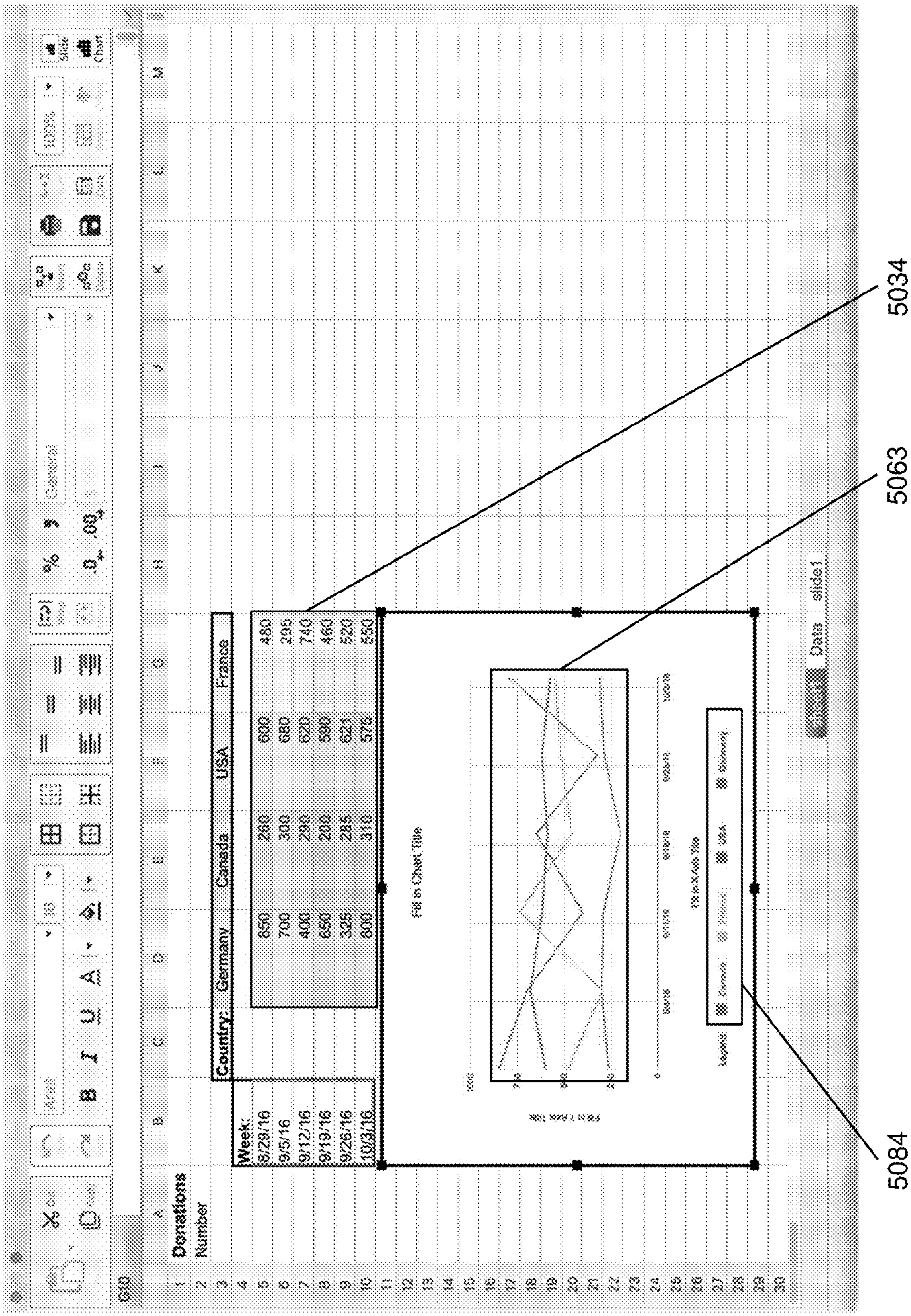
FIG. 50 examples our computing and using the average values of data in Line charts to order the legend labeling proxy.

FIG. 50 examples an embodiment of our technology where computing and using the average values of data in Line charts orders the legend labeling proxy. This approach applies to other chart types like the scatter chart where there is no chart specified order in the chart values display layout. Our technology computes the average value of the data used in the chart 5034 to arrive at an order from the lowest average value 'Canada' to the highest average value 'Germany'. Then because the legend 5084 is below the data display 5063, the legend is ordered from lowest to highest value as shown in 5084.

Figure 51A:
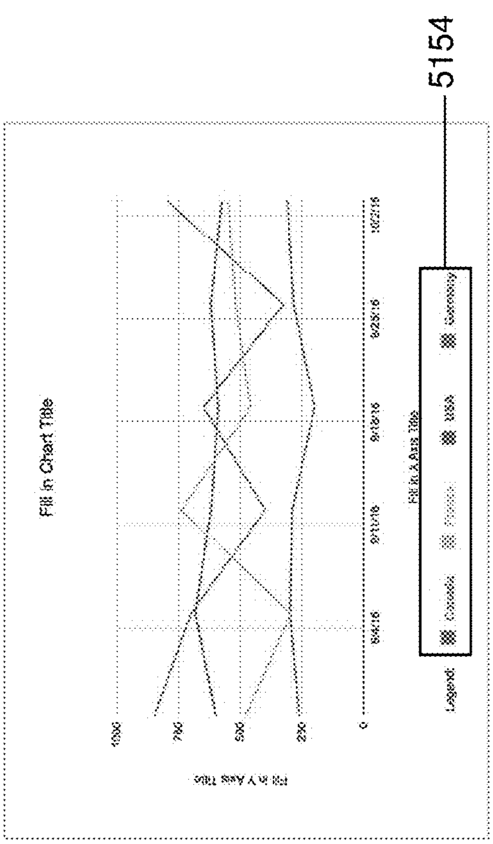
FIGS. 51A, 51B, 51C and 51D example how the legend changes if it is above the data display using the average value ordering approach.
Figure 51B:
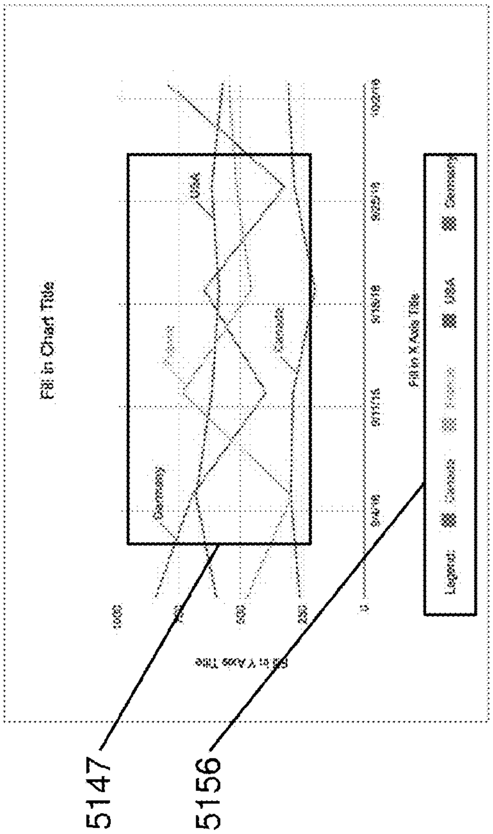
Figure 51C:
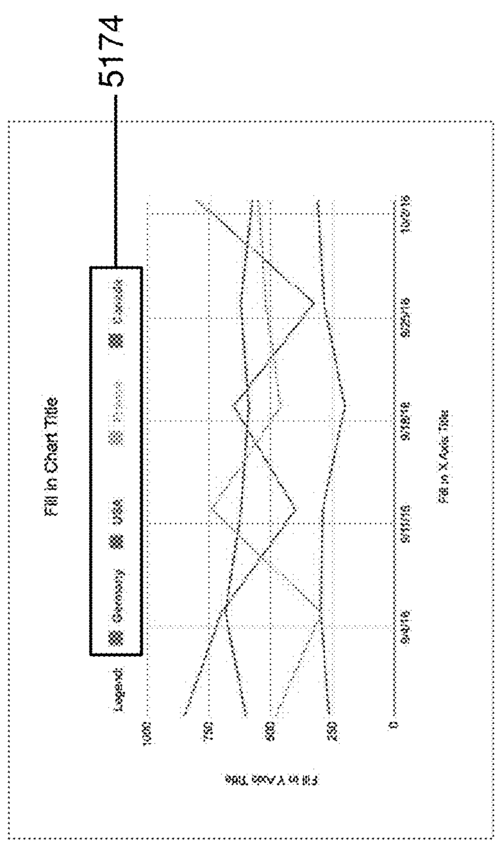
Figure 51D:
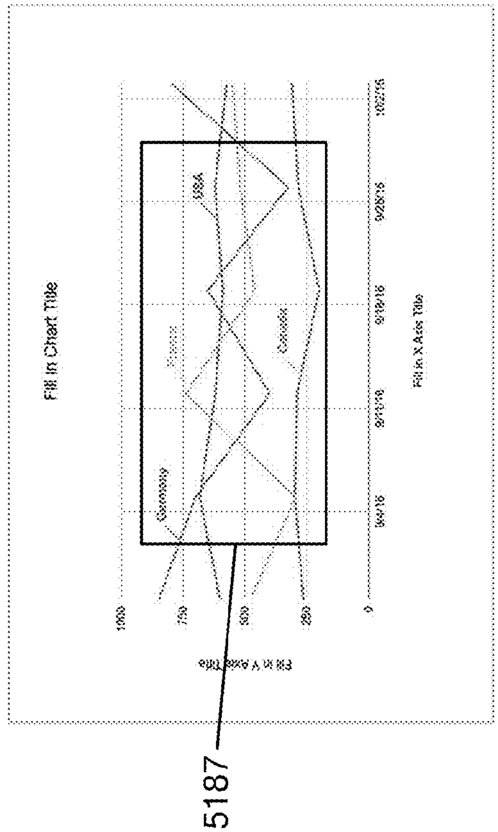
Figure 52:
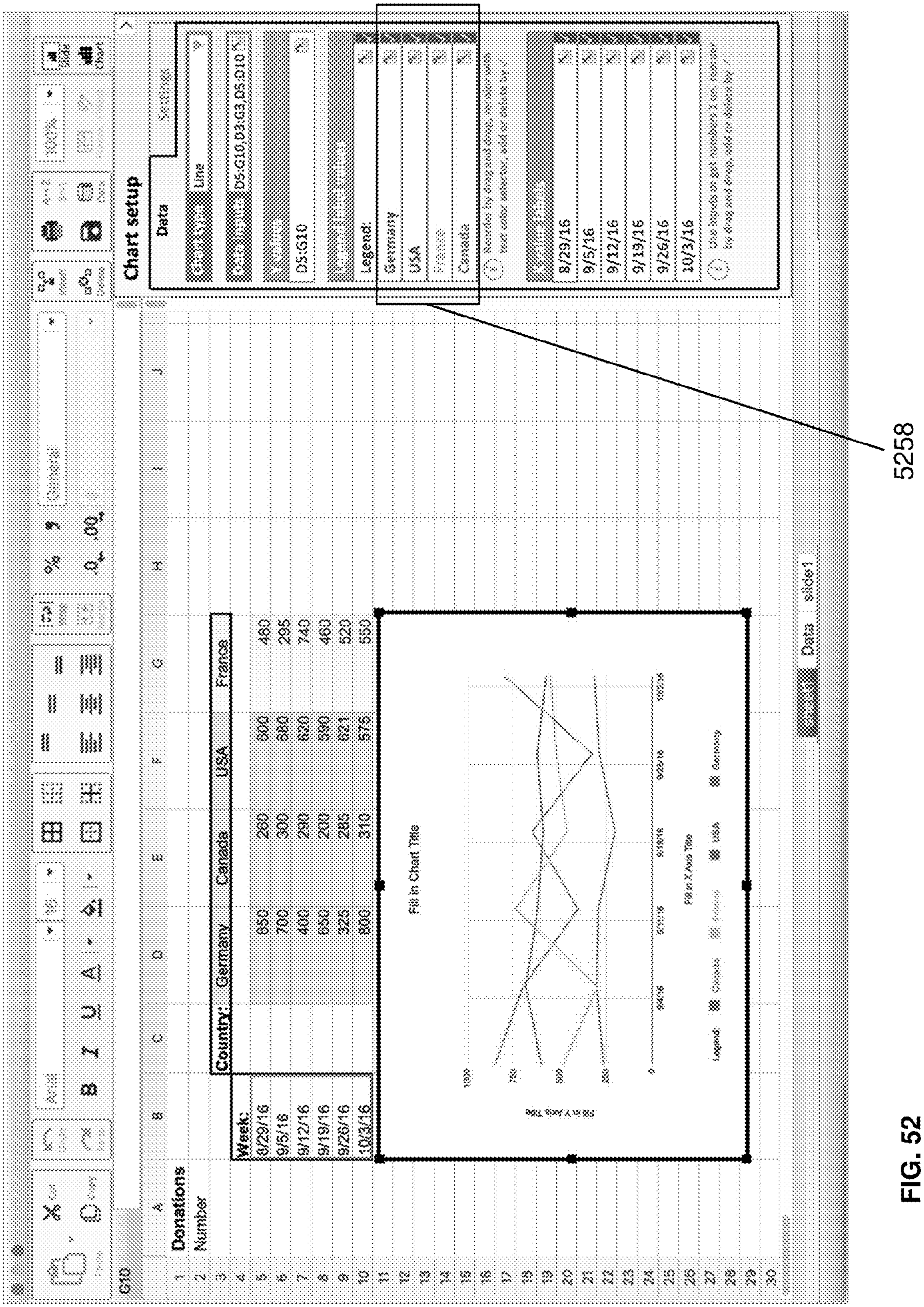
FIG. 52 examples the labeling proxy for the legend within a sidebar using the average value ordering approach.

FIG. 51A and FIG. 51C example how the legend changes if it is above the data display using the average value approach. It follows the mode previously described, using the average computed values to determine which values are farthest from the legend positioning. So, in this example the legend switches from 5154 to 5174 when the legend is moved above the data display. On chart legend labels 5147 are also very effective for Line charts as shown in FIG. 51B with the legend 5156 or in FIG. 51B 5187 without the legend. This computed average value is also applied by our technology to the order of the legend labeling proxies in a sidebar 5258 as shown in FIG. 52.

The calculated value (e.g., average value method used in the previous example) method of ordering the chart content can also be an optional mechanism for users to order the chart content. FIG. 89 through FIG. 92C examples using a user optional calculated total (or average which yields the same order outcome) ordering of the chart body and its associated labels to achieve a different order without having to alter the underlying data or manually move the content. The user starts with the stacked area chart shown in FIG. 49A with the setup in our technology shown in FIG. 89. The chart elements (chart body) Y axis order has been populated in order of the first column blue to last column yellow 8944 transposed to bottom to top in the chart body as shown in the blue to yellow order in 8965. The right to left ordering of the legend data source 8934 is then maintained in the bottom positioned chart legend 8984. The bottom to top data orientation of the chart body 8965 is then matched in the bottom to top legend label values 8968. The top to bottom orientation of the X data values 8942 is then translated into the right to left ordering of those dates in the chart body 8974 and its associated X axis labels 8974. While the top to bottom orientation is retained in the sidebar X axis label proxies 8988. These are the same default settings that created FIG. 49A however the user has the opportunity to optionally change that order using calculated value automatic ordering through selectors for each axis shown for totals in the selection boxes 8948 and 8978.

Figure 85:
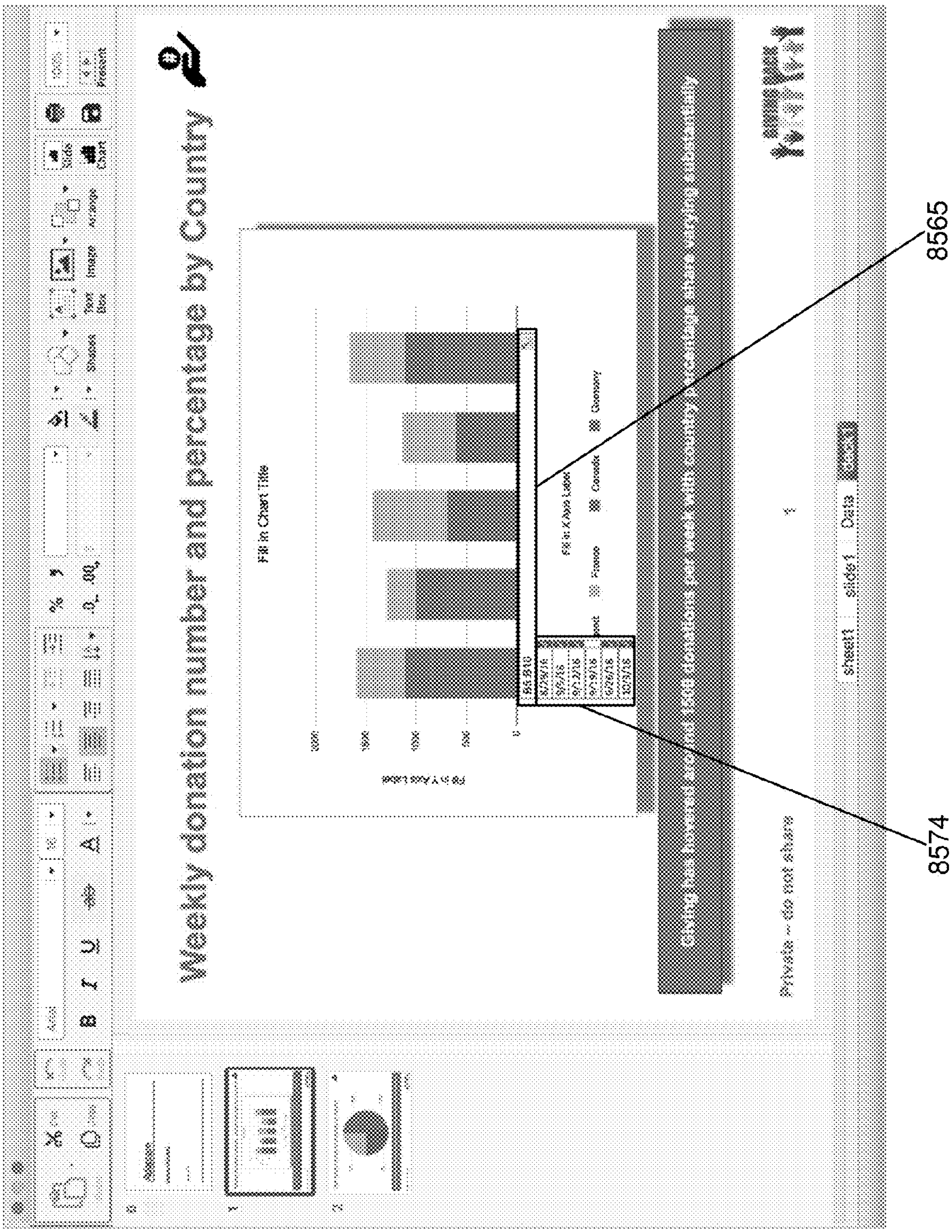
FIG. 85 examples a two click add back of an X axis value and the related Y values on-chart
Figure 90:
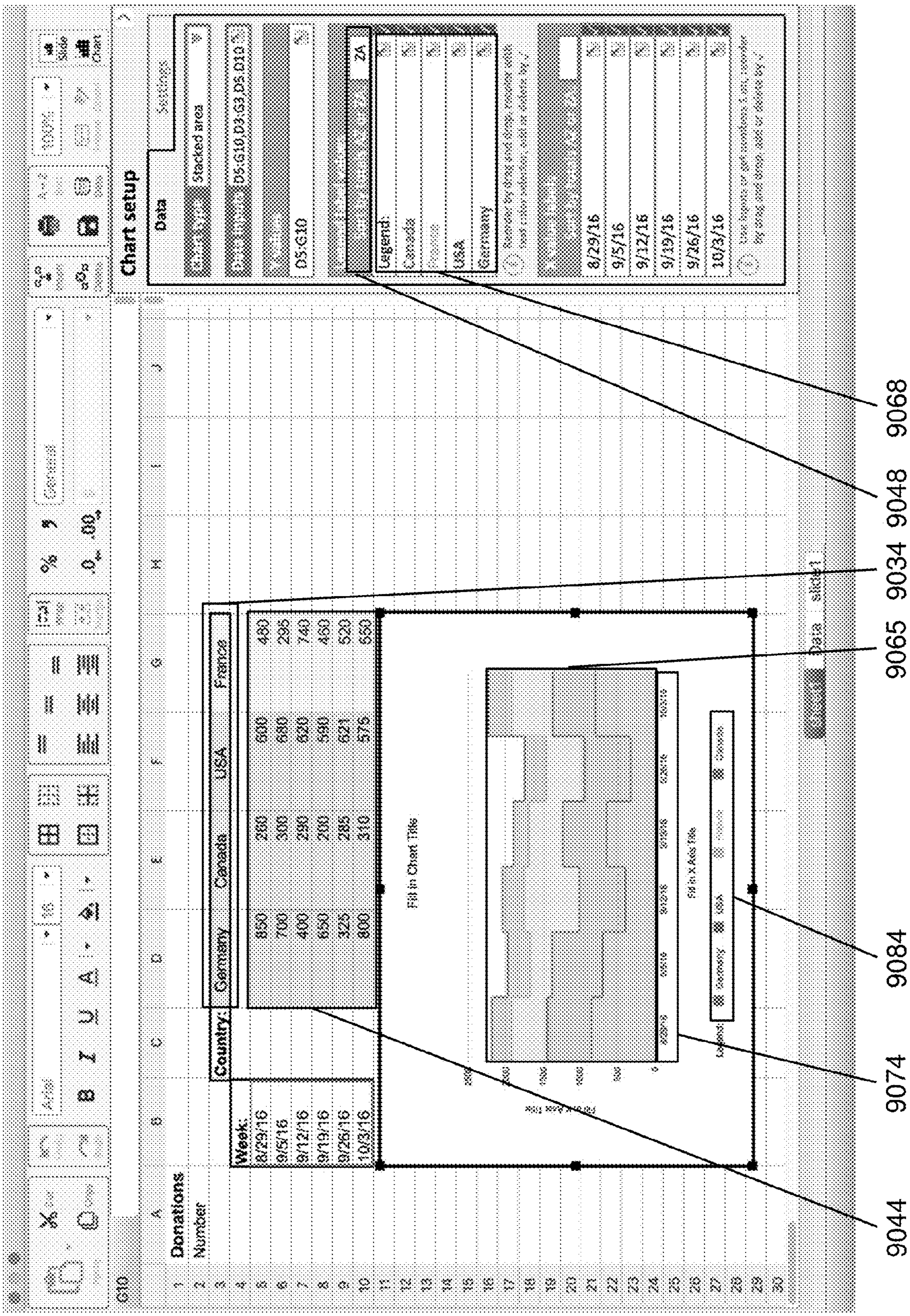
Figure 91:
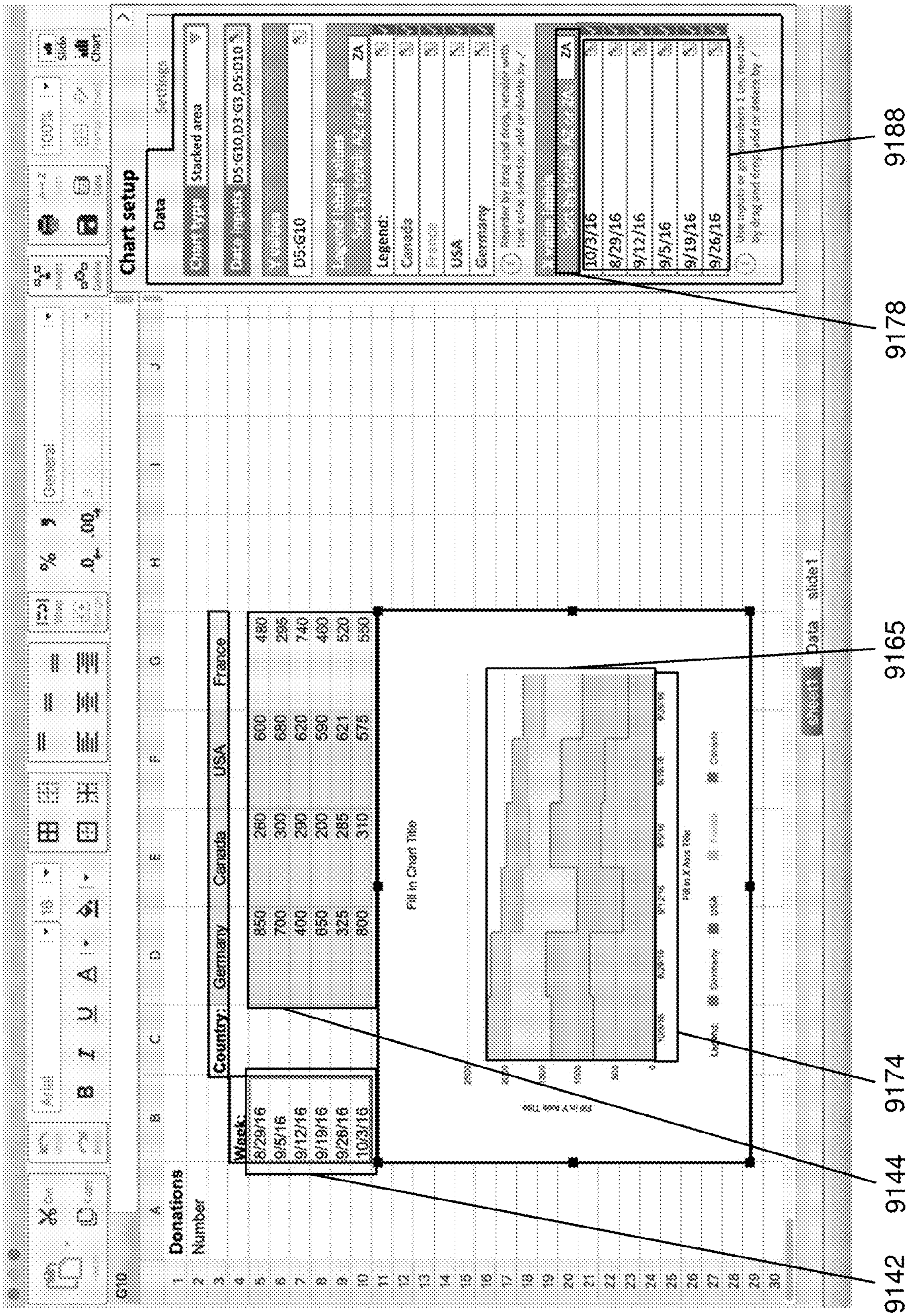

FIG. 90 examples the user triggering that automated resorting of the chart results for the legend/Y axis values. The user in their 'Sort by totals AZ or ZA' input of 'ZA' 9048 got an automated resort of the chart body content from bottom to top ordering the country with the most donations on the bottom to those with the least on top 9065. In the process automatically also changing the order in the associated chart legends 9084 and their sidebar proxies 9068 while not changing the order of the spreadsheet source data 9034 and 9044. The user then decides they would like to order their days from the best day to the worst day so in FIG. 91 they type 'ZA' in the 'Sorts by totals AZ or ZA' selector 9178. This automatically reorders the chart body data 9165 from the highest total on the left to the lowest on the right and automatically changes the associated X axis labels 9174 and their associated sidebar X label proxies 9188. Doing all of this without altering the source data 9142 and 9144. The controls for the sorts are exampled here in a sidebar but could as easily have been in a version of an on-chart control, such as the one example in FIG. 85, or in a pop-up panel.

Figure 92B:
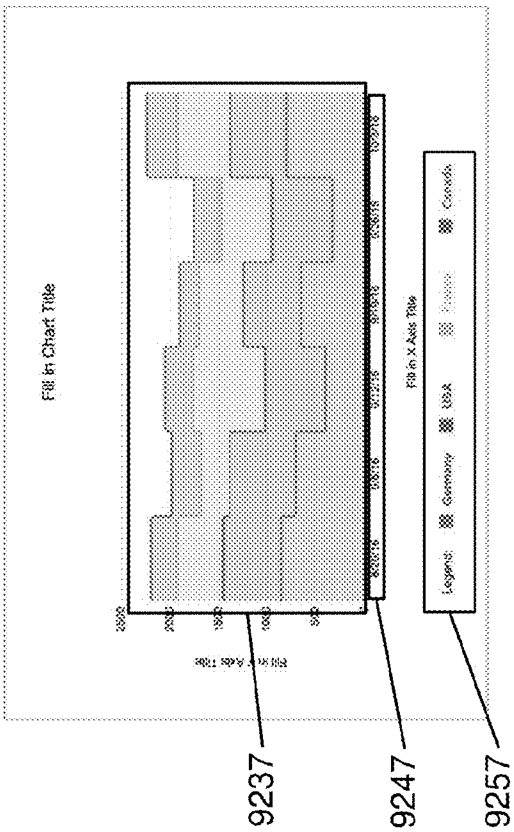
Figure 92C:
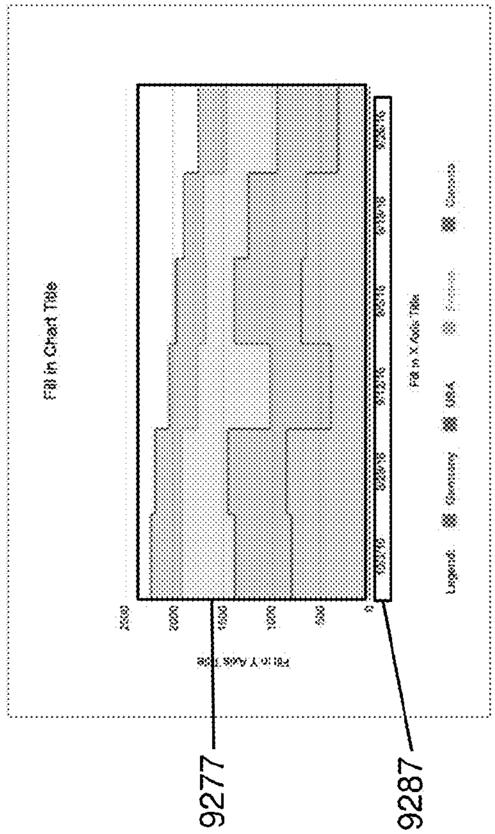
Figure 92A:
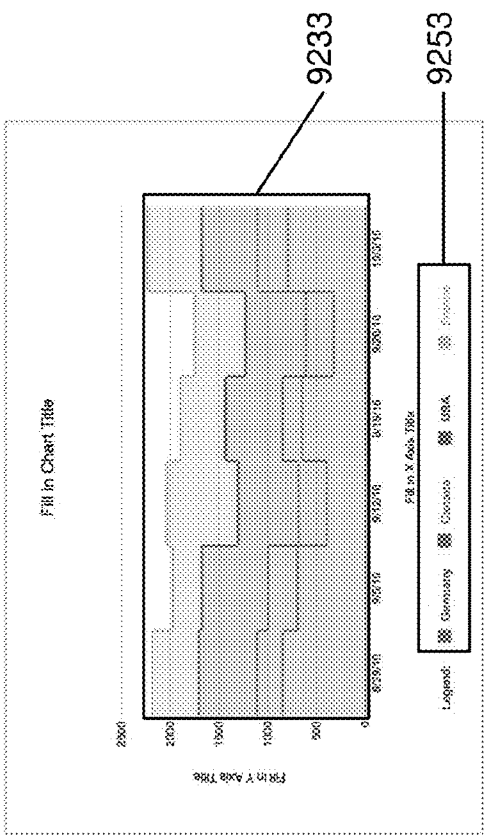

FIG. 92A through FIG. 92C more easily shows the side-by-side impacts of the automated sorts. Showing how the first selection changes the order of the countries in the chart body from blue-green-red-yellow 9233 to blue-red-yellow-green 9237 while making the comparable changes in the respective legends 9253 and 9257. Selecting the second automated sort changes the date sorted X axis order 9247 and chart body 9237 to one from the highest total stack value to the lowest in the chart body 9277 and the associated X axis labels 9287. The end result is that our automated calculation-based ordering saves users a great deal of work calculating values and then manually reordering based on those calculations. It also user to very quickly make those changes without manual work.

Figure 53:
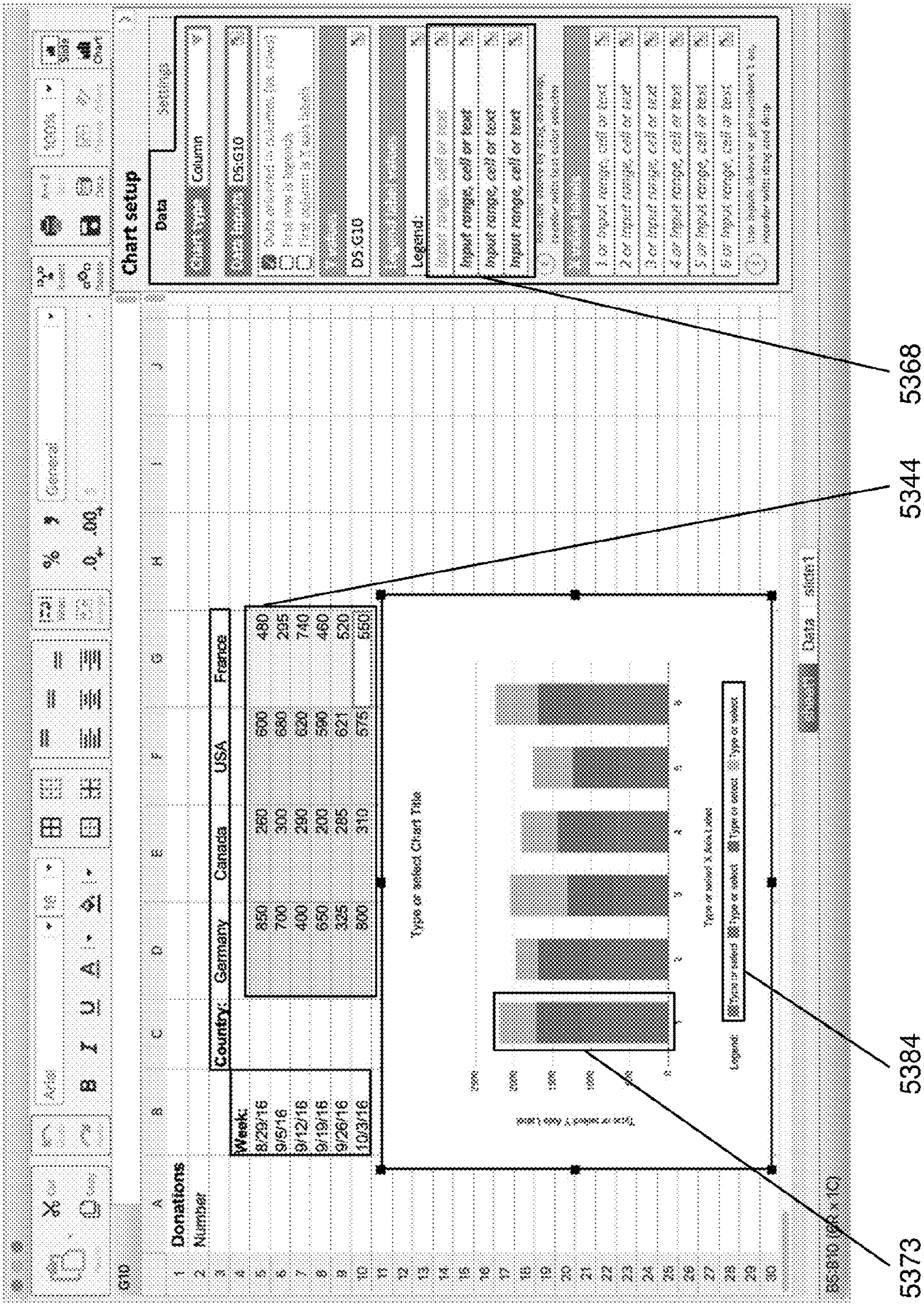
FIG. 53 examples where the colors used on the chart are extended to the spreadsheet data that supplied the values and the sidebar Legend label values.
Figure 54:
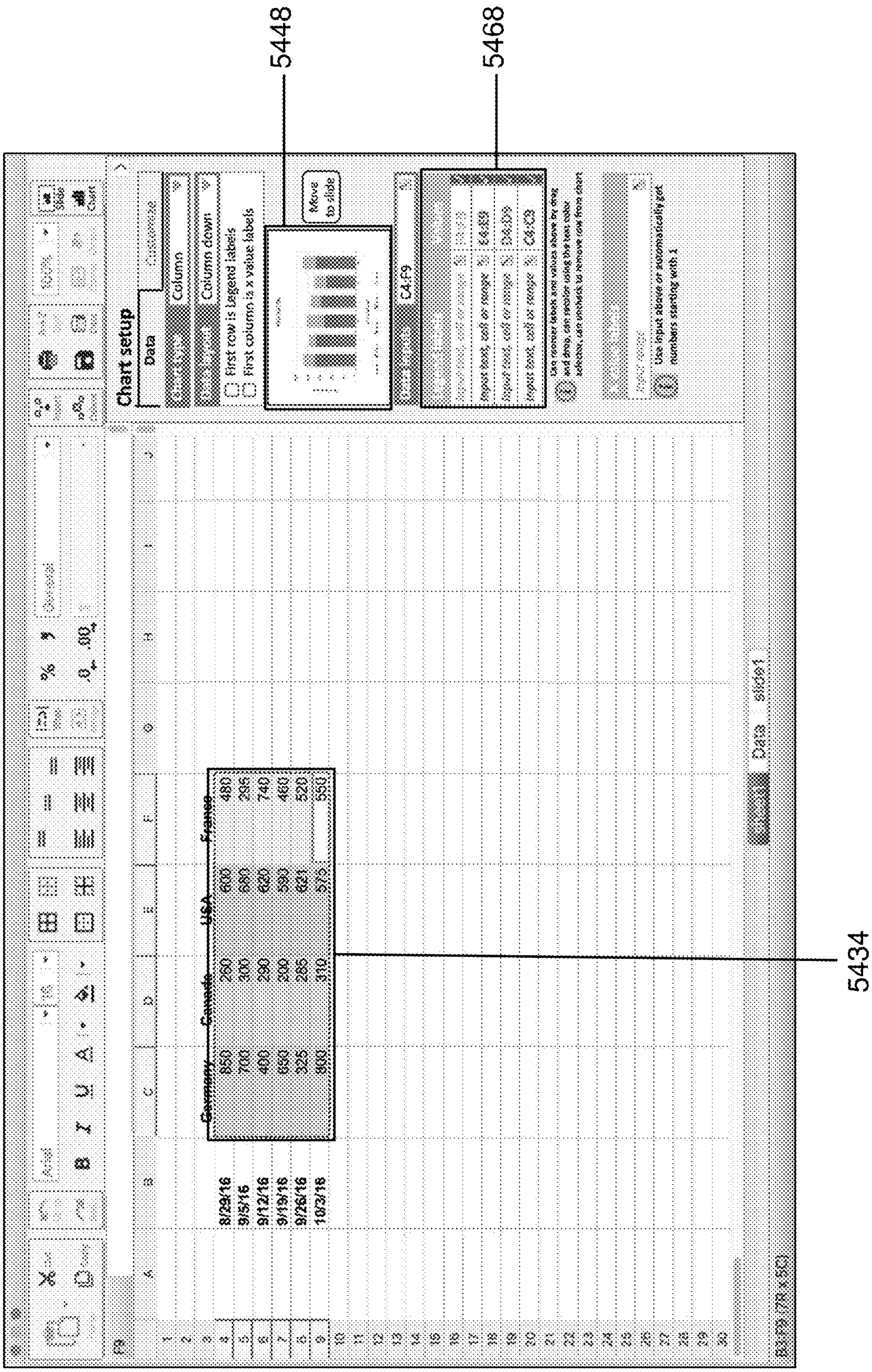
FIG. 54 examples extending the colors to the value ranges in a sidebar and pairing those values and their legends side by side.

As previously discussed, the labeling proxy color matching capabilities can be further expanded to help users not make mistakes entering their data. One of the existing spreadsheets uses data cell color backgrounds and outlining for the Y, X and Legend data range inputs into charts, but does not use color across the legend and the values they are linked with. FIG. 53 examples an embodiment of our technology, where in this example the colors applied to the Y value elements, e.g., the blue, green, red and yellow 5373 are not only applied to the Legend inputs 5384 and the cell ranges 5344 but also extended to the sidebar proxies for the legend 5368. This makes it much easier for the user to see all the relationships and select or type in the values they want with more confidence they are putting the correct value in the correct place. That can be further reinforced in the sidebar, as shown in FIG. 54, by pairing the Legend labels and the Values side by side 5468 with colors matching the data in the spreadsheet 5434 and the chart 5448.

Our technology thereby makes creating, modifying and reordering data within spreadsheet charts much simpler to execute. Users do not need to manipulate their data into specific formats that are compatible with creating charts and can use those charts in the presentation slides or presentation decks seamlessly in a single app making modification an extremely simple single application experiences.

Chart Tab Change Improvement

Once a user has created a chart and if they opt to save it as a separate chart tab in either of Microsoft Excel or Google Sheets, then the data is not right there and available as it is in a worksheet tab. In Microsoft Excel modifying the chart requires highlighting the chart content to trigger seeing the Chart Design ribbon, clicking on that ribbon and knowing to click the Select Data button. That triggers the pop-up shown in FIG. 6B 685 hovering over the chart (where you cannot see the data because it is in a different tab). Then the user clicks the selection they want to be taken to those cells in the source spreadsheet tab. So, it took many steps and the user having to know what to do in which ribbon and which button to click and then which data to click on in the resulting popup. Imagine how much easier it would be to simply click on the element in the chart you want to change and be automatically taken to the data with the cell or cell range selector populated and ready to change. The same operation from a Google Sheets Chart is even less automated, as you go to the Chart tab ribbon, click the Edit Chart button to get the Chart editor sidebar. At that point the sidebar will tell you on which worksheet tab the data resides but the user needs to manually click that tab and then navigate on the worksheet to then find the data and set up in the sidebar to highlight anew selection. So again, a much easier way is possible.

Figure 55:
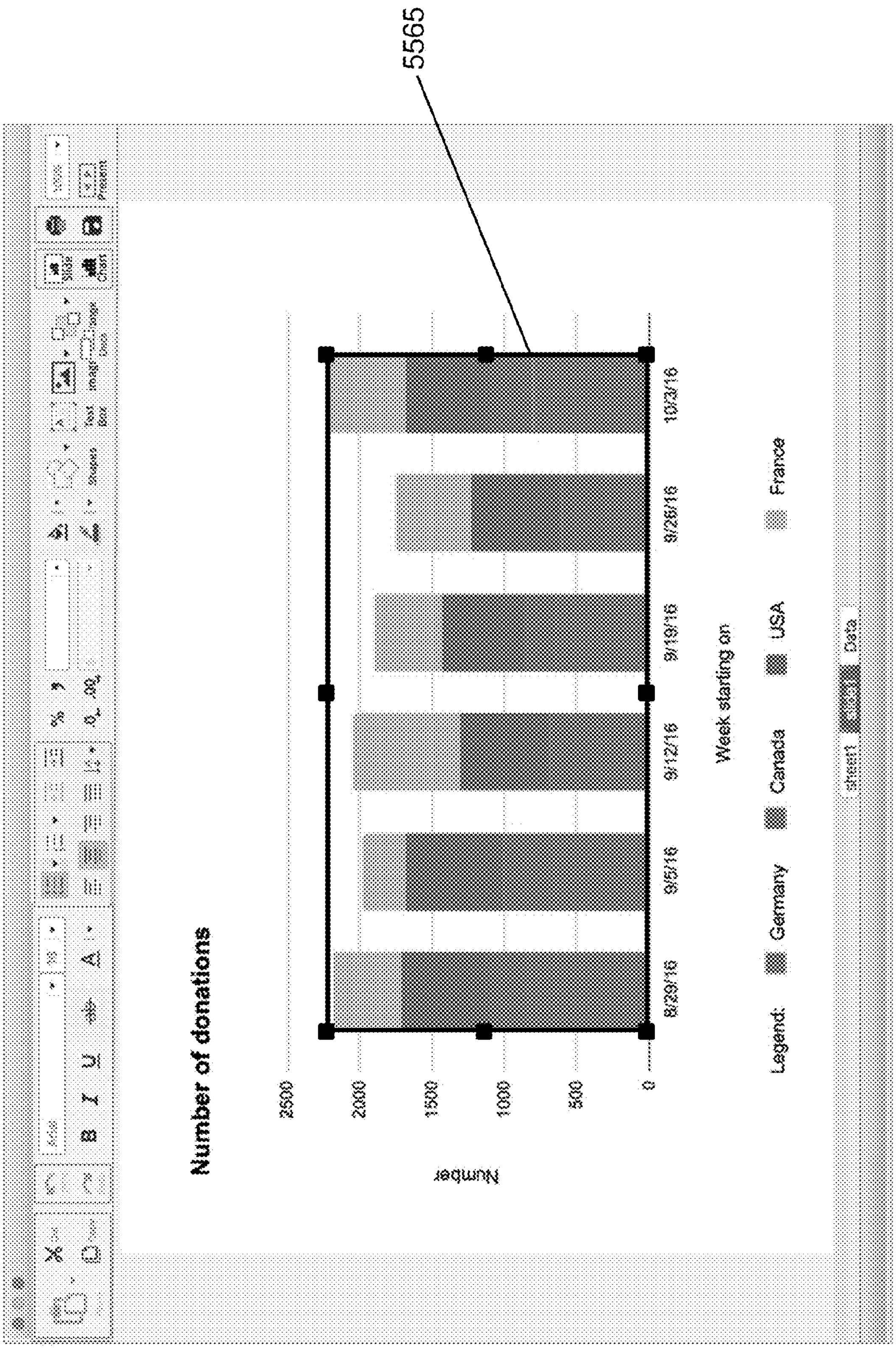
FIGS. 55, 56A, 56B, 56C, 56D and 57 examples the two-step highly automated process (with detail blowups) for changing chart cell inputs on-chart.
Figure 56B:
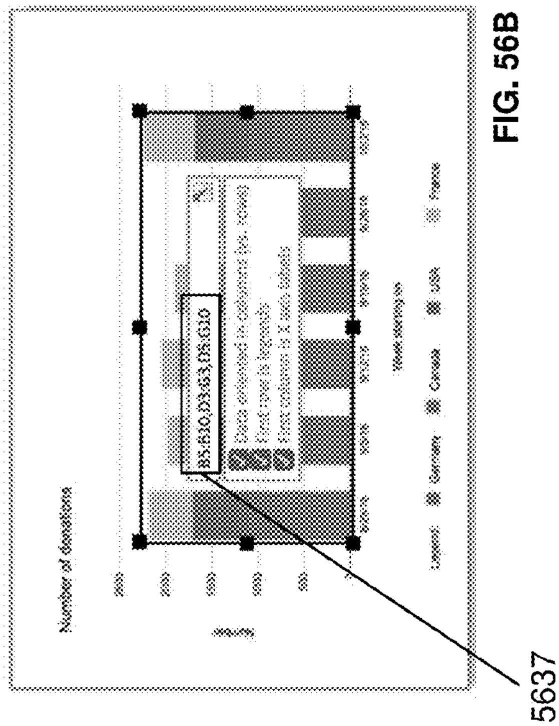
Figure 56C:
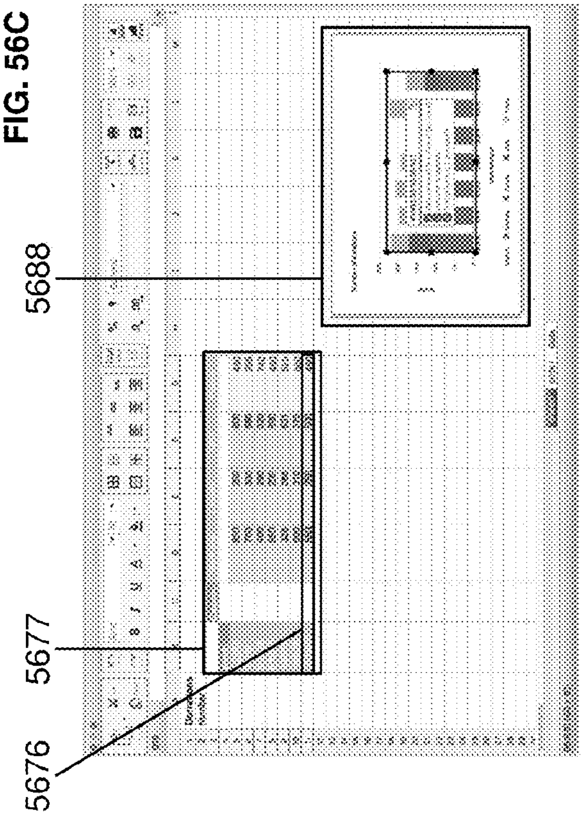
Figure 56A:
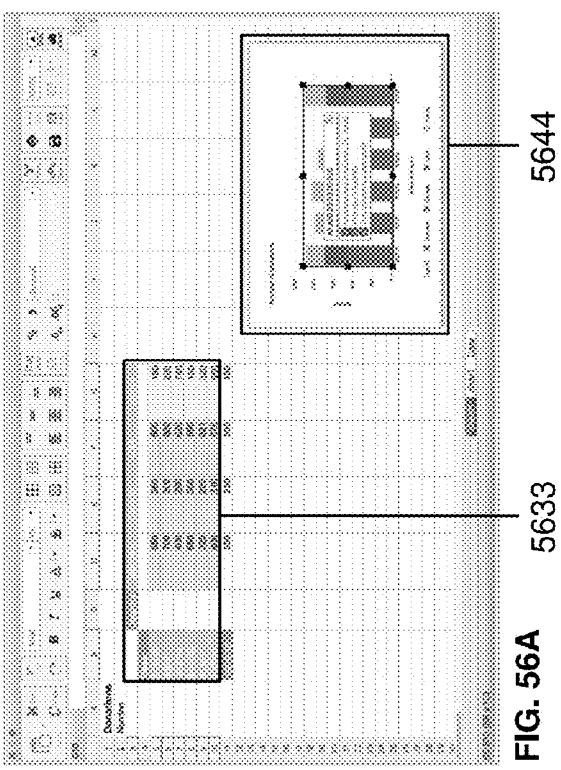
Figure 56D:
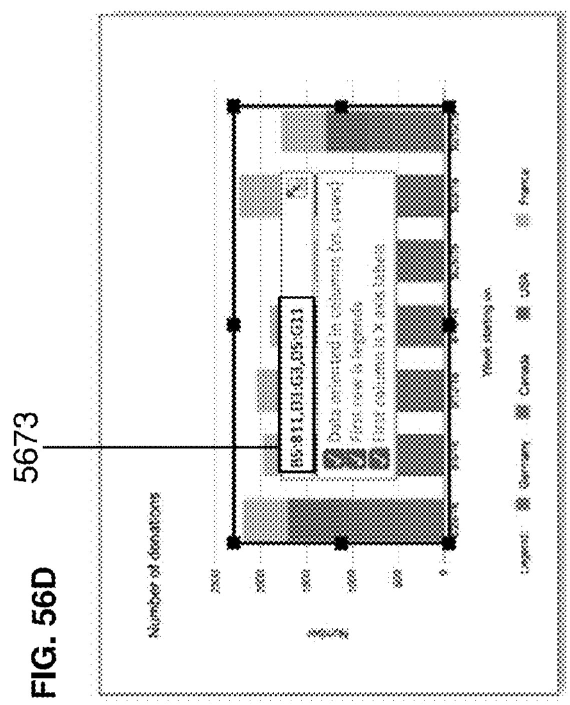
Figure 57:
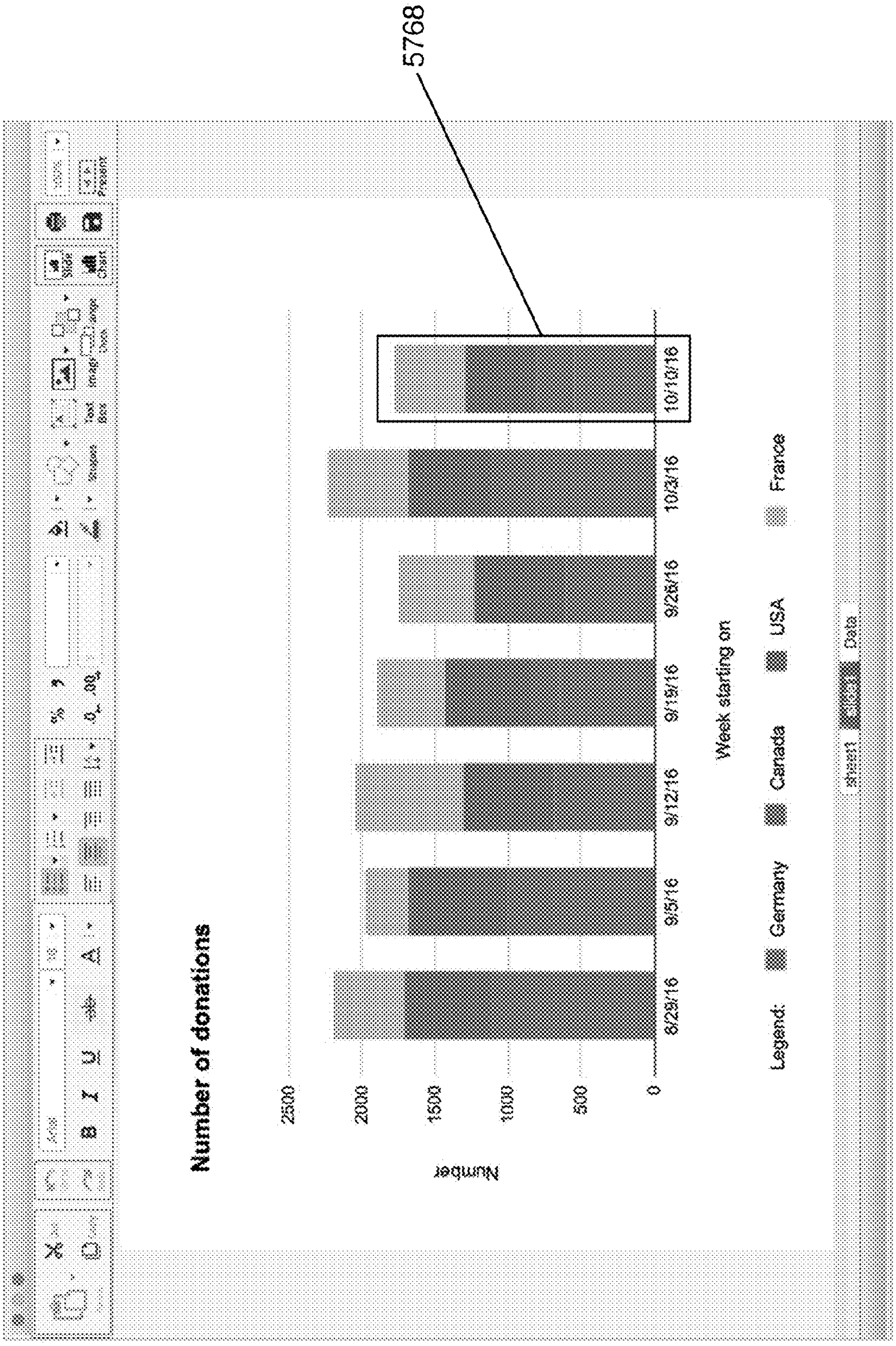

FIG. 55 through FIG. 57 examples the two-step process (with detail blowups) to accomplish the same change in our technology. When the user wants to change the chart, they can click on the chart area 5565 and it automatically takes them to the tab with the data and the data highlighted 5633. Within this embodiment, a mini version of the chart is also opened 5644. This mini version of the chart is shown blown up bigger in FIG. 56B with the data input populated in the selection bar 5637. The user then changes the highlighted inputs 5677 (adding an additional row 5676) as shown in FIG. 56C, which changes the values in the mini chart 5688 (as shown in the bigger blowup in FIG. 56D 5673) and hits enter (or return on a Mac) to be automatically taken back to the chart shown in FIG. 57 with an additional week of data populated in 5768. There was no need to go to ribbons click buttons, go to a pop-up or sidebar make selections etc. etc. as our approach takes just two highly automated steps.

Figure 58:
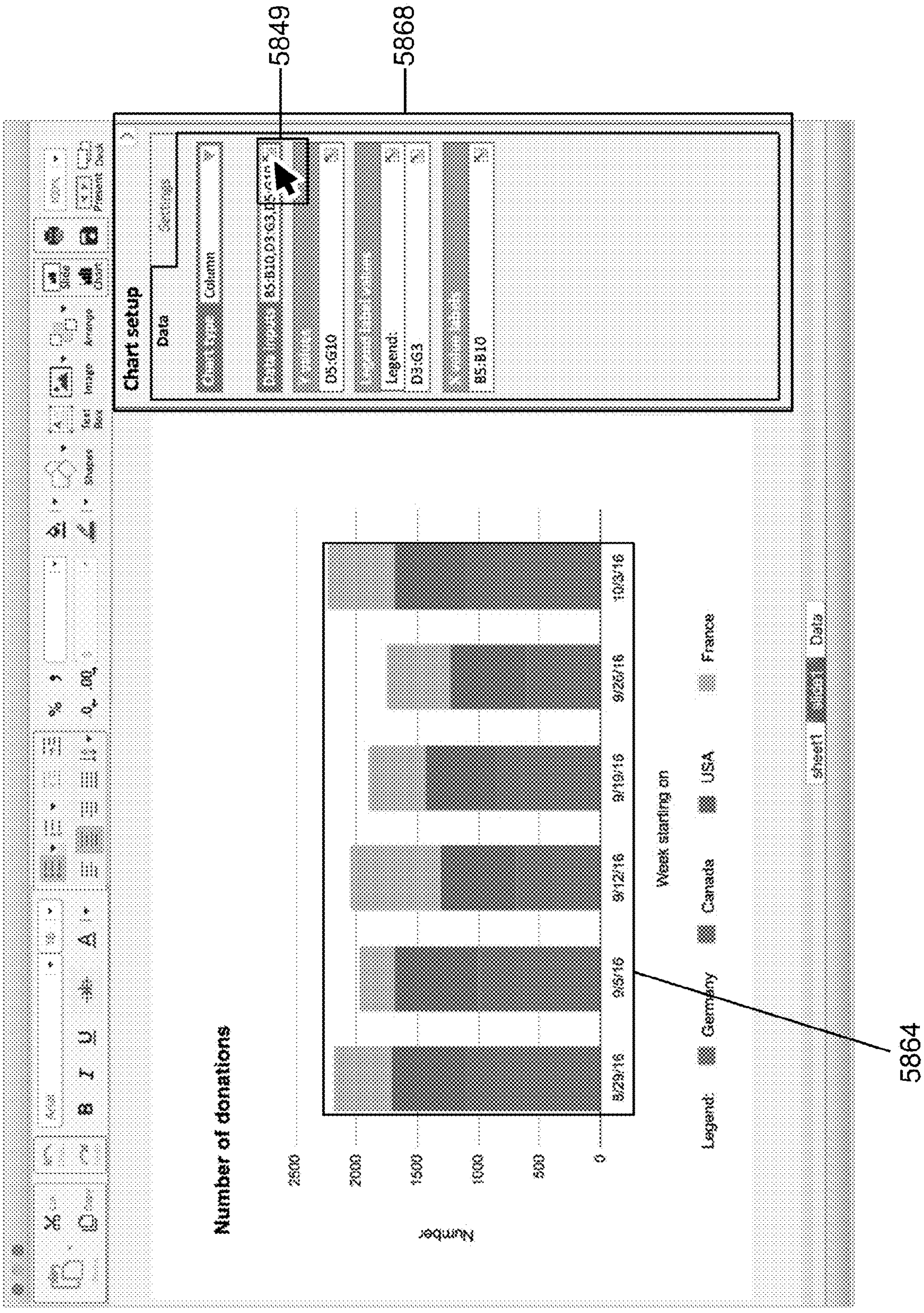
Figure 59B:
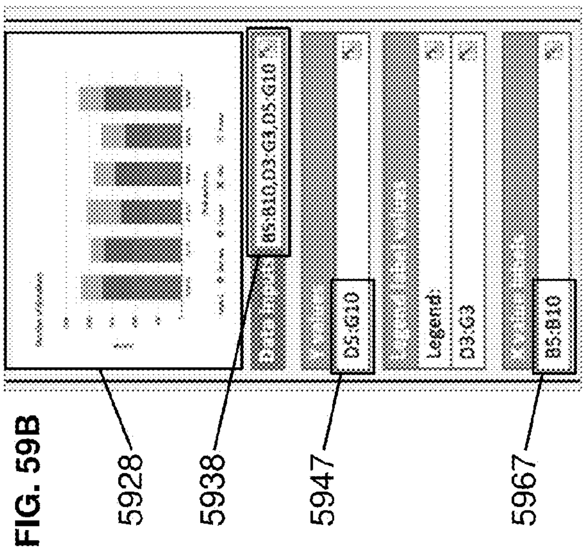
Figure 59A:
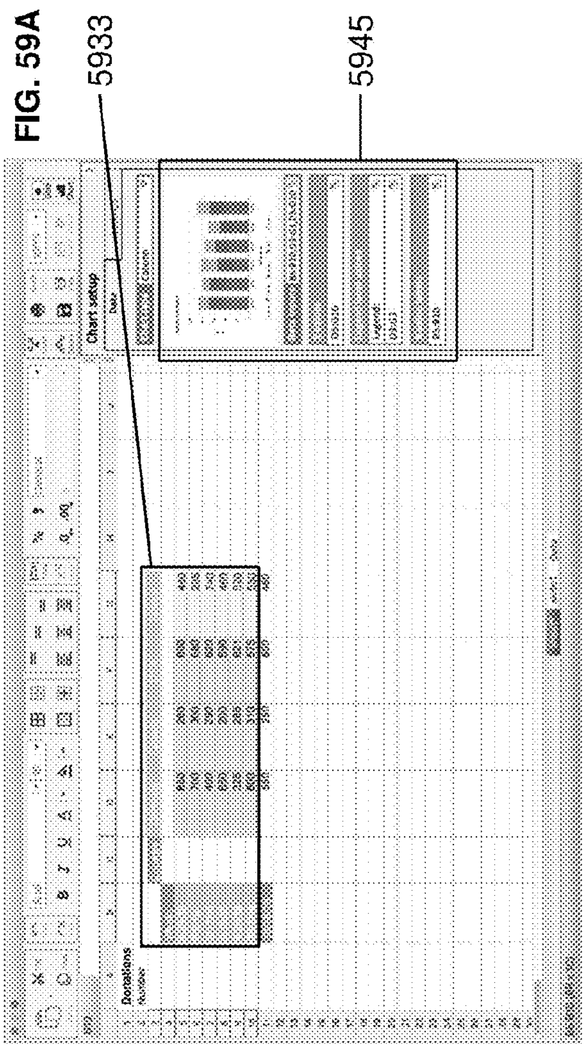
Figure 59C:
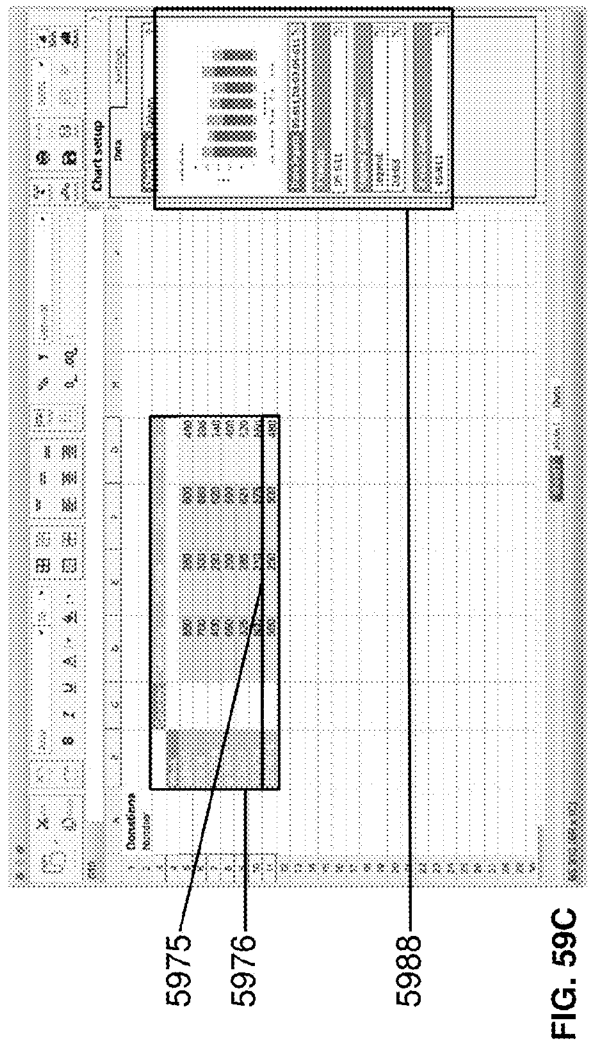
Figure 59D:
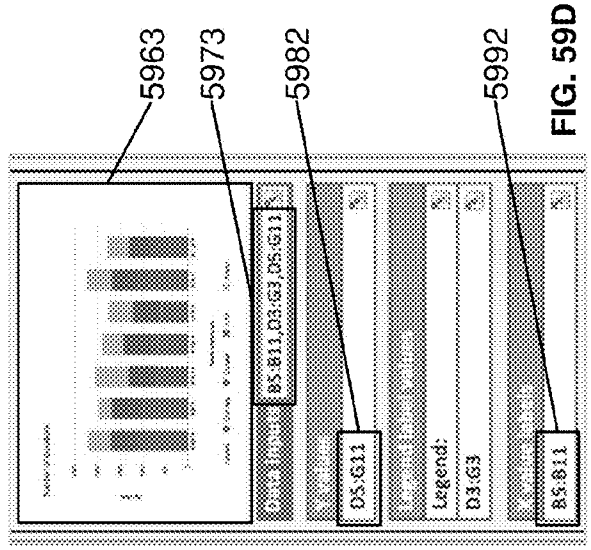
Figure 60:
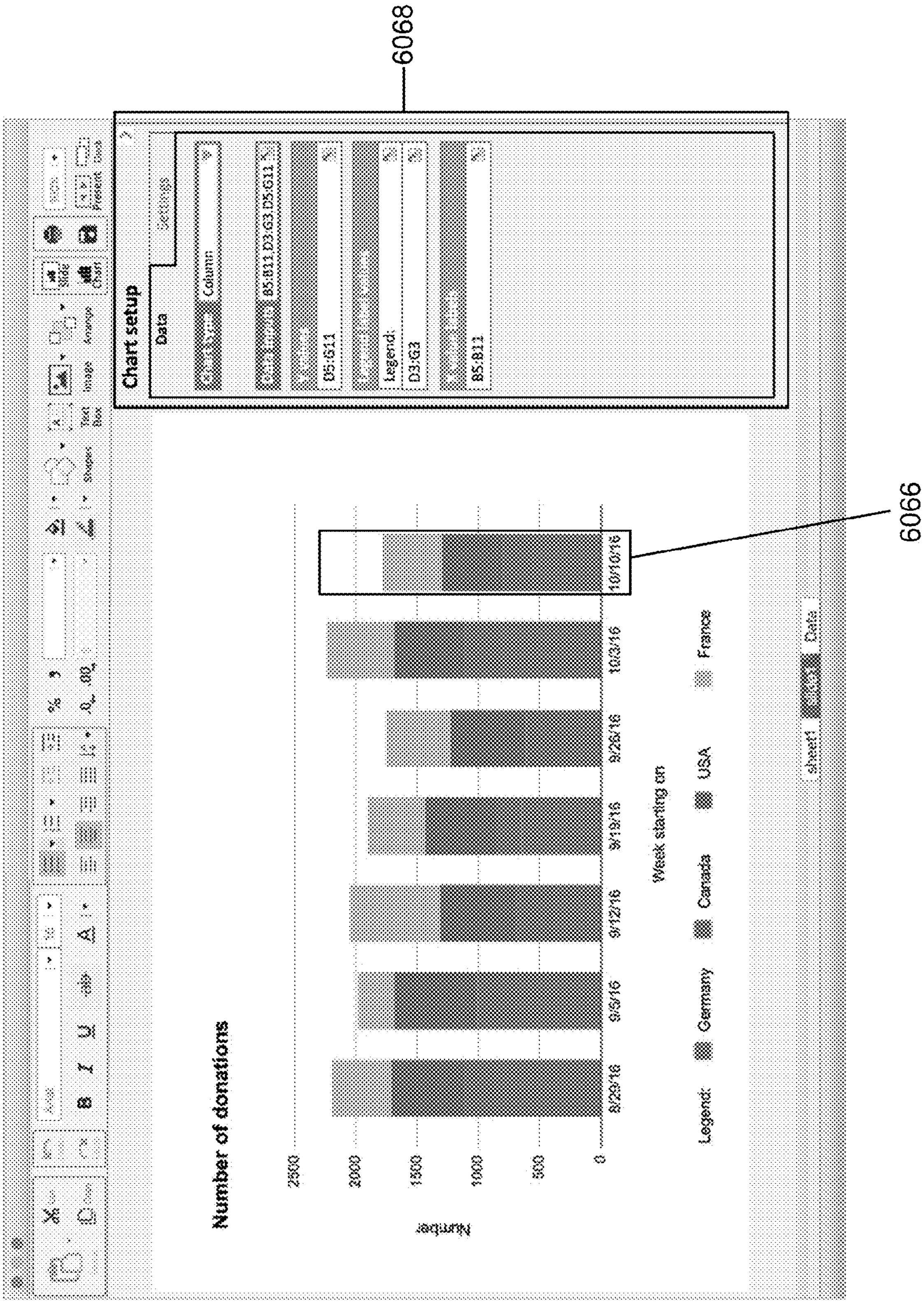

FIG. 58 through FIG. 60 examples the two-step process (with detail blowups) to accomplish the same change done in FIG. 55 through FIG. 57 but using a sidebar 5868. When the user wants to change the chart, they can click on the 'Data inputs' selector 5849 and it automatically takes them to the tab with the data and the data highlighted 5933 (in FIG. 59A) and within this embodiment a mini version of the chart shown in the sidebar 5945. The sidebar is shown blown up bigger in FIG. 59B with the data input populated in the selection bar 5938. The user then changes the highlighted inputs 5976 as shown in FIG. 59C (adding an additional row 5975), which changes the values in the mini chart shown in the sidebar 5988 (as shown in the bigger blowup in FIG. 59D 5963) and hits return to be automatically taken back to the chart shown in FIG. 60. Our technology has automatically changed the 'Data inputs' 5938 to 5973, 'Y values' 5947 to 5982 and 'X value labels' 5967 to 5992. Then shown in FIG. 60, the chart in this example has been automatically populated with an additional week of data 6066 versus the starting set 5864 and the datasets in the sidebar 6068 show the added cell references. There was no need to go the ribbons click buttons, go to a pop-up or sidebar navigate manually to the tab where the data resides make selections etc. etc. as again our approach takes just two highly automated steps.

Figure 61:
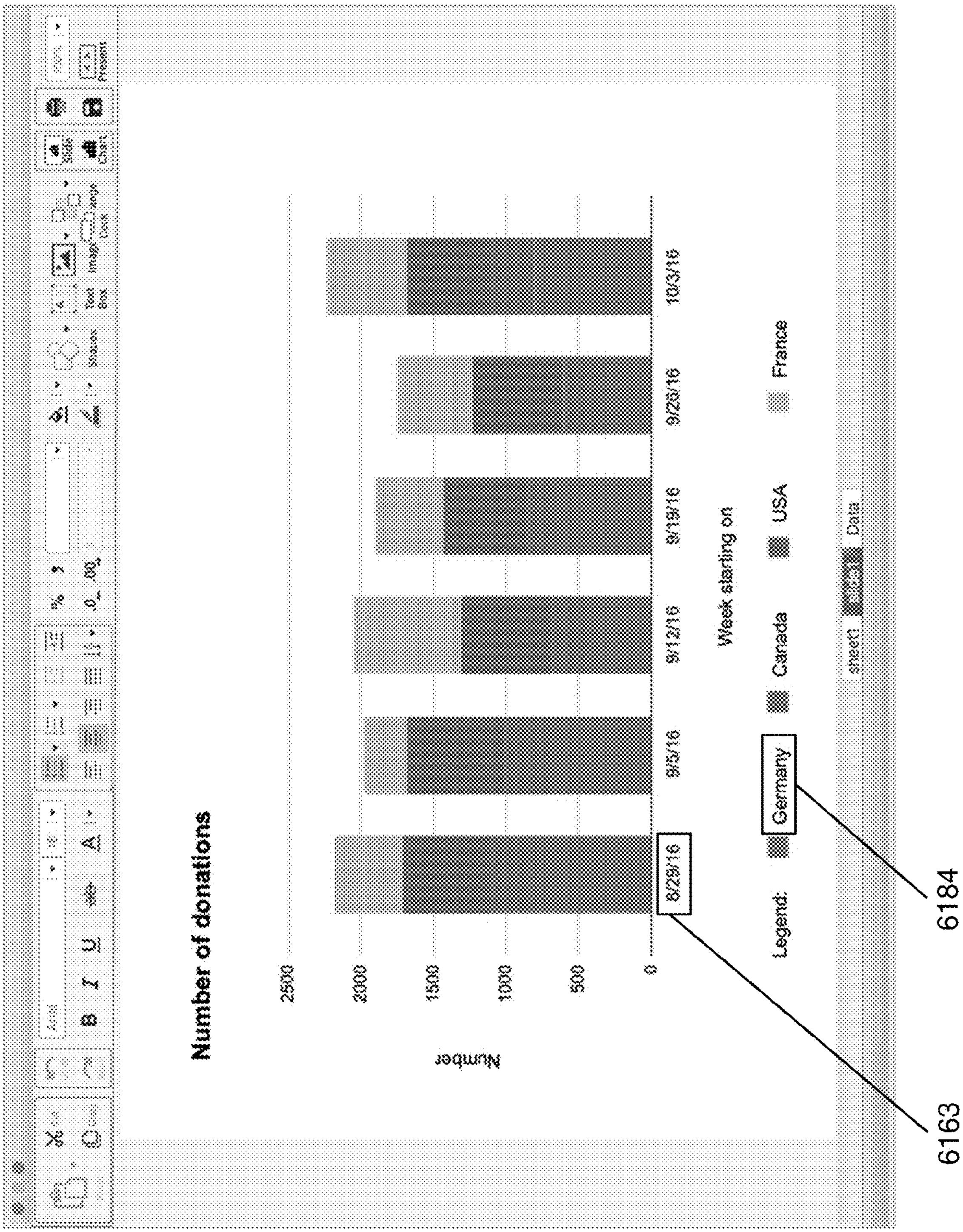
FIG. 61 sets up discussing the highly automated process for changing X value label or Legend values on-chart.

Our technology is sufficiently intelligent that if you instead click on changing a Legend value, 6163 in FIG. 61, or an X axis label 6184 and they were populated from an individual cell input or a cell range, it automatically takes the user to where that data resides ready for the user to change the selection. If the values were instead populated by text it takes the user nowhere but opens the text for editing or replacement by typing a cell or selecting a cell. Again, the user needs to do nothing other than clicking on what they want to change, and our technology then automatically sets the user up to make the change with no further ribbon hunting, button clicking, manual navigation etc. etc.

Figure 62A:
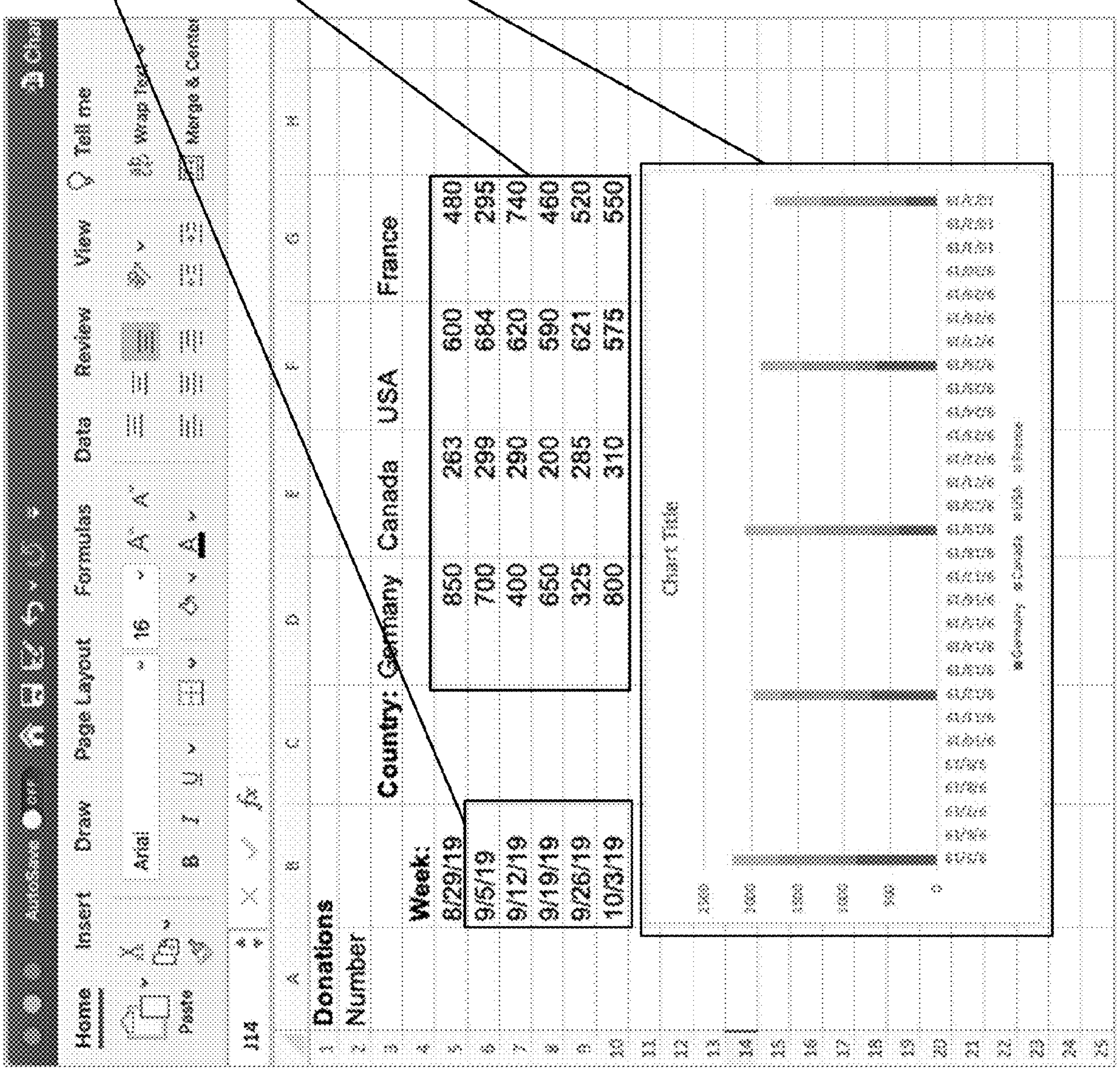
FIG. 62A and FIG. 62B example Microsoft Excel's lack of Error messages and generation of an erroneous chart.
Figure 62B:
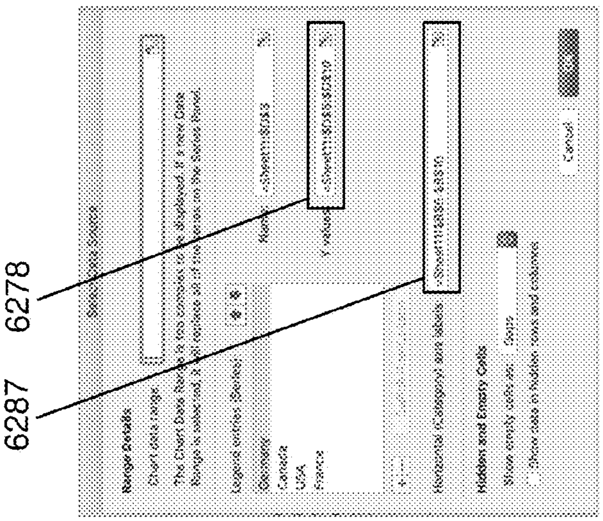

Another problem with conventional spreadsheets is that when you are making changes, and for that matter setting up the data, if a user enters data that is unusual or wrong the user gets no warning or error message stopping the operation. For example, in FIG. 62A the user has mismatched in an Excel chart the number of X axis label rows 6252 and the number of rows of Y values 6255. Clearly a mistake however, one that could have been easily missed entering as that is done separately (one input into 6278 and the other into 6287) and certainly one that could have easily happened in a situation where the data is not close together like FIG. 3 or the user typed in the cell references. However, Excel and for that matter the other available spreadsheets do not warn the user of the problem or give them an error. Instead, Excel proceeds to generate a chart 6274 which is clearly wrong with no hint of what is wrong. The user is then left on their own to figure it out the problem and then has to figure out how to rectify it in the inputs.

Figure 63A:
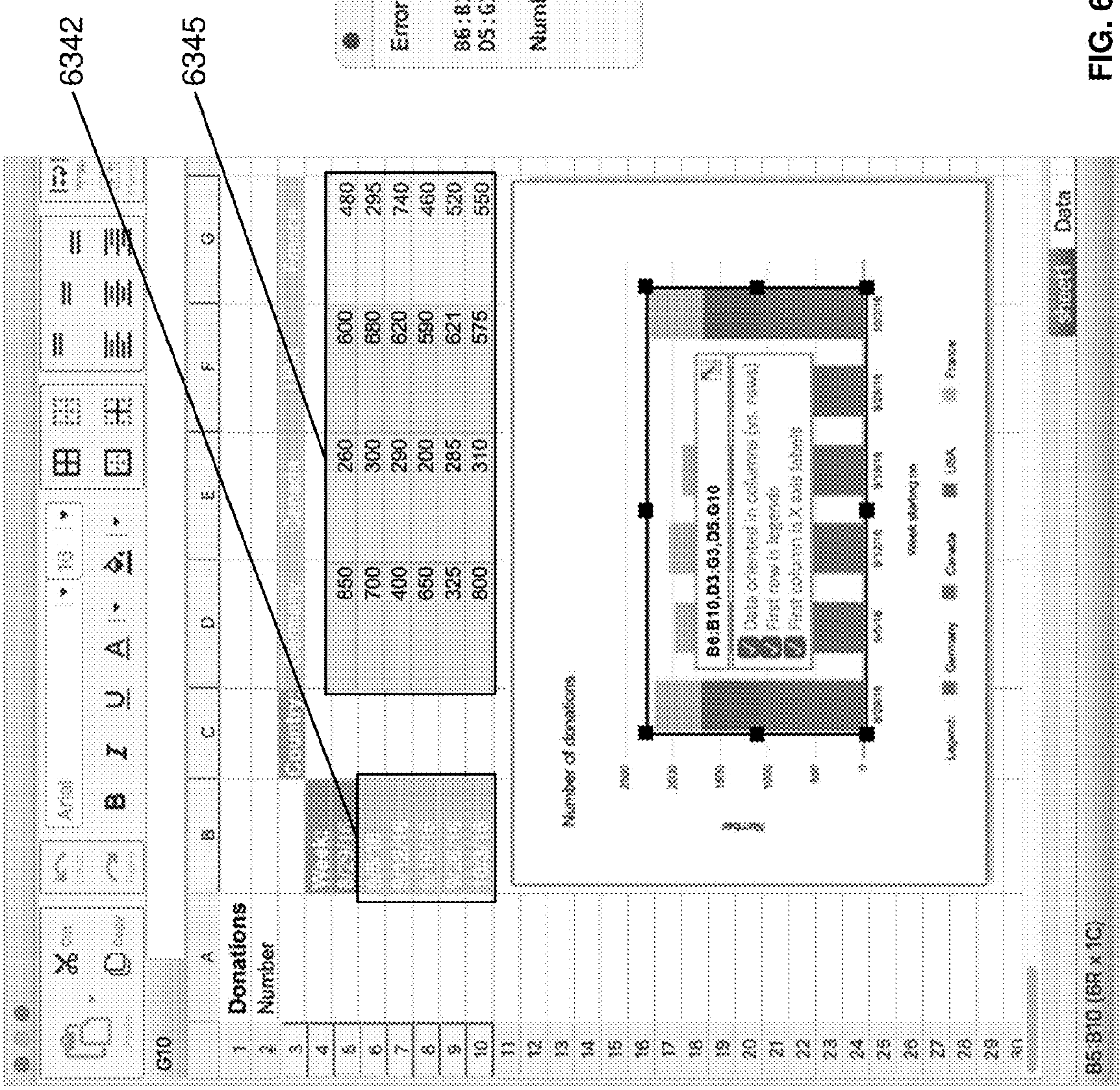
FIG. 63A and FIG. 63B example a chart Error message.
Figure 63B:
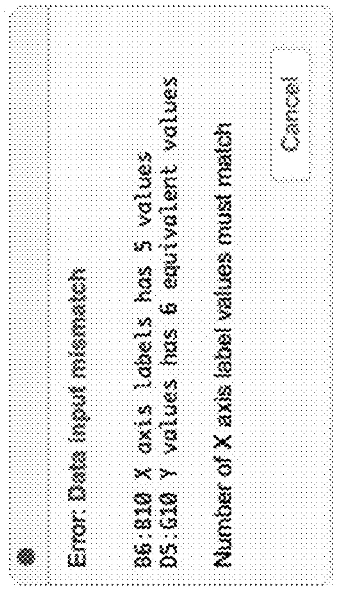

In an embodiment of our technology if the user inputs data with a problem or data that may contain a problem they get an Error or Warning message. FIG. 63A and FIG. 63B example one embodiment of the error messaging. In this example a mismatch of the number of X axis labels 6342 and the number of rows of Y values 6345 (just as was done in Excel in FIG. 62A). When the user hits ENTER (or on a Mac RETURN) instead of getting an erroneous chart as they get in Excel FIG. 62A 6274, the user gets the Error pop-up in FIG. 63B. They get that because the X axis labels range 'B6:B11' 6342 has five values while the Y values equivalent has six values. That mismatch indicates a user mistake that this embodiment requires rectifying for the chart creation or update (e.g., if they just changed the data inputs) to take place. Therefore, the problem is immediately identified for the user in the error pop-up in FIG. 63B.

Figure 64B:
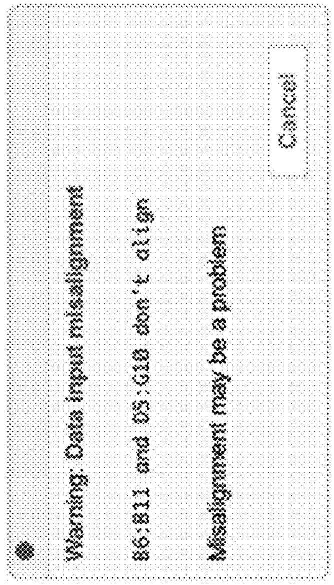
FIG. 64A and FIG. 64B example a chart Warning message.
Figure 64A:
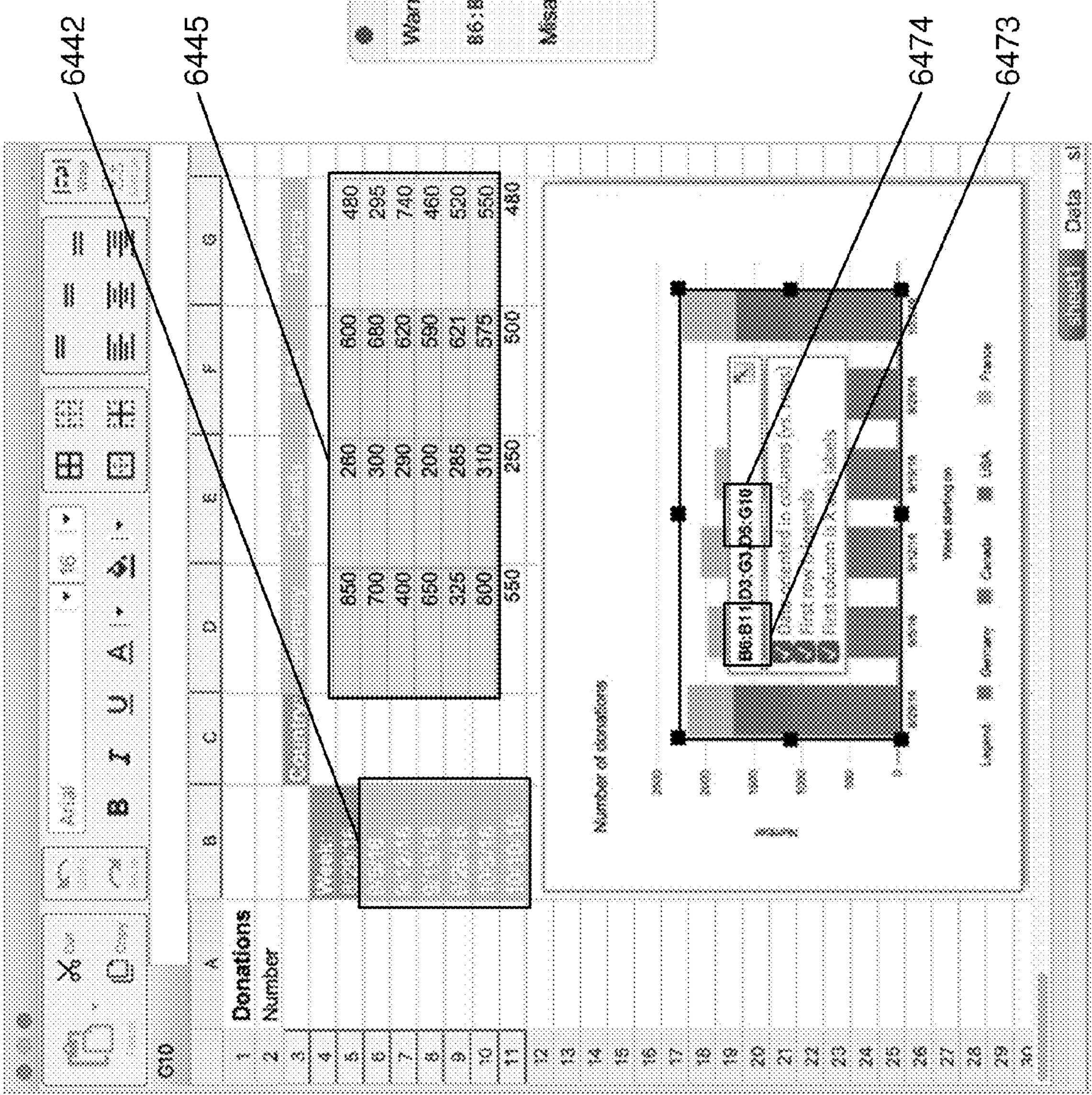

FIG. 64A and FIG. 64B example a further capability of this embodiment to warn users of possible chart data input problems. In this example the user has selected six (rows) X axis label values 6442 and six rows of Y values 6445 automatically recorded in the Data input as 'B6:B10' 6473 and 'D5:G10' 6474 respectively. When they hit ENTER (or RETURN on a Mac) they get the 'Warning' in FIG. 64B. The reason they get the warning is the two sets of data inputted do not line up in the same rows, which might be right but might not be right. In this particular example it would be right if the user calls the X-axis title the 'Values for the week before'. Likewise, it might simply be a mistake which would be easy to do if the user were selecting values in FIG. 3. In the situation where the values are correct, our technology allows users to mix and match inputs that do not need to line up and actually don't even need to be in the same worksheet as the other data. In the situation where the user made a mistake, our warning alerts them of a potential problem. In either situation our technology guides the user to a good outcome, something that is not occurring with today's spreadsheets that can't handle misaligned data (even though in some settings that is the desired correct outcome) and gives no warnings or errors for chart setup or change data inputs.

Stopping users from entering mismatched data or warning them of possible misalignments are not the only areas where warning or error messages are helpful in creating charts. For example, when users are entering data piecewise it may be helpful to let users know what data is further required to generate a chart (e.g., for example in a scatter chart the user must specify both X and Y values before getting a chart). In an additional embodiment when data is setup and a chart type is changed, warning users as to what was impacted would be helpful. For example, telling users what data was used versus not used when changing from a two-dimensional chart like a line or scatter chart to a one-dimensional chart like a pie chart would clarify the result for the user. On the flip side going from a one-dimensional chart to a two-dimensional chart it would be helpful to warn users what additional data is needed or has been assumed (e.g., X values starting from 1 in a line or column chart). Error or warning messages for charts will reduce user mistakes and make getting their desired results dramatically easier.

Spreadsheet Chart Presentation Integration

In many instances users want their charts to present like a slide in a presentation document, like slides do in Microsoft PowerPoint or Google Slides. Today's spreadsheet technologies allow users to create a chart dedicated tab however that chart is not the equivalent of a full-functioning presentation slide. And embedding and linking a spreadsheet generated chart into a presentation slide is not seamlessly integrated with the ease of use of a single application but is instead a two-application experience presenting unneeded complexity for the user. We will example some of the limitations of those experiences before showing how our technology supports creating presentation slides with spreadsheet charts in a seamless single application experience.

Figure 65A:
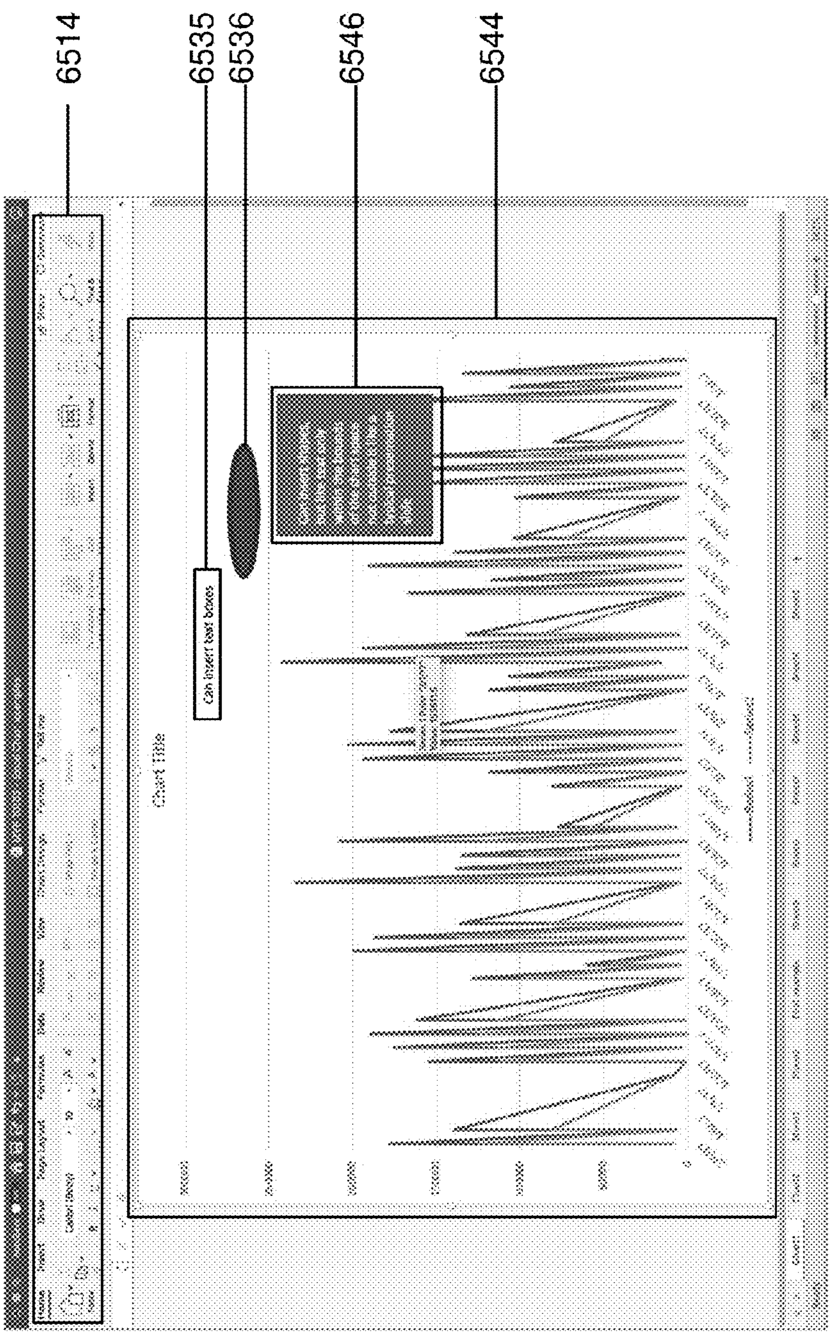
FIG. 65A and FIG. 65B example the chart tab and usage in Microsoft Excel.
Figure 65B:
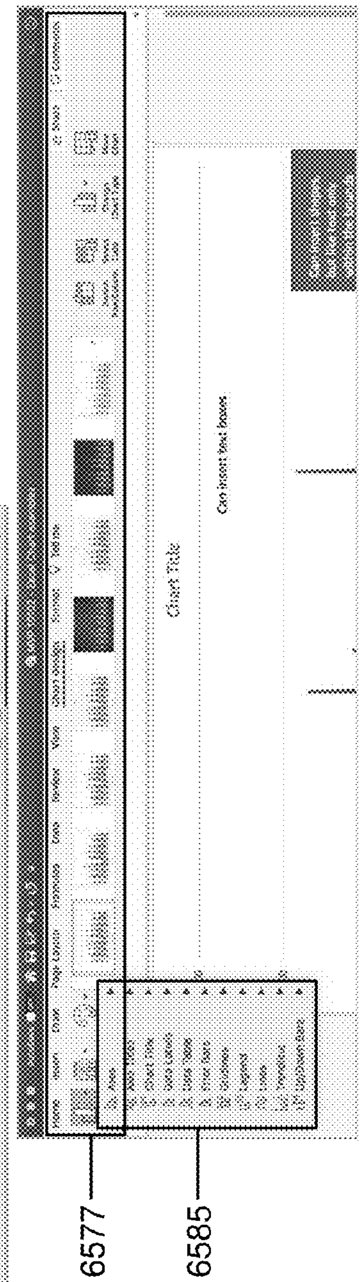

FIG. 65A and FIG. 65B example chart tab usage in Microsoft Excel. Once the user has created a chart, they have the option to make it a spreadsheet chart tab 6544 as shown in FIG. 65A. When using that tab, the user has access to the spreadsheet ribbons, 6514 including the "Chart Design" ribbon 6577, and their dropdowns 6585. However, a major deficiency to delivering a presentation like slide is the content is restricted to within the chart space 6544 and only one chart can be put in the space. Users can add text boxes 6535, shapes 6536 and text box shape combinations 6546 but they are restricted to the space within the chart 6544. Therefore, users cannot create anything like a presentation page with lots of content surrounding the chart and certainly not a slide that has more than one chart contained within the page.

Figure 66:
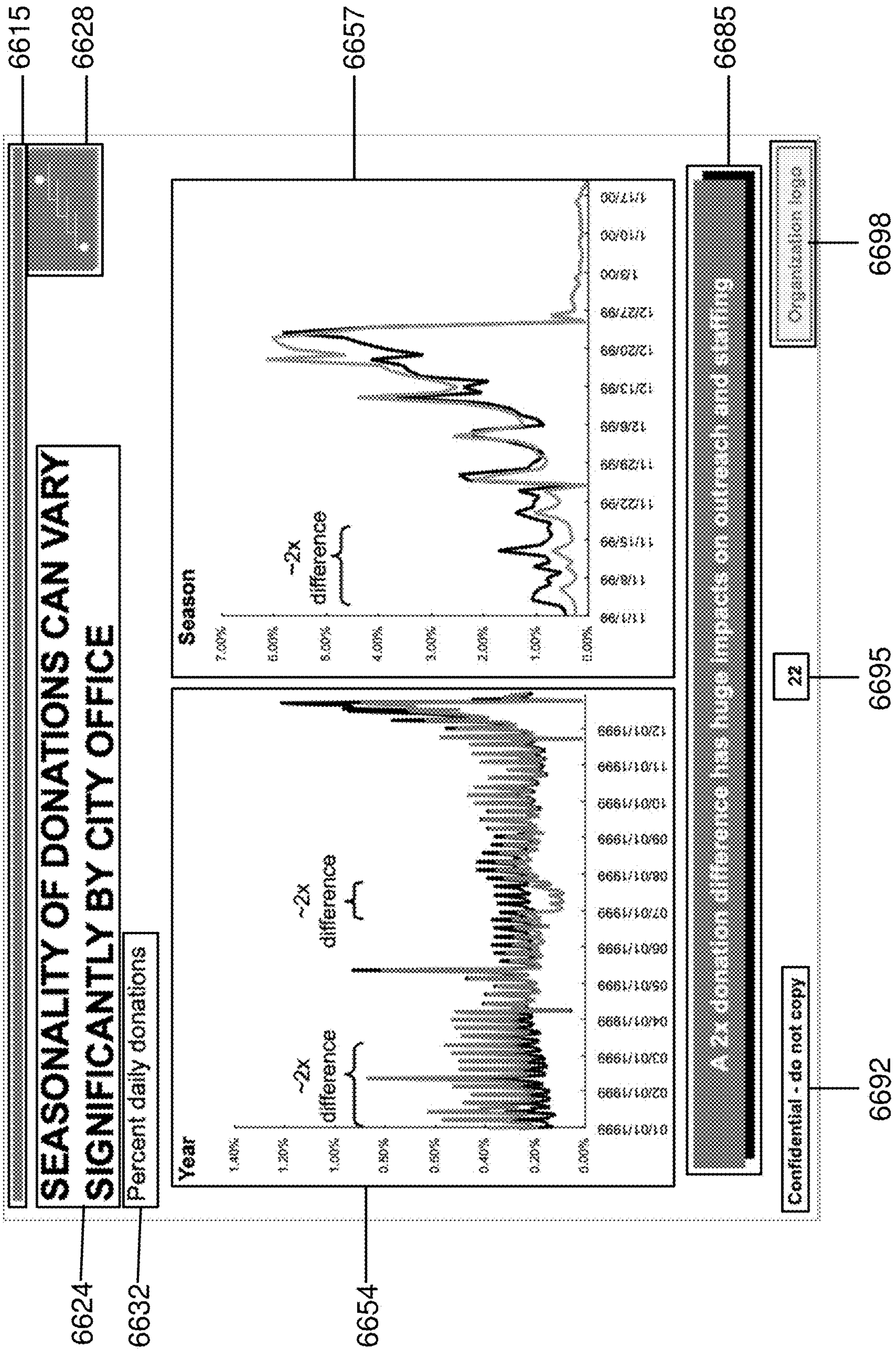
FIG. 66 examples a somewhat typical presentation slide.

FIG. 66 examples a somewhat typical presentation slide with some graphics (6615 and 6628), a storyline heading 6624, subheading 6632, box shadowed major point 6685, Confidentiality warning 6692, slide number 6695 and Organization logo 6698—none of which can be done in a Microsoft Excel chart tab. In this example, it also uses the output from two charts, 6654 and 6657, which also cannot be done in Excel or other spreadsheets. Finally, users' frequently want to view/present each slide in a presentation mode where only the slide with no ribbon/formula bar, bottom bar/tabs etc. is shown and can move from slide to slide by some simple mechanism such as hitting the forward or back arrows on their keyboard. This important capability is also not possible with Microsoft Excel chart tabs or elsewhere in Excel.

Figure 67B:
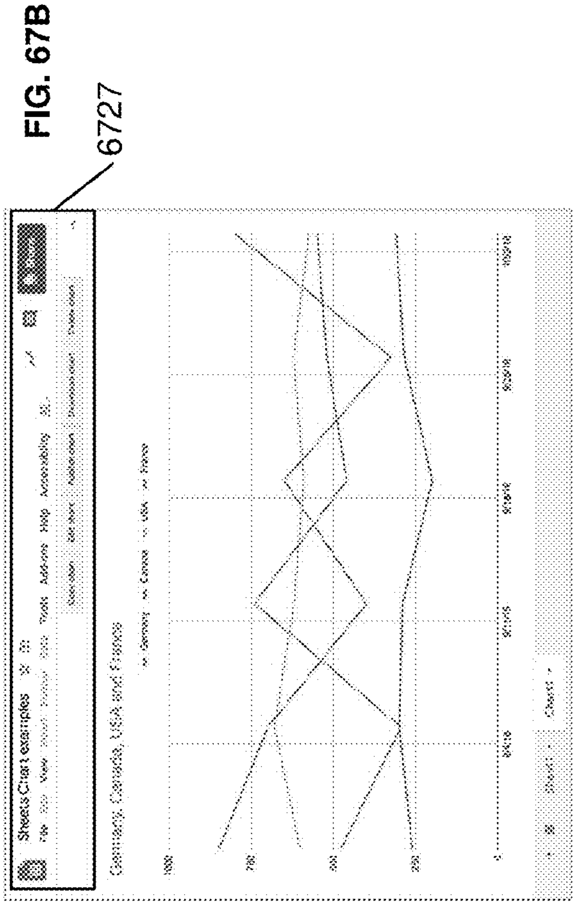
FIGS. 67A, 67B and 67C example the chart tab capabilities in the Google Sheets spreadsheet.
Figure 67C:
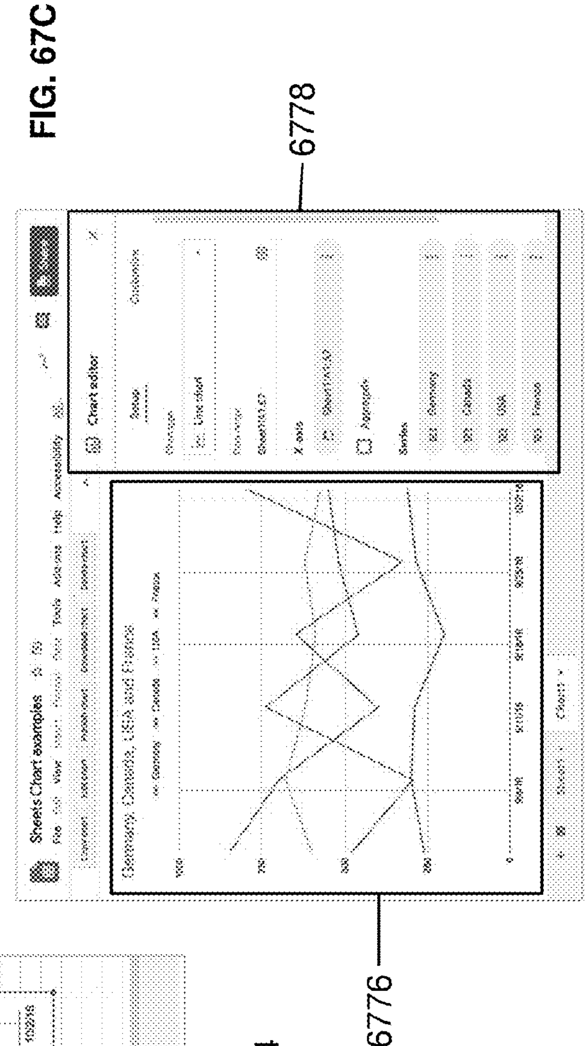
Figure 67A:
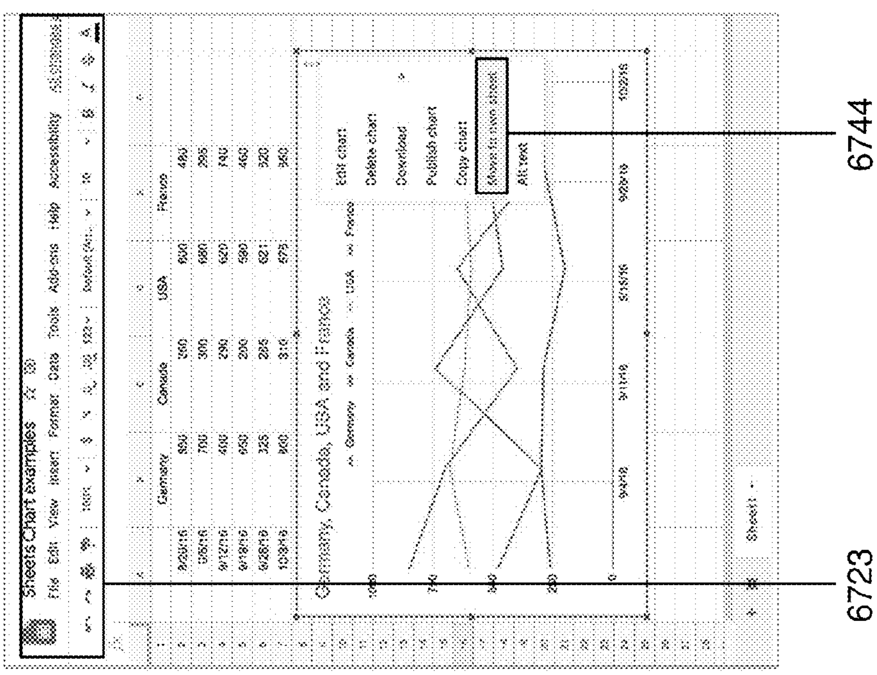

FIG. 67A through FIG. 67C example the chart tab capabilities in the Google Sheets spreadsheet. Its capabilities are much more limited than those in Excel. Once a user creates a chart they can opt to 'Move to own sheet' 6744 as shown in FIG. 67A. However, the normal Sheets spreadsheet ribbon 6723 visible before the move goes away and the user is presented with a replacement ribbon 6727 with very few capabilities. If the user elects to edit the chart 6776, they are given the typical Google Sheets Chart Editor sidebar 6778 where they can change the chart but have no presentation slide like further capabilities. So, there are almost no presentation slide image, text or other ribbon driven capabilities in Google Sheets, and it has substantially less capabilities than Microsoft Excel.

Figure 68A:
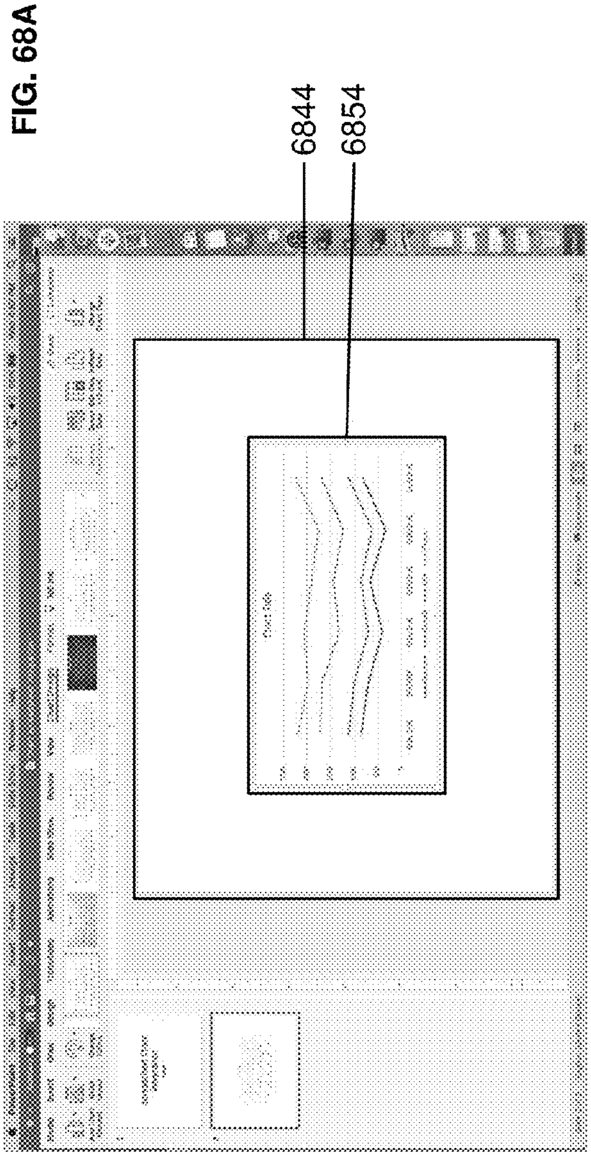
FIG. 68A and FIG. 68B examples Microsoft PowerPoint to Excel chart integration FIGS. 69A, 69B and 69C examples creating a slide containing a chart in our technology.
Figure 68B:
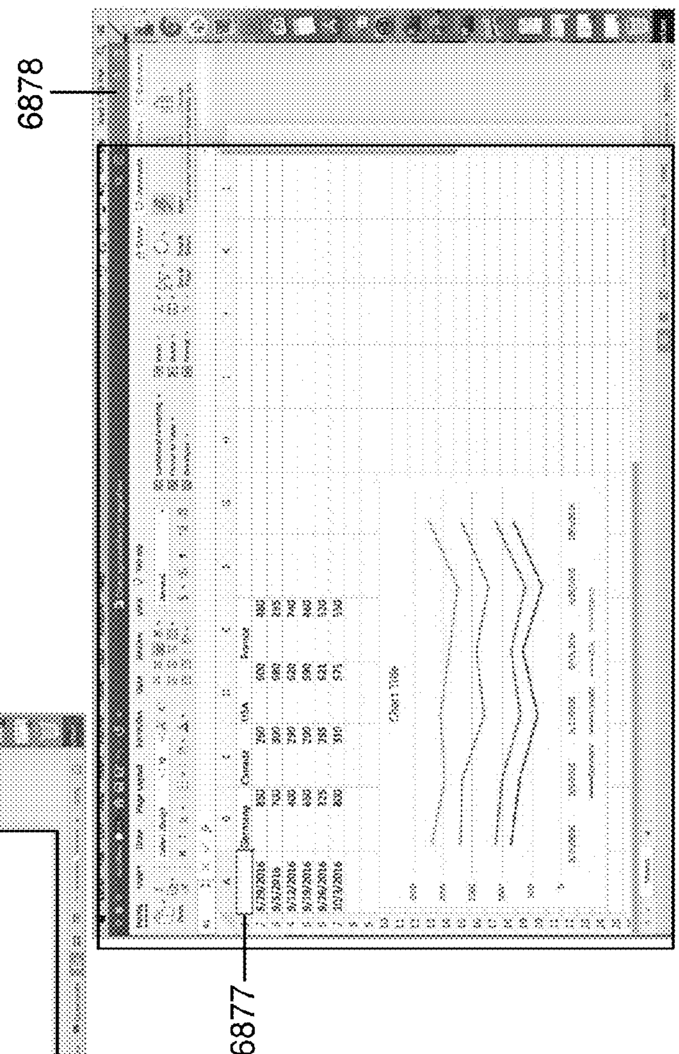

Coming at presentation slide spreadsheet chart integration from the presentation app side results in a two separate app experience in both Microsoft and Google. Spreadsheet charts can be imbedded and linked in both Microsoft PowerPoint and Google Slides. However, when you are in a presentation slide in PowerPoint or Slides and want to change an embedded chart it opens up the respective spreadsheet and you are into a two-app situation. There are many different ways of initiating this in Microsoft PowerPoint depending upon which version you are using and whether on a PC or Mac, but all involve Excel popping up and you making your chart setup changes in Excel before moving back to PowerPoint. FIG. 68A and FIG. 68B example what this looks like on a fifteen-inch Mac for a PowerPoint slide 6844 containing an Excel spreadsheet chart 6854. When the user goes starts to change the chart it triggers Excel 6877 to open in front of the PowerPoint app 6878 and then the user needs to move to the appropriate ribbon or ribbons in Excel execute the changes and then return to PowerPoint. You can also see that on a larger than average laptop computer screen this is not an easy back, and forth which is even more difficult on the smaller laptops used by so many users. Clearly it would be so much easier if you could make those changes without leaving the application and access to the spreadsheet cells is done through the capabilities previously discussed where our technology with one click takes a user to the spreadsheet cell data with no need to deal with separate applications, no need to resize those app windows so you can see what you are doing and then navigating ribbons, pop-ups, sidebars, drop-downs or other visuals.

Our technology employs a seamless integration across the presentation slide and the spreadsheet cells to make doing what users want dramatically easier. Those spreadsheet cells are held in the spreadsheet worksheet tabs while the presentation slides or pages are held in different spreadsheet tabs (e.g., chart, slide or deck tabs). As we will now example, our technology goes well beyond conventional spreadsheet chart tabs. In one embodiment, which we call here a slide, our technology gives users the capability to create full functioning presentation slides in a spreadsheet tab that can seamlessly hold one or more spreadsheet chart. We will also example a multi-panel embodiment of our technology, which we call here a deck, that can hold more than one slide (or page) and thereby hold an entire multi-slide (or page) presentation within a single spreadsheet tab. Both of these technologies include the ability to go into a presentation mode showing only the slide (or page) without any ribbon or other non-slide visual and easily move from slide to slide as users are used to doing in their presentation applications (e.g., Microsoft PowerPoint or Google Slides).

Figure 69B:
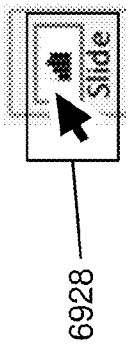
Figure 69A:
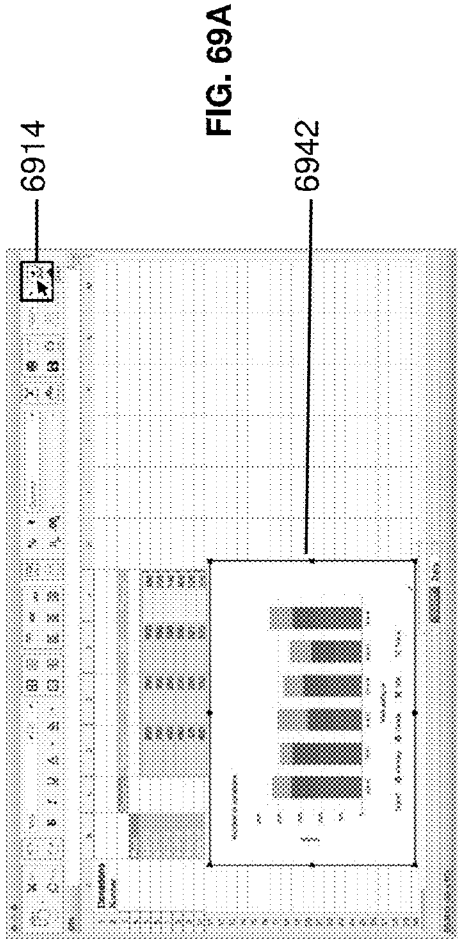
Figure 69C:
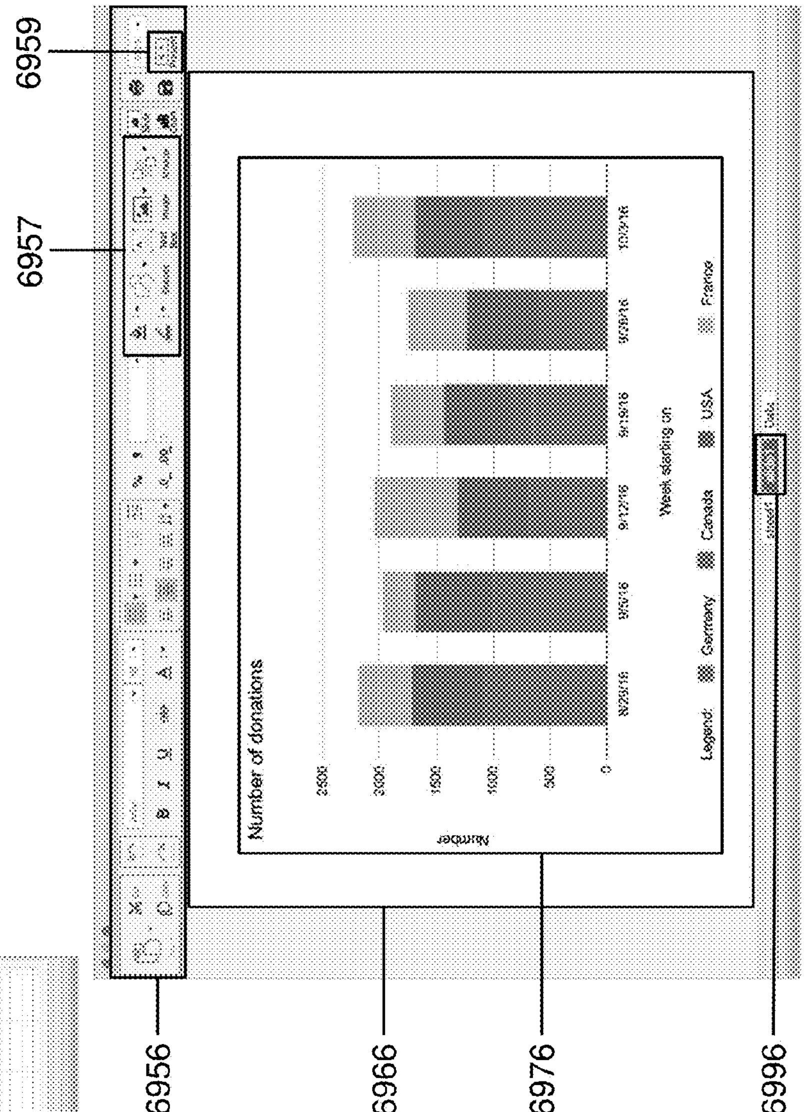

FIG. 69A through FIG. 69C examples one embodiment where once the user has created a spreadsheet chart 6942 that they move to a presentation slide 6966 (in FIG. 69C) by clicking a Slide button 6914 (blown up for ease of visibility in FIG. 69B 6928. Although this movement to a slide could have been triggered by a drop-down or other visual and could have been initiated from a spreadsheet slide tab. The resulting new slide1 tab 6996 houses the chart 6976 on a bigger presentation slide 6966 accompanied by a ribbon 6956 more tailored for creating presentations including buttons for inserting shapes, text boxes, images, shape fill, shape outline and arranging content 6957. It also includes a button for putting the slide into presentation mode 6959.

Figure 70:
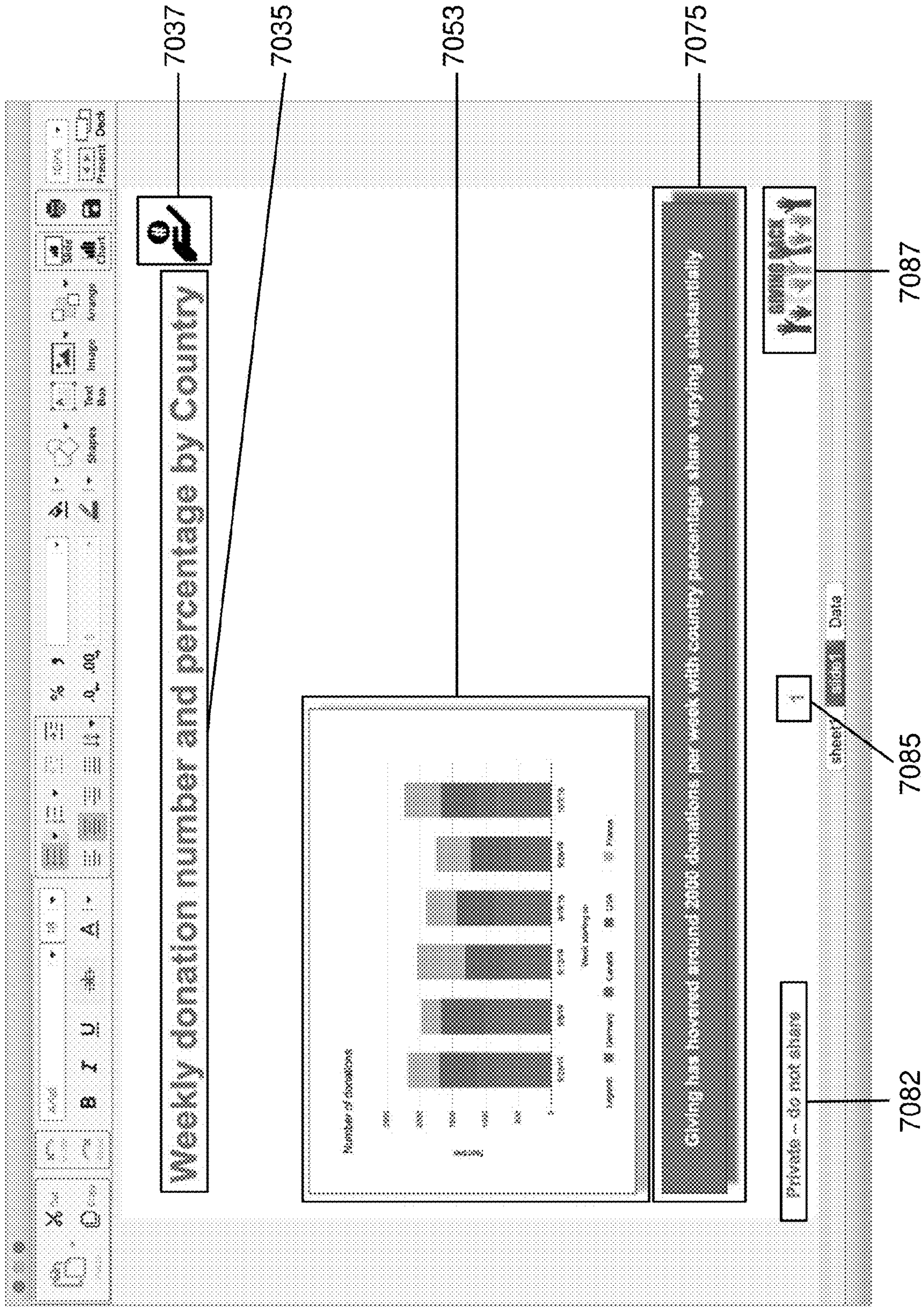
FIG. 70 and FIG. 71 example capabilities of a slide in our technology.
Figure 71:
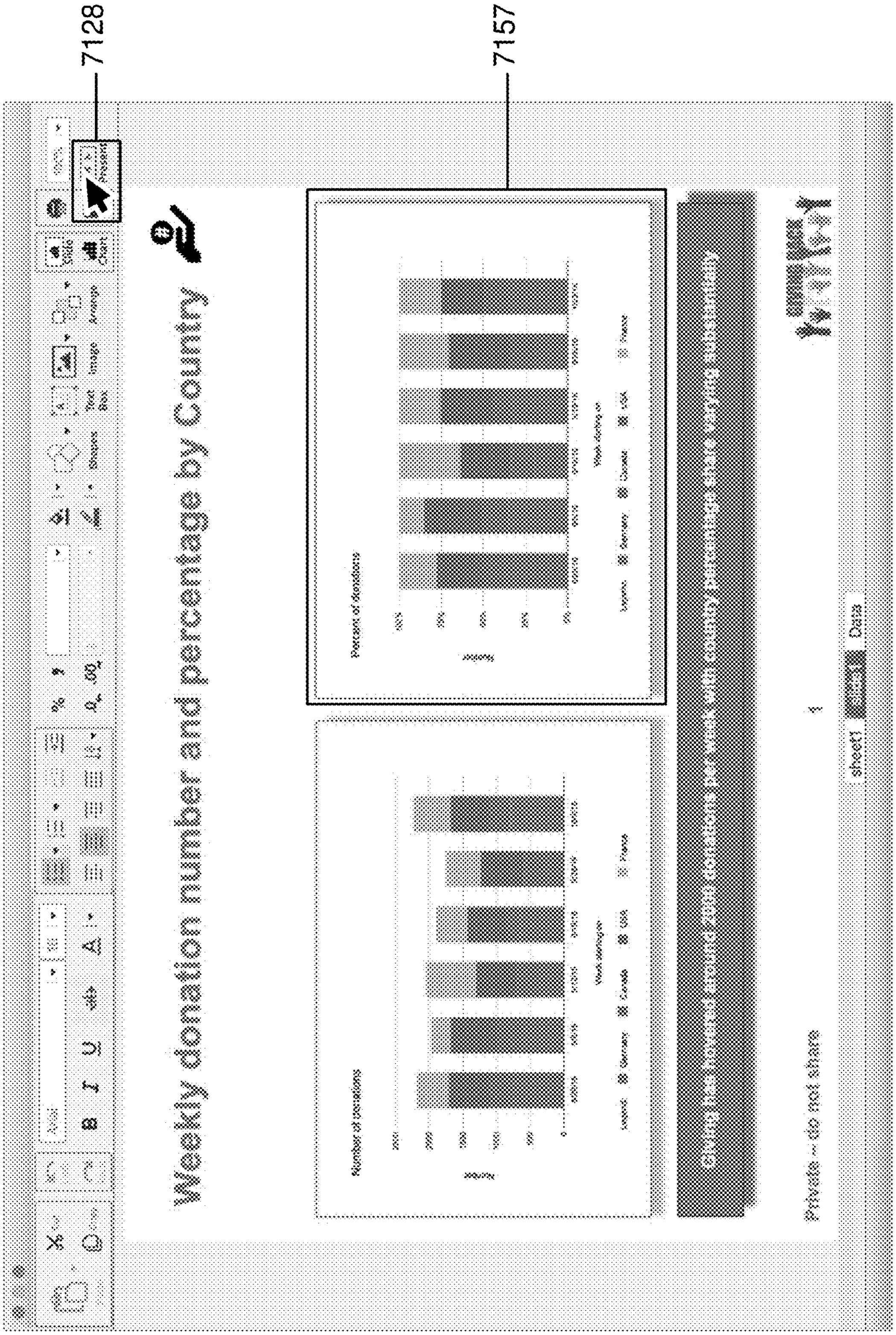
Figure 72:
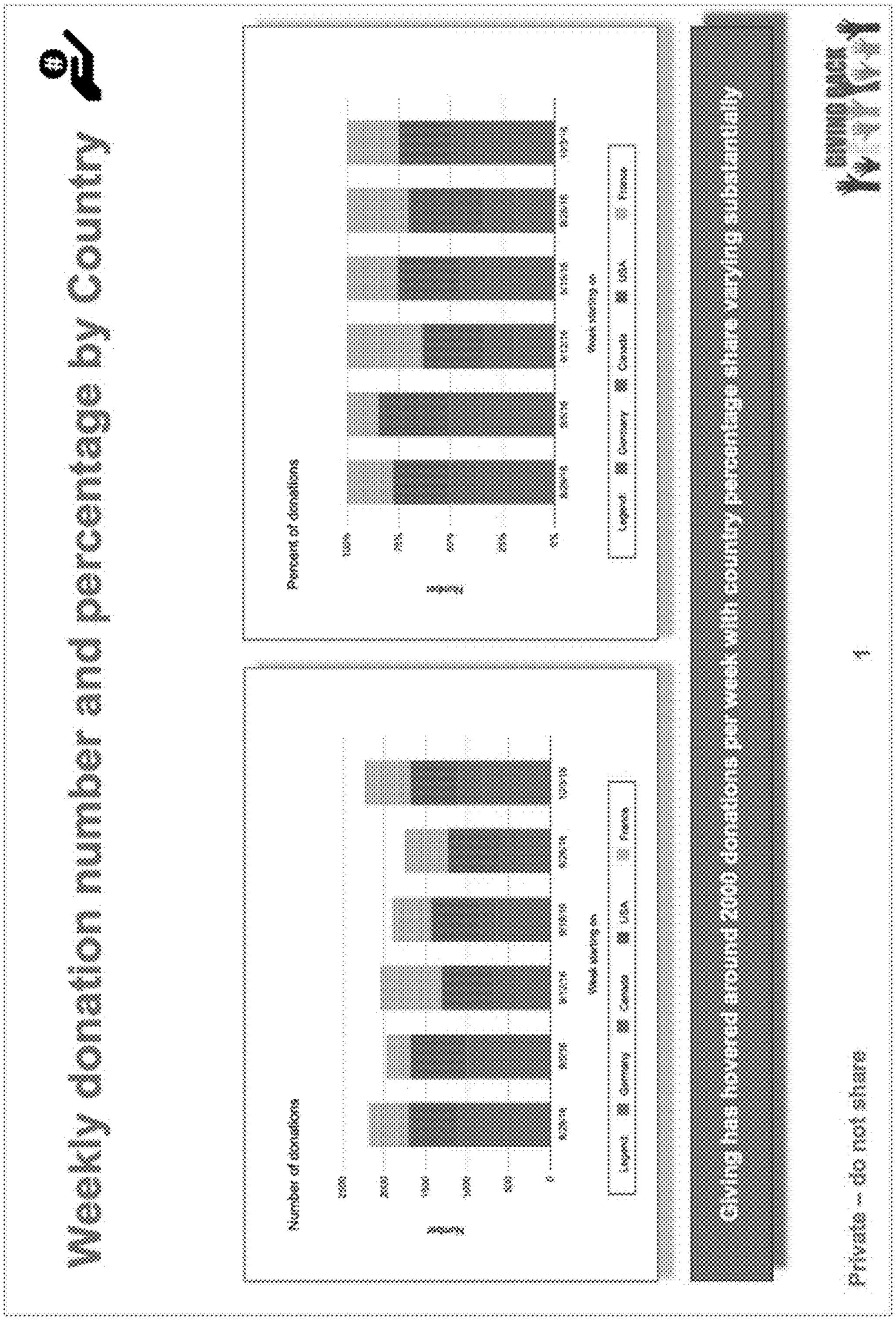
FIG. 72 examples the presentation view of a slide in our technology.

FIG. 70 and FIG. 71 example the use of that presentation slide 6966 in FIG. 69C where the user resizes the chart 6976 to use much less of the slide space, adds a purple border and a drop shadow 7053. The user then adds a storyline heading 7035, an image icon 7037, box shadowed major point 7075, Confidentiality warning 7082, slide number 7085 and Organization logo 7087—none of which can be done in a Microsoft Excel, Google Sheets or other spreadsheet chart tabs. In FIG. 71 the user adds a second chart 7157 with a purple border and a drop shadow—again not something that can be done in any other spreadsheet. The user then clicks the 'Present' button 7128 which puts the slide into presentation mode shown in FIG. 72, where the ribbon and all the surrounding UI goes away to only show the slide. And if the user in this embodiment had more slides, they could move from slide to slide by hitting the arrow keys on their keyboard (or other slide movement method) as they do today in presentation applications like Microsoft PowerPoint and Google Sheets.

Figure 73:
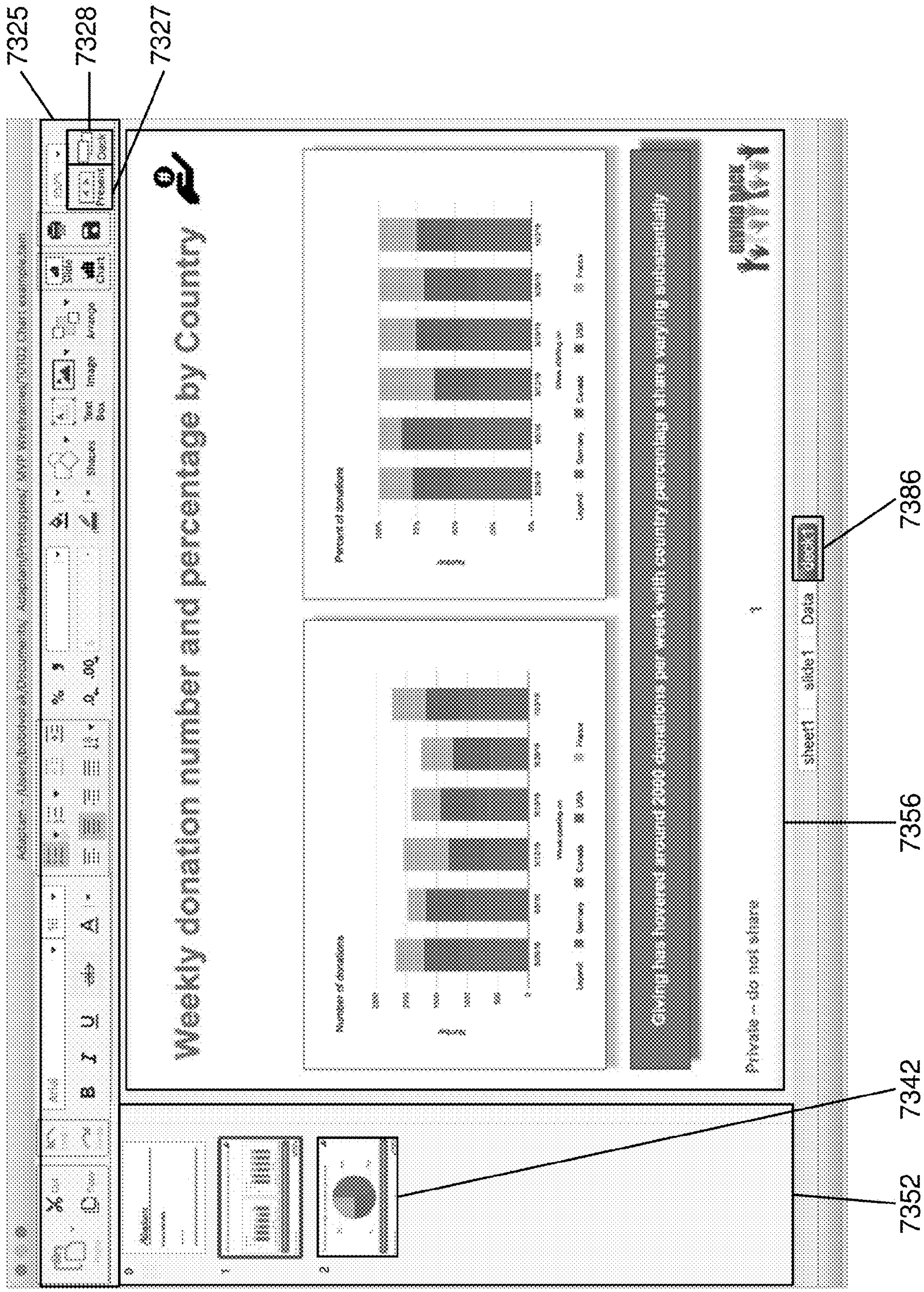
FIG. 73 examples what we have called in this embodiment the deck tab, a multi-panel visual including an ordering visual with multiple slide or page representations, a current view presentation slide or page canvas and the ribbon.

FIG. 73 examples what we have called in this embodiment the deck tab, a multi-panel visual including an ordering visual with multiple slide or page representations 7352, a current view presentation slide or page canvas 7356 and the ribbon 7325. This tab 7386, within the spreadsheet, holds multiple slides which users can use for a presentation. The user can transfer a slide using a 'Deck' button 7328, drop-down or other selection mode specifying where to put the slide. The user can also generate anew slide within the deck tab, in this example the 'deck1' tab 7386. The deck view contains a sidebar 7352 where the user can see some or all (if there are few enough) of the slides in the deck, depending upon the number of slides and size of their preview slides 7342. It is used to order the slides (or pages) as users can move the slides around, delete slides and copy and paste slides as they are used to do doing in their presentation applications. The deck view also contains a slide or page canvas 7356 with all the capabilities of the previously described presentation slide or page and a ribbon 7325 more tailored for creating presentations including buttons for inserting shapes, text boxes, images, shape fill, shape outline and arranging content.

In this embodiment of our technology a deck can be triggered into presentation mode by the 'Present' button. 7327, which then operates as previous described for side-to-side movement. The further advantage of our technology is that users can then have multiple presentations within one spreadsheet by having more than one deck tab. The technology then supports sharing slides from one deck to another with changes entirely or selectively propagating as controlled by the selective multiway technology disclosed in one of our previous patents. All of this makes creating, modifying and presenting slides utilizing spreadsheet created charts dramatically simpler.

Figure 74:
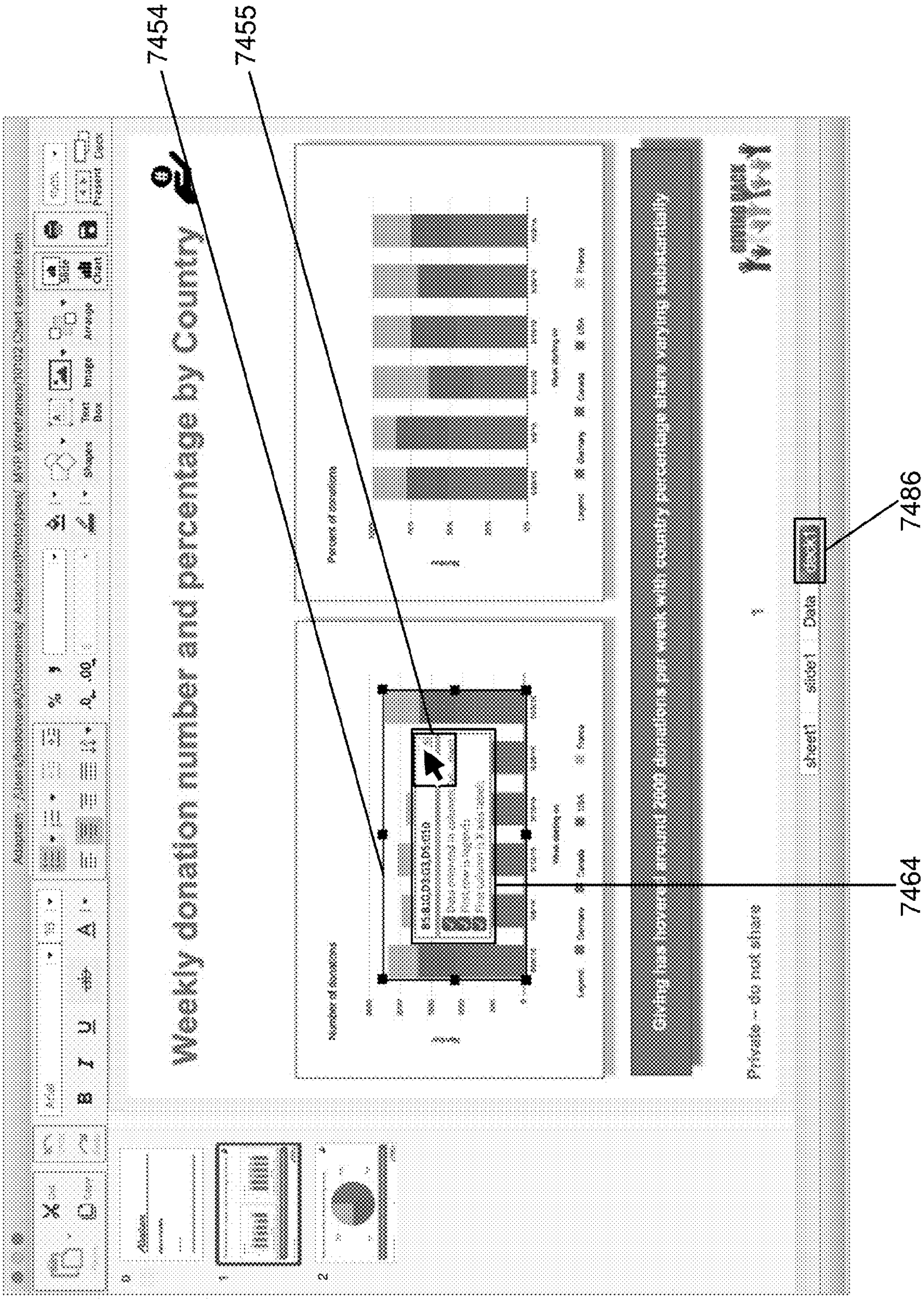
FIGS. 74, 75A, 75B, 75C 75D, 76 and 77 examples a user modifying a chart in a presentation slide or page in a multi-slide deck using an on-chart capability.
Figure 75B:
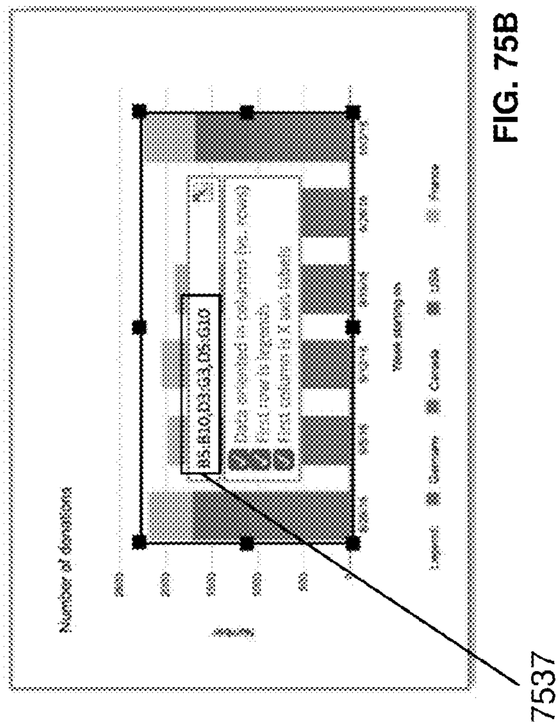
Figure 75C:
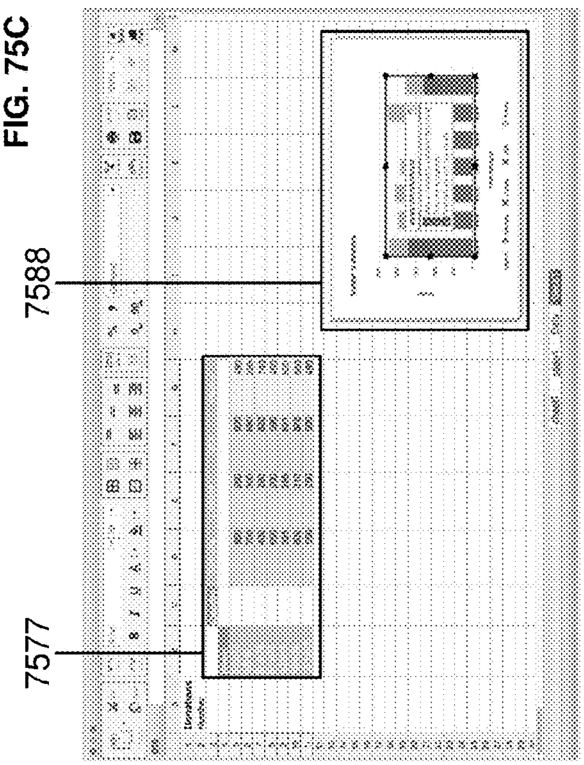
Figure 75A:
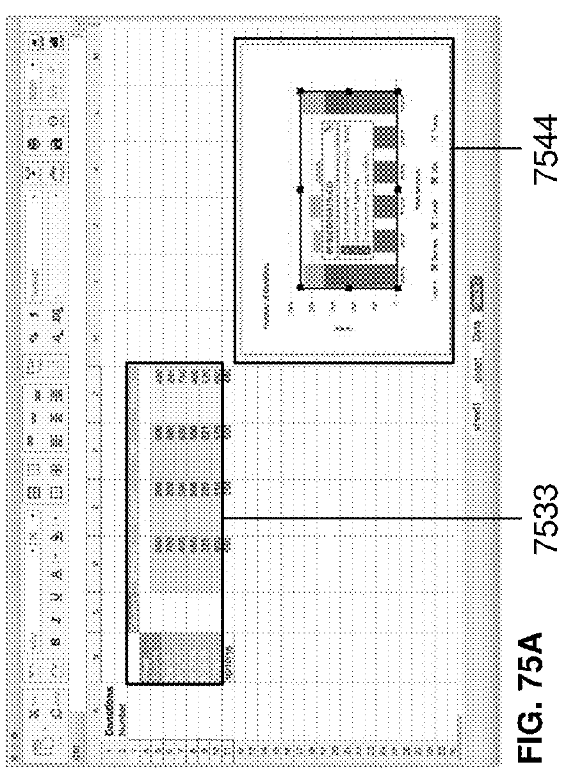
Figure 75D:
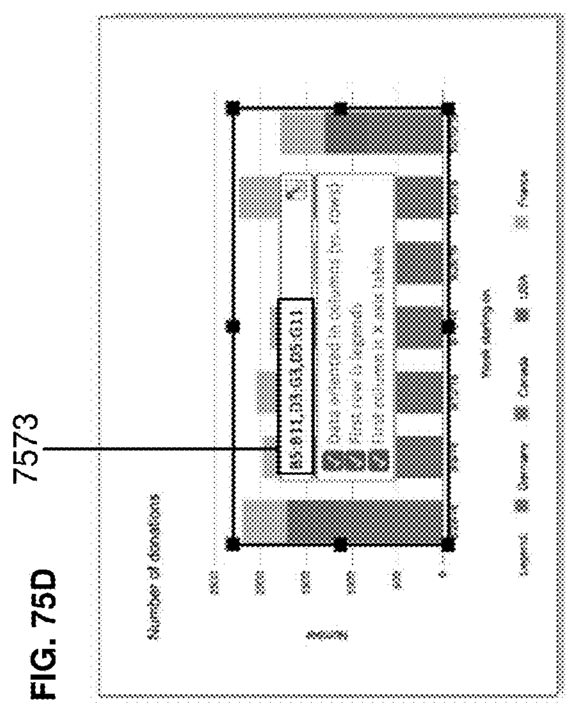
Figure 76:
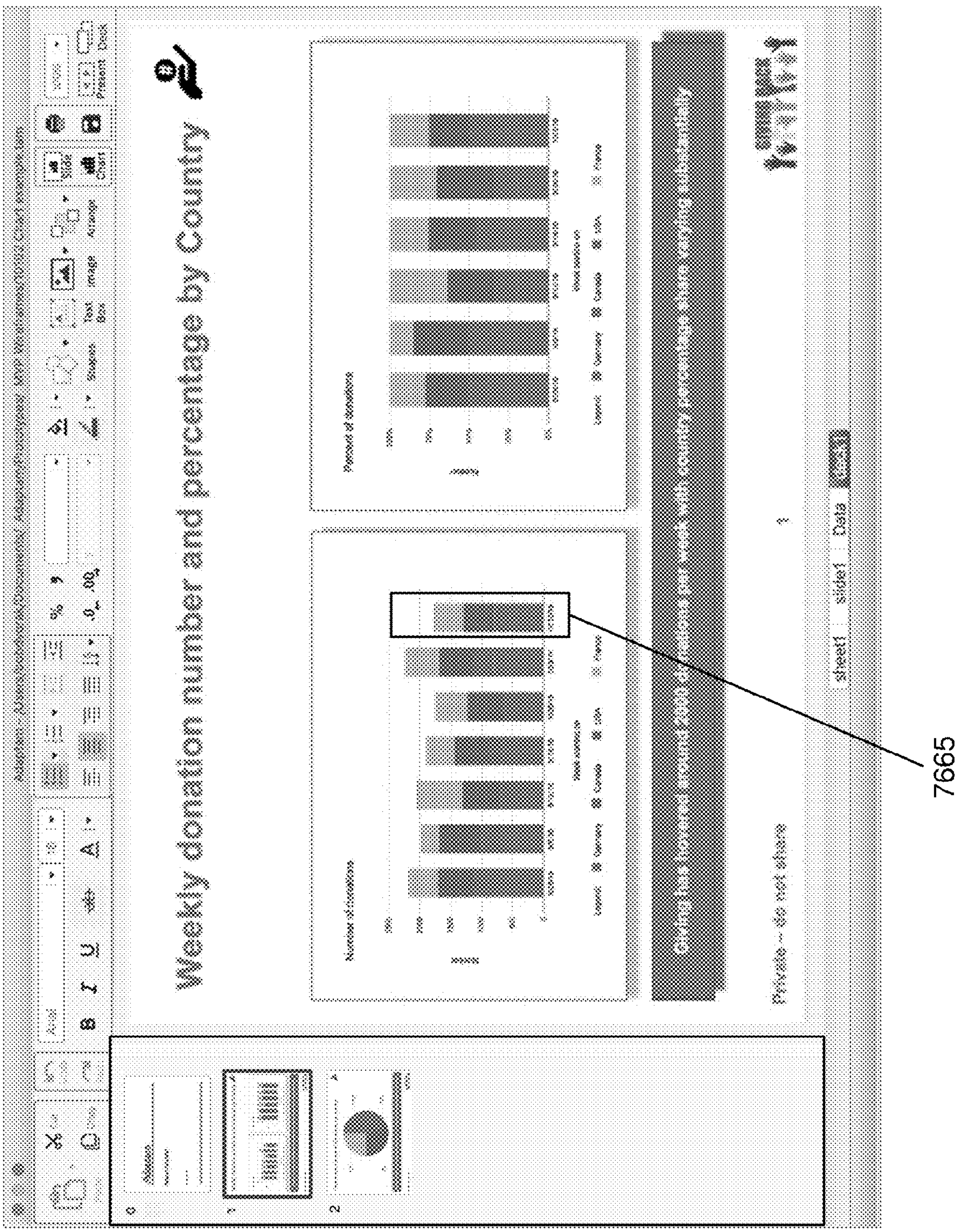

Our technology also makes modifying presentation decks easier. FIG. 74 through FIG. 77 examples a user modifying a chart in a slide in a multi-slide deck ('deck1' tab 7486). FIG. 74 examples a user of this embodiment clicking on the area of a chart that they desire to update 7454. As this chart was created using an on-chart data input, that data input reappears 7464. The user then clicks on the selector button 7455 and it automatically takes them to the worksheet tab that contains the data, with the data highlighted 7533 and a mini version of the chart opened 7544. This mini version of the chart is shown blown up bigger in FIG. 75B with the data input automatically populated in the selection bar 7537. The user then changes the highlighted inputs 7577 as shown in FIG. 75C (adding an additional row of data in 7577 versus 7533), which changes the values in the mini chart 7588 (as shown in the bigger blowup in FIG. 75D 7573) and hits enter (return on a Mac) to be automatically taken back to the chart shown in FIG. 76 with an additional week of data populated in 7665. There was no need to go to ribbons click buttons, go to a pop-up or sidebar then navigate to the data and certainly no need to go from a presentation application like Microsoft PowerPoint or Google Slides and then to a spreadsheet application like Microsoft Excel or Google Sheets and then back to the presentation app. Our seamless integration makes changing spreadsheet charts in presentations a two click seamless process.

Figure 77:
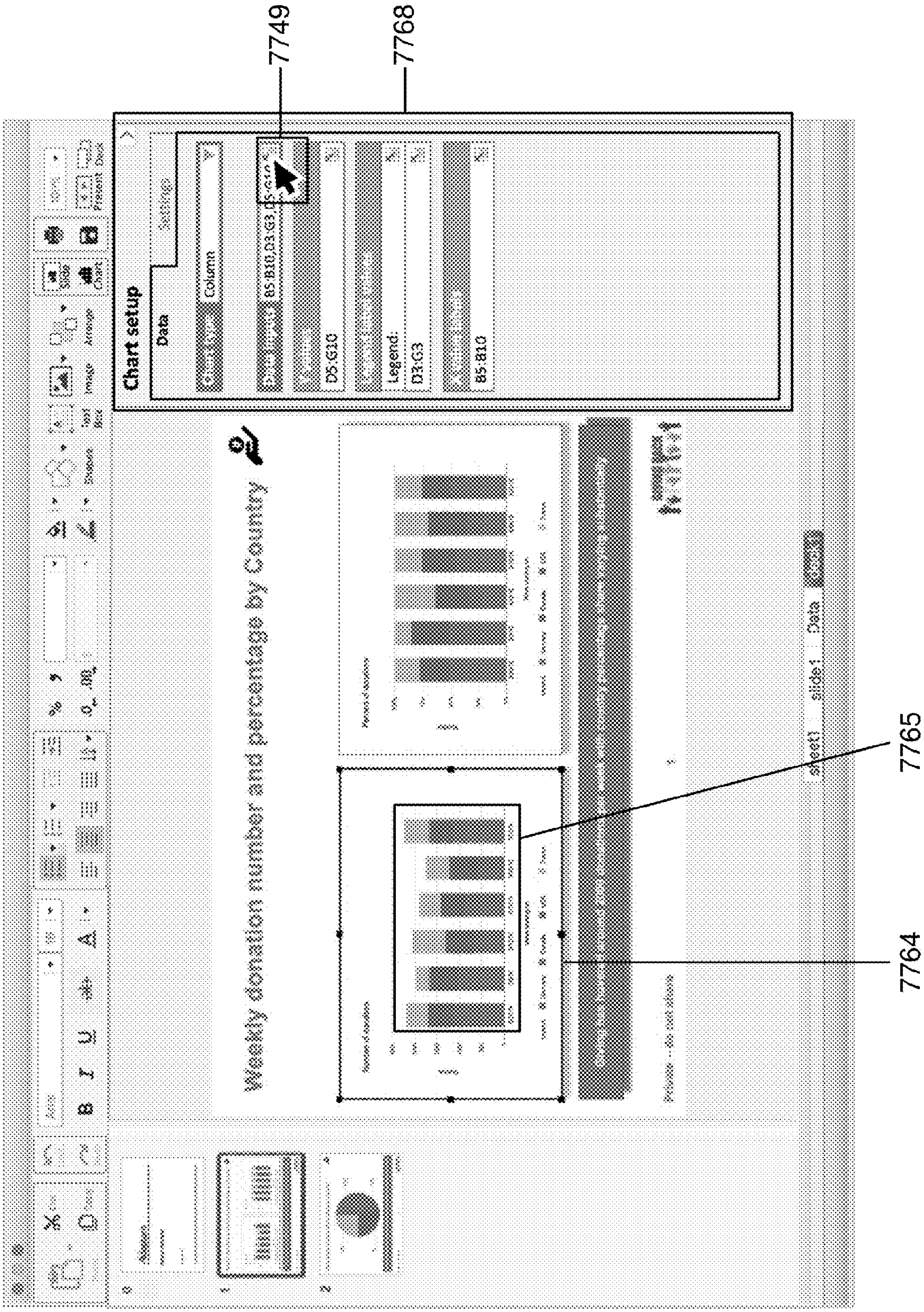
Figure 78A:
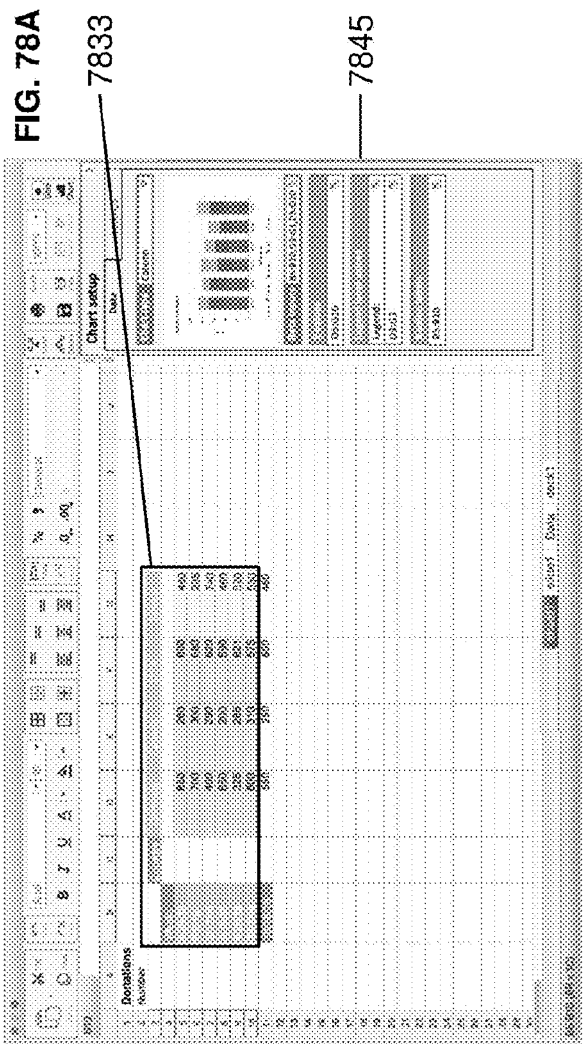
FIGS. 78A, 78B, 78C, 78D and 79 examples a user modifying a chart in a presentation slide or page in a multi-slide deck using a sidebar.
Figure 78B:
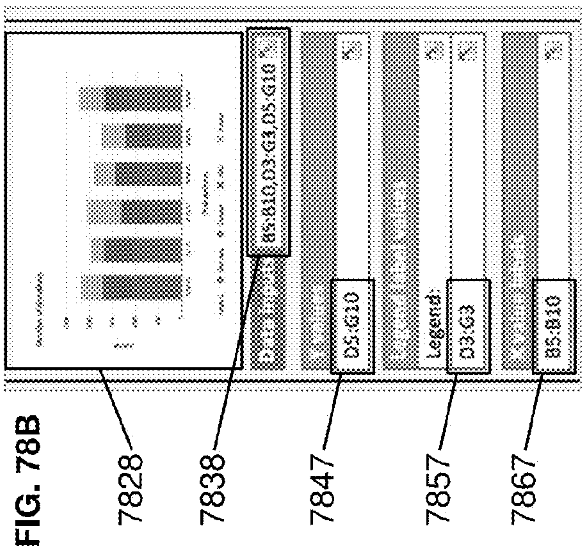
Figure 78C:
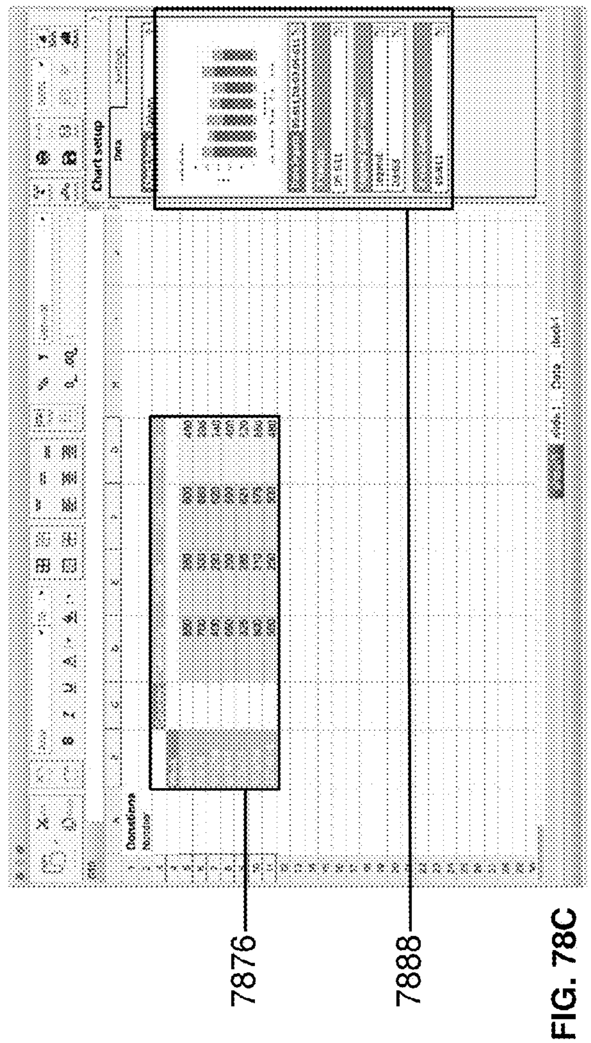
Figure 78D:
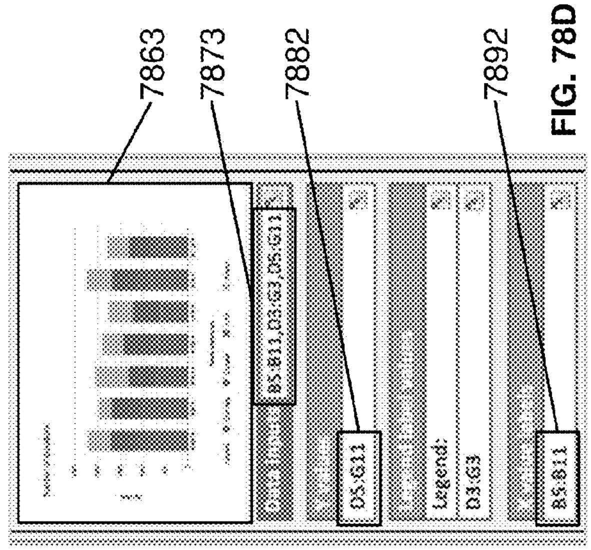
Figure 79:
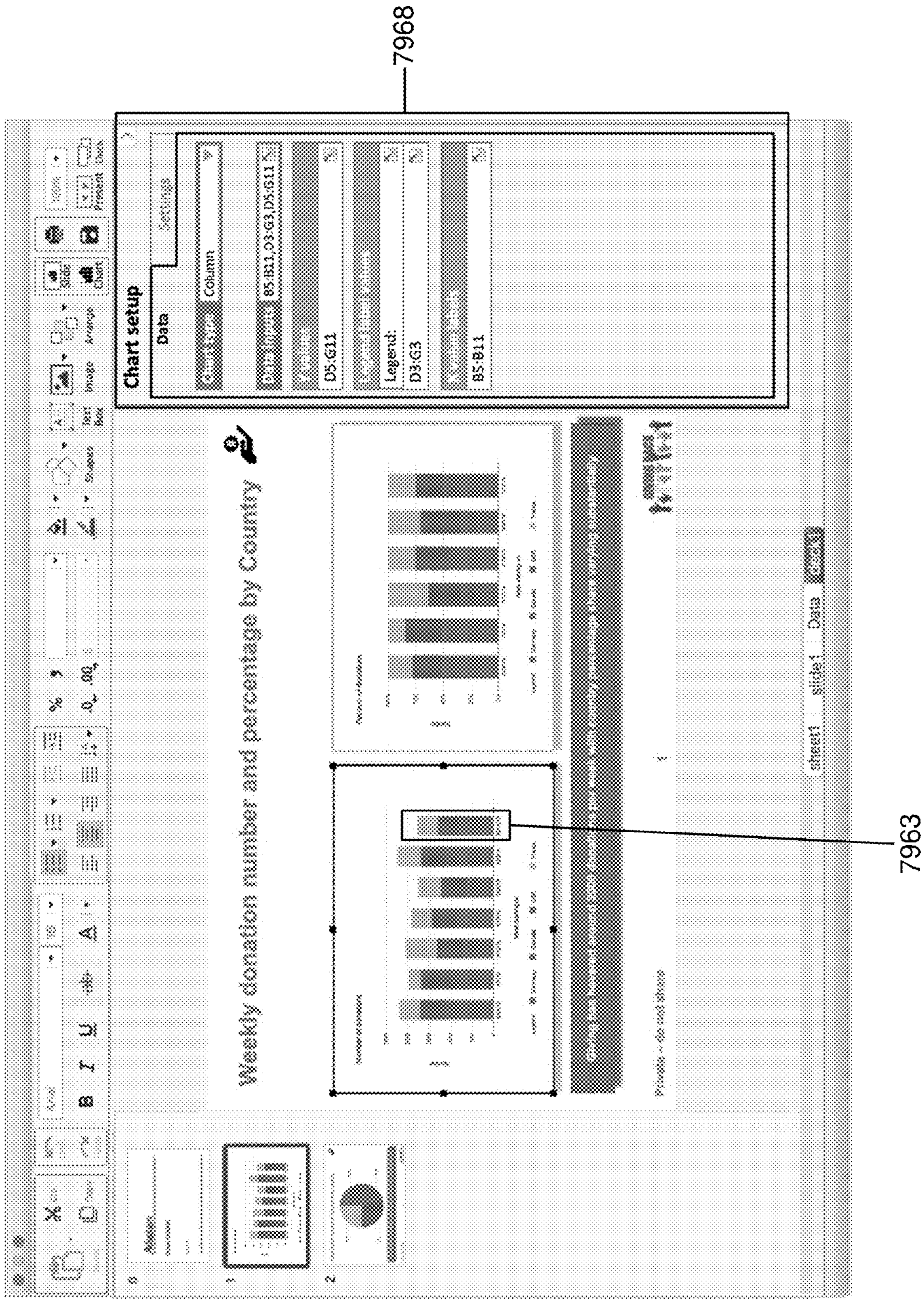

A similar level of simplicity and integration exists for users opting to use a sidebar to modify a presentation chart. FIG. 77 through FIG. 79 examples a user modifying a chart in a presentation slide or page in a multi-slide deck using a sidebar. In FIG. 77 the user has engaged the sidebar 7768 for the chart 7764 (note: in this embodiment clicking on the chart automatically populates the sidebar for that chart). The user then clicks on the selector button 7749 and it automatically takes them to the worksheet tab holding the data, with the data highlighted 7833 (in FIG. 78A) and a mini version of the chart shown in the sidebar 7845 (and blown up larger in FIG. 78B 7828). The user then changes the highlighted inputs 7876 as shown in FIG. 78C (adding an additional row of data in 7876 versus 7833), which automatically changes the values in the mini chart shown in the sidebar 7888 (as shown in the bigger blowup in FIG. 78D 7863) and hits return to be automatically taken back to the chart shown in FIG. 79. Our technology has automatically changed the 'Data inputs' 7838 to 7873, 'Y values' 7847 to 7882 and 'X value labels' 7867 to 7892 as then shown in FIG. 79 7968. The chart in this example has been automatically populated with an additional week of data 7963 versus the starting set 7765. There was no need to go from a presentation application like Microsoft PowerPoint or Google Slides and then to a spreadsheet application like Microsoft Excel or Google Sheets and then back to the presentation app. Our seamless integration makes changing spreadsheet charts in presentations a two click seamless process.

Figure 80:
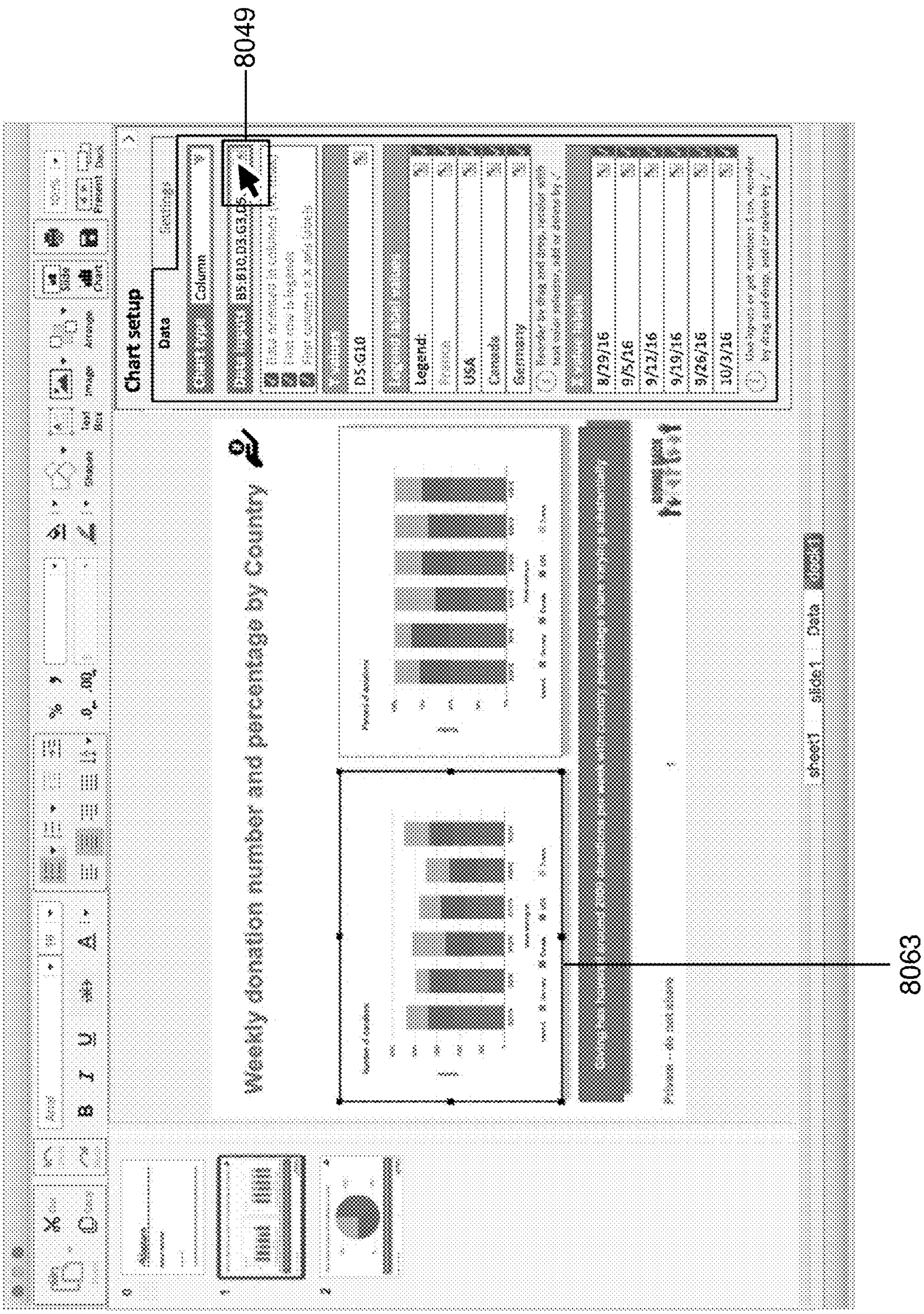
FIG. 80 and FIG. 81 further example the color coordination between chart elements, their proxies and the spreadsheet data from a presentation page or slide and a presentation slide or page in a deck tab.
Figure 81:
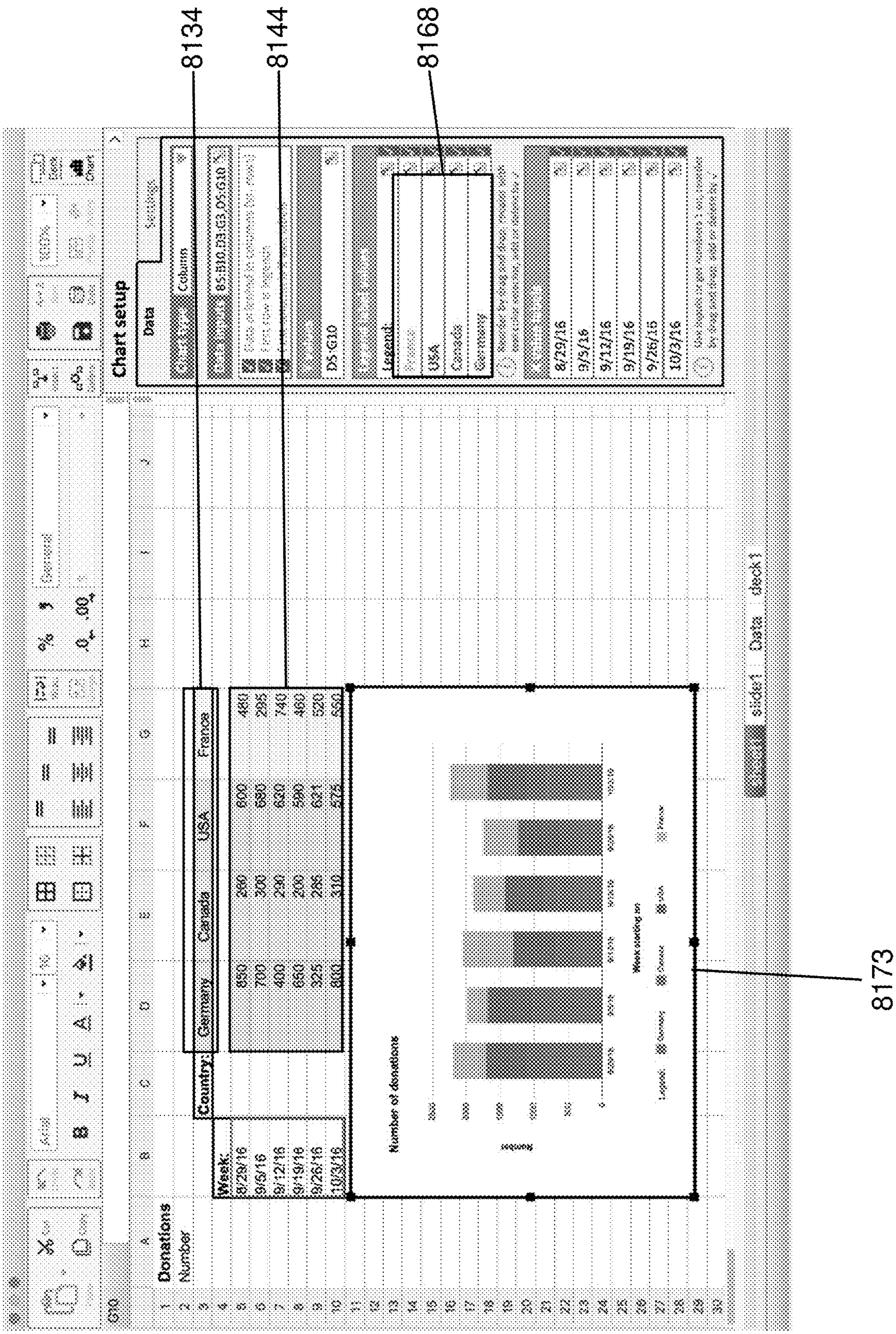

FIG. 80 and FIG. 81 further example the integrated capabilities of our presentation slides and decks with spreadsheet charts. For the highlighted chart 8063 the user can see the color coordination of the chart and its proxies in the sidebar. Clicking on the 'Data inputs' selector button 8049 automatically takes the user to the spreadsheet tab holding the data as shown in FIG. 81. In this embodiment the user sees a smaller version of the chart 8173 not only color coordinated with the sidebar proxies 8168, but color coordinated with the respective parts of the automatically highlighted data 8134 and 8144. Colors of chart elements, the labels or proxies for the chart elements, and fill or font colors of cells holding data represented by the chart elements can be color coordinated. As previously discussed, this makes it easier for the user to see the data to chart relationships and therefore minimize making mistakes setting up or modifying their data selections.

Figure 82B:
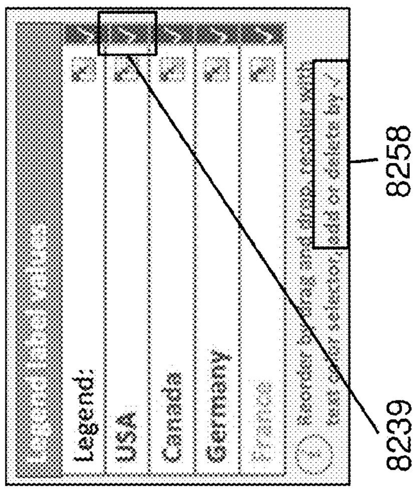
FIGS. 82A, 82B, 82C and 82D example the point and click removal of chart Y values and the related legend content using a sidebar.
Figure 82C:
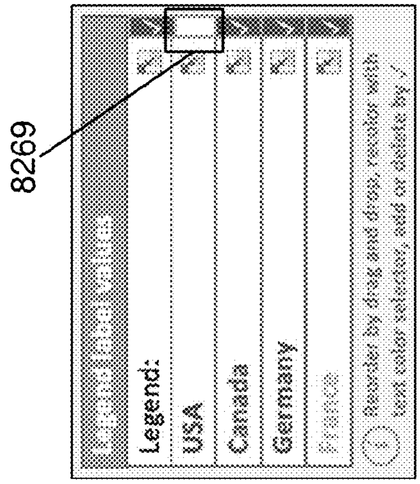
Figure 82A:
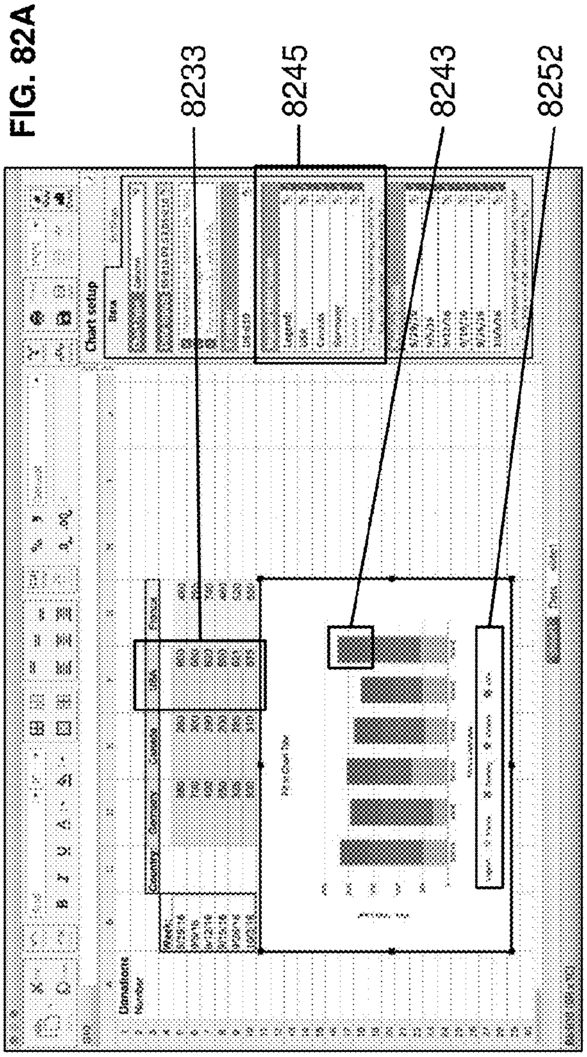
Figure 82D:
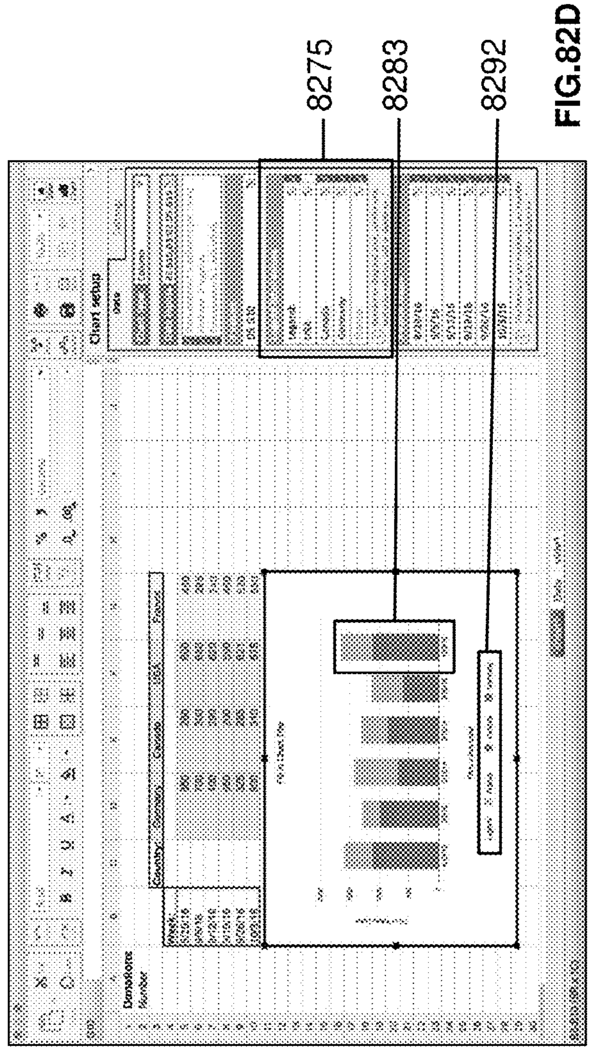
Figure 83A:
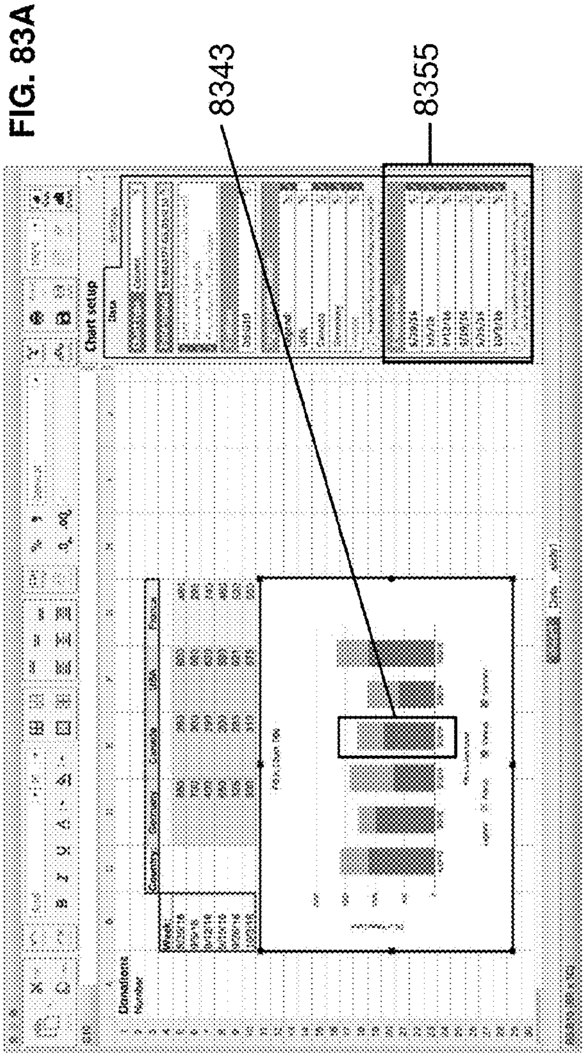
FIGS. 83A, 83B, 83C and 83D example the point and click X axis value removal using a sidebar.
Figure 83B:
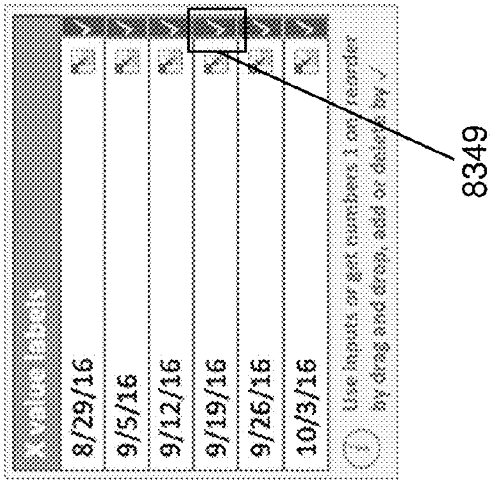
Figure 83C:
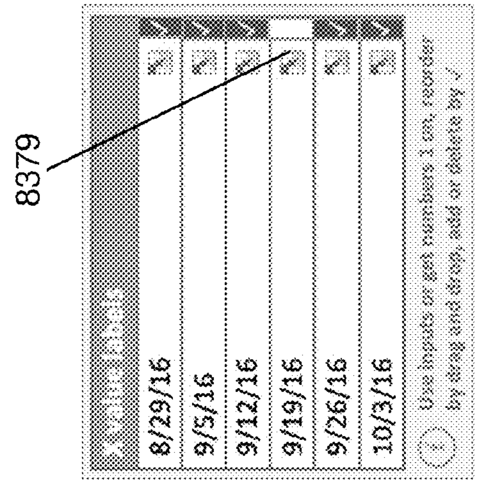
Figure 83D:
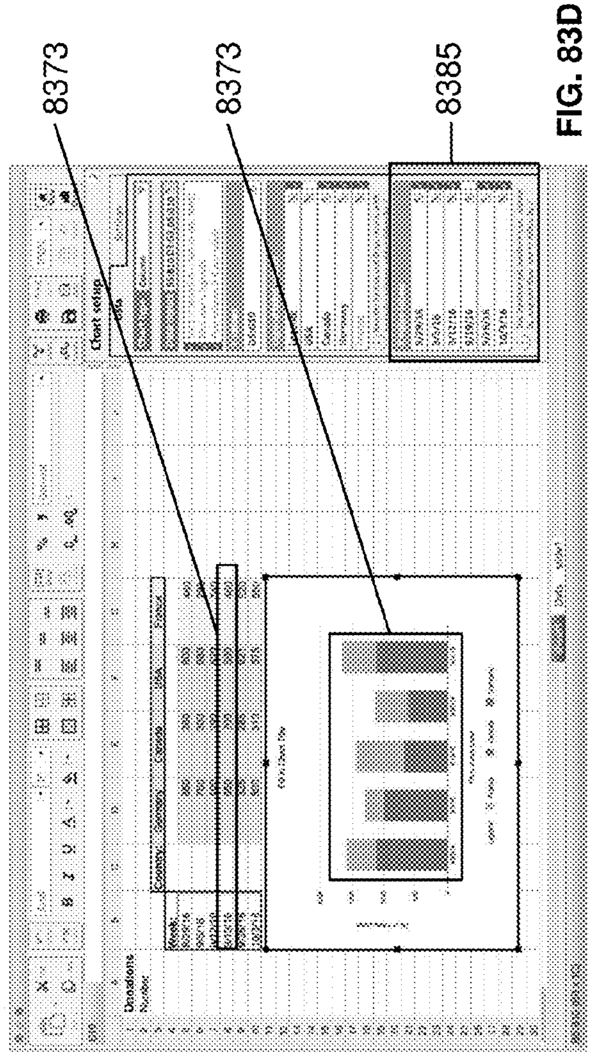

FIG. 82A through FIG. 82D example additional capabilities of our technology to modify a spreadsheet chart without having to modify the data. While these figures show the user making the changes on a chart within the worksheet tab, that chart could be in a chart tab, slide tab, on a presentation page or slide within a deck tab or elsewhere within the spreadsheet application. FIG. 82A shows the user deciding to remove the red top elements of the column as exampled by 8243. In this situation they elect to make the change in the sidebar 8245 which is blown up in FIG. 82B. They decide that they would like to remove the red 'USA' and after reading the instruction 8258 realize to do that they simply need to unclick the check box 8239. They therefore do that as shown in FIG. 82C 8269, a blow up of FIG. 82D 8275 and see the result in 8283 where the red element is gone and gone from all the columns. That element is also gone from the chart legend 8292 (versus in 8252). Thus, making changing the chart point and click simple to remove. And as easy to click to add back one or more data elements with their related legend in this example. What they have effectively done is remove (deselect) the column of data 8233 from the chart (chart group of series in the body and from the legend) without changing the original chart setup and without touching the data the chart was built from.

FIG. 83A through FIG. 83D examples in this embodiment a very similar process to remove X value data and the related Y values. The user decided to remove the data for column 8343 and therefore is going to uncheck the check box 8349 in the sidebar grouping 8355. Once that is done, as shown in FIG. 83C 8379 and FIG. 83D 8385, the user automatically gets the revised chart elements 8373 with the column 8343 removed. As before adding it back is as simple as point and click 8379 rechecking and can be done to as many values as desired by the user. Here what the user has effectively done is remove (deselect) the row of data 8373 from the chart (a series or respective points in multiple series and corresponding X axis labels) without changing the original chart setup and without touching the data the chart was built from.

The combination of the capabilities in FIG. 82A through FIG. 83D allow users to enter non-contiguous (discontinguous) data for a two-dimensional chart in a single selection and then simply remove the rows or columns of the data that are not populated, or the user doesn't want to use. Thereby, creating another way in our technology for the user to enter the non-contiguous data in FIG. 3A and with the removal of the undesired columns and rows generate the chart in FIG. 17C. For a one-dimensional chart, e.g., a pie chart, it is even easier in our technology as the user entering a single block of data only needs to use the legend removal capabilities exampled in FIG. 82A through FIG. 82D to remove any unwanted data to arrive at the desired non-contiguous data.

Figure 87:
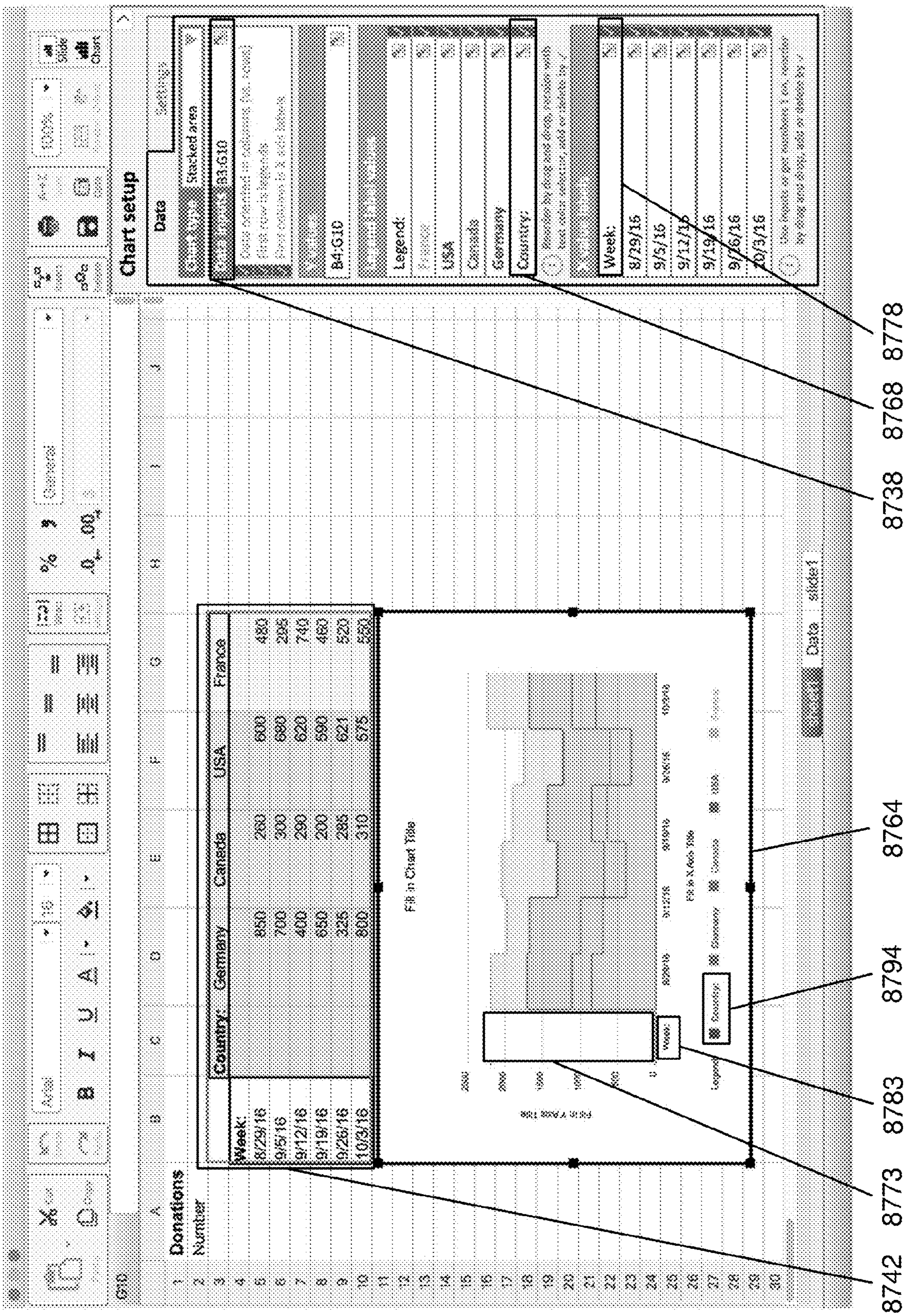
FIG. 87 and FIG. 88 examples a user inputted rectangular range turned into a non-contiguous (discontiguous) data chart using our row and/or column deselecting technology.
Figure 88:
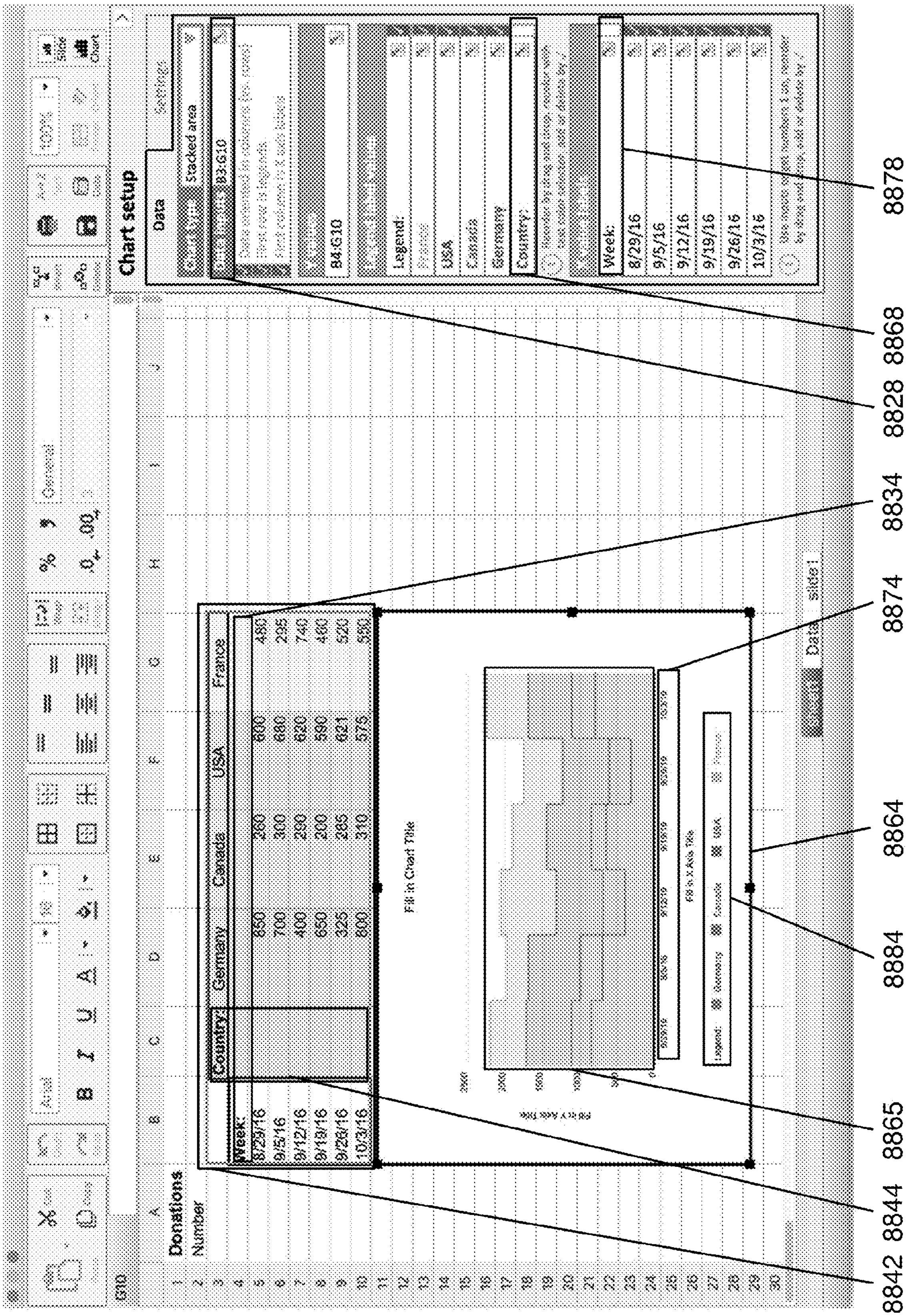
Figure 89:
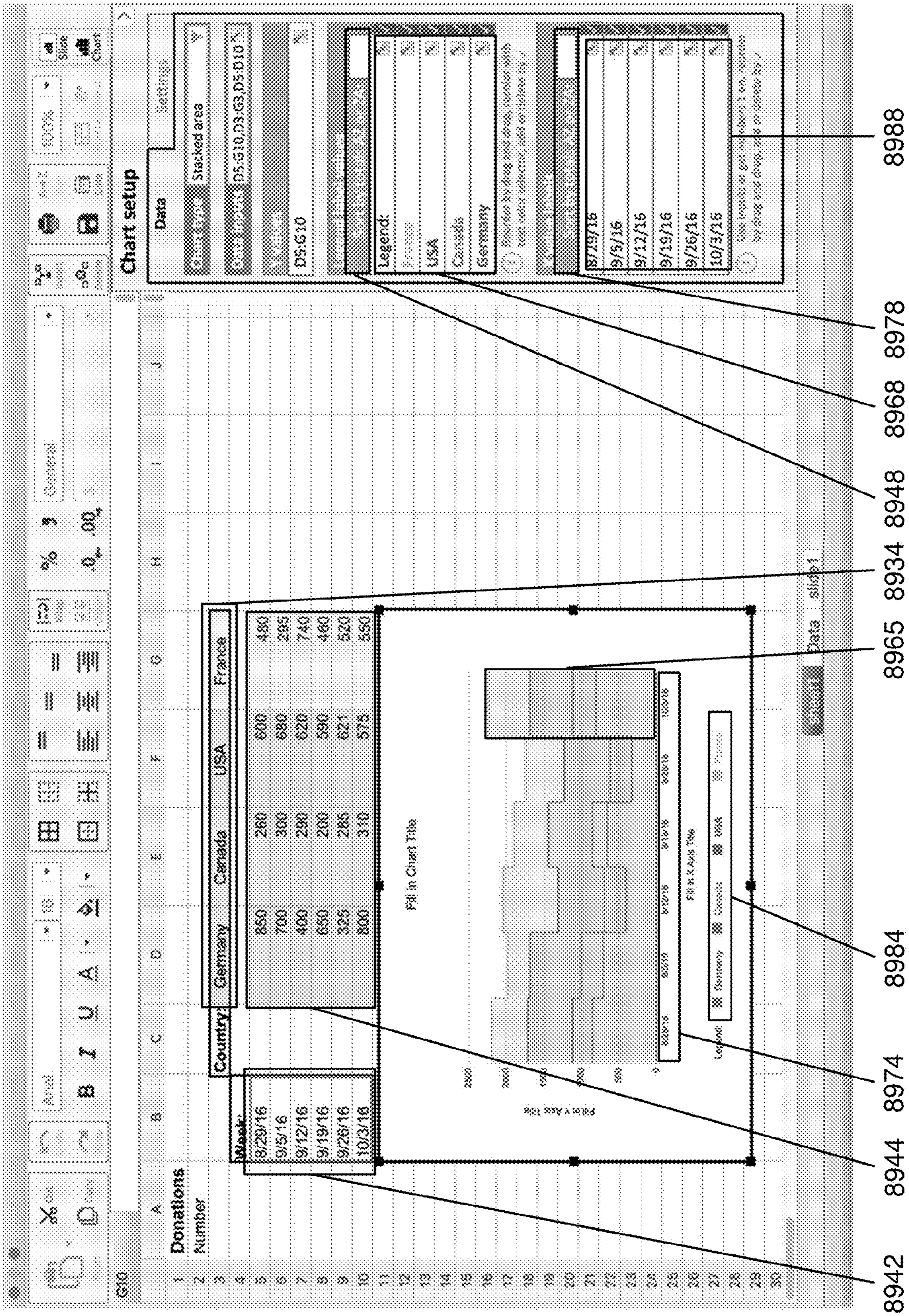
FIGS. 89, 90, 91, 92A, 92B and 92C example a user first using an algebraic automated sort for one dimensions of a two-dimensional chart and then using it for the dimension.

FIG. 87 and FIG. 88 examples that process for a simpler example than that of FIG. 3A however demonstrating the capabilities. The user inputs the single rectangular range of data in cells 'B3:G10' 8742 using the sidebar selector 8738 (although it could also have gone directly onto the chart in other embodiments). This automatically generates the chart 8764 with no data shown in the body of the chart 8773 for the X axis label 'Week:' 8783 and no data shown in the body of the chart (i.e., no purple stacked area) for the purple legend 'Country:' 8794. Although both 'Country:' 8768 and 'Week:' 8778 appear in the sidebar Legend label values and X value labels, respectively. When in FIG. 88 the user unchecks the box for the Legend label value 'Country:' and unchecks the X value label for 'Week:' 8878 they are left with a chart 8864 where the unwanted row 8834 and column 8844 have been removed from the body of the chart 8864 and from the chart legend values 8884 (which no longer show the purple value 'Country:') and the X value labels 8874 (which no longer show the label 'Week:'. However, the spreadsheet source data 8842 is unchanged as are the data inputs 'B3:G10' 8828. This capability of our technology allows a user to enter a contiguous rectangle of spreadsheet data and turn it into any combination of non-contiguous (discontiguous) parts.

Figure 84A:
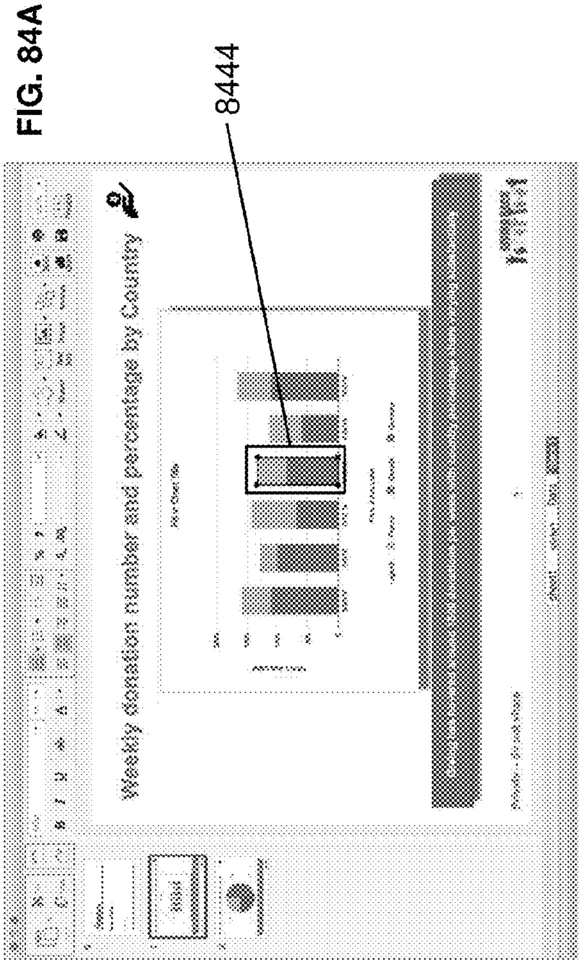
FIG. 84A and FIG. 84B examples highlight and delete X axis value and the related Y values removal on-chart.
Figure 84B:
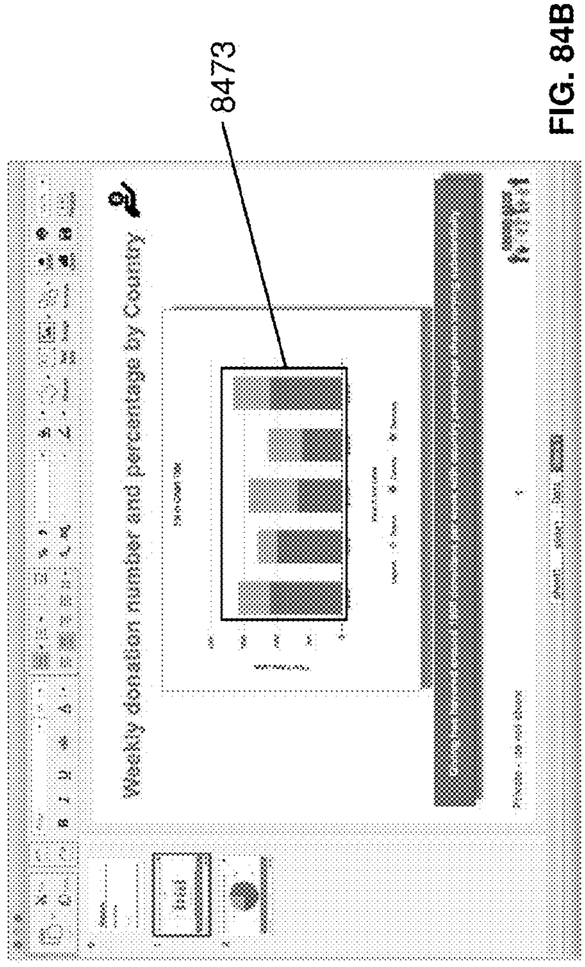

Making the same modification removing or adding back data with on-chart data inputs is a similarly simple operation in our technology. FIG. 84A and FIG. 84B example removing X value and the related Y values data on-chart. In one embodiment of our technology the user simply needs to highlight the data they want to remove 8444 and delete it. The result is shown in FIG. 84B 8473 which has five columns missing the deleted column 8444. In other embodiments the same effect could be done by removing the X label value which in this example is the date '9/19/16'. Adding back the data can also be accomplished on-chart. In one embodiment of our technology shown in FIG. 85 that is accomplished by highlighting all of the 'X axis label values' on the chart and clicking into them to expose the input bar and selector 8565. This also triggers popping up a related check box list 8574 which allows the user to add back an unchecked value or remove further values by clicking on the check boxes. Again, a different embodiment would involve clicking in this example on the columns generated by the Y values and getting a similar opportunity to add back or further remove data. Like previously exampled this can be done on the other dimensions of the data, which in this example would be adding back to the Legend or removing more of the Legend countries. Making the changes require a couple of clicks and having them originate on the chart element which the user is looking to impact. Our technology offers users the opportunity to change spreadsheet generated charts easily no matter where that chart resides, in a worksheet, in a chart tab, in tab with full slide or page presentation capabilities, in tab with multiple slide or page presentation capabilities or in some other place within the spreadsheet.

Computer System

Figure 86:
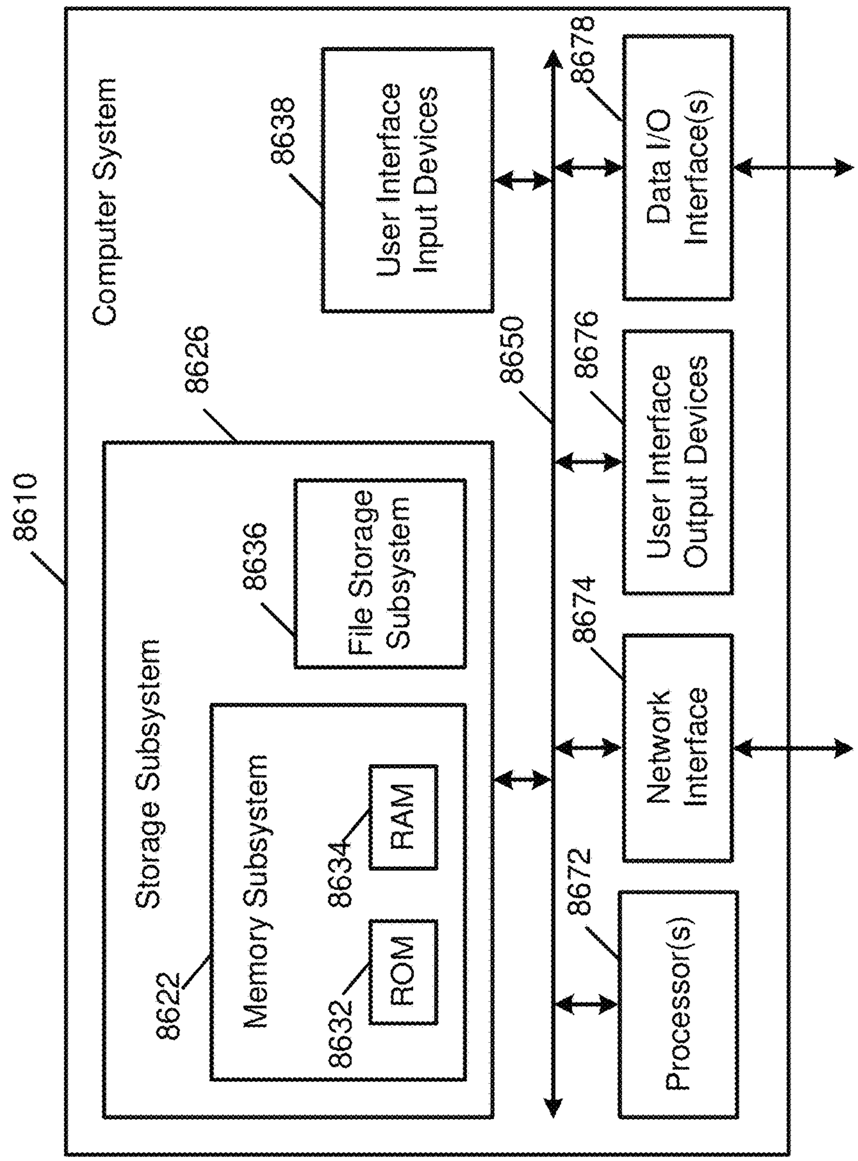
FIG. 86 depicts an example computer system that can be used to implement aspects of the technology disclosed.

FIG. 86 is a block diagram of an example computer system 8600, according to one implementation. Computer system 8610 typically includes at least one processor 8672 which communicates with a number of peripheral devices via bus subsystem 8650. These peripheral devices may include a storage subsystem 8626 including, for example, memory devices and a file storage subsystem, user interface input devices 8638, user interface output devices 8676, data I/O interfaces 8678, and a network interface subsystem 8674. The input and output devices allow user interaction with computer system 8610. Network interface subsystem 8674 provides an interface to outside networks, including an interface to communication network, and is coupled via communication network to corresponding interface devices in other computer systems or in the cloud and usable for cloud applications.

User interface input devices 8638 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 8610 or onto communication network.

User interface output devices 8676 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 8610 to the user or to another machine or computer system.

Storage subsystem 8626 stores programming and data constructs that provide the functionality of some or all of the modules and methods described herein. These software modules are generally executed by processor 8672 alone or in combination with other processors.

Memory 8622 used in the storage subsystem can include a number of memories including a main random-access memory (RAM) 8634 for storage of instructions and data during program execution and a read only memory (ROM) 8632 in which fixed instructions are stored. A file storage subsystem 8636 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 8636 in the storage subsystem 8626, or in other machines accessible by the processor.

Bus subsystem 8650 provides a mechanism for letting the various components and subsystems of computer system 8610 communicate with each other as intended. Although bus subsystem 8650 is shown schematically as a single bus, alternative implementations of the bus subsystem may use multiple busses.

Computer system 8610 can be of varying types including a workstation, server, computing cluster, blade server, server farm, or any other data processing system or computing device. Due to the ever-changing nature of computers and networks, the description of computer system 8610 depicted in FIG. 86 is intended only as one example. Many other configurations of computer system 8610 are possible having more or fewer components than the computer system depicted in FIG. 86.

Some Particular Implementations

Some particular implementations and features are described in the following discussion.

The technology disclosed can be practiced as a method, system or computer readable media.

A method implementation wherein the user modifies a spreadsheet chart without having to modify the data or redo the setup of the chart. Where instead a user uses a deselection control, on-chart, in a side bar or on a popup panel to deselect a row or column of the inputted data as show in FIG. 82A through FIG. 82D deselecting from the legend the 'USA' 8269 which represents a column of data 8233 and automatically updates the chart removing that data from the body of the chart (chart group series) 8283 and the chart legend 8292. Where for a two-dimensional chart there are separate control parts for controlling the deselection of the rows and columns of the data fed to the chart. As exampled in FIG. 82A through FIG. 82D for a data column and in FIG. 83A through FIG. 83D for a row situation. Realizing that the row and column orientations switch with the orientation of the data inputs. These controls then also support the adding back of any deselected data by a single click letting the user easily change their selections or respond the requests to show different views of the data.

The deselection controls can be in different locations. In an implementation of our technology the deselection controls are on-chart as exampled in FIG. 85 8574. In another implementation the deselection control is in a side bar as exampled in FIG. 82A through FIG. 83D. Similarly, the deselection control could be in a pop-up panel. All of which could then support the deselection to be executed by a single user click as shown in FIG. 82A through FIG. 82D. The result is that without touching the data or changing the chart setup, meaning how the chart was originally created, the user has changed that chart and effectively made the data discontiguous. These actions can be done for one-dimensional charts and are simply limited then to a single dimension usually thought of as the legend, e.g., the slices of the pie.

In another embodiment of our technology the spreadsheet chart generation capability places data input locations on the user selected chart proximate to the chart element the data populates, as exampled in FIG. 15 through FIG. 17B, and FIG. 19A through FIG. 20. In the example figures, controls are positioned to overlay the body of the chart. These controls can be positioned at or adjoining the chart feature for which input is provided. For instance, in FIG. 17C, the chart title input control is positioned where the chart title is. Alternatively, this control could be positioned adjoining to the feature. Or it could be within half an inch on the screen of where the feature is. Those inputs accept typed values, typed cell references and selector supported cell or cell range selections, as exampled in FIG. 17A, FIG. 17B and FIG. 44. Those inputs generate results, as exampled in FIG. 17C (Y values) and FIG. 18C Chart, X axis and Y axis titles). The input controls also accept drag and drop and/or special copy paste of cell references populating values, as exampled in FIG. 20 through FIG. 24. Those results can be reopened, as exampled in FIG. 18B and FIG. 18C, and the inputs changed to generate new results, as exampled in FIG. 55 through FIG. 57. Different input variants are exampled in FIG. 19A and FIG. 19B exampling situations where the Legend and axis labeling proxy value are separately inputted and therefore their input controls show up separately on the chart proximate to the values that they populate.

In an embodiment, exampling a one-dimensional chart like the Pie Chart, wherein the spreadsheet chart generation capability places data input locations on the user selected chart proximate to the chart element the data populates, as exampled in FIG. 25 through FIG. 30B. The input controls accept typed values, typed cell references and selector supported cell or cell range selections, as exampled in FIG. 24 through FIG. 27. Those inputs generate results, as exampled in FIG. 27 (Pie slice values). The input controls also accept drag and drop and/or special copy paste of cell references populating values, as exampled in FIG. 28 through FIG. 30B. Those results can be reopened and altered as exampled for the other chart variants and the Legend labeling proxy values can be separately inputted, as exampled in FIG. 30A and FIG. 30B.

So, using drag and drop population as an example in this embodiment the user highlights a rectangle of cells in the spreadsheet 2954 (in FIG. 29) representing the series of data points for the chart body (pie slices) to the control 2964 in the center of the pie chart body populating the data in the slices 2968. The user then selects a second range of cells 3043 (in FIG. 30) dragging that range from the spreadsheet to the chart control 3074 which is where a legend frequently is positioned. Upon dropping the legend immediately displays. FIG. 21A through FIG. 23B examples the same process applied to creating a two-dimensional stacked column chart. This technology then applies to other one and two-dimensional charts and can be applied to charts adding a third dimension using other modes of selecting the data.

In another embodiment the starter illustrative or initial input populated chart auto populates the title inputs on the chart as exampled in FIG. 17A and FIG. 17C. Those title inputs accept typed inputs and selector supported cell inputs as exampled in FIG. 18A through FIG. 18C.

In another embodiment one or more of the data input controls can also be done in a data setup sidebar, popup and/or dropdown as exampled in FIG. 32 through FIG. 35. Chart settings can be done on-chart as exampled in FIG. 31 or via a sidebar or other visual as exampled in FIG. 32. Data inputs can also be done via sidebar, popup and/or dropdown controls as exampled in FIG. 33 through FIG. 35 and facilitate chart data changes as exampled in FIG. 58 through FIG. 60.

To improve modifying content of existing charts another embodiment of our technology improves the ease of reordering data so that users do not have to change the worksheet source data or source data inputs and do not have to learn and remember obscure capabilities or remember and execute multiple ribbon, pop-up and button exercises. They instead can do a very simple drag and drop of what they want to move on-chart or via its sidebar, pop-up dropdown or other visual proxy as exampled in FIG. 41A through FIG. 42D and FIG. 45A through FIG. 45D.

In another embodiment the chart and chart sidebar, a pop-up, dropdown or other visual labeling proxy order (for legends and X axis labels) mirrors the order of the chart content (Y values or Pie slices) as exampled in FIG. 42A through FIG. 42D, FIG. 45A through FIG. 49C. A variant of that embodiment for charts with labels without a specified order, e.g., line charts or scatter charts, orders those proxy labels (e.g., legend values) using algebraic order (e.g., average values) as exampled in FIG. 50. An additional variant of those embodiments automatically changes the order of the on-chart proxy labels (legend) when their position is changed (e.g., from below the chart content to above it).

In another embodiment the user can elect to utilize variants of our automated algebraic order (e.g., average values or totals) technology to alter the order of the data in the body of the chart and its associated labels. FIG. 89 through FIG. 92 example a user first using an algebraic automated sort for one dimensions of a two-dimensional chart and then using it for the other dimension. That technology could be applied to one-dimensional chart with the algebraic automation working on the single dimension, e.g., the ordering of the sliced of a pie chart.

In an embodiment to minimize input and changing input errors the source data cells for the colored chart elements data cells are similarly superimposed with their respective chart element colors and/or the chart proxies are color coordinated to match the chart contents—as exampled in FIG. 36, FIG. 53 and FIG. 54. Where that color coordination extends to the on-chart and sidebar and/or pop-up panel chart proxy controls.

In another embodiment to minimize erroneous charts and user data entry errors, error and warning messages are generated for particular inputs as exampled in FIG. 63A through FIG. 64B. These messages can be generated based on detection of mismatches among respective series and/or axis labels.

In another embodiment the on-chart proxy labels (e.g., legend values) can be moved by the user dragging and dropping or cutting and pasting them within the chart or even outside of the chart boundaries as a group or individually and retain their ordering relationships as exampled in FIG. 43A through FIG. 44D.

Another embodiment of our technology addresses the ease of modifying chart data inputs for a chart not located in the worksheet from which the data is sourced. Where the user does not need to remember and navigate ribbons, sidebars, buttons, popups and selections to modify inputs. Instead, when the user starts to change the input it automatically takes them to the worksheet and the cell or cells that populated the input ready to make a change and once input is reclosed our technology automatically takes the user back to the chart executing any changes as exampled in FIG. 55 through FIG. 60.

Figure 42C:
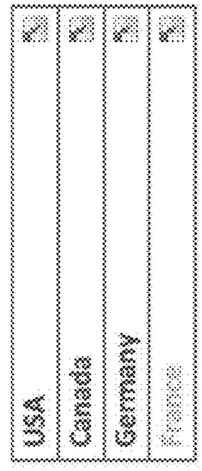
Figure 42D:
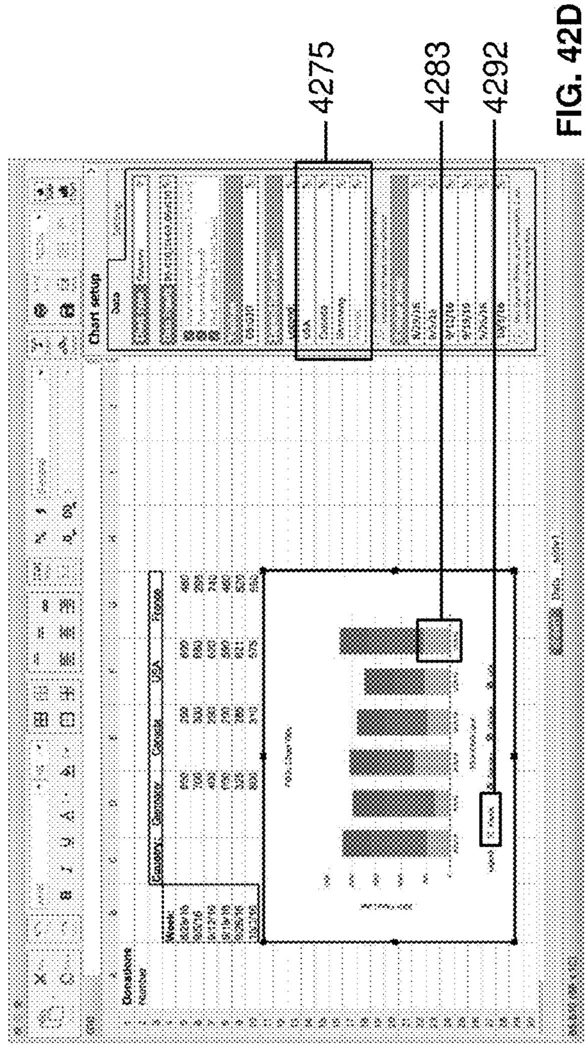

FIG. 55 through FIG. 57 examples an embodiment wherein the data input is on-chart. Once the user clicks on the data (stacked columns) in FIG. 55 the user is automatically taken to the worksheet where the data resides with the data highlighted and has a mini version of the chart visible as shown in FIG. 56A and FIG. 56B. The user can then change the data selections either by changing the highlighting or typing the new cell references as shown in FIG. 56C and FIG. 56D. Once they hit enter or return on those changed values they are automatically taken back to the chart with the changes made as shown in FIG. 57. FIG. 58 through FIG. 60 examples an embodiment wherein the data input is within a sidebar, pop-up, dropdown or other visual rather than on chart. Triggering the Data input change in the control in FIG. 58 also automatically takes the user to the worksheet where the data resides with the data highlighted and has a mini version of the chart visible in the sidebar as shown in FIG. 60A and FIG. 60B. The user can then change the data selections either by changing the highlighting or typing the new cell references as shown in FIG. 42C and FIG. 42D. Once they hit enter or return on those changed values they are automatically taken back to the chart with the changes made as shown in FIG. 60. Later embodiments where the data in the spreadsheet is color coded to match the graphic elements in chart will make this process even more intuitive, A set of embodiments in our technology provide the user with different levels of chart presentation capabilities well beyond current spreadsheet chart tabs. A slide or page capability we labelled a slide tab that allows the user to create a complete presentation page displaying multiple spreadsheet charts surrounded by full presentation content. A full presentation capability, we labelled a deck tab, allows a user to create a complete presentation made up of many pages within a single spreadsheet tab. Where this and the slide tab can be put into a presentation mode for easy viewing and navigation from slide (or page) to slide (or page).

The starting presentation embodiment of our technology provides presentation page capabilities. A presentation slide or page that holds one or more chart as exampled in FIG. 69A through FIG. 71, which can add text boxes, shapes, and images anywhere on the page as exampled on FIG. 70, has a ribbon for selection of text boxes, shapes images as well as formatting as exampled on FIG. 69C and can be put into presentation mode where only the content of the page is visible and page to page navigation can be done by keystroke, mouse click or other simple mode as exampled in FIG. 71 through FIG. 72.

Another embodiment wherein the presentation page is held within a dedicated spreadsheet tab as exampled in FIG. 69C. And another embodiment wherein the presentation slide (or page) or slides (or pages) are held in a multi-panel visual including an ordering visual with multiple slide or page representations, a current view presentation slide or page canvas and the ribbon as exampled in FIG. 73. And where that multi-panel visual is held within a spreadsheet tab as exampled in FIG. 73. Whereby a user can have multiple presentations held with separate tabs within a spreadsheet allowing use of the same chart and even the same pages across presentations.

In another embodiment the presentation page and/or presentation page in the multi-panel visual can hold one or more spreadsheet chart with seamless on-chart ability for making changes as exampled in FIG. 74 through FIG. 77. Where those changes automatically trigger accessing the worksheet and cells inputted into the chart and automatically returns the user to the chart once the inputs are reclosed. And those seamless changes can be executed via a sidebar or other visual as exampled in FIG. 77 through FIG. 79. That chart content and their proxies are color coordinated to the chart elements as exampled in FIG. 80 and FIG. 81.

In another embodiment of our technology the user can enter discontinuous data by adding the data in one large rectangle and then removing the unwanted rows and/or columns in that rectangle to use the discontinuous data desired. Automatically generating the chart from the non-contiguous (discontiguous) data ranges within the selected rectangle ignoring the deselected data as example in FIG. 87 and FIG. 88 using the data removal capabilities exampled in FIG. 82A through FIG. 85. That can be done for a chart populated from a spreadsheet using a sidebar or popup, as exampled in FIG. 87 and FIG. 88 or populated directly onto and modified on the chart, as exampled in FIG. 85. In the prior embodiments and most of the forthcoming embodiments the data population into the chart from the spreadsheet can use a selector, drag and drop, copy paste or preselection. This technology can be applied to other two-dimensional charts and work in a simplified manner for one-dimensional chart like the pie chart where the data entry is simplified to a single dimension.

Figure 27:
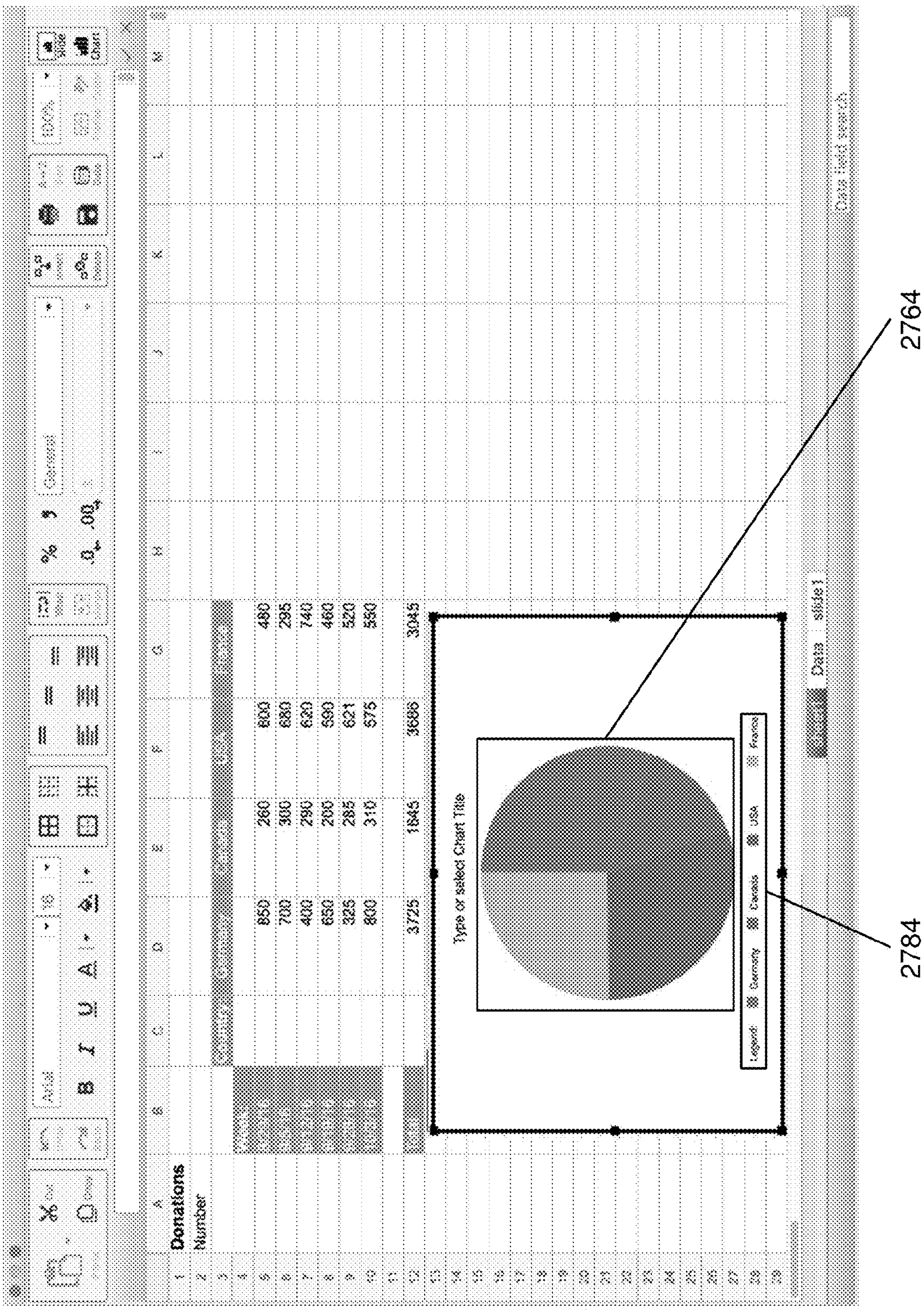

A method implementation wherein the user automatically generates a chart from a selection of non-contiguous (discontiguous) spreadsheet cell data as exampled for a one-dimensional pie chart in FIG. 26 and FIG. 27 and for a two-dimensional stacked column chart in FIG. 17A through FIG. 17C. Where that chart includes the elements/chart body of the chart (e.g., the pie and slices of a pie chart or the columns containing the stacks in a stacked column chart) and the associated labels (e.g., the legend and/or pie slice labels in a pie chart or the legend and/or stack labels and X axis labels in a stacked column chart). The automatically generated chart ignores all of the content of the data between the non-contiguous (discontiguous) selected areas of the spreadsheet. Note that the top left cell in the two dimensional graph is unused and not selected. Selection can be applied directly to cells or using a sidebar control or a panel control. The sidebar or panel can include checkboxes as illustrated or an equivalent control such as a radio button, Wherein the application accommodates data oriented in columns or in rows as exampled by the user checkbox selection 'Data oriented in columns (vs. rows) in FIG. 18C 1877 and FIG. 26 2673. And any data orientation changes can be made on chart as exampled in FIG. 18C 1877 or in a sidebar, popup or other visual as exampled in FIG. 33 3358.

Additional Implementations

Additional implementations of the technology disclosed are stated in the following clauses:

1. A method of revising a chart linked to at least one range of cells in a spreadsheet, including:
   - providing a deselection control that deselects a row or a column from the range of cells in the spreadsheet, wherein the deselection control is on-chart, in a sidebar, or on a pop-up panel;
   - receiving a deselection signal from a user for a first row or a first column in the range of cells; and
   - automatically updating the chart from the range, following deselection of the first row or the first column, and immediately causing display of the updated chart.

2. The method of clause 1, wherein the chart is two dimensional, further including providing the deselection control with separate control parts for the rows and the columns used to update the chart.

3. The method of clause 1, further including:
   - providing the deselection control on-chart including controls connected to graphic elements representing data from individual cells by lead lines to the graphic elements or controls positioned on the graphic elements; and
   - receiving the deselection signal from user interaction with the on-chart control.

4. The method of clause 1, further including:
   - providing the deselection control on-chart including controls connected to at least one graphic element representing labels on an axis and popping-up a list of the labels on the axis; and
   - receiving the deselection signal from user interaction with the on-chart control.

5. The method of clause 1, further including:
   - providing the deselection control in the side bar including controls representing the rows and the columns by labels for respective rows and columns in the range of cells.
   - receiving the deselection signal from user interaction with the sidebar control.

6. The method of clause 1, further including:
   - providing the deselection control in the pop-up panel including controls representing the rows and the columns by labels for respective rows and columns in the range of cells.
   - receiving the deselection signal from user interaction with the pop-up panel control.

7. The method of clause 1, further including the deselection control configured to permit the deselection of the row or the column by single click.

8. The method of clause 1, further including the deselection control configured to permit the deselection of the row or the column by single action.

9. The method of clause 1, wherein the deselection produces discontiguous ranges of cells in the spreadsheet.

10. The method of clause 1, further including
   - providing a sidebar control for the deselection of rows in the rectangle; and
   - receiving the deselection of the first row from user interaction with the sidebar control.

11. A method of building a chart, including:
   - causing display of a chart including targets for drag and drop composition;
   - receiving first drag and drop signals resulting from a user dragging a first rectangle of cells in a spreadsheet onto a first target representing a group of one or more series on a chart body of the chart;
   - responsively, populating the group of series using the first rectangle of cells and immediately causing display of chart elements linked to the first target;
   - receiving second drag and drop signals resulting from user dragging a second rectangle of cells in the spreadsheet onto a second target representing labels of a legend; and
   - responsively, populating the labels using the second rectangle of cells and immediately causing display the legend.

12. The method of clause 11, wherein the chart is a stacked column chart and the legend comprises labels either in a separate box with a color key or overlaying graphic elements of at least one stack.

13. The method of clause 11, wherein the chart is a pie chart and the legend comprises labels on slices of the pie chart or visually linked by lead lines to the slices.

14. A method of building a chart from source and target selection of components of the chart, including:

causing display of a spreadsheet including cells and display of the chart including targets for the components;

receiving first cell source and target selection signals resulting from a user selecting a first rectangle of cells in the spreadsheet and selecting a first target representing a group of one or more series on a chart body of the chart;

responsively, populating the series using the first rectangle of cells and immediately causing display of chart elements, for the series, linked to the first target;

receiving second cell source and target selection signals resulting from the user selecting a second rectangle of cells in the spreadsheet and selecting a second target representing labels of a legend; and responsively, populating the labels using the second rectangle of cells and immediately causing display of the legend.

15. The method of clause 14, wherein the first and second cell source and target selection signals are generated from the user dragging and dropping a rectangle of cells from the spreadsheet onto the first or second target.

16. The method of clause 14, wherein the first and second cell source and target selection signals are generated from the user selecting a rectangle of cells in the spreadsheet followed by selecting of one of the targets.

17. The method of clause 14, wherein at least one of the first and second cell source and target selection signals are generated from the user selecting of one of the targets followed by selecting of a rectangle of cells in the spreadsheet.

18. The method of clause 14, further including:

receiving third cell source and target signals resulting from the user selecting a third rectangle including a cell in the spreadsheet and a third target representing a legend title for the legend and the labels;

responsively, populating the legend title using the third rectangle and immediately causing display of the legend title.

19. The method of clause 14, further including:

receiving fourth cell source and target signals resulting from user selection of a fourth rectangle including a cell in the spreadsheet and a fourth target representing a overall title for the legend and the labels;

responsively, populating the overall title using the fourth rectangle and immediately causing display of the overall title.

20. The method of clause 14, wherein the chart is two dimensional and the legend comprises labels aligned along an axis.

21. The method of clause 14, wherein the chart is one dimensional and the legend comprises labels on slices of the pie chart or visually linked by lead lines to the slices.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

The invention claimed is:

1. A method of reordering points in a plurality of ordered series on a chart, including:

causing display of the chart, including graphic elements linked to corresponding data cells in a spreadsheet, the graphic elements representing groups of the points from the plurality of ordered series, the graphic elements and labels for the graphic elements oriented along a first axis;

receiving first source and target signals resulting from a user action changing an order of the graphic elements along the first axis; and responsively, changing the order of the graphic elements in the chart without changing locations of the corresponding data cells in the spreadsheet, further changing an order of the labels along the first axis corresponding to the changed order of the graphic elements, and immediately causing display of the reordered graphic elements and labels;

wherein the link between the data cells and the graphic elements causes changes in values of the corresponding data cells, applied before and after the changing of the order of the graphic elements in the chart, to propagate to and update sizes of the graphic elements proportional to the changes in values of the corresponding data cells.

2. The method of claim 1, wherein the first source and target signals are generated from dragging and dropping one of the graphic elements.

3. The method of claim 1, wherein at least one of the first source and target signals are generated from selection of one of the graphic elements followed by selection of a position along the first axis.

4. The method of claim 1, wherein the chart is a stacked column or stacked bar chart and respective points from the plurality of ordered series are represented by stacked bars.

5. The method of claim 1, wherein the chart is a vertical or horizontal side-by-side bar chart and respective points from the plurality of ordered series are represented by groups of side-by-side bars.

6. The method of claim 1, further including: providing a sidebar control for ordering the groups of the points; wherein receiving the first source and target signals results from user interaction with the sidebar control.

7. The method of claim 1, further including: providing a panel control that pops up for ordering the groups of the points; and wherein receiving the first source and target signals results from user interaction with the panel control.

8. A non-transitory computer readable medium including program instructions that, when executed on hardware resources, cause the hardware resources to implement a method of reordering points in a plurality of ordered series on a chart, including:

causing display of the chart, including graphic elements linked to corresponding data cells in a spreadsheet, the graphic elements and labels for the graphic elements representing groups of the points from the plurality of ordered series, the graphic elements oriented along a first axis;

receiving first source and target signals resulting from a user action changing an order of the graphic elements along the first axis; and responsively, changing the order of the graphic elements in the chart without changing locations of the corresponding data cells in the spreadsheet, further changing an order of the labels along the first axis corresponding to the changed order of the graphic elements, and immediately causing display of the reordered graphic elements and labels;

wherein the link between the data cells and the graphic elements causes changes in values of the corresponding data cells, applied before and after the changing of the order of the graphic elements in the chart, to propagate to and update sizes of the graphic elements proportional to the changes in values of the corresponding data cells.

9. A method of reordering series in a plurality of ordered series on a chart, including:

causing display of the chart with stacked columns including graphic elements linked to corresponding data cells in a spreadsheet and labels for the graphic elements, the graphic elements representing points from the plurality of ordered series and oriented along a first axis;

receiving first source and target signals resulting from a user action changing an order of a first graphic element among graphic elements within a first stacked column representing respective points from the plurality of ordered series; and responsively, changing the order of the graphic elements within the first stacked column in the chart without changing locations of the corresponding data cells in the spreadsheet, further changing an order of the labels for the graphic elements along corresponding to the changed order of the graphic elements, and immediately causing display of the reordered graphic elements and the reordered labels;

wherein the link between the data cells and the graphic elements causes changes in values of the corresponding data cells, applied before and after the changing of the order of the graphic elements in the chart, to propagate to and update sizes of the graphic elements proportional to the changes in values of the corresponding data cells.

10. The method of claim 9, wherein the first source and target signals are generated from dragging and dropping the first graphic element.

11. The method of claim 9, wherein at least one of the first source and target signals are generated from selection of the first graphic element followed by selection of a position along the first axis.

12. The method of claim 9, wherein the chart is a vertical or horizontal stacked bar chart, respective points from the ordered series are represented by stacked bars, and the reordering changes relative positions of the ordered series in each of the stacked bars.

13. The method of claim 9, wherein the chart is a vertical or horizontal side-by-side bar chart, respective points from the ordered series are represented by side-by-side bars, and the reordering changes relative positions of the ordered series in each group of the side-by-side bars.

14. The method of claim 9, further including:

providing a sidebar control for the ordering of the ordered series;

wherein receiving the first source and target signals results from user interaction with the sidebar control.

15. The method of claim 9, further including:

providing a panel control that pops up for ordering of the points; and wherein receiving the first source and target signals results from user interaction with the panel control.

16. A non-transitory computer readable medium including program instructions that, when executed on hardware resources, cause the hardware resources to implement a method of reordering series in a plurality of ordered series on a chart, including:

causing display of the chart, including graphic elements linked to corresponding data cells in a spreadsheet, the graphic elements and labels for the graphic elements representing points from the plurality of ordered series and oriented along a first axis;

receiving first source and target signals resulting from a user action changing an order of a first graphic element among a plurality of graphic elements representing respective points from the plurality of ordered series; and responsively, changing the order of the graphic elements in the chart without changing locations of the corresponding data cells in the spreadsheet, further changing an order of the labels along the first axis corresponding to the changed order of the graphic elements, and immediately causing display of the reordered graphic elements and labels;

wherein the link between the data cells and the graphic elements causes changes in values of the corresponding data cells, applied before and after the changing of the order of the graphic elements in the chart, to propagate to and update sizes of the graphic elements proportional to the changes in values of the corresponding data cells.

17. A method of reordering graphic elements on a chart, including:

causing display of the chart, including graphic elements linked to corresponding data cells in a spreadsheet and labels for the graphic elements, the graphic elements representing points from one or more ordered series of the corresponding data cells;

causing display of a sort-by-total control in an on-chart control, sidebar or on a panel;

receiving a first sort signal resulting from a user interaction with the sort-by-total control;

responsively, for each graphic element of the graphic elements, calculating respective point totals by totaling values of respective points of respective data cells linked to the graphic element, sorting the respective point totals, reordering the graphic elements and the labels according to the sorted point totals, and immediately causing display of the reordered graphic elements and the labels;

wherein the link between the data cells and the graphic elements causes changes in values of the corresponding data cells to propagate to and update sizes of the graphic elements proportional to the changes in values of the corresponding data cells.

18. The method of claim 17, wherein the chart is a one-dimensional pie chart, the graphic elements are slices of the pie chart, the point totals are the values in individual cells linked to the slices, and the sorting results in reordering of the slices by size.

19. The method of claim 17, wherein the chart is one-dimensional and the point totals are the values in individual cells.

20. The method of claim 17, wherein the chart is two-dimensional, the first sort signal includes selection of a dimension and the totaling applies to the values in multiple cells over the selected dimension.

21. The method of claim 17, wherein the chart is two-dimensional, the first sort signal includes selection of totaling both dimensions, the totaling applies to each of the dimensions separate, and the sorting applies to each of the dimensions.

22. A non-transitory computer readable medium including program instructions that, when executed on hardware resources, cause the hardware resources to implement a method of reordering graphic elements on a chart, including:

causing display of the chart, including graphic elements linked to corresponding data cells in a spreadsheet and labels for the graphic elements, the graphic elements representing points from one or more ordered series;

causing display of a sort-by-total control in an on-chart control, sidebar or on a panel;

receiving a first sort signal resulting from a user interaction with the sort-by-total control;

responsively, totaling values in the cells of points in the series, if the chart is not one dimensional, sorting the point totals, reordering the graphic elements and the labels according to the sorted point totals, and immediately causing display of the reordered graphic elements and the labels;

wherein the link between the data cells and the graphic elements causes changes in values of the corresponding data cells, applied before and after the changing of the order of the graphic elements in the chart, to propagate to and update sizes of the graphic elements proportional to the changes in values of the corresponding data cells.

* * * * *